(12) United States Patent
Lin et al.

(10) Patent No.: US 8,294,651 B2
(45) Date of Patent: *Oct. 23, 2012

(54) LIQUID CRYSTAL DISPLAY

(75) Inventors: Ching-Huan Lin, Tainan County (TW); Hsiang-Lin Lin, Changhua County (TW); Shih-Chia Hsu, Kaohsiung (TW); Sheng-Chao Liu, Kaohsiung (TW); Kuang-Hsiang Liu, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 566 days.

This patent is subject to a terminal disclaimer.

(21) Appl. No.: 12/508,573

(22) Filed: Jul. 24, 2009

(65) Prior Publication Data

US 2010/0259701 A1   Oct. 14, 2010

(30) Foreign Application Priority Data

Apr. 13, 2009   (TW) .............................. 98112230 A

(51) Int. Cl.
*G09G 3/36* (2006.01)

(52) U.S. Cl. ............ 345/90; 345/204; 345/211; 349/37; 349/38

(58) Field of Classification Search .................. 345/204, 345/205, 206, 211–215, 39–43, 87–103; 349/37, 38
See application file for complete search history.

(56) References Cited

U.S. PATENT DOCUMENTS

| | | | |
|---|---|---|---|
| 5,923,310 A * | 7/1999 | Kim ................................ 345/90 |
| 6,768,481 B2 | 7/2004 | Ozawa et al. | |
| 7,015,890 B2 * | 3/2006 | Moon ............................ 345/100 |
| 7,321,355 B2 | 1/2008 | Lee et al. | |
| 7,518,687 B2 * | 4/2009 | Chen et al. ..................... 349/139 |
| 7,683,988 B2 * | 3/2010 | Lin et al. ........................ 349/114 |
| 7,868,976 B2 * | 1/2011 | Lin et al. ........................ 349/114 |
| 7,920,117 B2 * | 4/2011 | Ohue et al. ....................... 345/98 |
| 8,072,409 B2 * | 12/2011 | Fanchiang et al. ............... 345/98 |
| 8,159,625 B2 * | 4/2012 | Huang et al. ..................... 349/39 |
| 2002/0105489 A1 | 8/2002 | Hashimoto et al. | |

(Continued)

FOREIGN PATENT DOCUMENTS

CN          101408704          4/2009

OTHER PUBLICATIONS

"1st Office Action of China Counterpart Application", issued on Jun. 3, 2010, , p. 1-p. 5.

*Primary Examiner* — Lun-Yi Lao
*Assistant Examiner* — Tom Sheng
(74) *Attorney, Agent, or Firm* — Jianq Chyun IP Office

(57) ABSTRACT

A liquid crystal display (LCD) is provided. The LCD includes a display panel and a voltage supply device (VSD). The display panel includes a plurality of scan lines, a plurality of data lines disposed substantially perpendicularly with the scan lines, and a plurality of pixels. The pixels are respectively electrically connected with the corresponding data line and the corresponding scan line, and are arranged in an array. Each of the pixels includes a common line and a compensation line, wherein the common line is located in the transparent area to receive a common voltage, and the compensation line is located in the reflection area to receive a stable voltage. The VSD is coupled to the compensation line of each of the pixels for continuously and correspondingly providing the stable voltage to the compensation line of each of the pixels.

45 Claims, 69 Drawing Sheets

U.S. PATENT DOCUMENTS

| | | | |
|---|---|---|---|
| 2005/0243246 A1* | 11/2005 | Edwards et al. | 349/98 |
| 2006/0262237 A1* | 11/2006 | Chen et al. | 349/38 |
| 2007/0263144 A1* | 11/2007 | Lin et al. | 349/114 |
| 2008/0024406 A1* | 1/2008 | Kim et al. | 345/87 |
| 2008/0055506 A1* | 3/2008 | Huang et al. | 349/41 |
| 2008/0180370 A1* | 7/2008 | Huang et al. | 345/87 |
| 2008/0303967 A1* | 12/2008 | Huang et al. | 349/39 |
| 2009/0015527 A1* | 1/2009 | Chung et al. | 345/87 |
| 2009/0015528 A1* | 1/2009 | Sheu | 345/87 |
| 2009/0096730 A1* | 4/2009 | Jung et al. | 345/87 |
| 2010/0182345 A1* | 7/2010 | Shimoshikiryoh et al. | 345/690 |

* cited by examiner

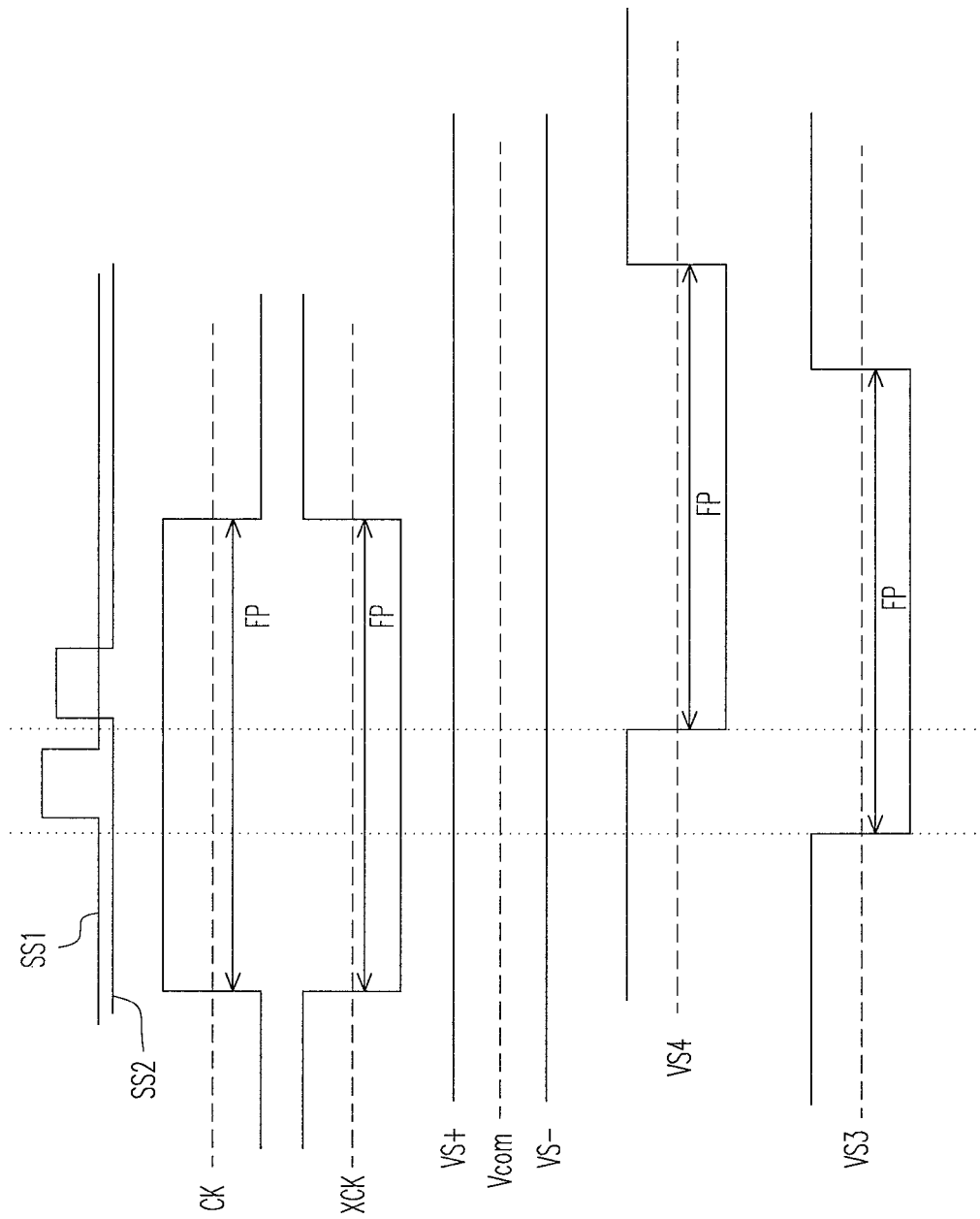

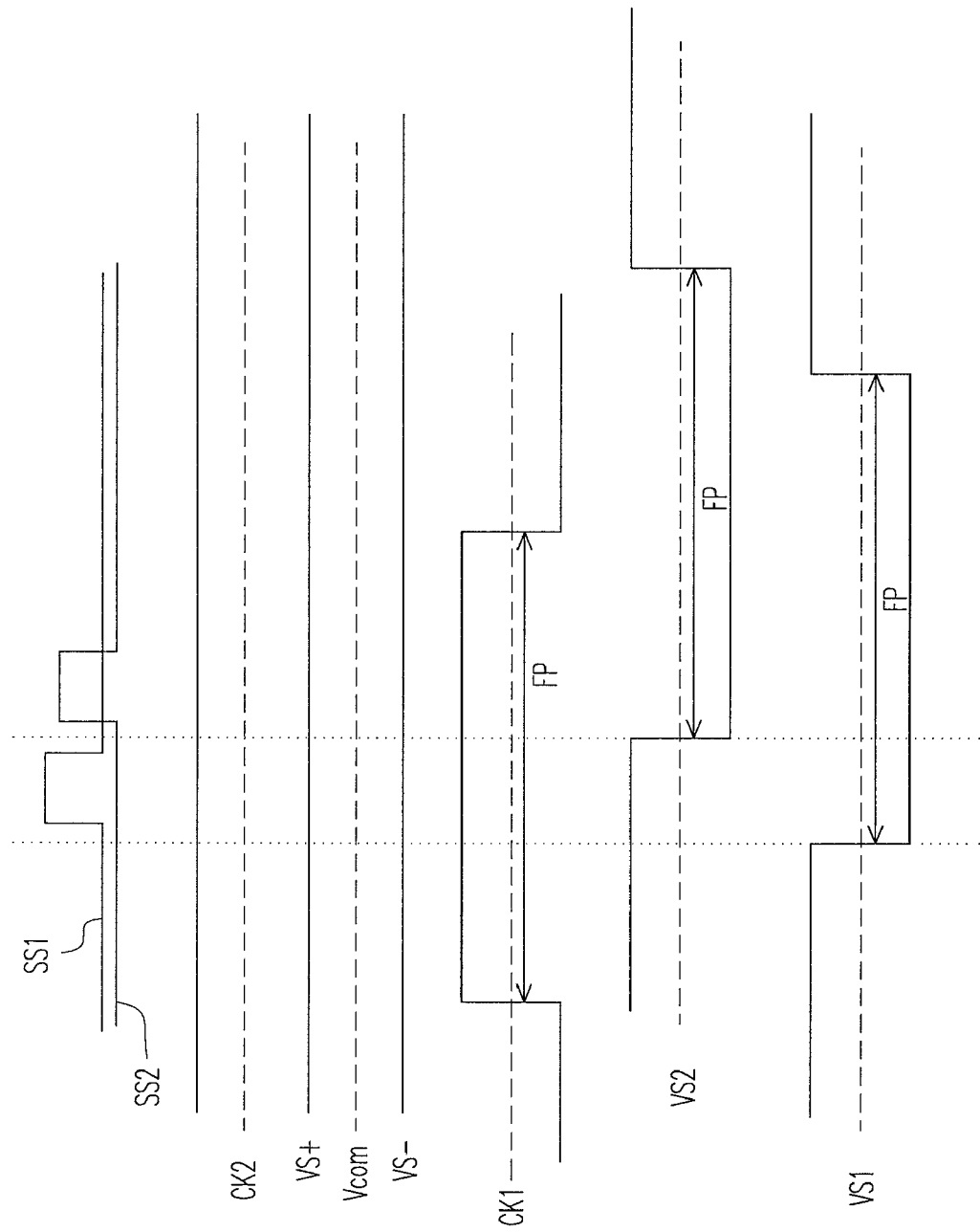

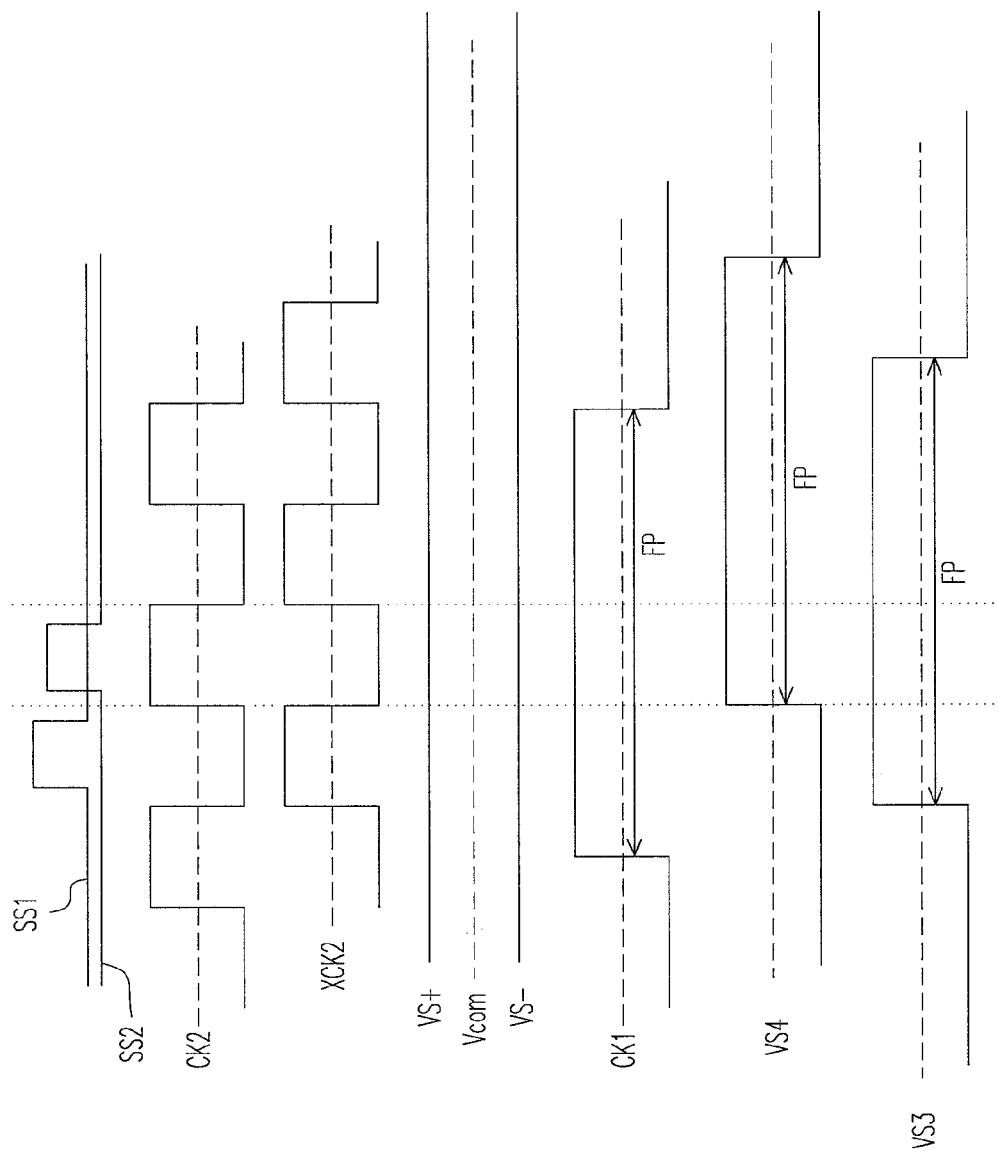

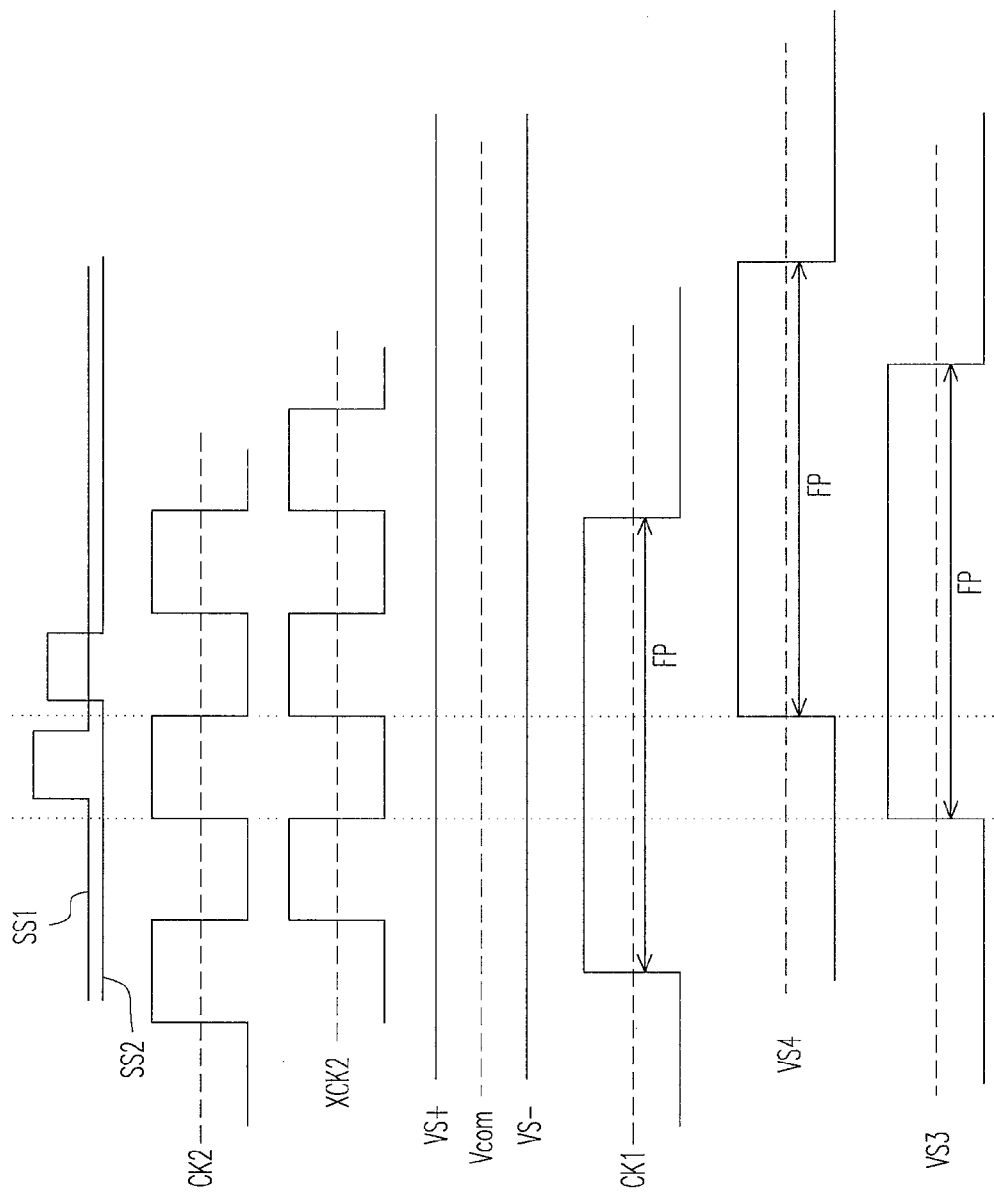

LIQUID CRYSTAL DISPLAY

CROSS-REFERENCE TO RELATED APPLICATION

This application claims the priority benefit of Taiwan application serial no. 98112230, filed on Apr. 13, 2009. The entirety of the above-mentioned patent application is hereby incorporated by reference herein and made a part of specification.

BACKGROUND OF THE INVENTION

1. Field of the Invention

The present invention relates to a flat panel display, and more particularly, to a single cell gap liquid crystal display (LCD).

2. Description of Related Art

Liquid crystal displays (LCD) can be categorized into the transparent type, the reflective type and the transflective type. Among them, the transflective LCDs utilizing both a backlight source and an external light source are suitable for being applied to portable electronic products, such as cell phones, personal digital assistants (PDAs) and e-Books. Therefore, the transflective LCDs draw more and more attention from the public.

In general, the transflective LCD can be categorized into the single cell gap transflective LCD and the dual cell gap transflective LCD. Since the fabrication of the single cell gap transflective LCD is simpler than that of the dual cell gap transflective LCD, and the cost of the single cell gap transflective LCD is lower than that of the dual cell gap transflective LCD. Therefore, the single cell gap transflective LCD has become the first choice to be applied to all kinds of the portable electronic products.

However, the main problem of the single cell gap transflective LCD facing presently is that the Gamma curves of a transparent area of each of pixels do not be matched with the Gamma curves of a reflective area. Hence, the transparent display quality and the reflective display quality of the single cell gap transflective LCD can not be optimized simultaneously.

SUMMARY OF THE INVENTION

Accordingly, the present invention provides a single cell gap transflective liquid crystal display (LCD) of which the transparent display quality and the reflective display quality can be optimized simultaneously.

The present invention provides a LCD including a display panel and a voltage supply device (VSD). The display panel includes a plurality of scan lines, a plurality of data lines substantially perpendicularly disposed with the scan lines, and a plurality of pixels. The pixels are respectively electrically connected with the corresponding data line and the corresponding scan line, and are arranged in an array. Each of the pixels includes a common line and a compensation line, wherein the common line is used to receive a common voltage, and the compensation line is used to receive a stable voltage. The VSD is coupled to the compensation line of each of the pixels for continuously and correspondingly providing the stable voltage to the compensation line of each of the pixels.

The present invention uses the VSD to continuously and correspondingly provide the stable voltage for the compensation line of a reflective area of each of the pixels, so as to change a voltage difference of the reflective area of each of the pixels. Hence, the reflective Gamma curves of the reflective area of each of pixels can be adjusted, so as to be matched with transparent Gamma curves of the transparent area of each of pixels. As a result, the transparent display quality and the reflective display quality of the single cell gap transflective LCD can be optimized simultaneously.

It should be understood that the above general description and the specific embodiments in the following are merely examples for explanation, and do not limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 20A and 20B are respectively timing diagrams of the circuit operation of the voltage supply unit according to the seventh exemplary embodiment.

FIGS. 25A and 25B are respectively timing diagrams of the circuit operation of the voltage supply unit according to the tenth exemplary embodiment.

FIGS. 28A and 28B are respectively timing diagrams of the circuit operation of the voltage supply unit according to the eleventh exemplary embodiment.

FIGS. 48A and 48B are respectively timing diagrams of the circuit operation of the voltage supply unit according to the twenty-fourth exemplary embodiment.

DESCRIPTION OF EMBODIMENTS

Figure 1:
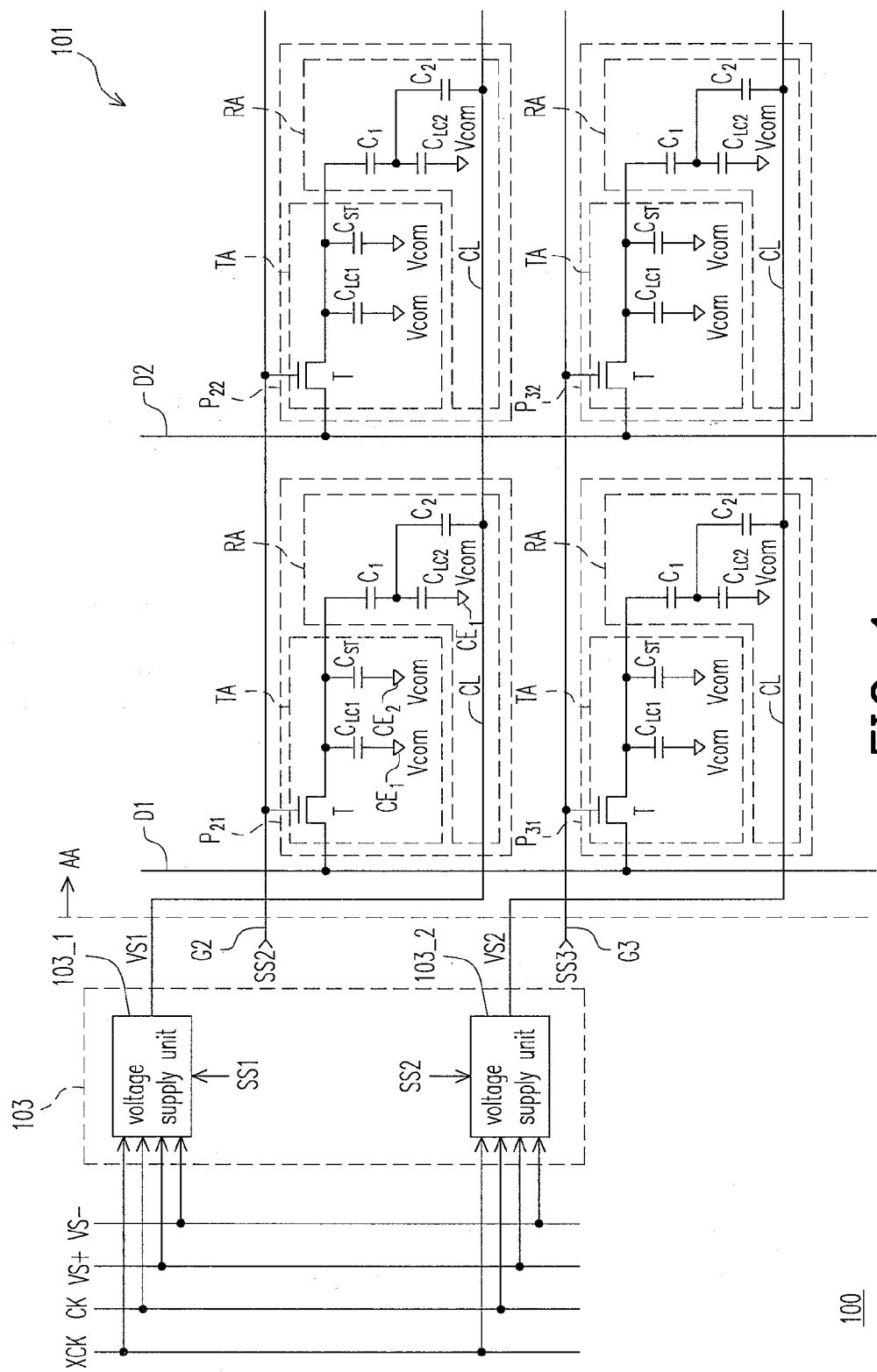
FIG. 1 is a diagram showing a partial single cell gap transflective LCD according to the first exemplary embodiment of the present invention.

Descriptions of the present invention are given with reference to the exemplary embodiments illustrated with accompanied drawings. Besides, wherever possible, the same reference numbers used in the drawings and the description refer to the same or like parts.

The First Exemplary Embodiment

FIG. 1 is a schematic diagram of a partial single cell gap transflective LCD 100 according to the first exemplary embodiment of the present invention. Referring to FIG. 1, the single cell gap transflective LCD 100 includes a display panel 101 and a voltage supply device 103, wherein the display panel 101 is a single cell gap liquid crystal panel. Obviously, the single cell gap transflective LCD 100 further includes other components, such as a gate driver, a source driver, a timing controller and a back light module. However, only components related to the present invention are sketched in the first exemplary embodiment for illustrating.

The display panel 101 includes a plurality of scan lines G2 and G3 (only two scan lines are shown to simplify explanations), a plurality of data lines D1 and D2 substantially perpendicularly disposed with the scan lines G2 and G3 (only two data lines are shown to simplify explanations), and a plurality of pixels $P_{21}$, $P_{22}$, $P_{31}$ and $P_{32}$ located in a display area AA of the display panel 101 (only four pixels are shown to simplify explanations).

The pixels $P_{21}$, $P_{22}$, $P_{31}$ and $P_{32}$ are respectively electrically connected with the corresponding data line and the corresponding scan line, and are arranged in an array. For example, the pixel $P_{21}$ is respectively electrically connected with the data line D1 and the scan line G2, the pixel $P_{22}$ is respectively electrically connected with the data line D2 and the scan line G2, the pixel $P_{31}$ is respectively electrically connected with the data line D1 and the scan line G3, and the pixel $P_{32}$ is respectively electrically connected with the data line D2 and the scan line G3. In addition, the pixel $P_{21}$ represents the $1^{st}$ pixel of the $2^{nd}$ pixel row, the pixel $P_{22}$ represents the $2^{nd}$ pixel of the $2^{nd}$ pixel row, the pixel $P_{31}$ represents the $1^{st}$ pixel of the $3^{rd}$ pixel row, and the pixel $P_{32}$ represents the $2^{nd}$ pixel of the $3^{rd}$ pixel row.

Each of the pixels $P_{21}$, $P_{22}$, $P_{31}$ and $P_{32}$ includes a common line $CE_2$ and a compensation line CL. The common line $CE_2$, for example, is located in a transparent area TA of each of the pixels $P_{21}$, $P_{22}$, $P_{31}$ and $P_{32}$, and the common line $CE_2$ is used to receive a common voltage Vcom. The compensation line CL, for example, is located in a reflective area RA of each of the pixels $P_{21}$, $P_{22}$, $P_{31}$ and $P_{32}$, and the compensation line CL is used to receive and transmit a stable voltage VS1 and/or VS2. That is, what the compensation line CL of each of the pixels $P_{21}$, $P_{22}$, $P_{31}$ and $P_{32}$ transmits is the stable voltage VS1 and/or VS2. Moreover, each of the pixels $P_{21}$, $P_{22}$, $P_{31}$ and $P_{32}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{21}$, $P_{22}$, $P_{31}$ and $P_{32}$ are similar in structure and in connection, only single pixel is used for description in the following.

Taking the pixel $P_{21}$ as an example, a gate of the pixel transistor T is coupled to the scan line G2, and a source of the pixel transistor T is coupled to the data line D1. In general, the first LC capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and the common line $CE_2$.

A first end of the first LC capacitor $C_{LC1}$ is coupled to the drain of the pixel transistor T, and a second end of the first LC capacitor $C_{LC1}$ is coupled to the common electrode Vcom. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{21}$. Although the first embodiment is exemplified by the transflective LCD, the application of the present invention is not limited thereto. For example, the main components of the present embodiment can be applied to a transparent LCD or a reflective LCD, so as to improve the color washout phenomenon. Furthermore, the common voltages Vcom of the first LC capacitor $C_{LC1}$ and the storage capacitor $C_{ST}$ are not limited to be the same. Those of ordinary skill in the art may make modifications accordingly.

In addition, a first end of the first capacitor $C_1$ is coupled to the drain of the pixel transistor T. A first end second of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{21}$.

In the first exemplary embodiment, the voltage supply device 103 is coupled to the compensation line CL of each of the pixels $P_{21}$, $P_{22}$, $P_{31}$ and $P_{32}$, and used to continuously and correspondingly provide the stable voltage(s) VS1 and/or VS2 to the compensation line CL of each of the pixels $P_{21}$, $P_{22}$, $P_{31}$ and $P_{32}$.

Specifically, the voltage supply device 103 includes a plurality of voltage supply units 103_1 and 103_2, i.e. each of the pixel rows with one voltage supply unit are provided. When driving the display panel 101 in a row inversion driving method, the $1^{st}$ voltage supply unit 103_1 provides a stable voltage, for example, a stable voltage with a negative polarity VS1, i.e. VS−, for the compensation line CL of each of the pixels $P_{21}$ and $P_{22}$ of the $2^{nd}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply device 103_2 provides a stable voltage, for example, a stable voltage with a positive polarity VS2, i.e. VS+, for the compensation line CL of each of the pixels $P_{31}$ and $P_{32}$ of the $3^{rd}$ pixel row according to a $2^{nd}$ scan signal SS2, and the first and the second clock signals CK and XCK, wherein there is a 180 degrees phase difference between the first clock signal CK and the second clock signal XCK. Besides, duty cycles of the first and the second clock signals CK and XCK are substantially an enable period of the scan signals SS1 or SS2. Generally the enable periods of the scan signals SS1 and SS2 are the same.

Figure 2A:
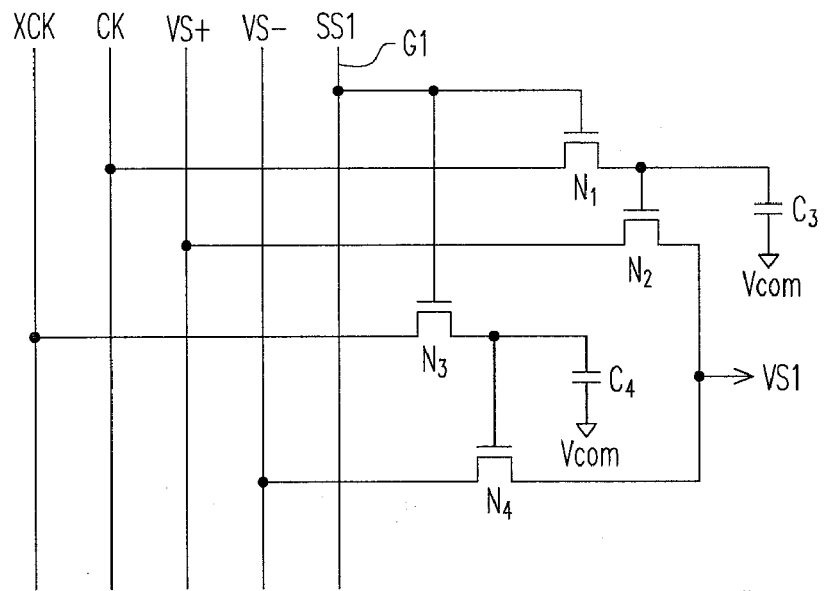
FIGS. 2A and 2B are respectively circuit diagrams of the voltage supply unit of the first exemplary embodiment.
Figure 2B:
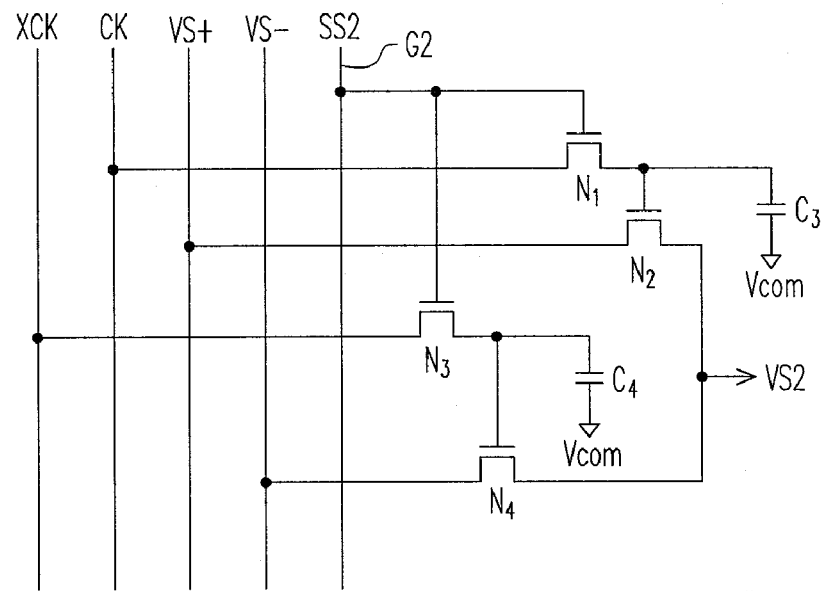

FIGS. 2A and 2B are respectively circuit diagrams of the voltage supply units 103_1 and 103_2 of the first exemplary embodiment. Referring to both FIGS. 2A and 2B, the voltage supply units 103_1 and 103_2 both include a first N-type transistor $N_1$, a third capacitor $C_3$, a second N-type transistor $N_2$, a third N-type transistor $N_3$, a fourth capacitor $C_4$ and a fourth N-type transistor $N_4$. Since the all the voltage supply units 103_1 and 103_2 are similar in structure and in connection, only single voltage supply unit is used for description in the following.

Taking the voltage supply unit 103_1 as an example, a gate of the first N-type transistor $N_1$ is coupled to the $1^{st}$ scan line G1 to receive the scan signal SS1, and a source of the first N-type transistor $N_1$ is used to receive the first clock signal CK. A first end of the third capacitor $C_3$ is coupled to a drain of the first N-type transistor $N_1$, and a second end of the third capacitor $C_3$ is coupled to the common line $CE_2$. A gate of the second N-type transistor $N_2$ is coupled to the drain of the first N-type transistor $N_1$, a source of the second N-type transistor $N_2$ is used to receive the stable voltage with the positive polarity VS+, and a drain of the second N-type transistor $N_2$ is coupled to the compensation line CL of each of the pixels $P_{21}$ and $P_{22}$ of the $2^{nd}$ pixel row. Since the component arrangement and the signal receiving process of the voltage supply unit 103_2 can be understood according to the above description, detailed description thereof is omitted herein.

A gate of the third N-type transistor $N_3$ is coupled to the $1^{st}$ scan line G1 to receive the scan signal SS1, and a source of the third N-type transistor $N_3$ is used to receive the second clock signal XCK. A first end of the fourth capacitor $C_4$ is coupled to a drain of the third N-type transistor $N_3$, and a second end of the fourth capacitor $C_4$ is coupled to the common electrode $CE_1$. A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the compensation line CL of each of the pixels $P_{21}$ and $P_{22}$ of the $2^{nd}$ pixel row. Although the transistors $N_1$~$N_4$ refer to N-type transistors in the aforementioned discussion, the transistors $N_1$~$N_4$ are not limited thereto. For example, the transistors $N_1$~$N_4$ can be changed from N-type transistors to P-type transistors according to necessity of design, accompanied with adjustments of a corresponding gate control signal and a source receiving signal, so that the voltage supply unit 103_1 or 103_2 can provide the above-mentioned function.

Figure 3:
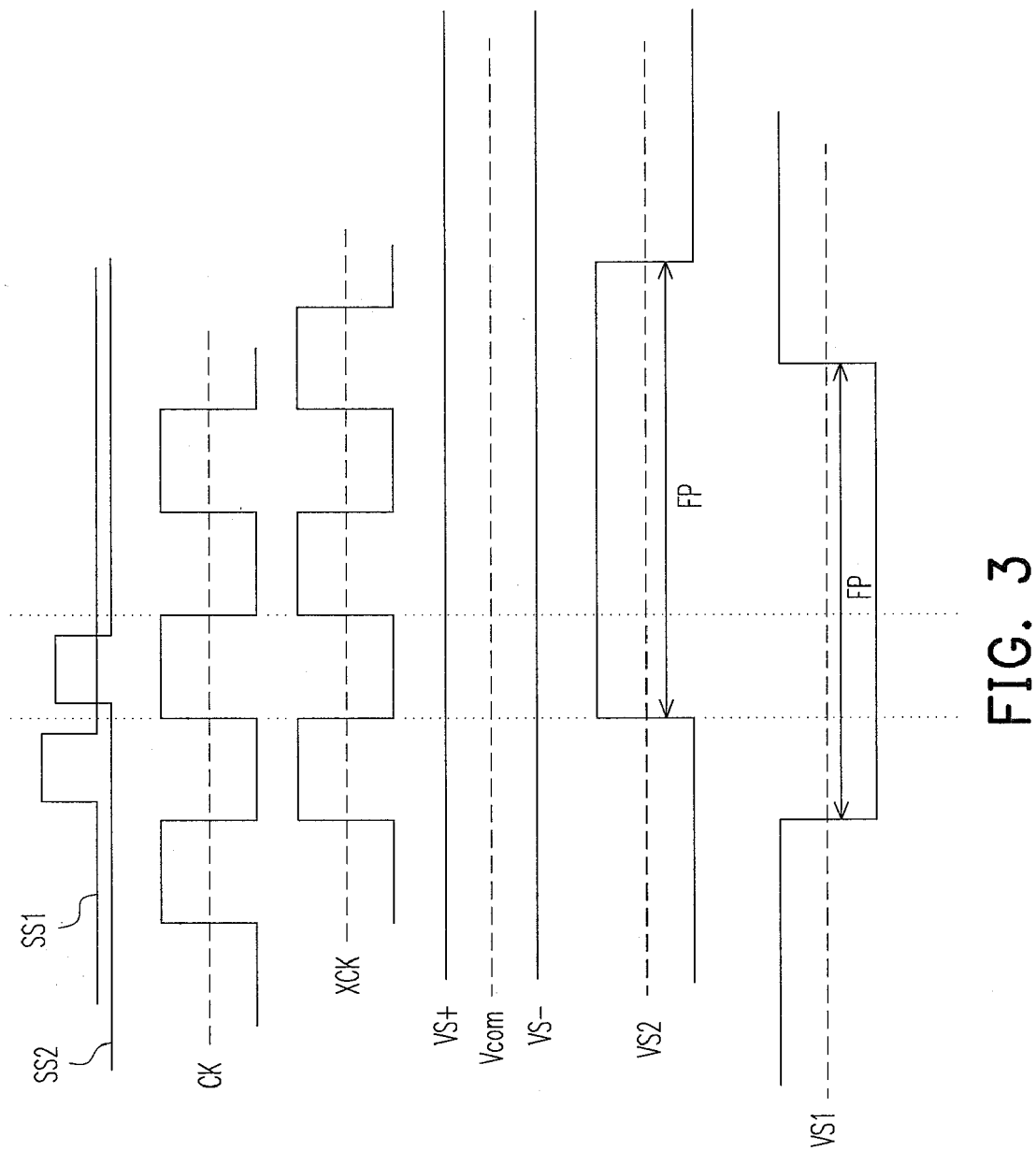
FIG. 3 is a timing diagram of the circuit operation of the voltage supply unit according to the first exemplary embodiment.

FIG. 3 is a timing diagram of the circuit operation of the voltage supply units 103_1 and 103_2 according to the first exemplary embodiment. Referring to FIGS. 1~3, it can be seen from FIG. 3 that when the scan signal SS1 is enabled, the first N-type transistor $N_1$ and the third N-type transistor $N_3$ of the voltage supply unit 103_1 are turned on. Since the first clock signal CK is disabled and the second clock signal XCK is enabled at this moment, the second N-type transistor $N_2$ of the voltage supply unit 103_1 is turned off, and the fourth N-type transistor $N_4$ is turned on. As a result, the voltage supply unit 103_1 provides the stable voltage with the negative polarity VS1, i.e. VS−, for the compensation line CL of each of the pixels $P_{21}$ and $P_{22}$ of the $2^{nd}$ pixel row during a frame period.

Similarly, when the scan signal SS2 is enabled, the first N-type transistor $N_1$ and the third N-type transistor $N_3$ of the voltage supply unit 103_2 are turned on. Since the first clock signal CK is enabled and the second clock signal XCK is disabled, the second N-type transistor $N_2$ of the voltage supply unit 103_2 is turned on, and the fourth N-type transistor $N_4$ is turned off. As a result, the voltage supply unit 103_2 provides the stable voltage with the positive polarity VS2, i.e. VS+, for the compensation line CL of each of the pixels $P_{31}$ and $P_{32}$ of the $3^{rd}$ pixel row during the frame period.

Accordingly, the voltage supply device 103 continuously and correspondingly provides/applies the stable voltages VS1 and VS2 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so as to adjust reflective Gamma curves of the reflective area RA of each of the pixels $P_{21}$, $P_{22}$, $P_{31}$ and $P_{32}$ so that the reflective Gamma curves can be matched with transparent Gamma curves of the transparent area TA. Hence, the transparent display quality and the reflective display quality of the single cell gap transflective LCD 100 can be optimized simultaneously.

In addition, since the voltage supply device 103 continuously and correspondingly provides/applies the stable voltages VS1 and VS2 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signals received by the data lines D1 and D2 through the coupling effect. Hence, the total cross-talk of the single cell gap transflective LCD 100 can be reduced below the set specifications of the shipment, such as below 2%, but the present invention is not limited thereto.

The Second Exemplary Embodiment

Figure 4:
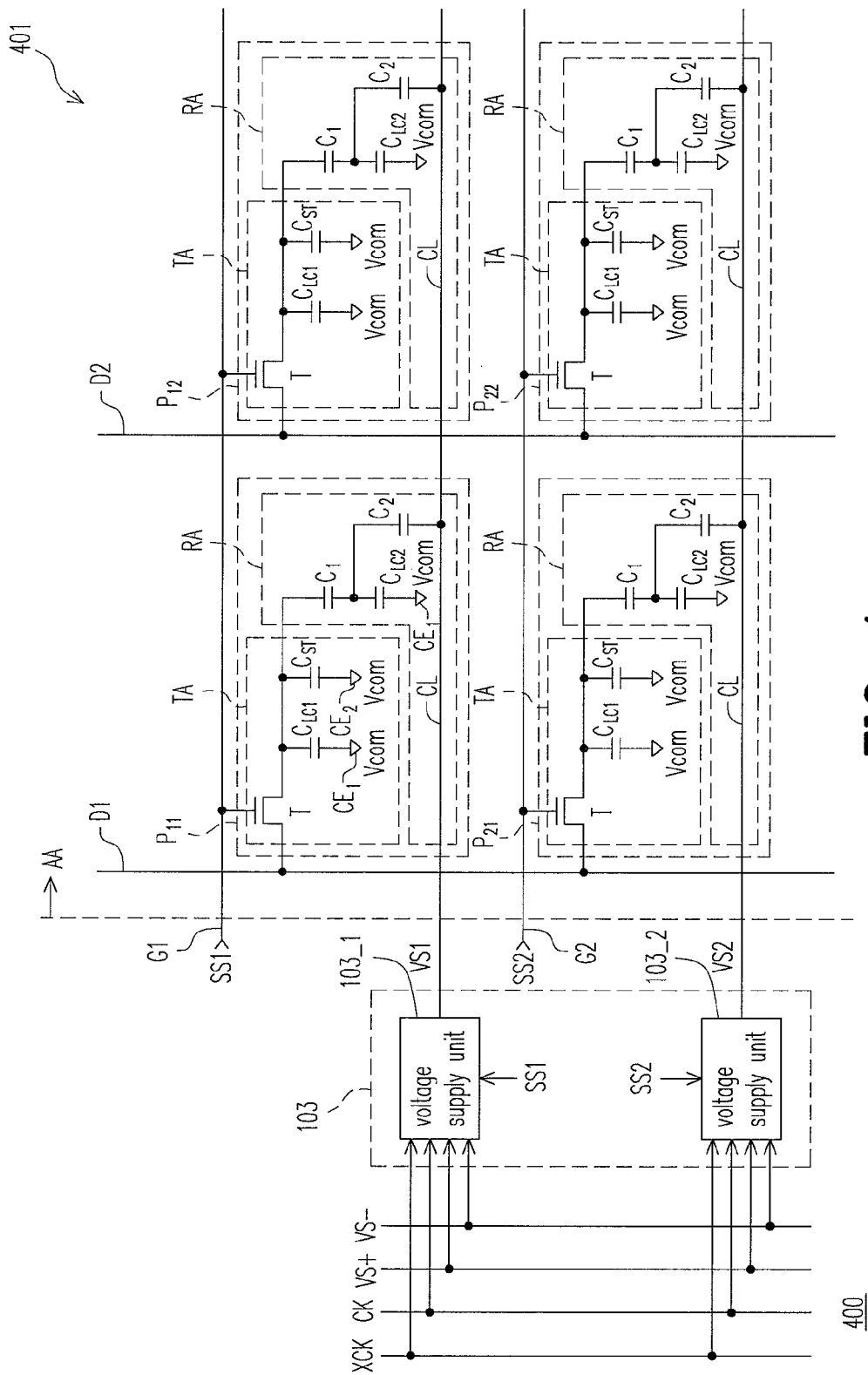
FIG. 4 is a diagram showing a partial single cell gap transflective LCD according to the second exemplary embodiment of the present invention.

FIG. 4 is a diagram showing a partial single cell gap transflective LCD 400 according to the second exemplary embodiment of the present invention. Referring to FIG. 4, the single cell gap transflective LCD 400 includes a single cell gap display panel 401 and a voltage supply device 103, wherein the display panel 401 is a liquid crystal display panel. Obviously, the single cell gap transflective LCD 400 further includes other components, such as a gate driver, a source driver, a timing controller and a back light module. However, only components related to the present invention are sketched in the second exemplary embodiment for illustrating.

The display panel 401 includes a plurality of scan lines G1 and G2 (only two scan lines are shown to simplify explanations), a plurality of data lines D1 and D2 substantially perpendicularly disposed to the scan lines G1 and G2 (only two data lines are shown to simplify explanations), and a plurality of pixels $P_{21}$, $P_{22}$, $P_{31}$ and $P_{32}$ located in a display area AA of the display panel 401 (only four pixels are shown to simplify explanations).

The pixels $P_{11}$, $P_{12}$, $P_{21}$ and $P_{22}$ are respectively electrically connected with the corresponding data line and the corresponding scan line, and are arranged in an array. For example, the pixel $P_{11}$ is respectively electrically connected with the data line D1 and the scan line G1, the pixel $P_{12}$ is respectively electrically connected with the data line D2 and the scan line G1, the pixel $P_{21}$ is respectively electrically connected with the data line D1 and the scan line G2, and the pixel $P_{22}$ is respectively electrically connected with the data line D2 and the scan line G2. In addition, the pixel $P_{11}$ represents the $1^{st}$ pixel of the $1^{st}$ pixel row of the display panel 401, the pixel $P_{12}$ represents the $2^{nd}$ pixel of the $1^{st}$ pixel row of the display panel 401, the pixel $P_{21}$ represents the $2^{nd}$ pixel of the $1^{st}$ pixel row of the display panel 401, and the pixel $P_{22}$ represents the $2^{nd}$ pixel of the $2^{nd}$ pixel row of the display panel 401.

Each of the pixels $P_{11}$, $P_{12}$, $P_{21}$ and $P_{22}$ includes a common line $CE_2$ and a compensation line CL. The compensation line CL, for example, is located in a transparent area TA of each of the pixels $P_{11}$, $P_{12}$, $P_{21}$ and $P_{22}$, and is used to receive a common voltage Vcom. The compensation line CL, for example, is located in a reflective area RA of each of the pixels $P_{11}$, $P_{12}$, $P_{21}$ and $P_{22}$, and the compensation line CL is used to correspondingly receive stable voltages VS1 and VS2. Moreover, each of the pixels $P_{11}$, $P_{12}$, $P_{21}$ and $P_{22}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{11}$, $P_{12}$, $P_{21}$ and $P_{22}$ are similar in structure and in connection, only single pixel is used for description in the following.

Taking the pixel $P_{11}$ as an example, a gate of the pixel transistor T is coupled to the scan line G1, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and common line $CE_2$.

A first end of the first LC capacitor $C_{LC1}$ is coupled to the drain of the pixel transistor T and a second end of the first LC capacitor $C_{LC1}$ is coupled to the common electrode $CE_1$. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{11}$. Although the second embodiment is exemplified by the transflective LCD, the application of the present invention is not limited thereto. For example, the main components of the present embodiment can be applied to a transparent LCD or a reflective LCD, so as to improve the color washout phenomenon. Furthermore, the common voltages Vcom of the first LC capacitor $C_{LC1}$ and the storage capacitor $C_{ST}$ are not limited to be the same. Those of ordinary skill in the art may make modifications accordingly.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{11}$.

In the second exemplary embodiment, the voltage supply device 103 is coupled to the compensation line CL of each of the pixels $P_{11}$, $P_{12}$, $P_{21}$ and $P_{22}$, and used to continuously and correspondingly provide the stable voltages VS1 and VS2 for the compensation line CL of each of the pixels $P_{11}$, $P_{12}$, $P_{21}$ and $P_{22}$.

Specifically, the voltage supply device 103 includes a plurality of voltage supply units 103_1 and 103_2, i.e. each of the pixel rows with one voltage supply unit are provided. When driving the display panel 401 in a row inversion driving method, the $1^{st}$ voltage supply unit 103_1 provides a stable voltage, for example, a stable voltage with a positive polarity VS1, i.e. VS+, for the compensation line CL of each of the pixels $P_{11}$, and $P_{12}$ of the $1^{st}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply device 103_2 provides a stable voltage, for example, a stable voltage with a negative polarity VS2, i.e. VS−, for the compensation line CL of each of the pixels $P_{21}$ and $P_{22}$ of the $2^{nd}$ pixel row according to a $2^{nd}$ scan signal SS2, and the first and the second clock signals CK and XCK, wherein there is a 180 degrees phase difference between the first clock signal CK and the second clock signal XCK. Besides, duty cycles of the first and the second clock signals CK and XCK are substantially an enable period of the scan signals SS1 or SS2. Generally the enable periods of the scan signals SS1 and SS2 are the same.

Since the structure of the voltage supply units 103_1 and 103_2 of the second exemplary embodiment are similar to those of the first exemplary embodiment, further descriptions are omitted herein.

Figure 5:
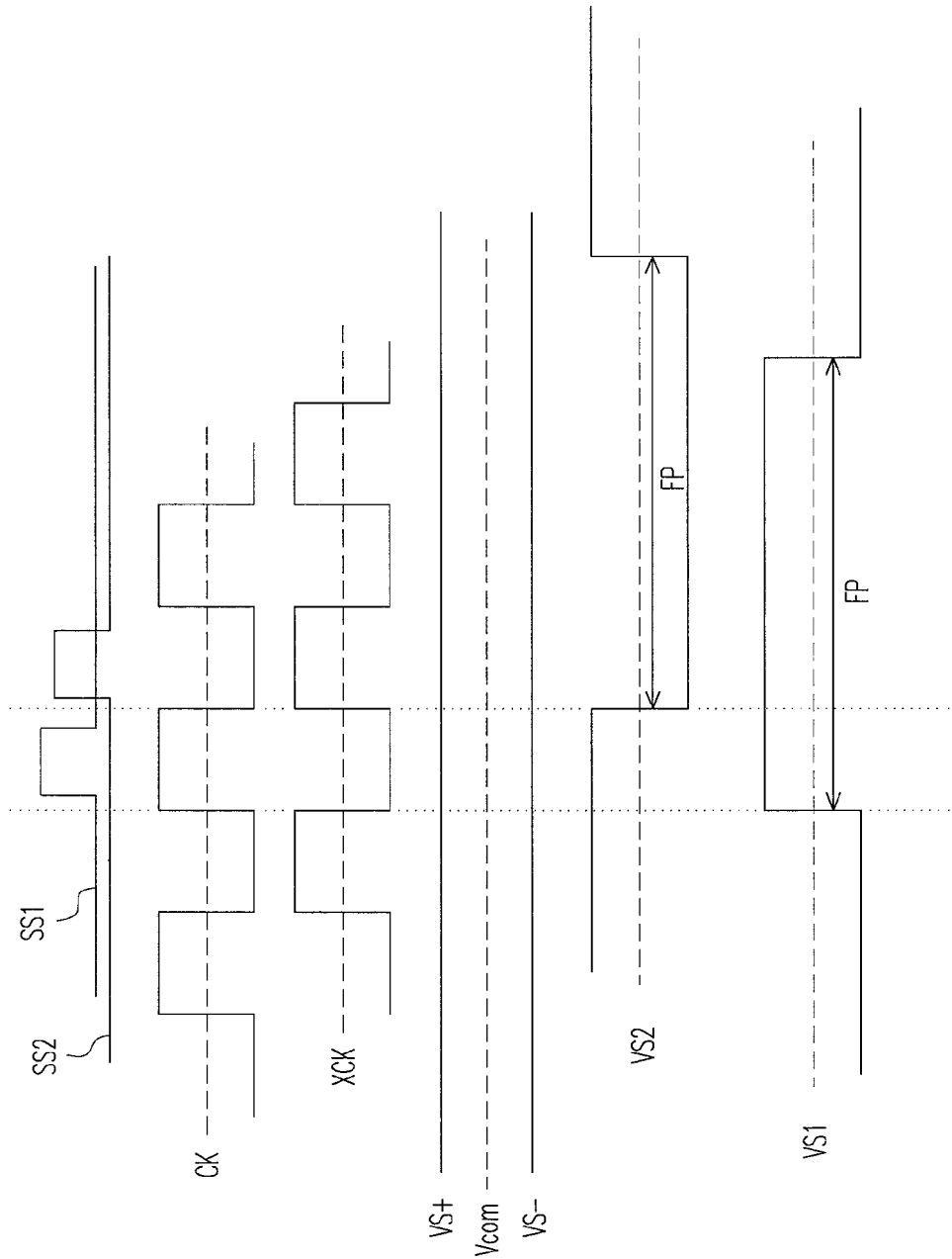
FIG. 5 is a timing diagram of the circuit operation of the voltage supply unit according to the second exemplary embodiment.

FIG. 5 is a timing diagram of the circuit operation of the voltage supply units 103_1 and 103_2 according to the second exemplary embodiment. Referring to FIG. 2A, FIG. 2B, FIG. 4 and FIG. 5, it can be seen from FIG. 5 that when the scan signal SS1 is enabled, the first N-type transistor $N_1$ and the third N-type transistor $N_3$ of the voltage supply unit 103_1 are turned on. Since the first clock signal CK is enabled and the second clock signal XCK is disabled, the second N-type transistor $N_2$ of the voltage supply unit 103_1 is turned on, and the fourth N-type transistor $N_4$ is turned off. As a result, the voltage supply unit 103_1 provides the stable voltage with the positive polarity VS1, i.e. VS+, for the compensation line CL of each of the pixels $P_{11}$, and $P_{12}$ of the $1^{st}$ pixel row during a frame period FP.

Similarly, when the scan signal SS2 is enabled, the first N-type transistor $N_1$ and the third N-type transistor $N_3$ of the voltage supply unit 103_2 are turned on. Since the first clock signal CK is disabled and the second clock signal XCK is enabled, the second N-type transistor $N_2$ of the voltage supply unit 103_2 is turned off, and the fourth N-type transistor $N_4$ is turned on. As a result, the voltage supply unit 103_2 provides the stable voltage with the negative polarity VS2, i.e. VS−, for the compensation line CL of each of the pixels $P_{21}$ and $P_{22}$ of the $2^{nd}$ pixel row during the frame period FP.

Accordingly, the voltage supply unit 103 continuously and correspondingly provides/applies the stable voltages VS1 and VS2 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so as to adjust reflective Gamma curves of the reflective area RA of each of the pixels $P_{11}$, $P_{12}$, $P_{21}$ and $P_{22}$ so that the reflective Gamma curves can be matched with transparent Gamma curves of the transparent area TA. Hence, the transparent display quality and the reflective display quality of the single cell gap transflective LCD 400 can be optimized simultaneously.

In addition, since the voltage supply device 103 continuously and correspondingly provides/applies the stable voltages VS1 and VS2 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total cross-talk of the single cell gap transflective LCD 400 can be reduced below the set specifications of the shipment, for example below 2%, but the present invention is not limited thereto.

The Third Exemplary Embodiment

Figure 6:
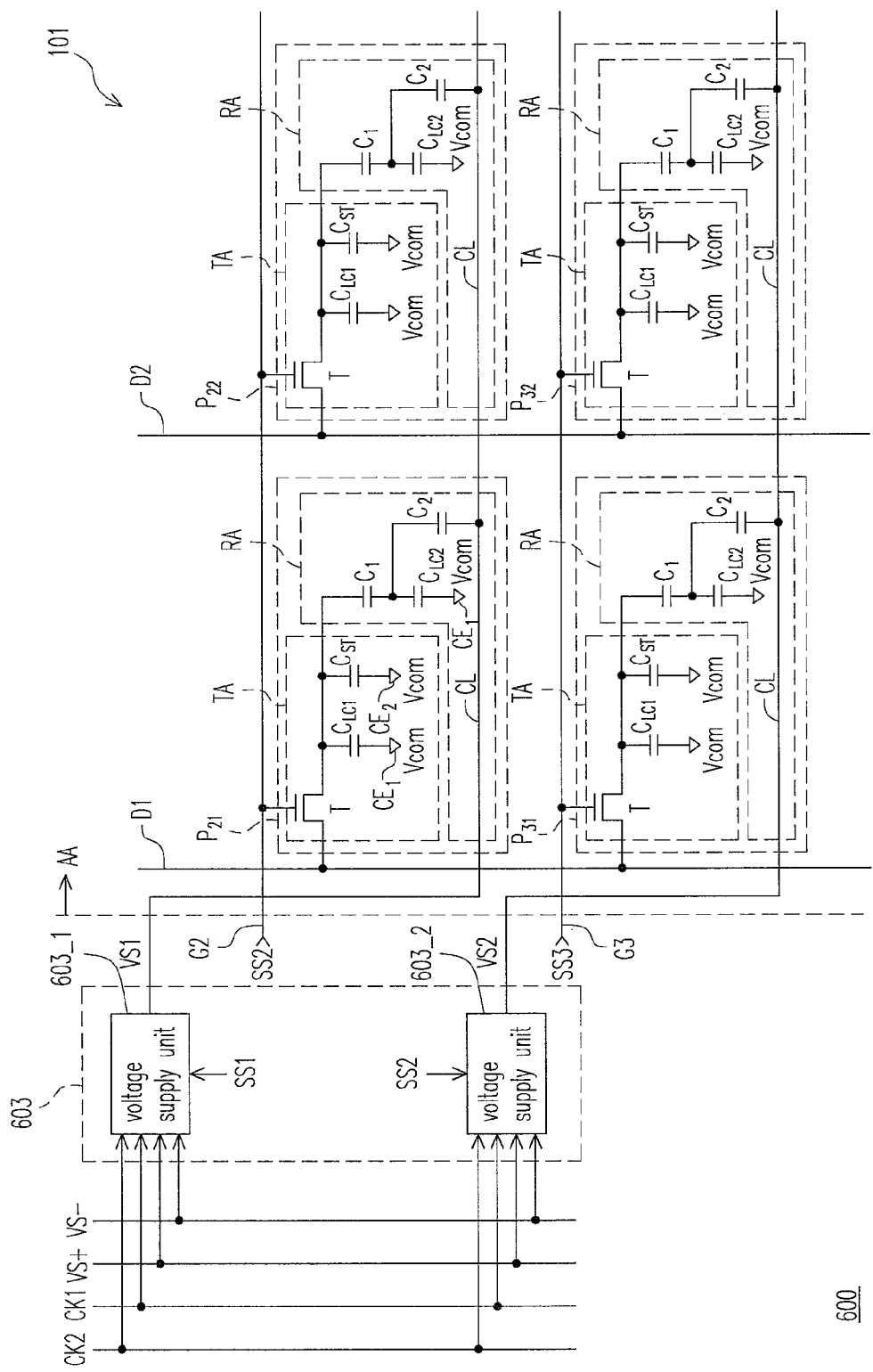
FIG. 6 is a diagram showing a partial single cell gap transflective LCD according to the third exemplary embodiment of the present invention.

FIG. 6 is a diagram showing a partial single cell gap transflective LCD 600 according to the third exemplary embodiment of the present invention. Referring to FIG. 6, the single cell gap transflective LCD 600 includes a single cell gap display panel 101 and a voltage supply device 603, wherein the display panel 101 is a liquid crystal display panel. Obviously, the single cell gap transflective LCD 600 further includes other components, such as a gate driver, a source driver, a timing controller and a back light module. However, only components related to the present invention are sketched in the third exemplary embodiment for illustrating.

Since the structure of the display panel 101 of the third exemplary embodiment is the same as that of the first exemplary embodiment, further descriptions are omitted herein. In addition, the voltage supply device 603 is coupled to the compensation line CL of each of the pixels $P_{21}$, $P_{22}$, $P_{31}$ and $P_{32}$, and used to continuously and correspondingly provide the stable voltages VS1 and VS2 to the compensation line CL of each of the pixels $P_{21}$, $P_{22}$, $P_{31}$ and $P_{32}$.

Specifically, the voltage supply device 603 includes a plurality of voltage supply units 603_1 and 603_2, i.e. each of the pixel rows with one voltage supply unit are provided. When driving the display panel 101 in a row inversion driving method, the $1^{st}$ voltage supply unit 603_1 provides a stable voltage, for example, a stable voltage with a positive polarity VS1, i.e. VS+, for the compensation line CL of each of the pixels $P_{21}$ and $P_{22}$ of the $2^{nd}$ pixel row according to a $1^{st}$ scan signal SS1, generally generated by the gate driver, and a first and a second clock signals CK and XCK. The first and the second clock signals CK and XCK, for example, are generated by the timing controller, but the present invention is not limited thereto.

Additionally, the $2^{nd}$ voltage supply device 603_2 provides a stable voltage, for example, a stable voltage with a negative polarity VS2, i.e. VS−, for the compensation line CL of each of the pixels $P_{31}$ and $P_{32}$ of the $3^{rd}$ pixel row according to a $2^{nd}$ scan signal SS2, and the first and the second clock signals CK and XCK. Besides, a duty cycle of the first clock signal CK1 is substantially an enable period of the scan signal SS1 or SS2, and the second clock signal CK2 is continuously maintained enabled. Generally the enable periods of the scan signals SS1 and SS2 are the same.

Figure 7A:
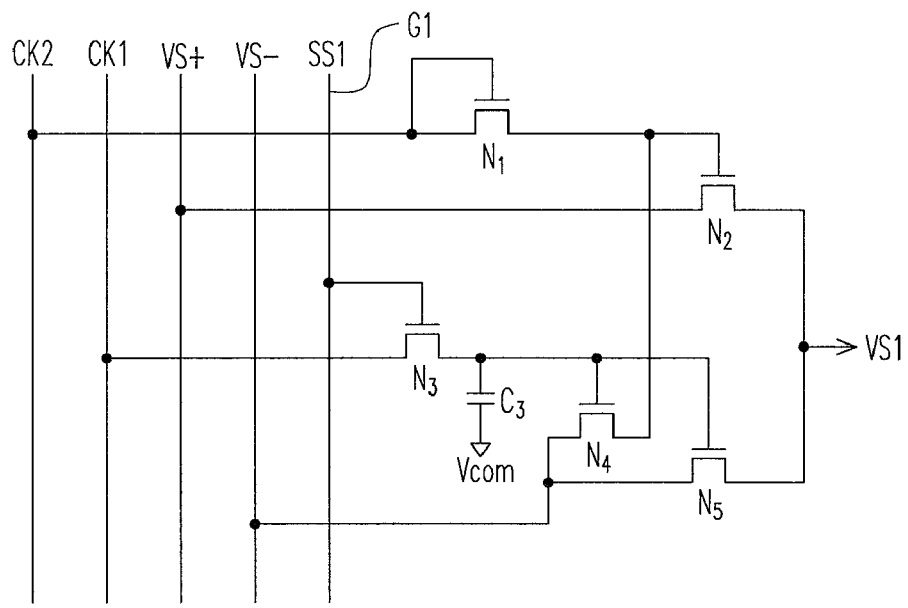
FIGS. 7A and 7B are respectively circuit diagrams of the voltage supply unit of the third exemplary embodiment.
Figure 7B:
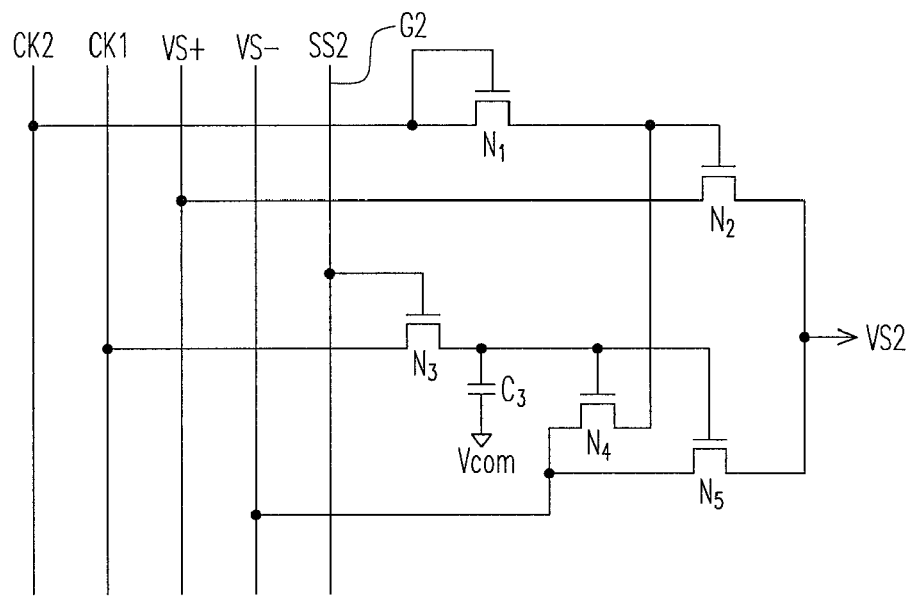

FIGS. 7A and 7B are respectively circuit diagrams of the voltage supply units 603_1 and 603_2 of the third exemplary embodiment. Referring to both FIGS. 7A and 7B, the voltage supply units 603_1 and 603_2 both include a first N-type transistor $N_1$, a second N-type transistor $N_2$, a third capacitor $C_3$, a third N-type transistor $N_3$, a fourth N-type transistor $N_4$ and a fifth N-type transistor $N_5$. Since the voltage supply units 603_1 and 603_2 are similar in structure and in connection, only single voltage supply unit is used for description in the following.

Taking the voltage supply unit 603_1 as an example, a gate and a source of the first N-type transistor $N_1$ are coupled with each other to receive the second clock signal CK2. A gate of the second N-type transistor $N_2$ is coupled to a drain of the first N-type transistor $N_1$, a source of the second N-type transistor $N_2$ is used to receive the stable voltage with the positive polarity VS+, and a drain of the second N-type transistor $N_2$ is coupled to the compensation line CL of each of the pixels $P_{21}$ and $P_{22}$ of the $2^{nd}$ pixel row. A gate of the third N-type transistor $N_3$ is coupled to the $1^{st}$ scan line G1 to receive the scan signal SS1, and a source of the third N-type transistor $N_3$ is used to receive the first clock signal CK1.

A first end of the third capacitor $C_3$ is coupled to a drain of the third N-type transistor $N_3$, and a second end of the third capacitor $C_3$ is coupled to the common line $CE_2$. A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the negative polarity VS−, and a drain of the fifth N-type transistor $N_5$ is coupled to the compensation line CL of each of the pixels $P_{21}$ and $P_{22}$ of the $2^{nd}$ pixel row. Although the transistors $N_1$~$N_5$ refer to N-type transistors in the aforementioned discussion, the transistors $N_1$~$N_5$ are not limited thereto. For example, the transistors $N_1$~$N_5$ can be changed from N-type transistors to P-type transistors according to necessity of design, accompanied with adjustments of a corresponding gate control signal and a source receiving signal, so that the voltage supply unit 603_1 or 603_2 can provide the above-mentioned function.

Figure 8:
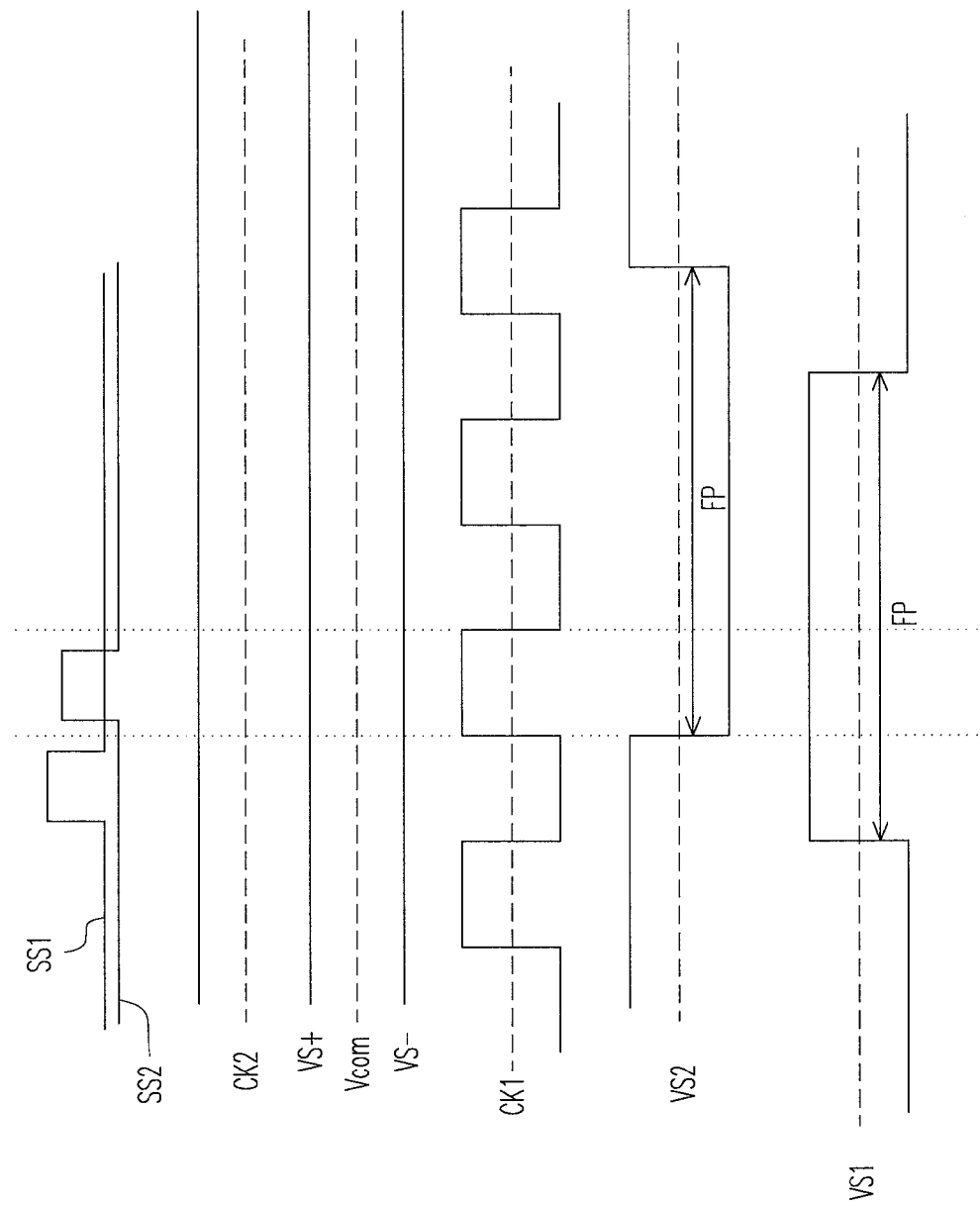
FIG. 8 is a timing diagram of the circuit operation of the voltage supply unit according to the third exemplary embodiment.

FIG. 8 is a timing diagram of the circuit operation of the voltage supply units 603_1 and 603_2 according to the third exemplary embodiment. Referring to FIGS. 6~8, it can be seen from FIG. 8 that when the scan signal SS1 is enabled, the first N-type transistor $N_1$ and the third N-type transistor $N_3$ of the voltage supply unit 603_1 are turned on. Since the first clock signal CK1 is disabled and the second clock signal CK2 is maintained enabled, the fourth N-type transistor $N_4$ and the fifth N-type transistor $N_5$ of the voltage supply unit 603_1 are turned off, and the second N-type transistor $N_2$ is turned on. As a result, the voltage supply unit 603_1 provides the stable voltage with the positive polarity VS1, i.e. VS+, for the compensation line CL of each of the pixels $P_{21}$ and $P_{22}$ of the $2^{nd}$ pixel row during a frame period FP.

Similarly, when the scan signal SS2 is enabled, the third N-type transistor $N_3$ of the voltage supply unit 603_2 is turned on. Since the first clock signal CK1 is enabled and the second clock signal CK2 is maintained enabled at this moment, the fourth N-type transistor $N_4$ and the fifth N-type transistor $N_5$ of the voltage supply unit 603_2 are turned on, and the second N-type transistor $N_2$ is turned off. As a result, the voltage supply unit 603_2 provides the stable voltage with the negative polarity VS2, i.e. VS−, for the compensation line CL of each of the pixels $P_{31}$ and $P_{32}$ of the $3^{rd}$ pixel row during the frame period FP.

Accordingly, the voltage supply unit 603 continuously and correspondingly provides/applies the stable voltage(s) VS1 and/or VS2 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so as to adjust reflective Gamma curves of the reflective area RA of each of the pixels $P_{21}$, $P_{22}$, $P_{31}$ and $P_{32}$ so that the reflective Gamma curves can be matched with transparent Gamma curves of the transparent area TA. Hence, the transparent display quality and the reflective display quality of the single cell gap transflective LCD 600 can be optimized simultaneously.

In addition, since the voltage supply device 603 continuously and correspondingly provides/applies the stable voltages VS1 and VS2 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total cross-talk of the single cell gap transflective LCD 600 can be reduced below the set specifications of the shipment, for example below 2%, but the present invention is not limited thereto.

The Fourth Exemplary Embodiment

Figure 9:
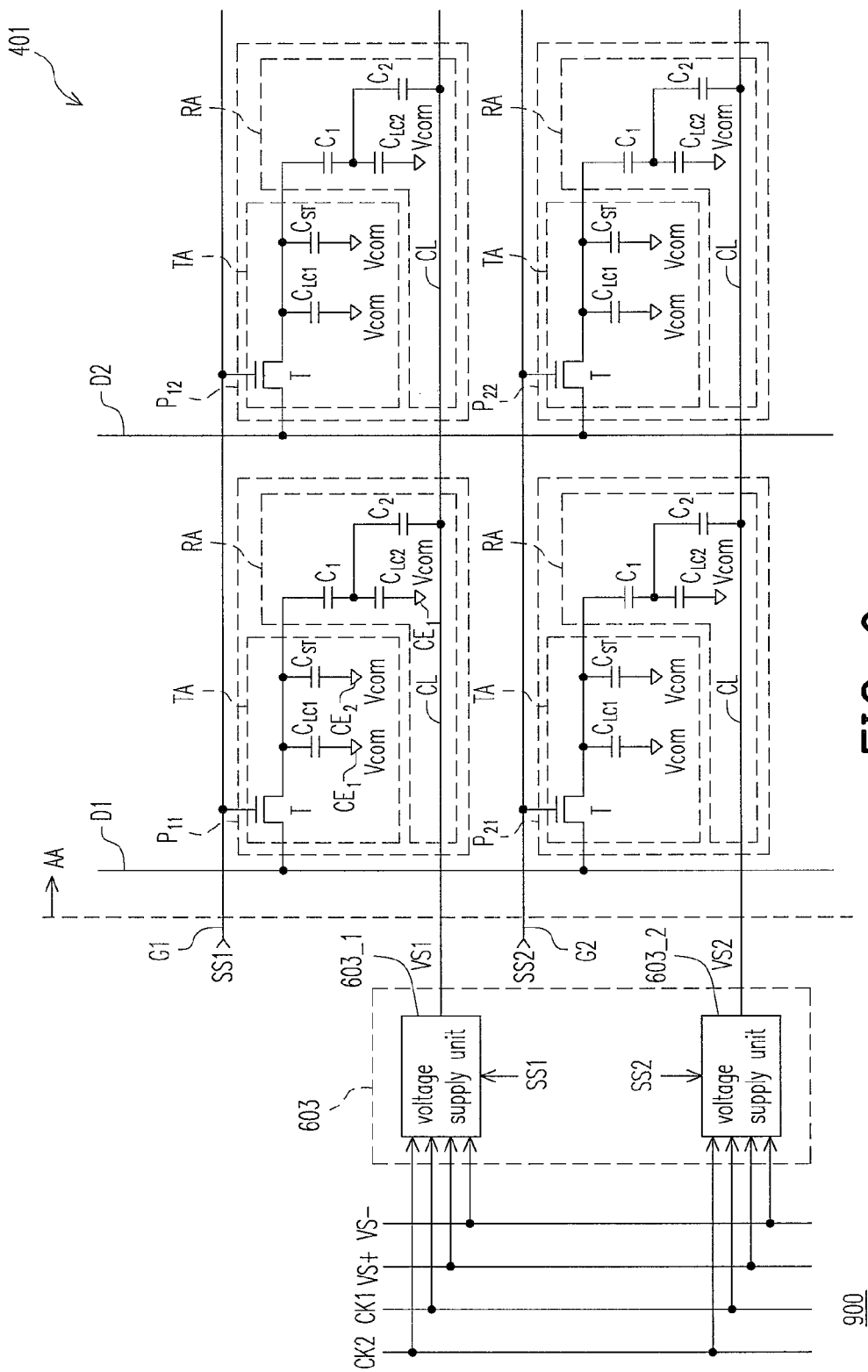
FIG. 9 is a diagram showing a partial single cell gap transflective LCD according to the fourth exemplary embodiment of the present invention.

FIG. 9 is a diagram showing a partial single cell gap transflective LCD 900 according to the fourth exemplary embodiment of the present invention. Referring to FIG. 9, the single cell gap transflective LCD 900 includes a single cell gap display panel 401 and a voltage supply device 603, wherein the display panel 401 is a liquid crystal display panel. Obviously, the single cell gap transflective LCD 900 further includes other components, such as a gate driver, a source driver, a timing controller and a back light module. However, only components related to the present invention are sketched in the fourth exemplary embodiment for illustrating.

Since the structure of the display panel 401 of the fourth exemplary embodiment is the same as that of the second exemplary embodiment, further descriptions are omitted herein. In addition, the voltage supply device 603 is coupled to the compensation line CL of each of the pixels $P_{11}$, $P_{12}$, $P_{21}$ and $P_{22}$, and used to continuously and correspondingly provide the stable voltage(s) VS1 and/or VS2 for the compensation line CL of each of the pixels $P_{11}$, $P_{12}$, $P_{21}$ and $P_{22}$.

Specifically, the voltage supply device 603 includes a plurality of voltage supply units 603_1 and 603_2, i.e. each of the pixel rows with one voltage supply unit are provided. When driving the display panel 401 in a row inversion driving method, the $1^{st}$ voltage supply unit 603_1 provides a stable voltage, for example, a stable voltage with a negative polarity VS1, i.e. VS−, for the compensation line CL of each of the pixels $P_{11}$ and $P_{12}$ of the $1^{st}$ pixel row according to a $1^{st}$ scan signal SS1, generally generated by the gate driver, and a first and a second clock signals CK1 and CK2. The first and the second clock signals CK1 and CK2, for example, are generated by the timing controller, but the present invention is not limited thereto.

Additionally, the $2^{nd}$ voltage supply device 603_2 provides a stable voltage, for example, a stable voltage with a positive polarity VS2, i.e. VS+, for the compensation line CL of each of the pixels $P_{21}$ and $P_{22}$ of the $2^{nd}$ pixel row according to a $2^{nd}$ scan signal SS2, and the first and the second clock signals CK1 and CK2. Besides, a duty cycle of the first clock signal CK1 is substantially an enable period of the scan signal SS1 or SS2, and the second clock signal CK2 is continuously maintained enabled. Generally the enable periods of the scan signals SS1 and SS2 are the same.

Since the structure of the voltage supply units 603_1 and 603_2 of the fourth exemplary embodiment is the same as that of the third exemplary embodiment, further descriptions are omitted herein.

Figure 10:
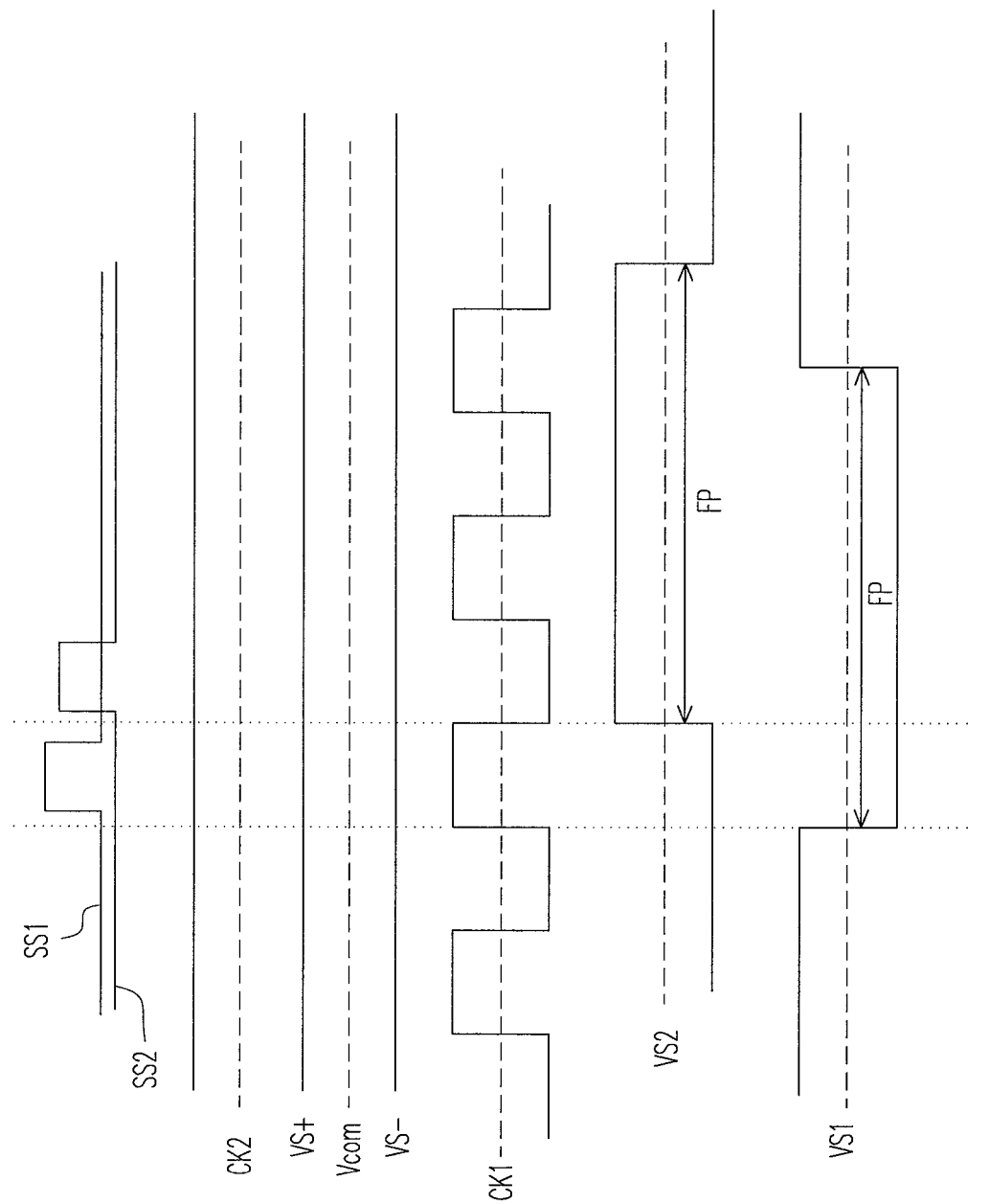
FIG. 10 is a timing diagram of the circuit operation of the voltage supply unit according to the fourth exemplary embodiment.

FIG. 10 is a timing diagram of the circuit operation of the voltage supply units 603_1 and 603_2 according to the fourth exemplary embodiment. Referring to FIG. 7A, FIG. 7B, FIG. 9 and FIG. 10, it can be seen from FIG. 10 that when the scan signal SS1 is enabled, the third N-type transistor $N_3$ of the voltage supply unit 603_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 603_1 are turned on, and the second N-type transistor $N_2$ is turned off. As a result, the voltage supply unit 603_1 provides the stable voltage with the negative polarity VS1, i.e. VS−, for the compensation line CL of each of the pixels $P_{11}$ and $P_{12}$ of the $1^{st}$ pixel row during a frame period FP.

Similarly, when the scan signal SS2 is enabled, the third N-type transistor $N_3$ of the voltage supply unit 603_2 is turned on. Since the first clock signal CK1 is disabled and the second clock signal CK2 is maintained enabled, the fourth N-type transistor $N_4$ and the fifth N-type transistor $N_5$ of the voltage supply unit 603_2 are turned off, and the second N-type transistor $N_2$ is turned on. As a result, the voltage supply unit 603_2 provides the stable voltage with the positive polarity VS2, i.e. VS+, for the compensation line CL of each of the pixels $P_{21}$ and $P_{22}$ of the $2^{nd}$ pixel row during the frame period FP.

Accordingly, the voltage supply unit 603 continuously and correspondingly provides/applies the stable voltage(s) VS1 and/or VS2 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so as to adjust reflective Gamma curves of the reflective area RA of each of the pixels $P_{11}$, $P_{12}$, $P_{21}$ and $P_{22}$ so that the reflective Gamma curves can be matched with transparent Gamma curves of the transparent area TA. Hence, the transparent display quality and the reflective display quality of the single cell gap transflective LCD 900 can be optimized simultaneously.

In addition, since the voltage supply device 603 continuously and correspondingly provides/applies the stable voltages VS1 and VS2 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total cross-talk of the single cell gap transflective LCD 900 can be reduced below the set specifications of the shipment, for example below 2%, but the present invention is not limited thereto.

The Fifth Exemplary Embodiment

Figure 11:
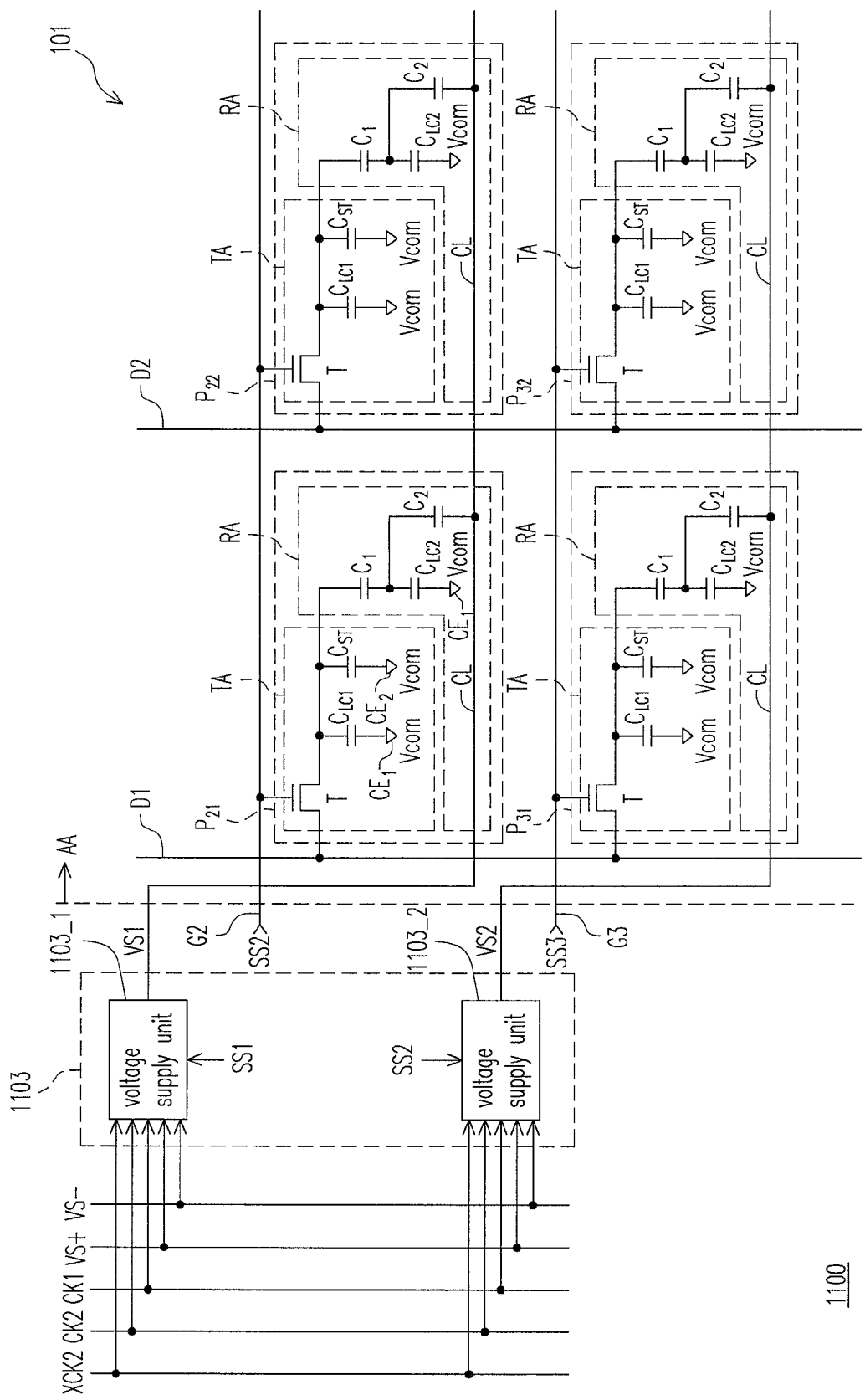
FIG. 11 is a diagram showing a partial single cell gap transflective LCD according to the fifth exemplary embodiment of the present invention.

FIG. 11 is a diagram showing a partial single cell gap transflective LCD 1100 according to the fifth exemplary embodiment of the present invention. Referring to FIG. 11, the single cell gap transflective LCD 1100 includes a display panel 101 and a voltage supply device 1103, wherein the display panel 101 is a single cell gap liquid crystal panel. Obviously, the single cell gap transflective LCD 1100 further includes other components, such as a gate driver, a source driver, a timing controller and a back light module. However, only components related to the present invention are sketched in the fifth exemplary embodiment for illustrating.

Since the structure of the display panel 101 of the fifth exemplary embodiment is the same as that of the first exemplary embodiment, further descriptions are omitted herein. In addition, the voltage supply device 1103 is coupled to the compensation line CL of each of the pixels $P_{21}$, $P_{22}$, $P_{31}$ and $P_{32}$, and used to continuously and correspondingly provide the stable voltage(s) VS1 and/or VS2 for the compensation line CL of each of the pixels $P_{21}$, $P_{22}$, $P_{31}$ and $P_{32}$.

Specifically, the voltage supply device 603 has a plurality of voltage supply units 1103_1 and 1103_2, i.e. each of the pixel rows with one voltage supply unit are provided. When driving the display panel 101 in a row inversion driving method, the $1^{st}$ voltage supply unit 1103_1 provides a stable voltage, for example, a stable voltage with a positive polarity VS1, i.e. VS+, for the compensation line CL of each of the pixels $P_{21}$ and $P_{22}$ of the $2^{nd}$ pixel row according to a $1^{st}$ scan signal SS1, generally generated by the gate driver, a first clock signal CK1, and a second clock signals CK2 and XCK2, wherein there is a 180 degrees phase difference between the first clock signal CK and the second clock signal XCK.

Additionally, the $2^{nd}$ voltage supply device 1103_2 provides a stable voltage, for example, a stable voltage with a negative polarity VS2, i.e. VS−, for the compensation line CL of each of the pixels $P_{31}$ and $P_{32}$ of the $3^{rd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2. Besides, duty cycles of the first, the second and the third clock signals CK1, CK2 and XCK2 are substantially an enable period of the scan signals SS1 or SS2. Generally the enable periods of the scan signals SS1 and SS2 are the same.

Figure 12A:
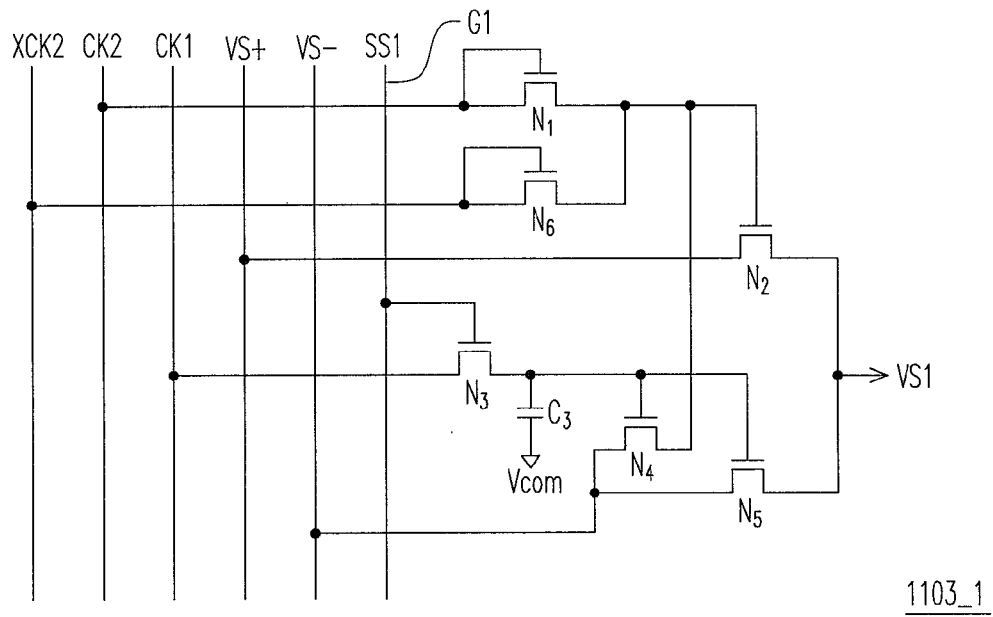
FIGS. 12A and 12B are respectively circuit diagrams of the voltage supply unit of the fifth exemplary embodiment.
Figure 12B:
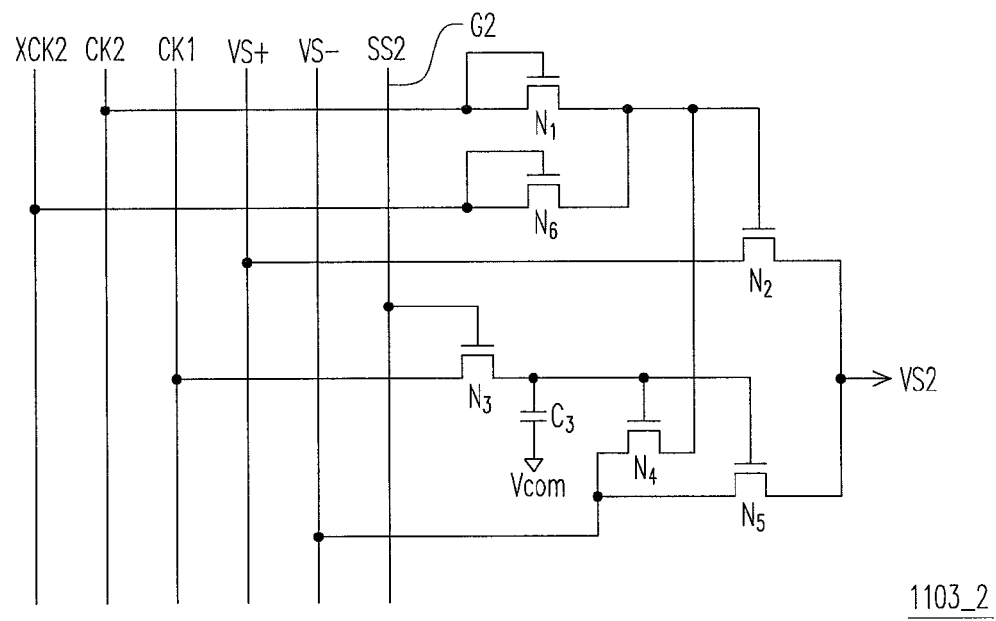

FIGS. 12A and 12B are respectively circuit diagrams of the voltage supply units 1103_1 and 1103_2 of the fifth exemplary embodiment. Referring to both FIGS. 12A and 12B, the voltage supply units 1103_1 and 1103_2 both include a first N-type transistor $N_1$, a second N-type transistor $N_2$, a third capacitor $C_3$, a third N-type transistor $N_3$, a fourth N-type transistor $N_4$, a fifth N-type transistor $N_5$ and a sixth N-type transistor $N_6$. Since the voltage supply units 1103_1 and 1103_2 are similar in structure and in connection, only single voltage supply unit is used for description in the following.

Taking the voltage supply unit 1103_1 as an example, a gate and a source of the first N-type transistor $N_1$ are coupled with each other to receive the second clock signal CK2. A gate of the second N-type transistor $N_2$ is coupled to a drain of the first N-type transistor $N_1$, a source of the second N-type transistor $N_2$ is used to receive the stable voltage with the positive polarity VS+, and a drain of the second N-type transistor $N_2$ is coupled to the compensation line CL of each of the pixels $P_{21}$ and $P_{22}$ of the $2^{nd}$ pixel row.

A gate and a source of the sixth N-type transistor $N_6$ are coupled with each other to receive the third clock signal XCK2, and a drain of the sixth N-type transistor $N_6$ is coupled to the drain of the first N-type transistor $N_1$. A gate of the third N-type transistor $N_3$ is coupled to the $1^{st}$ scan line G1 to receive the scan signal SS1, and a source of the third N-type transistor $N_3$ is used to receive the first clock signal CK1. A first end of the third capacitor $C_3$ is coupled to a drain of the third N-type transistor $N_3$, and a second end of the third capacitor $C_3$ is coupled to the common line $CE_2$.

A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the negative polarity VS−, and a drain of the fifth N-type transistor $N_5$ is coupled to the compensation line CL of each of the pixels $P_{21}$ and $P_{22}$ of the $2^{nd}$ pixel row.

Figure 13:
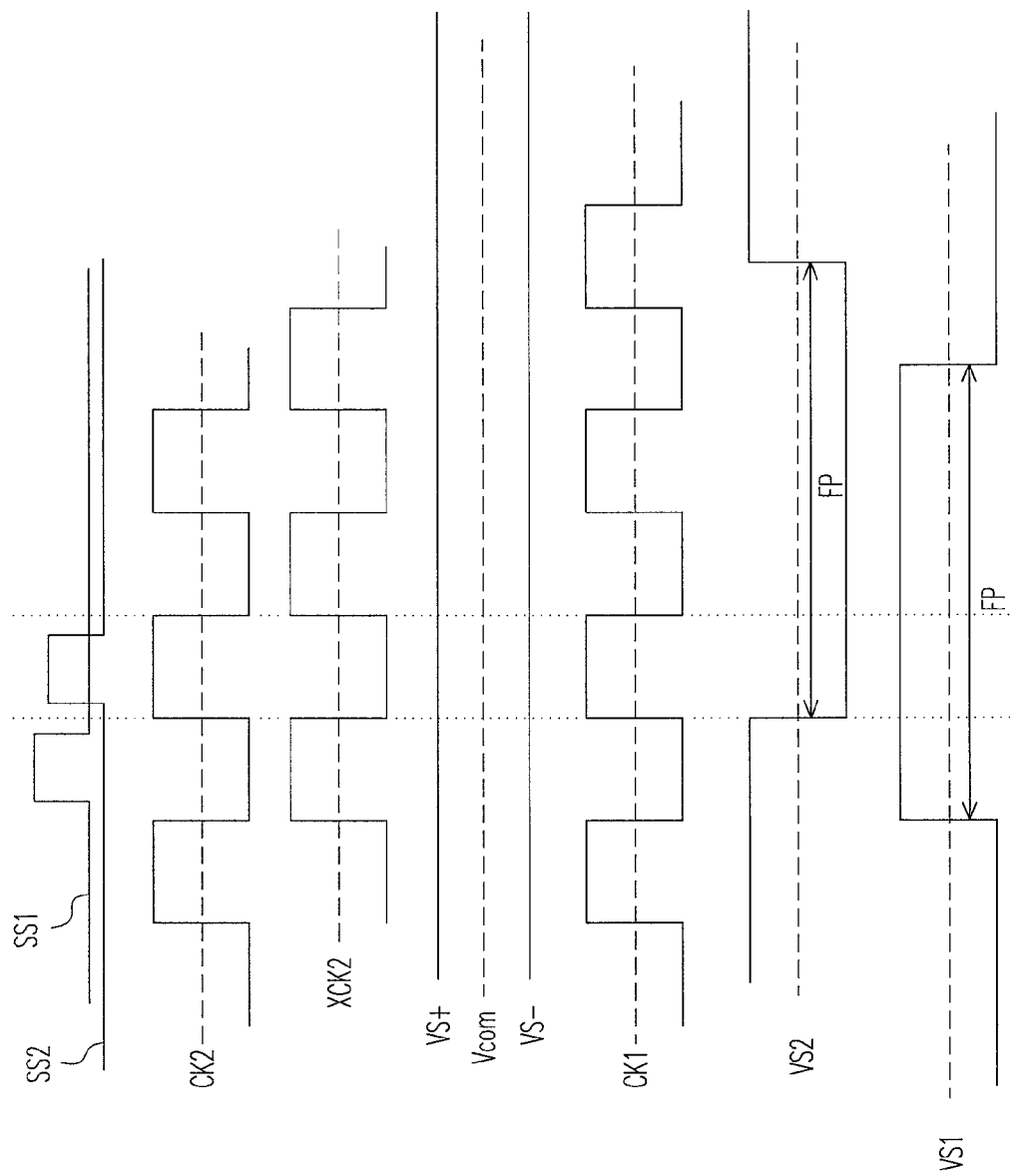
FIG. 13 is a timing diagram of the circuit operation of the voltage supply unit according to the fifth exemplary embodiment.

FIG. 13 is a timing diagram of the circuit operation of the voltage supply units 1103_1 and 1103_2 according to the fifth exemplary embodiment. Referring to FIG. 11 to FIG. 13, it can be seen from FIG. 13 that when the scan signal SS1 is enabled, the first N-type transistor $N_1$ and the third N-type transistor $N_3$ of the voltage supply unit 1103_1 are turned on. Since the first and second clock signals CK1 and CK2 are disabled and the third clock signal XCK2 is enabled at this moment, the fourth N-type transistor $N_4$ and the fifth N-type transistor $N_5$ of the voltage supply unit 1103_1 are turned off, and the second N-type transistor $N_2$ is turned on. As a result, the voltage supply unit 1103_1 provides the stable voltage with the positive polarity VS1, i.e. VS+, for the compensation line CL of each of the pixels $P_{21}$, and $P_{22}$ of the $2^{nd}$ pixel row during a frame period FP.

Similarly, when the scan signal SS2 is enabled, the third N-type transistor $N_3$ of the voltage supply unit 1103_2 is turned on. Since the first and second clock signals CK1 and CK2 are enabled and the third clock signal XCK2 is disabled at this moment, the fourth N-type transistor $N_4$ and the fifth N-type transistor $N_5$ of the voltage supply unit 1103_1 are turned on, and the second N-type transistor $N_2$ is turned off. As a result, the voltage supply unit 1103_2 provides the stable voltage with the negative polarity VS2, i.e. VS−, for the compensation line CL of each of the pixels $P_{31}$ and $P_{32}$ of the $3^{rd}$ pixel row during the frame period FP.

Accordingly, the voltage supply unit 1103 continuously and correspondingly provides/applies the stable voltages VS1 and VS2 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 1100 can be optimized simultaneously.

In addition, since the voltage supply device 1103 continuously and correspondingly provides/applies the stable voltages VS1 and VS2 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total cross-talk of the single cell gap transflective LCD 1100 can be reduced below the set specifications of the shipment, for example below 2%, but the present invention is not limited thereto.

The Sixth Exemplary Embodiment

Figure 14:
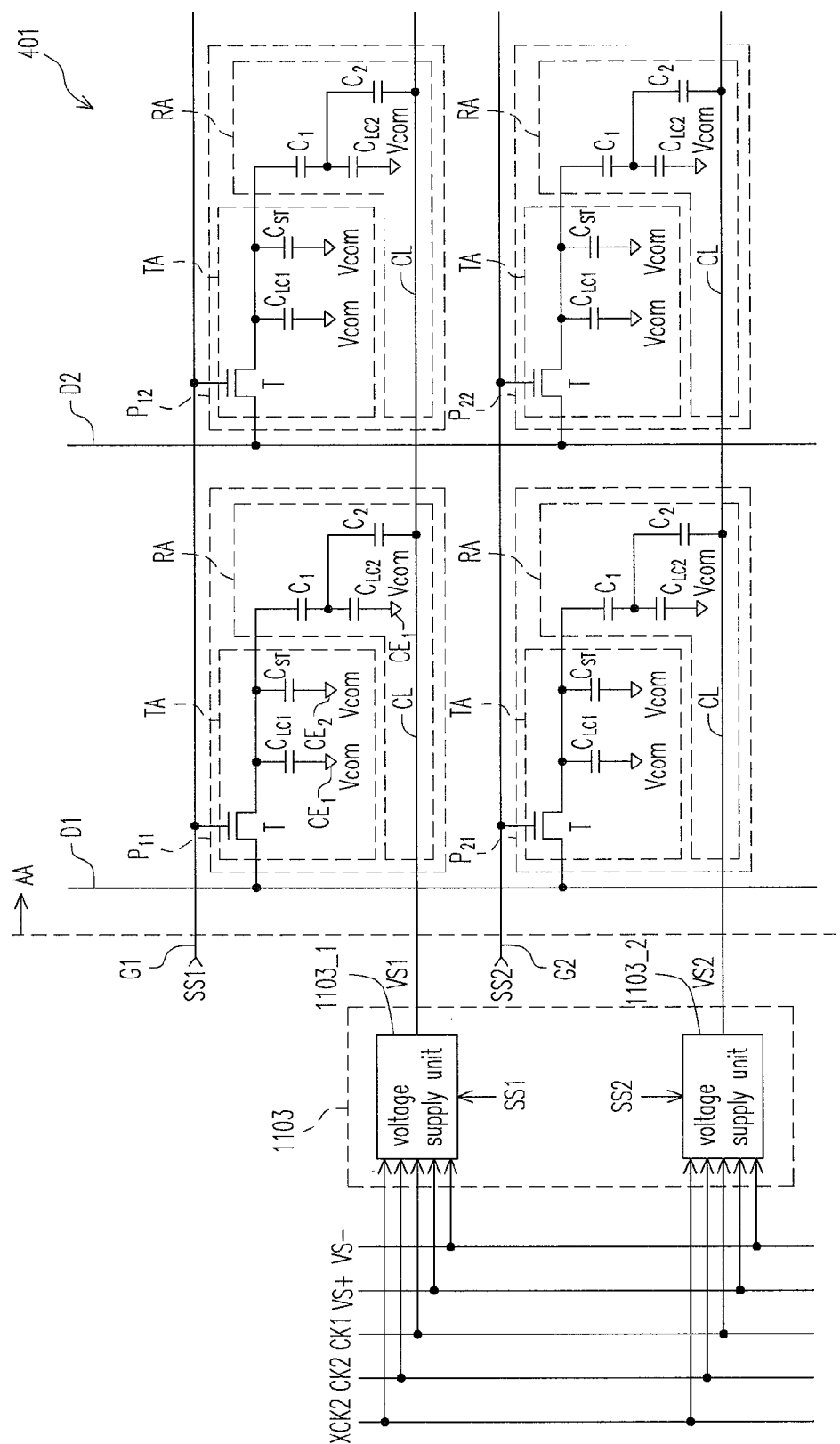
FIG. 14 is a diagram showing a partial single cell gap transflective LCD according to the sixth exemplary embodiment of the present invention.

FIG. 14 is a diagram showing a partial single cell gap transflective LCD 1400 according to the sixth exemplary embodiment of the present invention. Referring to FIG. 14, the single cell gap transflective LCD 1400 includes a display panel 401 and a voltage supply device 1103, wherein the display panel 401 is a single cell gap liquid crystal panel. Obviously, the single cell gap transflective LCD 1400 further includes other components, such as a gate driver, a source driver, a timing controller and a back light module. However, only components related to the present invention are sketched in the sixth exemplary embodiment for illustrating.

Since the structure of the display panel 401 of the sixth exemplary embodiment is the same as that of the second exemplary embodiment, further descriptions are omitted herein. In addition, the voltage supply device 1103 is coupled to the compensation line CL of each of the pixels $P_{11}$, $P_{12}$, $P_{21}$ and $P_{22}$, and used to continuously and correspondingly provide the stable voltages VS1 and VS2 for the compensation line CL of each of the pixels $P_{11}$, $P_{12}$, $P_{21}$ and $P_{22}$.

Specifically, the voltage supply device 1103 has a plurality of voltage supply units 1103_1 and 1103_2, i.e. each of the pixel rows with one voltage supply unit are provided. When driving the display panel 101 in a row inversion driving method, the $1^{st}$ voltage supply unit 1103_1 provides a stable voltage, for example, a stable voltage with a negative polarity VS1, i.e. VS−, for the compensation line CL of each of the pixels $P_{21}$ and $P_{22}$ of the $2^{nd}$ pixel row according to a $1^{st}$ scan signal SS1, generally generated by the gate driver, a first clock signal CK1, and a second and a third clock signals CK2 and XCK2.

Additionally, the $2^{nd}$ voltage supply device 1103_2 provides a stable voltage, for example, a stable voltage with a negative polarity VS2, i.e. VS+, for the compensation line CL of each of the pixels $P_{21}$, and $P_{22}$ of the $2^{nd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2. Besides, duty cycles of the first, the second and the third clock signals CK1, CK2 and XCK2 are substantially an enable period of the scan signals SS1 or SS2. Generally the enable periods of the scan signals SS1 and SS2 are the same.

Since the structure of the voltage supply units 1103_1 and 1103_2 of the sixth exemplary embodiment is the same as that of the fifth exemplary embodiment, further descriptions are omitted herein.

Figure 15:
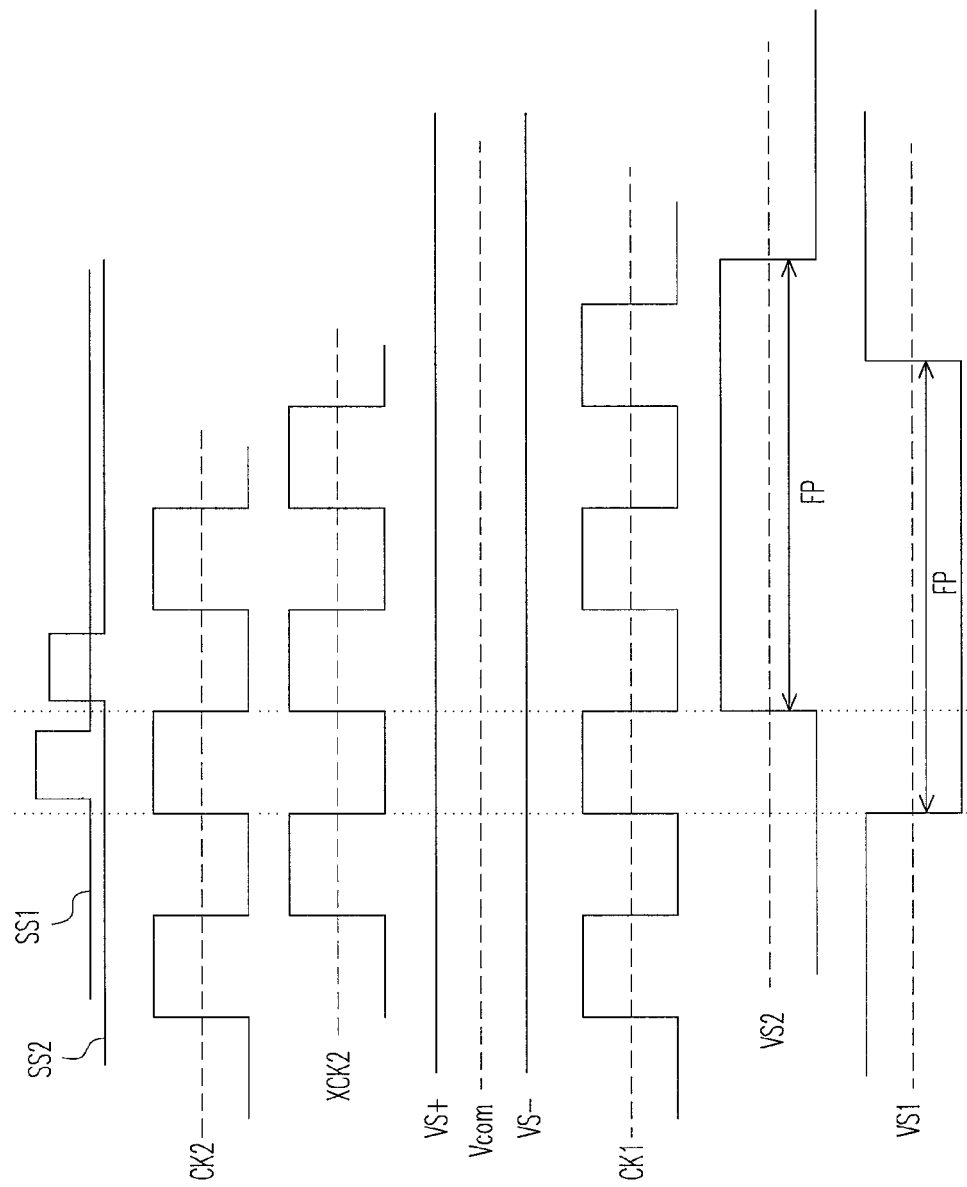
FIG. 15 is a timing diagram of the circuit operation of the voltage supply unit according to the sixth exemplary embodiment.

FIG. 15 is a timing diagram of the circuit operation of the voltage supply units 1103_1 and 1103_2 according to the sixth exemplary embodiment. Referring to FIG. 12A, FIG. 12B, FIG. 14 and FIG. 15, it can be seen from FIG. 15 that when the scan signal SS1 is enabled, the third N-type transistor $N_3$ of the voltage supply unit 1103_1 is turned on. Since the first and second clock signals CK1 and CK2 are enabled and the third clock signal XCK2 is disabled at this moment, the fourth N-type transistor $N_4$ and the fifth N-type transistor $N_5$ of the voltage supply unit 1103_1 are turned on, and the second N-type transistor $N_2$ is turned off. As a result, the voltage supply unit 1103_1 provides the stable voltage with the negative polarity VS1, i.e. VS−, for the compensation line CL of each of the pixels $P_{11}$ and $P_{12}$ of the $1^{st}$ pixel row during a frame period FP.

Similarly, when the scan signal SS2 is enabled, the third N-type transistor $N_3$ of the voltage supply unit 1103_2 is turned on. Since the first and second clock signals CK1 and CK2 are disabled and the third clock signal XCK2 is enabled at this moment, the fourth N-type transistor $N_4$ and the fifth N-type transistor $N_5$ of the voltage supply unit 1103_1 are turned off, and the second N-type transistor $N_2$ is turned on. As a result, the voltage supply unit 1103_2 provides the stable voltage with the positive polarity VS2, i.e. VS+, for the compensation line CL of each of the pixels $P_{21}$ and $P_{22}$ of the $2^{nd}$ pixel row during the frame period FP.

Accordingly, the voltage supply unit 1103 continuously and correspondingly provides/applies the stable voltages VS1 and VS2 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 1400 can be optimized simultaneously.

In addition, since the voltage supply device 1103 continuously and correspondingly provides/applies the stable voltages VS1 and VS2 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total cross-talk of the single cell gap transflective LCD 1400 can be reduced below the set specification of the shipment, for example below 2%, but the present invention is not limited thereto.

The Seventh Exemplary Embodiment

Figure 16:
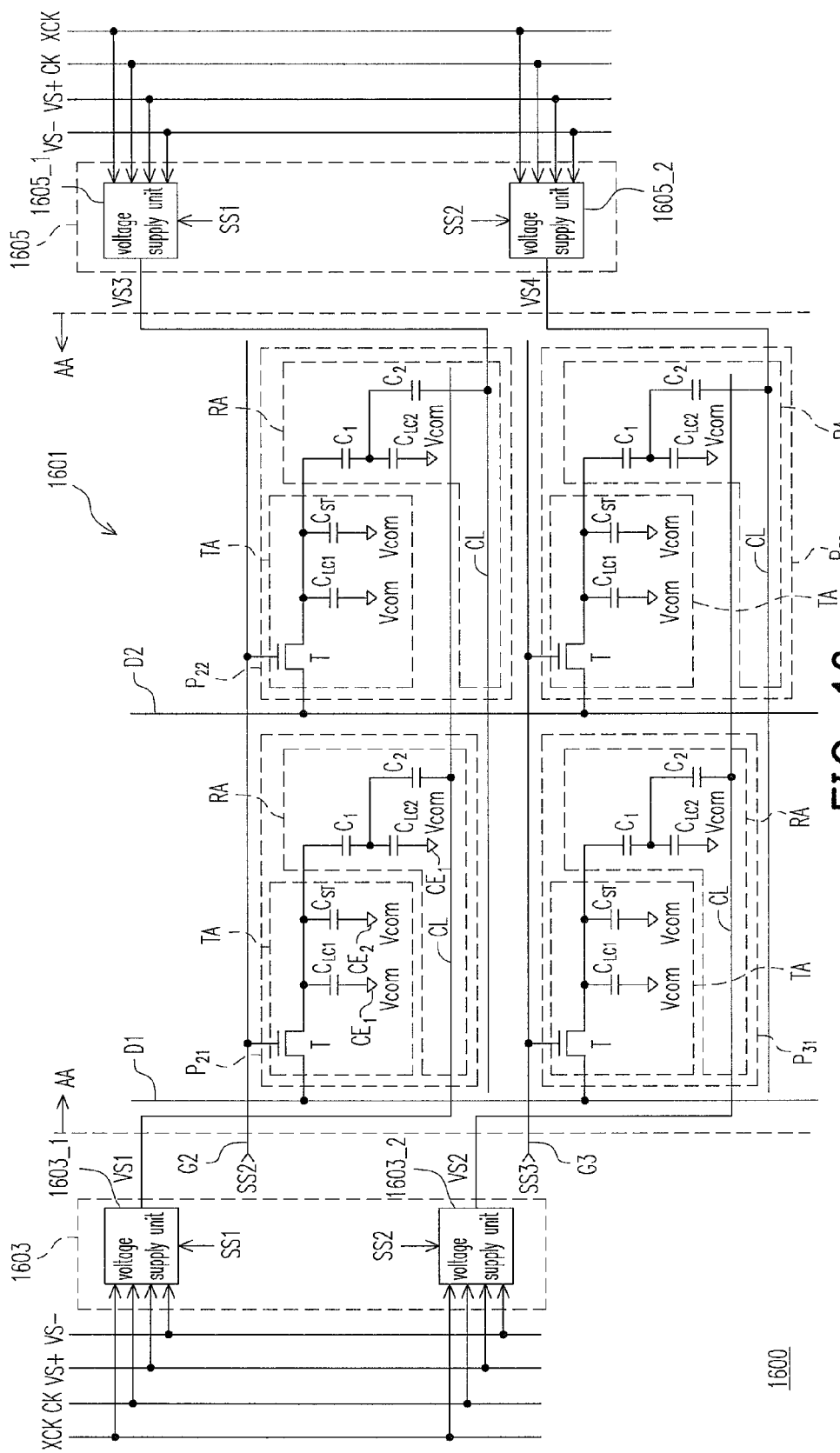
FIG. 16 is a diagram showing a partial single cell gap transflective LCD according to the seventh exemplary embodiment of the present invention.

FIG. 16 is a diagram showing a partial single cell gap transflective LCD 1600 according to the seventh exemplary embodiment of the present invention. Referring to FIG. 16, the single cell gap transflective LCD 1600 includes a display panel 1601 and a voltage supply device, wherein the voltage supply device includes a first and a second sub-voltage device 1603 and 1605. Besides, the display panel 1601 is a single cell gap liquid crystal panel. Obviously, the single cell gap transflective LCD 1600 further includes other components, such as a gate driver, a source driver, a timing controller and a back light module. However, only components related to the present invention are sketched in the seventh exemplary embodiment for illustrating.

The display panel 1601 includes a plurality of scan lines G2 and G3 (only two scan lines are shown to simplify explanations), a plurality of data lines D1 and D2 substantially perpendicularly disposed to the scan lines G2 and G3 (only two data lines are shown to simplify explanations), and a plurality of pixels $P_{21}$, $P_{22}$, $P_{31}$ and $P_{32}$ located in a display area AA of the display panel 1601 (only four pixels are shown to simplify explanations).

The pixels $P_{21}$, $P_{22}$, $P_{31}$ and $P_{32}$ are respectively electrically connected with the corresponding data line and the corresponding scan line, and are arranged in an array. For example, the pixel $P_{21}$ is respectively electrically connected with the data line D1 and the scan line G2, the pixel $P_{22}$ is respectively electrically connected with the data line D2 and the scan line G2, the pixel $P_{31}$ is respectively electrically connected with the data line D1 and the scan line G3, and the pixel $P_{32}$ is respectively electrically connected with the data line D2 and the scan line G3. In addition, the pixel $P_{21}$ represents the $1^{st}$ pixel of the $2^{nd}$ pixel row of the display panel 1601, the pixel $P_{22}$ represents the $2^{nd}$ pixel of the $2^{nd}$ pixel row of the display panel 1601, the pixel $P_{31}$ represents the $1^{st}$ pixel of the $3^{rd}$ pixel row of the display panel 1601, and the pixel $P_{32}$ represents the $2^{nd}$ pixel of the $3^{rd}$ pixel row of the display panel 1601.

Each of the pixels $P_{21}$, $P_{22}$, $P_{31}$ and $P_{32}$ includes a common line $CE_2$ and a compensation line CL. The common line $CE_2$, for example, is located in a transparent area TA of each of the pixels $P_{21}$, $P_{22}$, $P_{31}$ and $P_{32}$, and the common line $CE_2$ is used to receive a stable voltage Vcom. The compensation line CL, for example, is located in a reflective area RA of each of the pixels $P_{11}$, $P_{12}$, $P_{21}$ and $P_{22}$, and the compensation line CL is used to correspondingly receive stable voltages VS1~VS4. Moreover, each of the pixels $P_{21}$, $P_{22}$, $P_{31}$ and $P_{32}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{21}$, $P_{22}$, $P_{31}$ and $P_{32}$ are similar in structure and connection, only single pixel is used for description in the following.

Take the pixel $P_{21}$ for example, a gate of the pixel transistor T is coupled to the scan line G2, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and common line $CE_2$.

A first end of the first LC capacitor $C_{LC1}$ is coupled to the drain of the pixel transistor T and a second end of the first LC capacitor $C_{LC1}$ is coupled to the common electrode $CE_1$. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{21}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{21}$.

In the first exemplary embodiment, the first sub-voltage supply device 1603 is coupled to the compensation line CL of all odd pixels $P_{21}$ and $P_{31}$ of each of the pixel rows, and used to continuously and correspondingly provide the stable voltage(s) VS1 and/or VS2 for the compensation lines CL of the pixels $P_{21}$ and $P_{31}$. Besides, the second sub-voltage supply device 1605 is coupled to the compensation line CL of all even pixels $P_{22}$ and $P_{32}$ of each of the pixel rows, and used to continuously and correspondingly provide the stable voltage(s) VS3 and/or VS4 for the compensation lines CL of the pixels $P_{22}$ and $P_{32}$. Note that the odd pixels represent pixels of odd pixel columns, and the even pixels represent pixels of even pixel columns.

Specifically, the first sub-voltage supply device 1603 has a plurality of voltage supply units 1603_1 and 1603_2. When driving the display panel 1601 in a column inversion driving method, the $1^{st}$ voltage supply unit 1603_1 provides a stable voltage, for example, a stable voltage with a positive polarity VS1, i.e. VS+, for the compensation line CL of the odd pixels $P_{21}$ of the $2^{nd}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply unit 1603_2 provides a stable voltage, for example, a stable voltage with a positive polarity VS2, i.e. VS+, for the compensation line CL of the odd pixels $P_{31}$ of the $3^{rd}$ pixel row according to a $2^{nd}$ scan signal SS2, and the first and the second clock signals CK and XCK, wherein there is a 180 degrees phase difference between the first clock signal CK and the second clock signal XCK. Besides, duty cycles of the first and the second clock signals CK and XCK are substantially a frame period of the single cell gap transflective LCD 1600.

Specifically, the second sub-voltage supply device 1605 has a plurality of voltage supply units 1605_1 and 1605_2. When driving the display panel 1601 in the column inversion driving method, the $1^{st}$ voltage supply unit 1605_1 provides a stable voltage, for example, a stable voltage with a negative polarity VS3, i.e. VS−, for the compensation line CL of the even pixels $P_{22}$ of the $2^{nd}$ pixel row according to the $1^{st}$ scan signal SS1, generally generated by the gate driver, and the first and the second clock signals CK and XCK, wherein there is a 180 degrees phase difference between the first clock signal CK and the second clock signal XCK. Additionally, the $2^{nd}$ voltage supply unit 1605_2 provides a stable voltage, for example, a stable voltage with a negative polarity VS2, i.e. VS−, for the compensation line CL of the even pixels $P_{32}$ of the $3^{rd}$ pixel row according to a $2^{nd}$ scan signal SS2, and the first and the second clock signals CK and XCK, wherein there is a 180 degrees phase difference between the first clock signal CK and the second clock signal XCK.

Figure 17A:
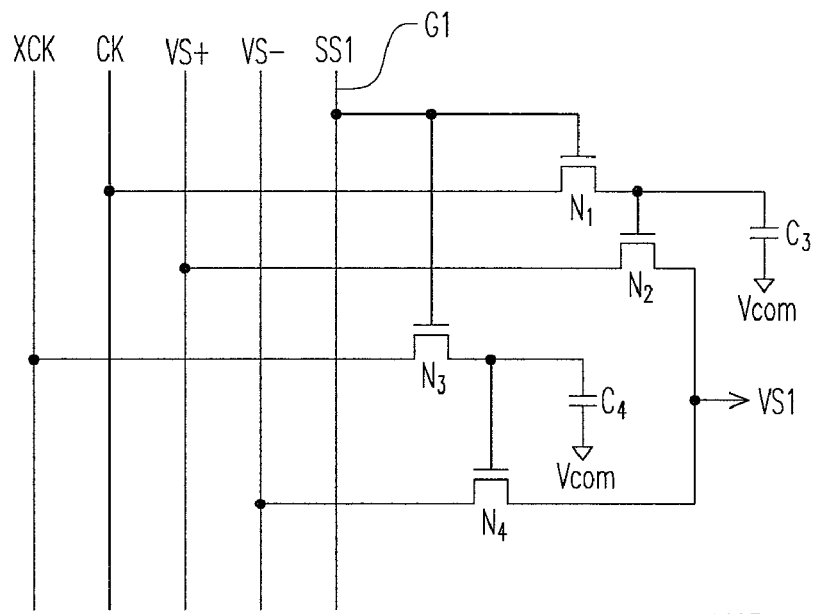
FIGS. 17A~17D are respectively circuit diagrams of the voltage supply unit of the seventh exemplary embodiment.
Figure 17B:
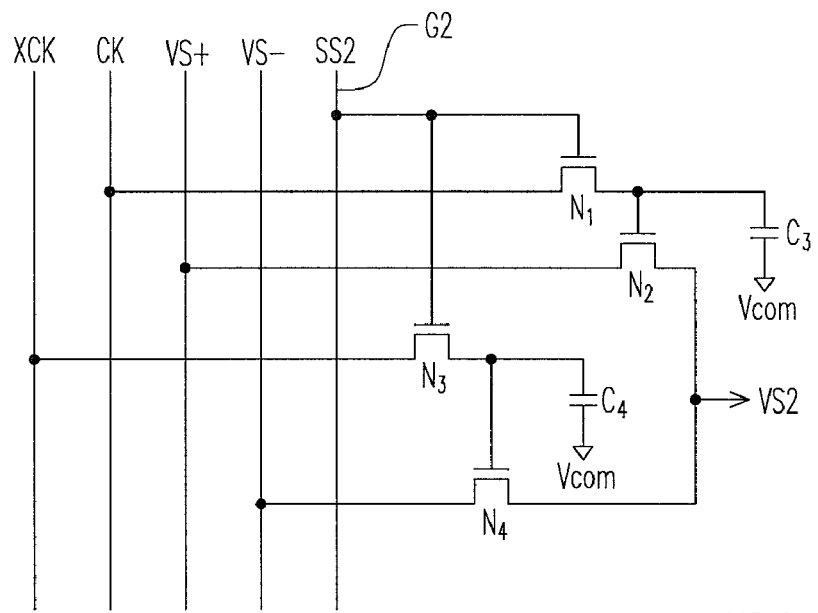

FIGS. 17A and 17B are respectively circuit diagrams of the voltage supply units 1603_1 and 1603_2 of the seventh exemplary embodiment. Referring to both FIGS. 17A and 17B, the voltage supply units 1603_1 and 1603_2 both include a first N-type transistor $N_1$, a third capacitor $C_3$, a second N-type transistor $N_2$, a third N-type transistor $N_3$, a fourth capacitor $C_4$ and a fourth N-type transistor $N_4$. Since the voltage supply units 1603_1 and 1603_2 are similar in structure and in connection, only single voltage supply unit is used for description in the following.

Taking the voltage supply unit 1603_1 as an example, a gate of the first N-type transistor $N_1$ is coupled to the $1^{st}$ scan line G1 to receive the scan signal SS1, and a source of the first N-type transistor $N_1$ is used to receive the first clock signal CK. A first end of the third capacitor $C_3$ is coupled to a drain of the first N-type transistor $N_1$, and a second end of the third capacitor $C_3$ is coupled to the common line $CE_2$. A gate of the second N-type transistor $N_2$ is coupled to the drain of the first N-type transistor $N_1$, a source of the second N-type transistor $N_2$ is used to receive the stable voltage with the positive polarity VS+, and a drain of the second N-type transistor $N_2$ is coupled to the compensation line CL of the odd pixel $P_{21}$ of the $2^{nd}$ pixel row.

A gate of the third N-type transistor $N_3$ is coupled to the $1^{st}$ scan line G1 to receive the scan signal SS1, and a source of the third N-type transistor $N_3$ is used to receive the second clock signal XCK. A first end of the fourth capacitor $C_4$ is coupled to a drain of the third N-type transistor $N_3$, and a second end of the fourth capacitor $C_4$ is coupled to the common line $CE_2$. A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the compensation line CL of the odd pixels $P_{21}$ of the $2^{nd}$ pixel row. Although the transistors $N_1 \sim N_4$ refer to N-type transistors in the aforementioned discussion, the transistors $N_1 \sim N_4$ are not limited thereto. For example, the transistors $N_1 \sim N_4$ can be changed from N-type transistors to P-type transistors according to necessity of design, accompanied with adjustments of a corresponding gate control signal and a source receiving signal, so that the voltage supply units 1603_1 or 1603_2 can provide the above-mentioned function.

Figure 17C:
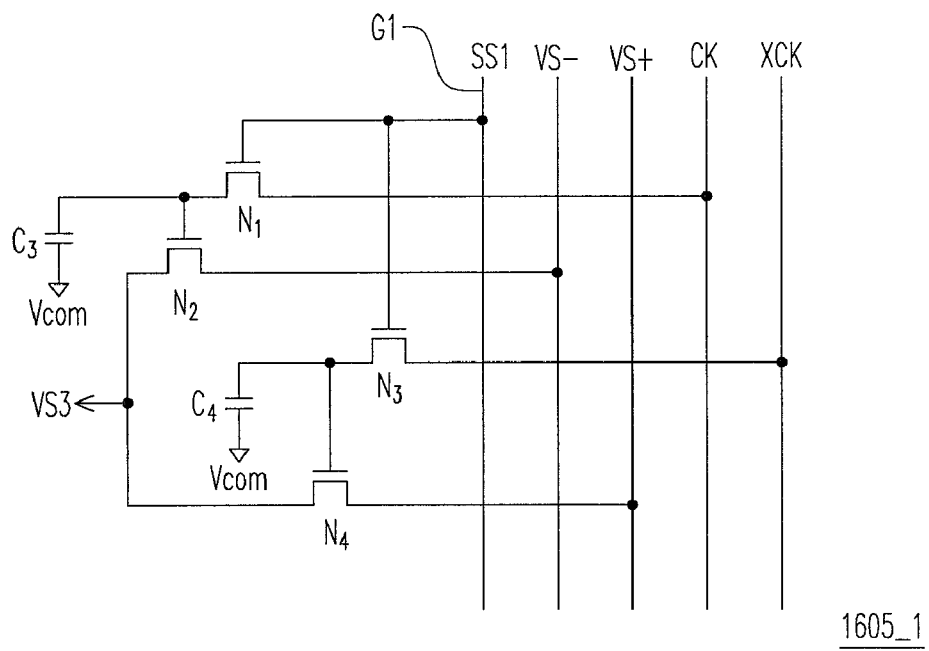
Figure 17D:
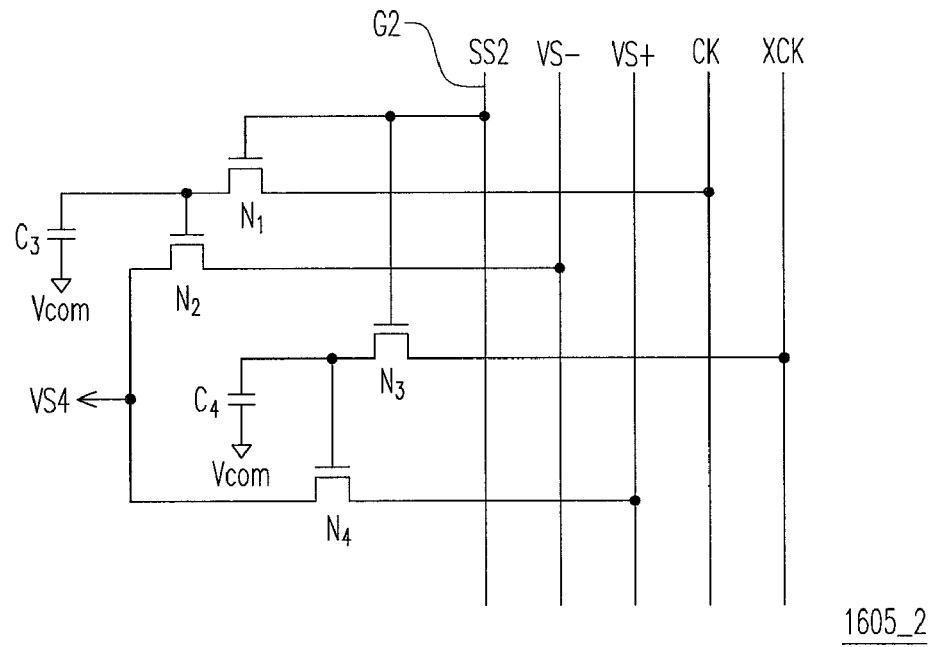

FIGS. 17C and 17D are respectively circuit diagrams of the voltage supply units 1605_1 and 1605_2 of the seventh exemplary embodiment. Referring to both FIGS. 17C and 17D, the voltage supply units 1605_1 and 1605_2 both include a first N-type transistor $N_1$, a third capacitor $C_3$, a second N-type transistor $N_2$, a third N-type transistor $N_3$, a fourth capacitor $C_4$ and a fourth N-type transistor $N_4$. Since the voltage supply units 1605_1 and 1605_2 are similar in structure and in connection, only single voltage supply unit is used for description in the following.

Taking the voltage supply unit 1605_1 as an example, a gate of the first N-type transistor $N_1$ is coupled to the $1^{st}$ scan line G1 to receive the scan signal SS1, and a source of the first N-type transistor $N_1$ is used to receive the first clock signal CK. A first end of the third capacitor $C_3$ is coupled to a drain of the first N-type transistor $N_1$, and a second end of the third capacitor $C_3$ is coupled to the common line $CE_2$. A gate of the second N-type transistor $N_2$ is coupled to the drain of the first N-type transistor $N_1$, a source of the second N-type transistor $N_2$ is used to receive the stable voltage with the negative polarity VS−, and a drain of the second N-type transistor $N_2$ is coupled to the compensation line CL of the even pixel $P_{22}$ of the $2^{nd}$ pixel row.

A gate of the third N-type transistor $N_3$ is coupled to the $1^{st}$ scan line G1 to receive the scan signal SS1, and a source of the third N-type transistor $N_3$ is used to receive the second clock signal XCK. A first end of the fourth capacitor $C_4$ is coupled to a drain of the third N-type transistor $N_3$, and a second end of the fourth capacitor $C_4$ is coupled to the common line $CE_2$. A gate of the fourth N-type transistor $N_4$ is coupled to the drain of the third N-type transistor $N_3$, a source of the fourth N-type transistor $N_4$ is used to receive the stable voltage with the positive polarity VS+, and a drain of the fourth N-type transistor $N_4$ is coupled to the compensation line CL of the even pixel $P_{22}$ of the $2^{nd}$ pixel row.

Figure 18A:
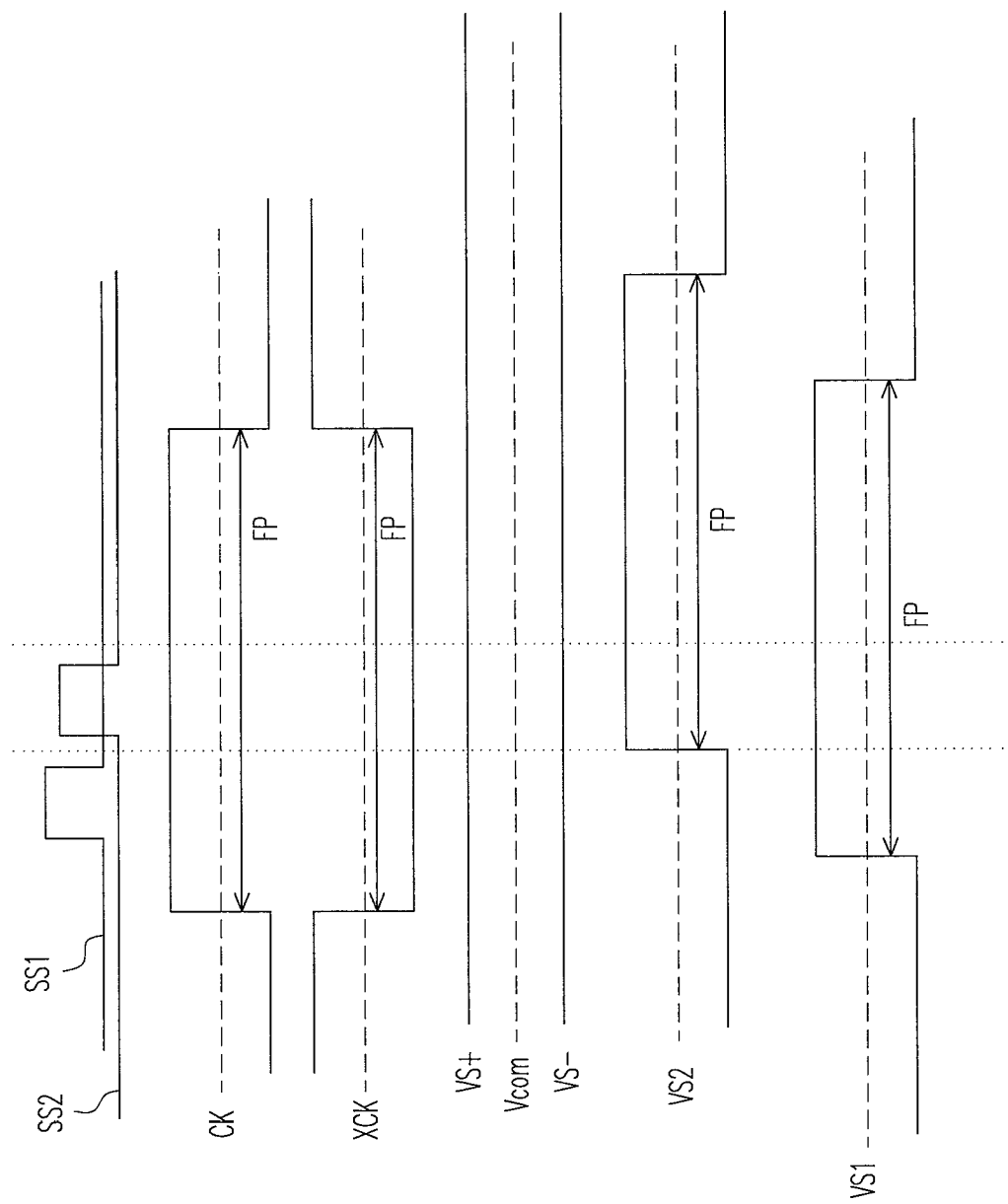
FIGS. 18A~18B are respectively timing diagrams of the circuit operation of the voltage supply unit according to the seventh exemplary embodiment.

FIG. 18A is a timing diagram of the circuit operation of the voltage supply units 1603_1 and 1603_2 according to the seventh exemplary embodiment. Referring to FIG. 16, FIG. 17A, FIG. 17B and FIG. 18A, it can be seen from FIG. 18A that when the scan signal SS1 is enabled, the first N-type transistor $N_1$ and the third N-type transistor $N_3$ of the voltage supply unit 1603_1 are turned on. Since the first clock signal CK is enabled and the second clock signal XCK is disabled, the second N-type transistor $N_2$ of the voltage supply unit 1603_1 is turned on, and the fourth N-type transistor $N_4$ is turned off. As a result, the voltage supply unit 1603_1 provides the stable voltage with the positive polarity VS1, i.e. VS+, for the compensation line CL of the odd pixel $P_{21}$ of the $2^{nd}$ pixel row during a frame period FP.

Similarly, when the scan signal SS2 is enabled, the first N-type transistor $N_1$ and the third N-type transistor $N_3$ of the voltage supply unit 1603_2 are turned on. Since the first clock signal CK is still enabled and the second clock signal XCK is still disabled, the second N-type transistor $N_2$ of the voltage supply unit 1603_2 is turned on, and the fourth N-type transistor $N_4$ is turned off. As a result, the voltage supply unit 1603_2 provides the stable voltage with the positive polarity VS2, i.e. VS+, for the compensation line CL of the odd pixels $P_{31}$ of the $3^{rd}$ pixel row during the frame period FP.

Figure 18B:
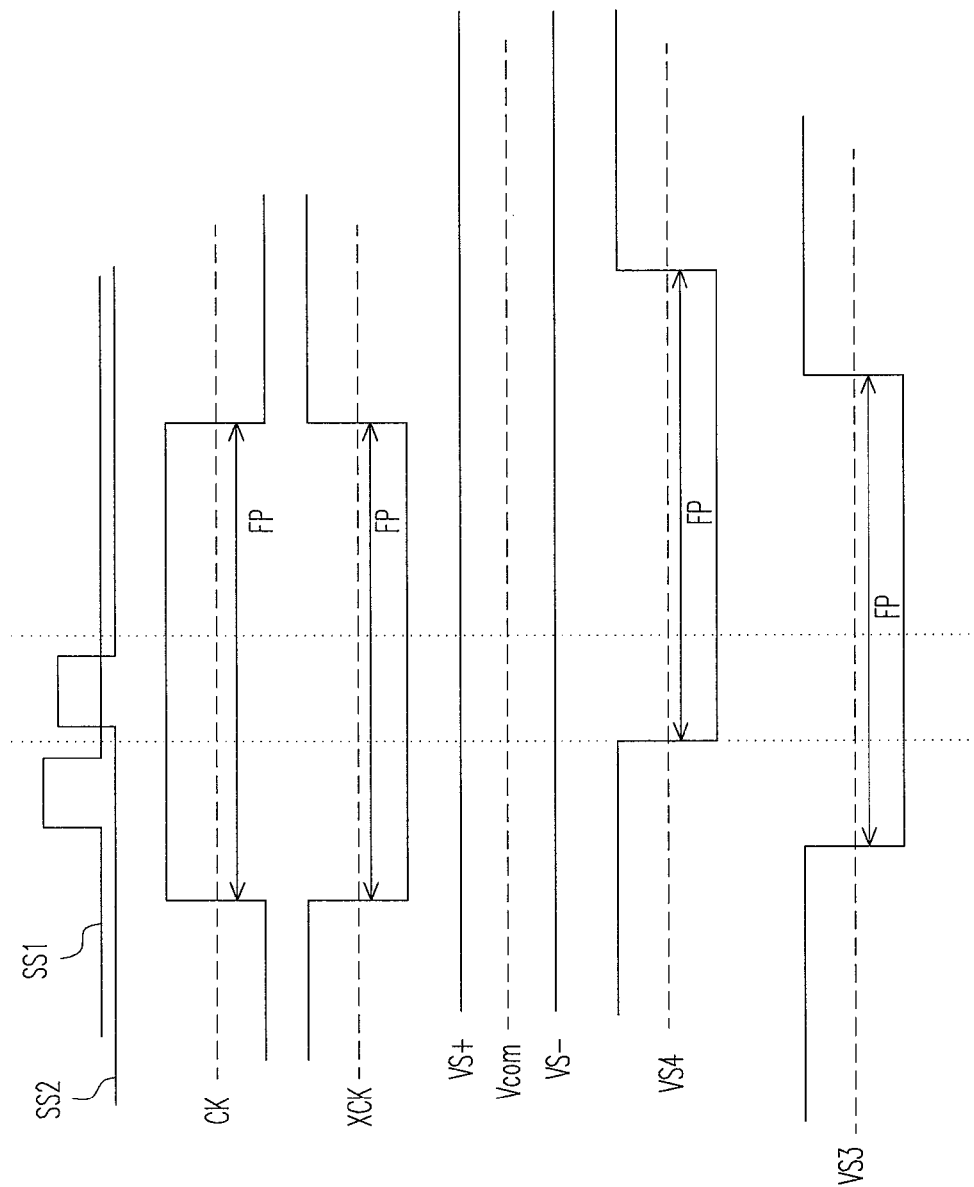

FIG. 18B is a timing diagram of the circuit operation of the voltage supply units 1605_1 and 1605_2 according to the seventh exemplary embodiment. Referring to FIG. 16, FIG. 17C, FIG. 17D and FIG. 18B, it can be seen from FIG. 18B that when the scan signal SS1 is enabled, the first N-type transistor $N_1$ and the third N-type transistor $N_3$ of the voltage supply unit 1605_1 are turned on. Since the first clock signal CK is enabled and the second clock signal XCK is disabled, the second N-type transistor $N_2$ of the voltage supply unit 1605_1 is turned on, and the fourth N-type transistor $N_4$ is turned off. As a result, the voltage supply unit 1605_1 provides the stable voltage with the negative polarity VS3, i.e. VS−, for the compensation line CL of the even pixels $P_{22}$ of the $2^{nd}$ pixel row during the frame period FP.

Similarly, when the scan signal SS2 is enabled, the first N-type transistor $N_1$ and the third N-type transistor $N_3$ of the voltage supply unit 1605_2 are turned on. Since the first clock signal CK is still enabled and the second clock signal XCK is still disabled, the second N-type transistor $N_2$ of the voltage supply unit 1605_2 is turned on, and the fourth N-type transistor $N_4$ is turned off. As a result, the voltage supply unit 1605_2 provides the stable voltage with the negative polarity VS4, i.e. VS−, for the compensation line CL of the even pixels $P_{32}$ of the $3^{rd}$ pixel row during the frame period FP.

Accordingly, the voltage supply device, composed of the first sub-voltage supply device 1603 and the second sub-voltage supply device 1605, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 1600 can be optimized simultaneously In addition, since the voltage supply device, composed of the first and the second sub-voltage supply devices 1603 and 1605, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 1600 can be reduced below the set specifications of the shipment, for example below 2%, but the present invention is not limited thereto.

The Eighth Exemplary Embodiment

Figure 19:
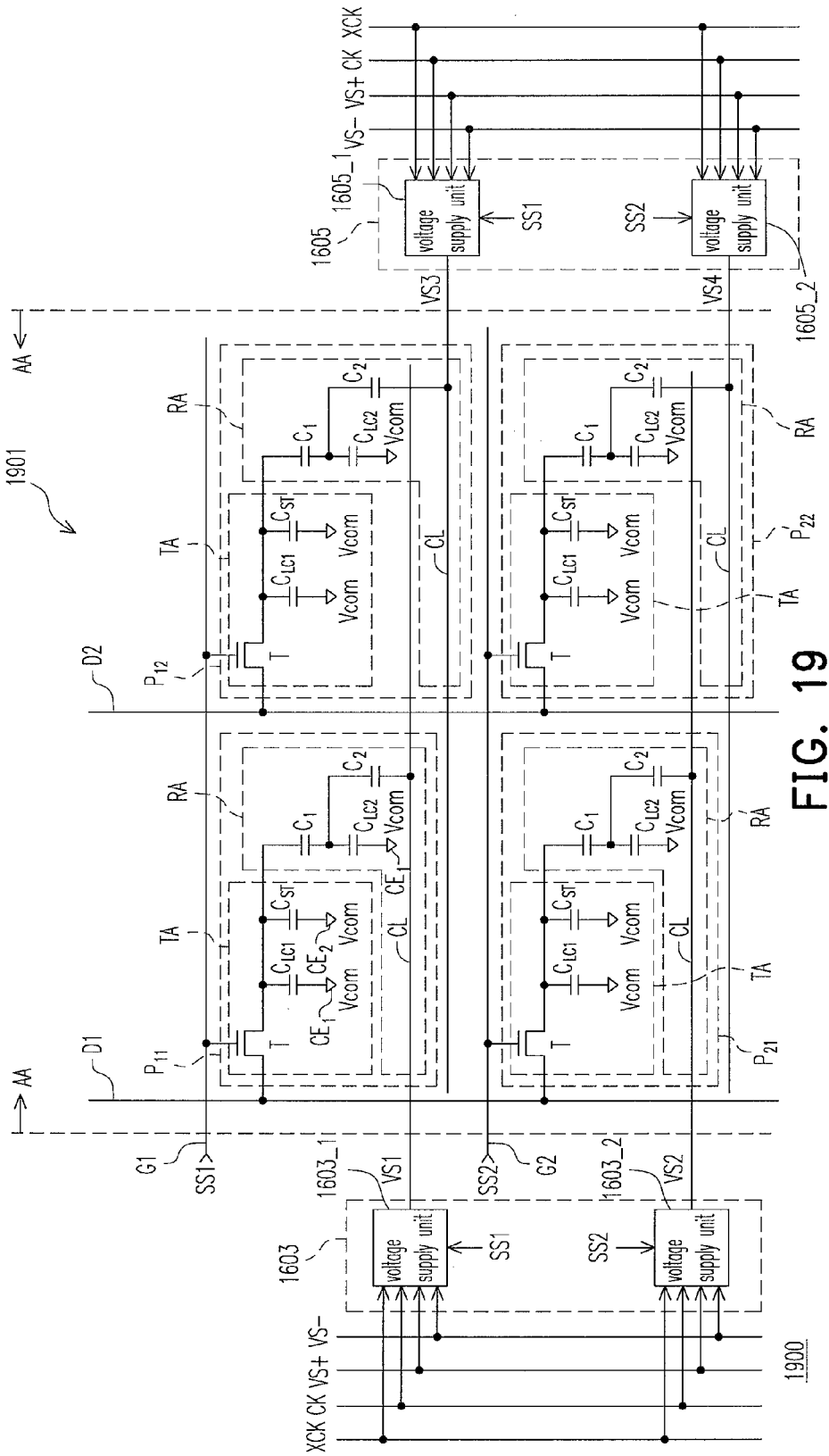
FIG. 19 is a diagram showing a partial single cell gap transflective LCD according to the eighth exemplary embodiment of the present invention.

FIG. 19 is a diagram showing a partial single cell gap transflective LCD 1900 according to the eighth exemplary embodiment of the present invention. Referring to FIG. 19, the single cell gap transflective LCD 1900 includes a display panel 1901 and a voltage supply device, wherein the voltage supply device includes a first and a second sub-voltage devices 1603 and 1605. Besides, the display panel 1901 is a single cell gap liquid crystal panel. Obviously, the single cell gap transflective LCD 1900 further includes other components, such as a gate driver, a source driver, a timing controller and a back light module. However, only components related to the present invention are sketched in the eighth exemplary embodiment for illustrating.

The display panel 1901 includes a plurality of scan lines G1 and G2 (only two scan lines are shown to simplify explanations), a plurality of data lines D1 and D2 substantially perpendicularly disposed to the scan lines G1 and G2 (only two data lines are shown to simplify explanations), and a plurality of pixels $P_{11}$, $P_{12}$, $P_{21}$ and $P_{22}$ located in a display area AA of the display panel 1901 (only four pixels are shown to simplify explanations).

The pixels $P_{11}$, $P_{12}$, $P_{21}$ and $P_{22}$ are respectively electrically connected with the corresponding data line and the corresponding scan line, and are arranged in an array. For example, the pixel $P_{11}$ is respectively electrically connected with the data line D1 and the scan line G1, the pixel $P_{12}$ is respectively electrically connected with the data line D2 and the scan line G1, the pixel $P_{21}$ is respectively electrically connected with the data line D1 and the scan line G2, and the pixel $P_{22}$ is respectively electrically connected with the data line D2 and the scan line G2. In addition, the pixel $P_{11}$ represents the $1^{st}$ pixel of the $1^{st}$ pixel row of the display panel 1901, the pixel $P_{12}$ represents the $2^{nd}$ pixel of the $1^{st}$ pixel row of the display panel 1901, the pixel $P_{21}$ represents the $2^{nd}$ pixel of the $1^{st}$ pixel row of the display panel 1901, and the pixel $P_{22}$ represents the $2^{nd}$ pixel of the $2^{nd}$ pixel row of the display panel 1901.

Each of the pixels $P_{11}$, $P_{12}$, $P_{21}$ and $P_{22}$ includes a common line $CE_2$ and a compensation line CL. The common line $CE_2$, for example, is located in a transparent area TA of each of the pixels $P_{11}$, $P_{12}$, $P_{21}$ and $P_{22}$, and is used to receive a common voltage Vcom. The compensation line CL, for example, is located in a reflective area RA of each of the pixels $P_{11}$, $P_{12}$, $P_{21}$ and $P_{22}$, and the compensation line CL is used to correspondingly receive stable voltages VS1~VS4. Moreover, each of the pixels $P_{11}$, $P_{12}$, $P_{21}$ and $P_{22}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{11}$, $P_{12}$, $P_{21}$ and $P_{22}$ are similar in structure and in connection, only single pixel is used for description in the following.

Taking the pixel $P_{11}$ as an example, a gate of the pixel transistor T is coupled to the scan line G1, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and common line $CE_2$.

A first end of the first LC capacitor $C_{LC1}$ is coupled to the drain of the pixel transistor T and a second end of the first LC capacitor $C_{LC1}$ is coupled to the common electrode $CE_1$. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{11}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{11}$.

In the eighth exemplary embodiment, the voltage supply device 1603 is coupled to the compensation line CL of all odd pixels $P_{11}$ and $P_{21}$ of each of the pixel rows, and used to continuously and correspondingly provide the stable voltages VS1 and VS2 for the compensation lines CL of the pixels $P_{11}$ and $P_{21}$. Besides, the second sub-voltage supply device 1605 is coupled to the compensation line CL of all even pixels $P_{22}$ and $P_{32}$ of each of the pixel rows, and used to continuously and correspondingly provide the stable voltages VS3 and VS4 for the compensation lines CL of the pixels $P_{12}$ and $P_{22}$.

Specifically, the first sub-voltage supply device 1603 has a plurality of voltage supply units 1603_1 and 1603_2. When driving the display panel 1901 in a column inversion driving method, the $1^{st}$ voltage supply unit 1603_1 provides a stable voltage, for example, a stable voltage with a positive polarity VS1, i.e. VS+, for the compensation line CL of the odd pixels $P_{11}$ of the $1^{st}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply unit 1603_2 provides a stable voltage, for example, a stable voltage with a positive polarity VS2, i.e. VS+, for the compensation line CL of the odd pixels $P_{21}$ of the $2^{nd}$ pixel row according to a $2^{nd}$ scan signal SS2, and the first and the second clock signals CK and XCK, wherein there is a 180 degrees phase difference between the first clock signal CK and the second clock signal XCK. Besides, duty cycles of the first and the second clock signals CK and XCK are substantially a frame period of the single cell gap transflective LCD 1900.

In addition, the second sub-voltage supply device 1605 has a plurality of voltage supply units 1605_1 and 1605_2. When driving the display panel 1901 in the column inversion driving method, the $1^{st}$ voltage supply unit 1605_1 provides a stable voltage, for example, a stable voltage with a negative polarity VS3, i.e. VS−, for the compensation line CL of the even pixel $P_{12}$ of the $1^{st}$ pixel row according to the $1^{st}$ scan signal SS1, and the first and the second clock signals CK and XCK, wherein there is a 180 degrees phase difference between the first clock signal CK and the second clock signal XCK. Besides, the $2^{nd}$ voltage supply unit 1605_2 provides a stable voltage, for example, a stable voltage with a negative polarity VS4, i.e. VS−, for the compensation line CL of the even pixels $P_{22}$ of the $2^{nd}$ pixel row according to a $2^{nd}$ scan signal SS2, and the first and the second clock signals CK and XCK, wherein there is a 180 degrees phase difference between the first clock signal CK and the second clock signal XCK.

Since the structure of the voltage supply units 1603_1, 1603_2, 1605_1 and 1605_2 of the seventh exemplary embodiment are the same as that of the seventh exemplary embodiment, further descriptions are omitted herein.

Figure 20A:
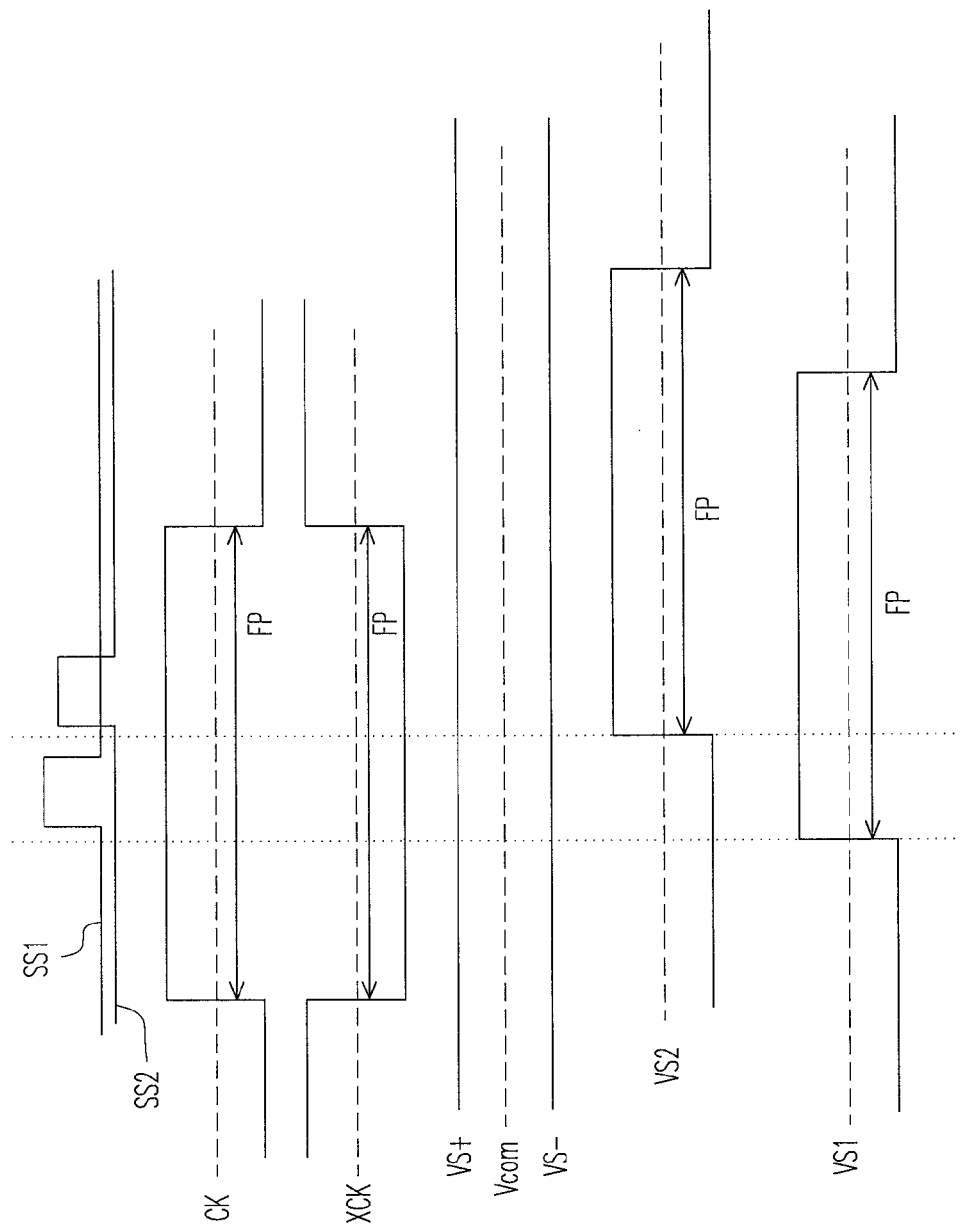

FIG. 20A is a timing diagram of the circuit operation of the voltage supply units 1603_1 and 1603_2 according to the eighth exemplary embodiment. Referring to FIG. 17A, FIG. 17B, FIG. 19 and FIG. 20A, it can be seen from FIG. 20A that when the scan signal SS1 is enabled, the first N-type transistor $N_1$ and the third N-type transistor $N_3$ of the voltage supply unit 1603_1 are turned on. Since the first clock signal CK is enabled and the second clock signal XCK is disabled, the second N-type transistor $N_2$ of the voltage supply unit 103_1 is turned on, and the fourth N-type transistor $N_4$ is turned off. As a result, the voltage supply unit 1603_1 provides the stable voltage with the positive polarity VS1, i.e. VS+, for the compensation line CL of the odd pixel $P_{11}$ of the $1^{st}$ pixel row during a frame period FP.

Similarly, when the scan signal SS2 is enabled, the first N-type transistor $N_1$ and the third N-type transistor $N_3$ of the voltage supply unit 1603_2 are turned on. Since the first clock signal CK is still enabled and the second clock signal XCK is still disabled, the second N-type transistor $N_2$ of the voltage supply unit 1605_2 is turned on, and the fourth N-type transistor $N_4$ is turned off. As a result, the voltage supply unit 1603_2 provides the stable voltage with the positive polarity VS2, i.e. VS+, for the compensation line CL of the odd pixels $P_{21}$ of the $2^{nd}$ pixel row during the frame period FP.

FIG. 20B is a timing diagram of the circuit operation of the voltage supply units 1605_1 and 1605_2 according to the eighth exemplary embodiment. Referring to FIG. 17C, FIG. 17D, FIG. 19 and FIG. 20B, it can be seen from FIG. 20B that when the scan signal SS1 is enabled, the first N-type transistor $N_1$ and the third N-type transistor $N_3$ of the voltage supply unit 1605_1 are turned on. Since the first clock signal CK is enabled and the second clock signal XCK is disabled, the second N-type transistor $N_2$ of the voltage supply unit 1605_1 is turned on, and the fourth N-type transistor $N_4$ is turned off. As a result, the voltage supply unit 1605_1 provides the stable voltage with the negative polarity VS3, i.e. VS−, for the compensation line CL of the even pixels $P_{12}$ of the $1^{st}$ pixel row during the frame period FP.

Similarly, when the scan signal SS2 is enabled, the first N-type transistor $N_1$ and the third N-type transistor $N_3$ of the voltage supply unit 1605_2 are turned on. Since the first clock signal CK is still enabled and the second clock signal XCK is still disabled, the second N-type transistor $N_2$ of the voltage supply unit 1605_2 is turned on, and the fourth N-type transistor $N_4$ is turned off. As a result, the voltage supply unit 1605_2 provides the stable voltage with the negative polarity VS4, i.e. VS−, for the compensation line CL of the even pixels $P_{22}$ of the $2^{nd}$ pixel row during the frame period FP.

Accordingly, the voltage supply device, composed of the first sub-voltage supply unit 1603 and the second sub-voltage supply unit 1605, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 1900 can be optimized simultaneously.

In addition, since the voltage supply device, composed of the first and the second sub-voltage supply devices 1603 and 1605, continuously and correspondingly provides/applies the stable voltages VS1~VS4 for/in the compensation line CL of the reflection area RA of each of the pixels $P_{11}$, $P_{12}$, $P_{21}$ and $P_{22}$, the voltage of the compensation line CL of the reflection area RA of each of the pixels $P_{11}$, $P_{12}$, $P_{21}$ and $P_{22}$ is not affected by the signal received by the data lines D1 and D2 through the coupling effect. Hence, the total cross-talk of the single cell gap transflective LCD 1900 can be reduced below the set specifications of the shipment, for example below 2%, but the present invention is not limited thereto.

The Ninth Exemplary Embodiment

Figure 21:
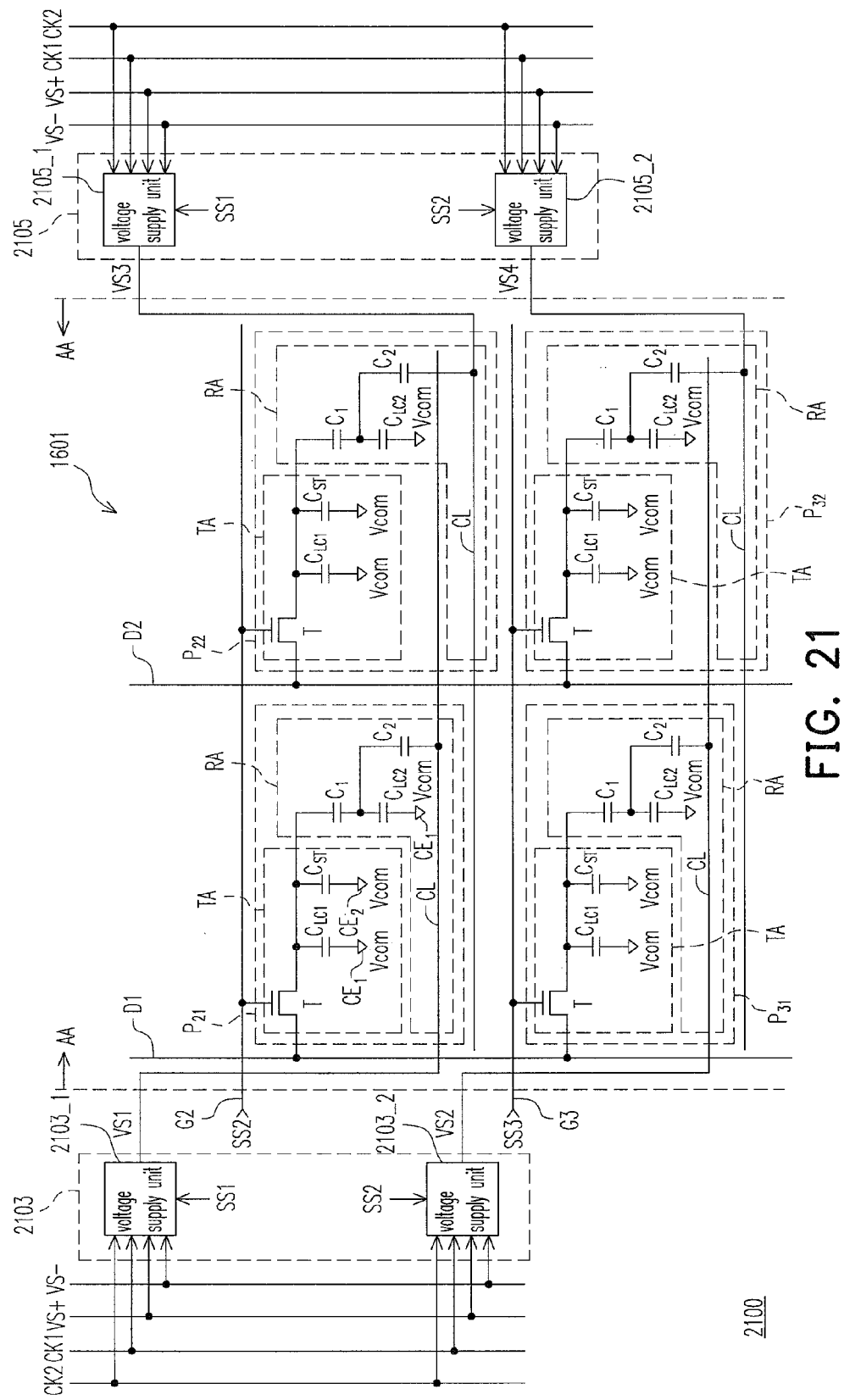
FIG. 21 is a diagram showing a partial single cell gap transflective LCD according to the ninth exemplary embodiment of the present invention.

FIG. 21 is a diagram showing a partial single cell gap transflective LCD 2100 according to the ninth exemplary embodiment of the present invention. Referring to FIG. 21, the single cell gap transflective LCD 2100 includes a display panel 1601 and a voltage supply device, wherein the voltage supply device includes a first and a second sub-voltage devices 2103 and 2105. Besides, the display panel 1601 is a single cell gap liquid crystal panel. Obviously, the single cell gap transflective LCD 2100 further includes other components, such as a gate driver, a source driver, a timing controller and a back light module. However, only components related to the present invention are sketched in the ninth exemplary embodiment for illustrating.

Since the structure of the display panel 1601 of the ninth exemplary embodiment is the same as that of the seventh exemplary embodiment, further descriptions are omitted herein. Besides, the first sub-voltage supply device 2103 is coupled to the compensation line CL of all odd pixels $P_{21}$ and $P_{31}$ of each of the pixel rows, and used to continuously and correspondingly provide the stable voltages VS1 and VS2 for the compensation lines CL of the pixels $P_{21}$ and $P_{31}$. Besides, the second sub-voltage supply device 2105 is coupled to the compensation line CL of all even pixels $P_{22}$ and $P_{32}$ of each of the pixel rows, and used to continuously and correspondingly provide the stable voltages VS3 and VS4 for the compensation lines CL of the pixels $P_{22}$ and $P_{32}$.

Specifically, the first sub-voltage supply device 2103 has a plurality of voltage supply units 2103_1 and 2103_2. When driving the display panel 1601 in a column inversion driving method, the $1^{st}$ voltage supply unit 2103_1 provides a stable voltage, for example, a stable voltage with a negative polarity VS1, i.e. VS−, for the compensation line CL of the odd pixels $P_{21}$ of the $2^{nd}$ pixel row according to a $1^{st}$ scan signal SS1, generally generated by the gate driver, and a first and a second clock signals CK1 and CK2. The first and the second clock signals CK1 and CK2, for example, are generated by the timing controller, but the present invention is not limited thereto.

Additionally, the $2^{nd}$ voltage supply device 2103_2 provides a stable voltage, for example, a stable voltage with a negative polarity VS2, i.e. VS−, for the compensation line CL of the odd pixel $P_{31}$ of the $3^{rd}$ pixel row according to a $2^{nd}$ scan signal SS2, and the first and the second clock signal CK1 and CK2. Besides, a duty cycle of the first clock signal CK1 is substantially a frame period of the single cell gap transflective LCD 2100, and the second clock signal CK2 is maintained enabled.

In addition, the second sub-voltage supply device 2105 has a plurality of voltage supply units 2105_1 and 2105_2. When driving the display panel 1601 in the column inversion driving method, the $1^{st}$ voltage supply unit 2105_1 provides a stable voltage, for example, a stable voltage with a positive polarity VS3, i.e. VS+, for the compensation line CL of the even pixels $P_{22}$ of the $2^{nd}$ pixel row according to the $1^{st}$ scan signal SS1, and the first and the second clock signal CK1 and CK2. Additionally, the $2^{nd}$ voltage supply device 2105_2 provides a stable voltage, for example, a stable voltage with a positive polarity VS4, i.e. VS+, for the compensation line CL of the even pixel $P_{32}$ of the $3^{rd}$ pixel row according to a $2^{nd}$ scan signal SS2, and the first and the second clock signal CK1 and CK2.

Figure 22A:
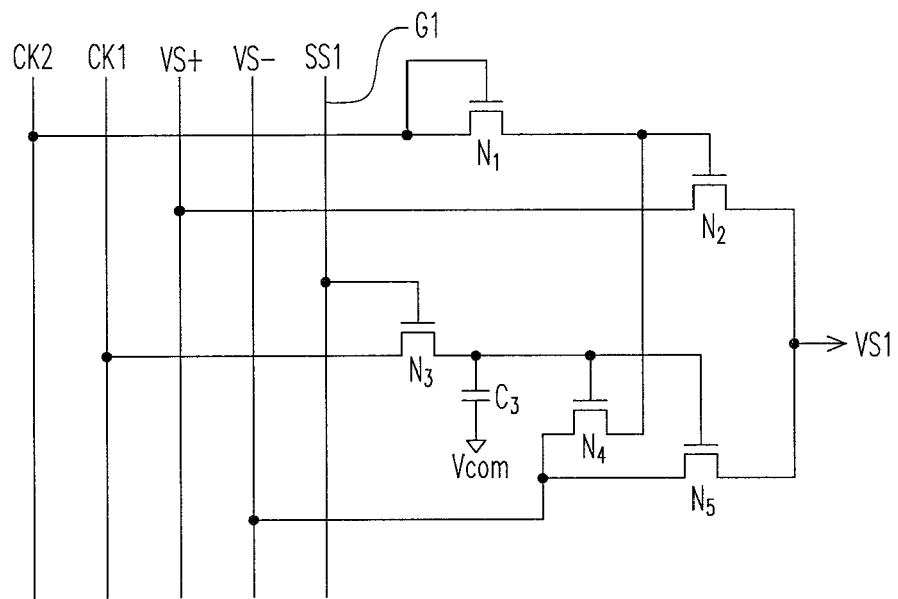
FIGS. 22A~22D are respectively circuit diagrams of the voltage supply unit of the ninth exemplary embodiment.
Figure 22B:
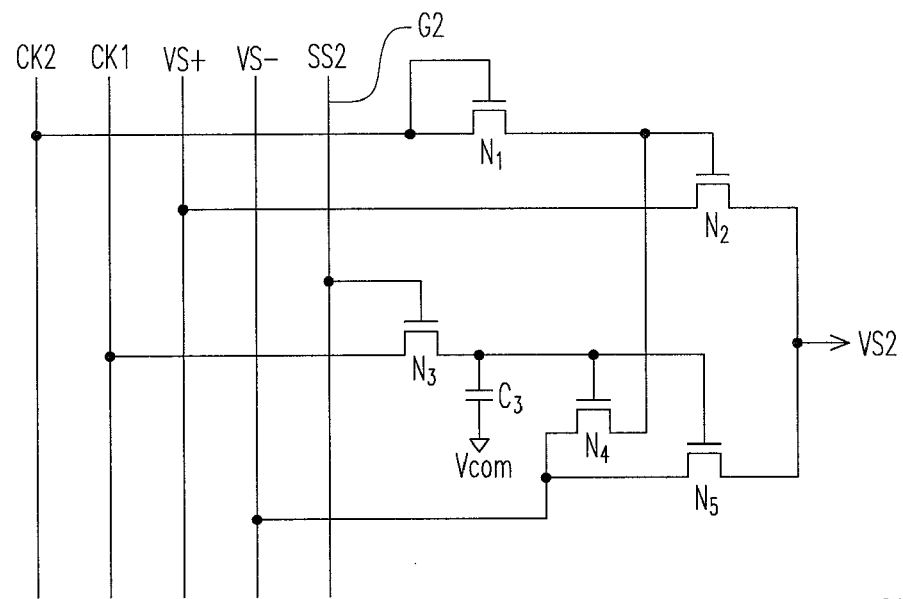

FIGS. 22A and 22B are respectively circuit diagrams of the voltage supply unit 2103_1 and 2103_2 of the ninth exemplary embodiment. Referring to both FIGS. 22A and 22B, the voltage supply unit 2103_1 and 2103_2 both include a first N-type transistor $N_1$, a second N-type transistor $N_2$, a third capacitor $C_3$, a third N-type transistor $N_3$, a fourth N-type transistor $N_4$ and a fifth N-type transistor $N_5$. Since the voltage supply unit 2103_1 and 2103_2 are similar in structure and in connection, only single voltage supply unit is used for description in the following.

Taking the voltage supply unit 2103_1 as an example, a gate and a source of the first N-type transistor $N_1$ are coupled with each other to receive the second clock signal CK2. A gate of the second N-type transistor $N_2$ is coupled to the drain of the first N-type transistor $N_1$, a source of the second N-type transistor $N_2$ is used to receive the stable voltage with the positive polarity VS+, and a drain of the second N-type transistor $N_2$ is coupled to the compensation line CL of the odd pixel $P_{21}$ of the $2^{nd}$ pixel row. A gate of the third N-type transistor $N_3$ is coupled to the $1^{st}$ scan line G1 to receive the scan signal SS1, and a source of the third N-type transistor $N_3$ is used to receive the first clock signal CK1.

A first end of the third capacitor $C_3$ is coupled to a drain of the third N-type transistor $N_3$, and a second end of the third capacitor $C_3$ is coupled to the common line $CE_2$. A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the negative polarity VS−, and a drain of the fifth N-type transistor $N_5$ is coupled to the compensation line CL of the pixels $P_{21}$ of the $2^{nd}$ pixel row.

Figure 22C:
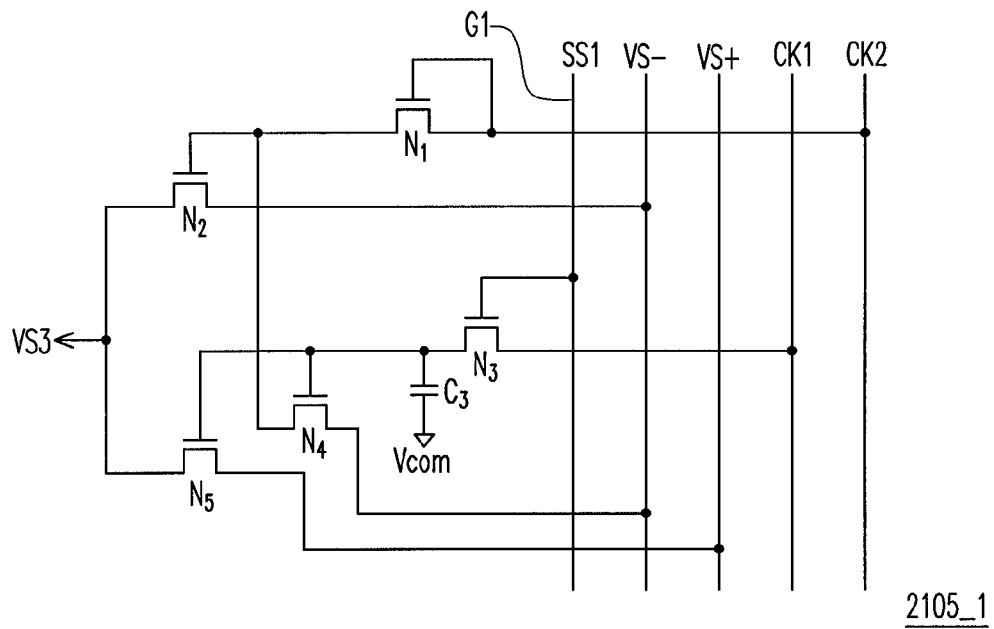
Figure 22D:
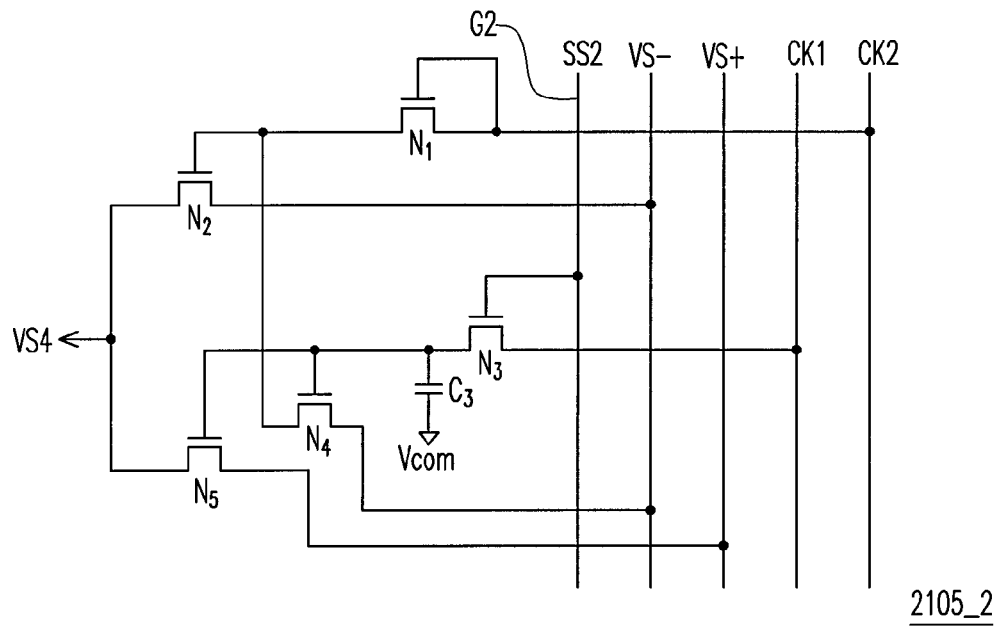

FIGS. 22C and 22D are respectively circuit diagrams of the voltage supply unit 2105_1 and 2105_2 of the ninth exemplary embodiment. Referring to both FIGS. 22C and 22D, the voltage supply unit 2105_1 and 2103_2 both include a first N-type transistor $N_1$, a second N-type transistor $N_2$, a third capacitor $C_3$, a third N-type transistor $N_3$, a fourth N-type transistor $N_4$ and a fifth N-type transistor $N_5$. Since the voltage supply unit 2105_1 and 2105_2 are similar in structure and in connection, only single voltage supply unit is used for description in the following.

Taking the voltage supply unit 2105_1 as an example, a gate and a source of the first N-type transistor $N_1$ are coupled with each other to receive the second clock signal CK2. A gate of the second N-type transistor $N_2$ is coupled to the drain of the first N-type transistor $N_1$, a source of the second N-type transistor $N_2$ is used to receive the stable voltage with the negative polarity VS−, and a drain of the second N-type transistor $N_2$ is coupled to the compensation line CL of the even pixel $P_{22}$ of the $2^{nd}$ pixel row. A gate of the third N-type transistor $N_3$ is coupled to the $1^{st}$ scan line G1 to receive the scan signal SS1, and a source of the third N-type transistor $N_3$ is used to receive the first clock signal CK1.

A first end of the third capacitor $C_3$ is coupled to a drain of the third N-type transistor $N_3$, and a second end of the third capacitor $C_3$ is coupled to the common line $CE_2$. A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the positive polarity VS+, and a drain of the fifth N-type transistor $N_5$ is coupled to the compensation line CL of the even pixels $P_{22}$ of the $2^{nd}$ pixel row.

Figure 23A:
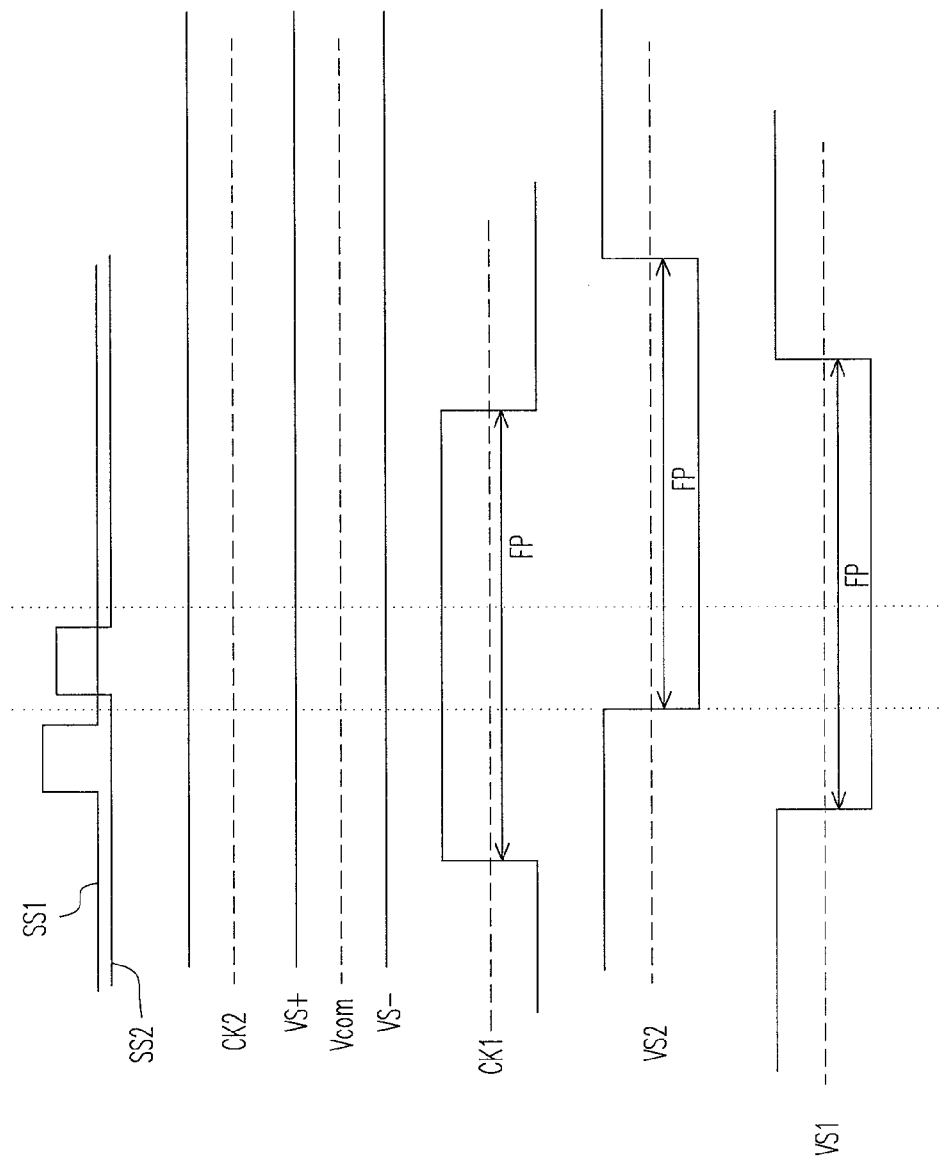
FIGS. 23A and 23B are respectively timing diagrams of the circuit operation of the voltage supply unit according to the ninth exemplary embodiment.

FIG. 23A is a timing diagram of the circuit operation of the voltage supply unit 2103_1 and 2103_2 according to the ninth exemplary embodiment. Referring to FIG. 21, FIG. 22A, FIG. 22B and FIG. 23A, it can be seen from FIG. 23A that when the scan signal SS1 is enabled, the third N-type transistor $N_3$ of the voltage supply unit 2103_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2103_1 are turned on, and the second N-type transistor $N_2$ is turned off. As a result, the voltage supply unit 2103_1 provides the stable voltage with the negative polarity VS1, i.e. VS−, for the compensation line CL of the odd pixel $P_{21}$ of the $2^{nd}$ pixel row during a frame period FP.

Similarly, when the scan signal SS2 is enabled, the third N-type transistor $N_3$ of the voltage supply unit 2103_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2103_1 are turned on, and the second N-type transistor $N_2$ is turned off. As a result, the voltage supply unit 2103_2 provides the stable voltage with the negative polarity VS2, i.e. VS−, for the compensation line CL of the odd pixels $P_{31}$ of the $3^{rd}$ pixel row during the frame period FP.

Figure 23B:
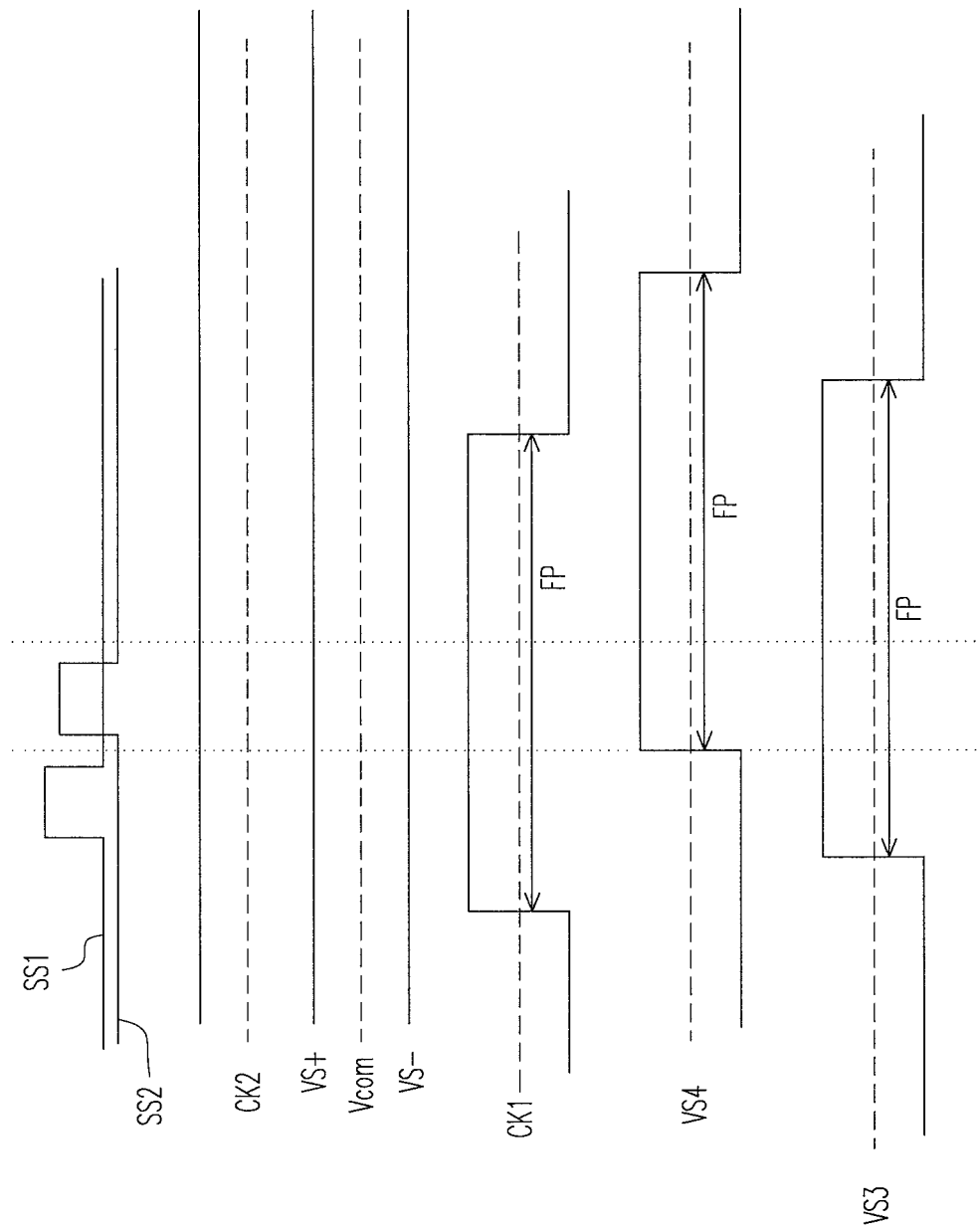

FIG. 23B is a timing diagram of the circuit operation of the voltage supply units 2503_1 and 2503_2 according to the ninth exemplary embodiment. Referring to FIG. 21, FIG. 22C, FIG. 22D and FIG. 23B, it can be seen from FIG. 23B that when the scan signal SS1 is enabled, the third N-type transistor $N_3$ of the voltage supply unit 2105_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2105_1 are turned on, and the second N-type transistor $N_2$ is turned off. As a result, the voltage supply unit 2105_1 provides the stable voltage with the positive polarity VS3, i.e. VS+, for the compensation line CL of the even pixels $P_{22}$ of the $2^{nd}$ pixel row during the frame period FP.

Similarly, when the scan signal SS2 is enabled, the third N-type transistor $N_3$ of the voltage supply unit 2105_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2105_1 are turned on, and the second N-type transistor $N_2$ is turned off. As a result, the voltage supply unit 2105_2 provides the stable voltage with the positive polarity VS4, i.e. VS+, for the compensation line CL of the even pixels $P_{32}$ of the $3^{rd}$ pixel row during the frame period FP.

Accordingly, the voltage supply device, composed of the first sub-voltage supply unit 2103 and the second sub-voltage supply unit 2105, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 2100 can be optimized simultaneously.

In addition, since the voltage supply device, composed of the first and the second sub-voltage supply devices 2103 and 2105, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 2100 can be reduced below the set specifications of the shipment, for example below 2%, but the present invention is not limited thereto.

The Tenth Exemplary Embodiment

Figure 24:
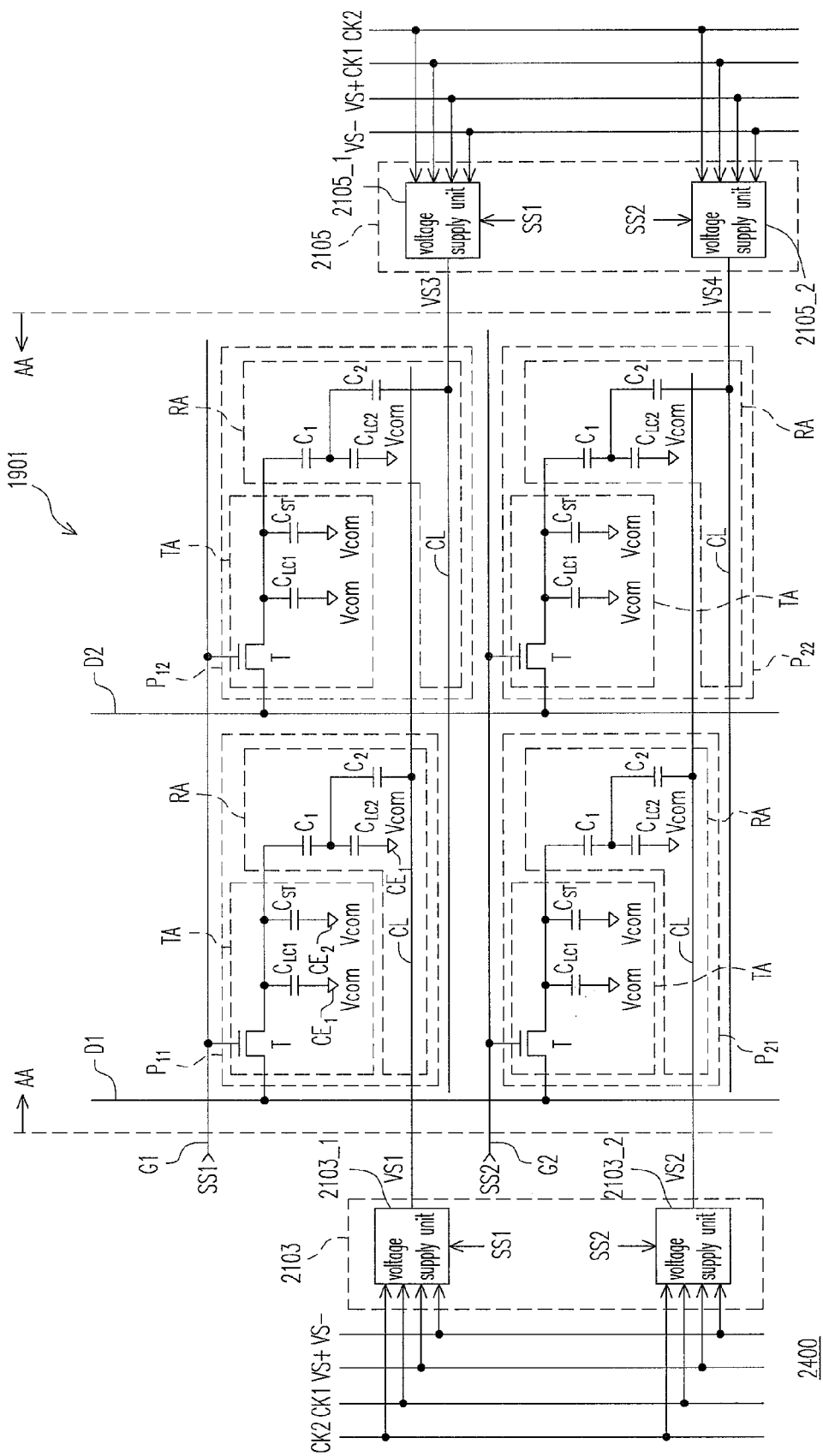
FIG. 24 is a diagram showing a partial single cell gap transflective LCD according to the tenth exemplary embodiment of the present invention.

FIG. 24 is a diagram showing a partial single cell gap transflective LCD 2400 according to the tenth exemplary embodiment of the present invention. Referring to FIG. 24, the single cell gap transflective LCD 2400 includes a display panel 1901 and a voltage supply device, wherein the voltage supply device includes a first and a second sub-voltage device 2103 and 2105. Besides, the display panel 1901 is a single cell gap liquid crystal panel. Obviously, the single cell gap transflective LCD 2400 further includes other components, such as a gate driver, a source driver, a timing controller and a back light module. However, only components related to the present invention are sketched in the tenth exemplary embodiment for illustrating.

Since the structure of the display panel 1901 of the tenth exemplary embodiment is the same as that of the eighth exemplary embodiment, further descriptions are omitted herein. Besides, the first sub-voltage supply device 2103 is coupled to the compensation line CL of all odd pixels $P_{11}$ and $P_{21}$ of each of the pixel rows, and used to continuously and correspondingly provide the stable voltages VS1 and/or VS2 for the compensation lines CL of the pixels $P_{11}$ and $P_{21}$. Besides, the second sub-voltage supply device 2105 is coupled to the compensation line CL of all even pixels $P_{12}$ and $P_{22}$ of each of the pixel rows, and used to continuously and correspondingly provide the stable voltages VS3 and VS4 for the compensation lines CL of the pixels $P_{12}$ and $P_{22}$.

Specifically, the first sub-voltage supply device 2103 has a plurality of voltage supply units 2103_1 and 2103_2. When driving the display panel 1601 in a column inversion driving method, the $1^{st}$ voltage supply unit 2103_1 provides a stable voltage, for example, a stable voltage with a negative polarity VS1, i.e. VS−, for the compensation line CL of the odd pixels $P_{11}$ of the $1^{st}$ pixel row according to a $1^{st}$ scan signal SS1, generally generated by the gate driver, and a first and a second clock signals CK1 and CK2. The first and the second clock signals CK1 and CK2, for example, are generated by the timing controller, but the present invention is not limited thereto.

Additionally, the $2^{nd}$ voltage supply device 2103_2 provides a stable voltage, for example, a stable voltage with a negative polarity VS2, i.e. VS−, for the compensation line CL of the odd pixel $P_{21}$ of the $2^{nd}$ pixel row according to a $2^{nd}$ scan signal SS2, and the first and the second clock signal CK1 and CK2. Besides, a duty cycle of the first clock signal CK1 is substantially a frame period of the single cell gap transflective LCD 2100, and the second clock signal CK2 is maintained enabled.

In addition, the second sub-voltage supply device 2105 has a plurality of voltage supply units 2105_1 and 2105_2. When driving the display panel 1601 in the column inversion driving method, the $1^{st}$ voltage supply unit 2105_1 provides a stable voltage, for example, a stable voltage with a positive polarity VS3, i.e. VS+, for the compensation line CL of the even pixels $P_{12}$ of the $1^{st}$ pixel row according to the $1^{st}$ scan signal SS1, and the first and the second clock signal CK1 and CK2. Additionally, the $2^{nd}$ voltage supply device 2105_2 provides a stable voltage, for example, a stable voltage with a positive polarity VS4, i.e. VS+, for the compensation line CL of the even pixel $P_{22}$ of the $2^{nd}$ pixel row according to a $2^{nd}$ scan signal SS2, and the first and the second clock signal CK1 and CK2.

Since the structure of the voltage supply units 2103_1, 2103_2, 2105_1 and 2105_2 of the tenth exemplary embodiment are the same as that of the ninth exemplary embodiment, further descriptions are omitted herein.

FIG. 25A is a timing diagram of the circuit operation of the voltage supply units 2103_1 and 2103_2 according to the tenth exemplary embodiment. Referring to FIG. 22A, FIG. 22B, FIG. 24 and FIG. 25A, it can be seen from FIG. 25A that when the scan signal SS1 is enabled, the third N-type transistor $N_3$ of the voltage supply unit 2103_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2103_1 are turned on, and the second N-type transistor $N_2$ is turned off. As a result, the voltage supply unit 2103_1 provides the stable voltage with the negative polarity VS1, i.e. VS−, for the compensation line CL of the odd pixel $P_{11}$ of the $1^{st}$ pixel row during a frame period FP.

Similarly, when the scan signal SS2 is enabled, the third N-type transistor $N_3$ of the voltage supply unit 2103_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2103_2 are turned on, and the second N-type transistor $N_2$ is turned off. As a result, the voltage supply unit 2103_2 provides the stable voltage with the negative polarity VS2, i.e. VS−, for the compensation line CL of the odd pixels $P_{21}$ of the $2^{nd}$ pixel row during the frame period FP.

Figure 25B:
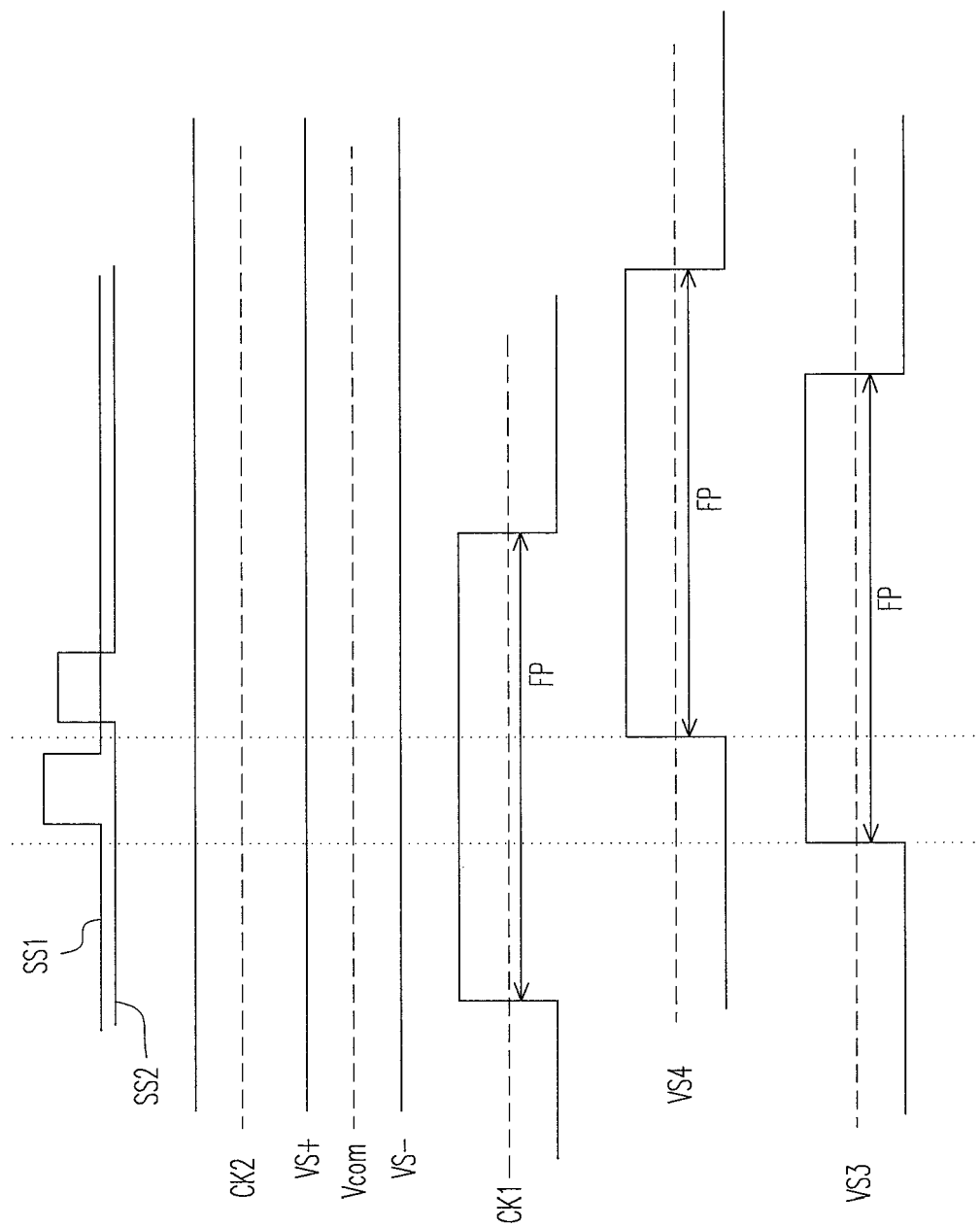

FIG. 25B is a timing diagram of the circuit operation of the voltage supply units 2105_1 and 2105_2 according to the tenth exemplary embodiment. Referring to FIG. 22C, FIG. 22D, FIG. 24 and FIG. 25B, it can be seen from FIG. 25B that when the scan signal SS1 is enabled, the third N-type transistor $N_3$ of the voltage supply unit 2105_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2105_1 are turned on, and the second N-type transistor $N_2$ is turned off. As a result, the voltage supply unit 2105_1 provides the stable voltage with the positive polarity VS3, i.e. VS+, for the compensation line CL of the even pixels $P_{12}$ of the $1^{st}$ pixel row during the frame period FP.

Similarly, when the scan signal SS2 is enabled, the third N-type transistor $N_3$ of the voltage supply unit 2105_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2105_2 are turned on, and the second N-type transistor $N_2$ is turned off. As a result, the voltage supply unit 2105_2 provides the stable voltage with the positive polarity VS4, i.e. VS+, for the compensation line CL of the even pixels $P_{22}$ of the $2^{nd}$ pixel row during the frame period FP.

Accordingly, the voltage supply device, composed of the first sub-voltage supply unit 2103 and the second sub-voltage supply unit 2105, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves in the transparent area TA. Hence, the transparent display quality and the reflective display quality of the single cell gap transflective LCD 2400 can be optimized simultaneously.

In addition, since the voltage supply device, composed of the first and the second sub-voltage supply devices 2103 and 2105, continuously and correspondingly provides/applies the stable voltages VS1~VS4 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total crosstalk of the single cell gap transflective LCD 2400 can be reduced below the set specifications of the shipment, for example below 2%, but the present invention is not limited thereto.

The Eleventh Exemplary Embodiment

Figure 26:
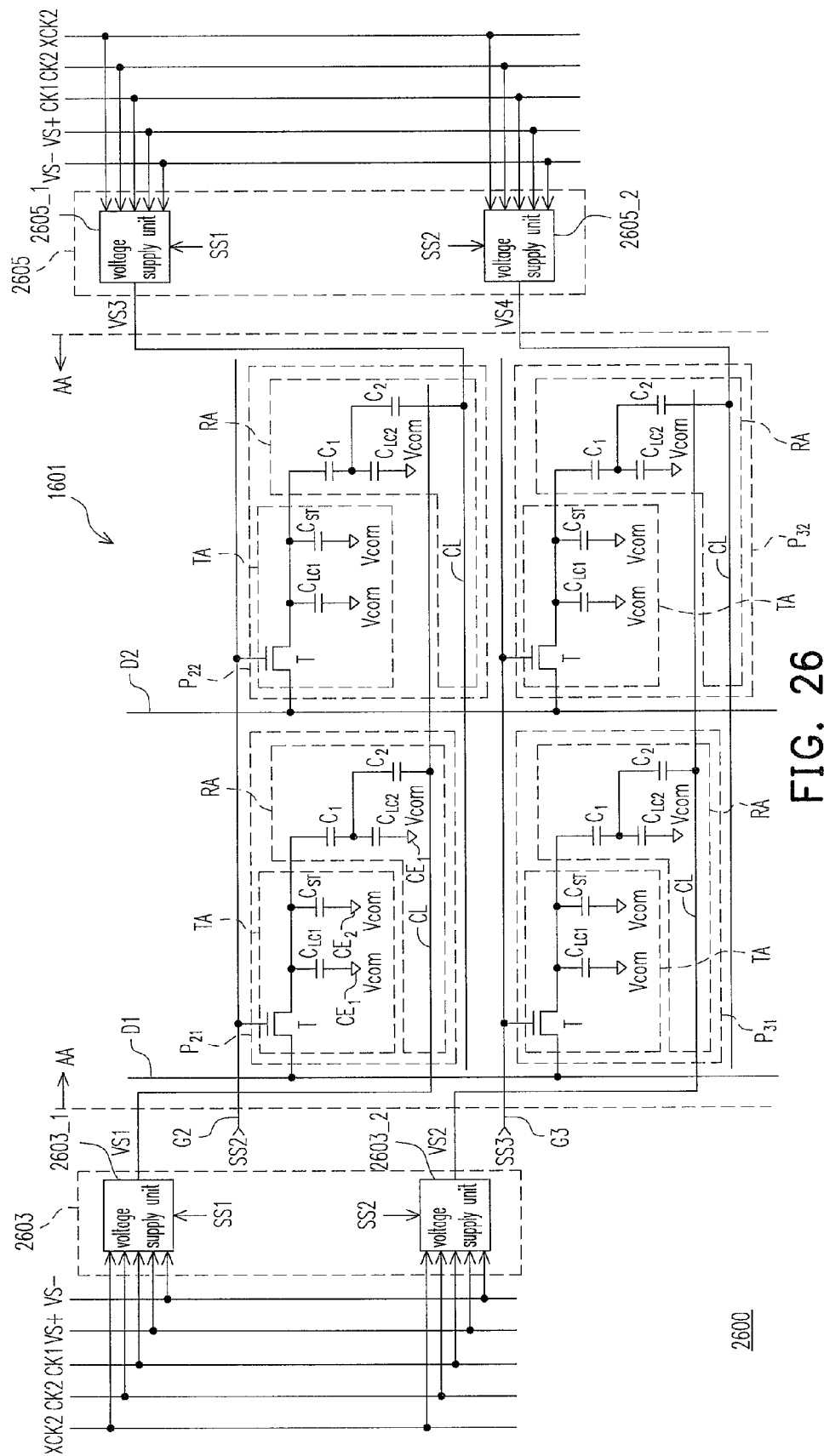
FIG. 26 is a diagram showing a partial single cell gap transflective LCD according to the eleventh exemplary embodiment of the present invention.

FIG. 26 is a diagram showing a partial single cell gap transflective LCD 2600 according to the eleventh exemplary embodiment of the present invention. Referring to FIG. 26, the single cell gap transflective LCD 2600 includes a display panel 1601 and a voltage supply device, wherein the voltage supply device includes a first and a second sub-voltage device 2603 and 2605. Besides, the display panel 1601 is a single cell gap liquid crystal panel. Obviously, the single cell gap transflective LCD 2600 further includes other components, such as a gate driver, a source driver, a timing controller and a back light module. However, only components related to the present invention are sketched in the eleventh exemplary embodiment for illustrating.

Since the structure of the display panel 1601 of the eleventh exemplary embodiment is the same as that of the seventh exemplary embodiment, further descriptions are omitted herein. Besides, the first sub-voltage supply device 2603 is coupled to the compensation line CL of the odd pixels $P_{21}$ and $P_{31}$ of each of the pixel rows, and used to continuously and correspondingly provide the stable voltages VS1 and VS2 for the compensation lines CL of the pixels $P_{21}$ and $P_{31}$. Besides, the second sub-voltage supply device 2605 is coupled to the compensation line CL of even pixels $P_{22}$ and $P_{32}$ of each of the pixel rows, and used to continuously and correspondingly provide the stable voltages VS3 and VS4 for the compensation lines CL of the pixels $P_{22}$ and $P_{32}$.

Specifically, the first sub-voltage supply device 2603 has a plurality of voltage supply units 2603_1 and 2603_2. When driving the display panel 1601 in a column inversion driving method, the $1^{st}$ voltage supply unit 2603_1 provides a stable voltage, for example, a stable voltage with a negative polarity VS1, i.e. VS− for the compensation line CL of the pixels $P_{21}$ of the $2^{nd}$ pixel row according to a $1^{st}$ scan signal SS1, generally generated by the gate driver, a first clock signal CK1, and a second and a third clock signals CK2 and XCK2, wherein there is a 180 degrees phase difference between the second clock signal CK2 and the third clock signal XCK2.

Additionally, the $2^{nd}$ voltage supply device 2603_2 provides a stable voltage, for example, a stable voltage with a negative polarity VS2, i.e. VS−, for the compensation line CL of the odd pixels $P_{31}$ the $3^{rd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2. Besides, a duty cycle of the first clock signal CK1 is substantially a frame period of the single cell gap transflective LCD 2600, and duty cycles of the second and the third clock signals CK2 and XCK2 are substantially an enable period of the scan signal SS1 or SS2. Generally the enable periods of the scan signals SS1 and SS2 are the same.

In addition, the second sub-voltage supply device 2605 has a plurality of voltage supply units 2605_1 and 2605_2. When driving the display panel 1601 in the column inversion driving method, the $1^{st}$ voltage supply unit 2605_1 provides a stable voltage, for example, a stable voltage with a positive polarity VS3, i.e. VS+, for the compensation line CL of the even pixels $P_{22}$ of the $2^{nd}$ pixel row according to the $1^{st}$ scan signal SS1, the first clock signal CK1, and the second and the third clock signals CK2 and XCK2. Additionally, the $2^{nd}$ voltage supply device 2605_2 provides a stable voltage, for example, a stable voltage with a positive polarity VS4, i.e. VS+, for the compensation line CL of the even pixels $P_{32}$ the $3^{rd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2.

Figure 27A:
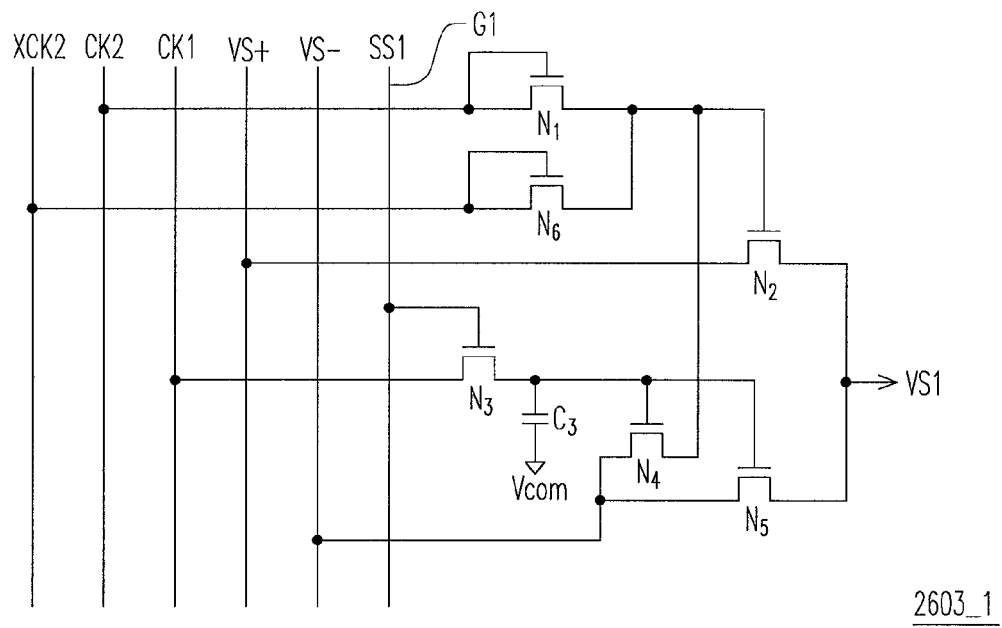
FIGS. 27A~27D are respectively circuit diagrams of the voltage supply unit of the eleventh exemplary embodiment.
Figure 27B:
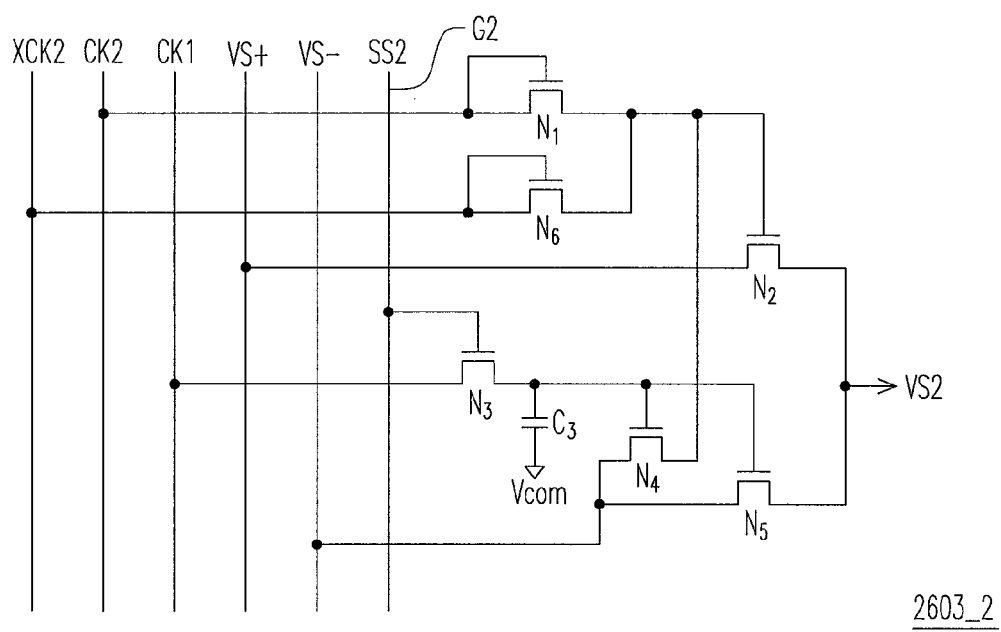

FIGS. 27A and 27B are respectively circuit diagrams of the voltage supply unit 2603_1 and 2603_2 of the eleventh exemplary embodiment. Referring to both FIGS. 27A and 27B, the voltage supply unit 2603_1 and 2603_2 both include a first N-type transistor $N_1$, a second N-type transistor $N_2$, a third capacitor $C_3$, a third N-type transistor $N_3$, a fourth N-type transistor $N_4$, a fifth N-type transistor $N_5$ and a sixth N-type transistor $N_6$. Since the voltage supply unit 2603_1 and 2603_2 are similar in structure and in connection, only single voltage supply unit is used for description in the following.

Taking the voltage supply unit 2603_1 as an example, a gate and a source of the first N-type transistor $N_1$ are coupled with each other to receive the second clock signal CK2. A gate of the second N-type transistor $N_2$ is coupled to the drain of the first N-type transistor $N_1$, a source of the second N-type transistor $N_2$ is used to receive the stable voltage with the positive polarity VS+, and a drain of the second N-type transistor $N_2$ is coupled to the compensation line CL of the odd pixel $P_{21}$ of the $2^{nd}$ pixel row.

A gate and a source of the sixth N-type transistor $N_6$ are coupled with each other to receive the third clock signal XCK2, and a drain of the sixth N-type transistor $N_6$ is coupled to the drain of the first N-type transistor $N_1$. A gate of the third N-type transistor $N_3$ is coupled to the $1^{st}$ scan line G1 to receive the scan signal SS1, and a source of the third N-type transistor $N_3$ is used to receive the first clock signal CK1. A first end of the third capacitor $C_3$ is coupled to a drain of the third N-type transistor $N_3$, and a second end of the third capacitor $C_3$ is coupled to the common line $CE_2$.

A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the negative polarity VS−, and a drain of the fifth N-type transistor $N_5$ is coupled to the compensation line CL of the odd pixel $P_{21}$ of the $2^{nd}$ pixel row.

Figure 27C:
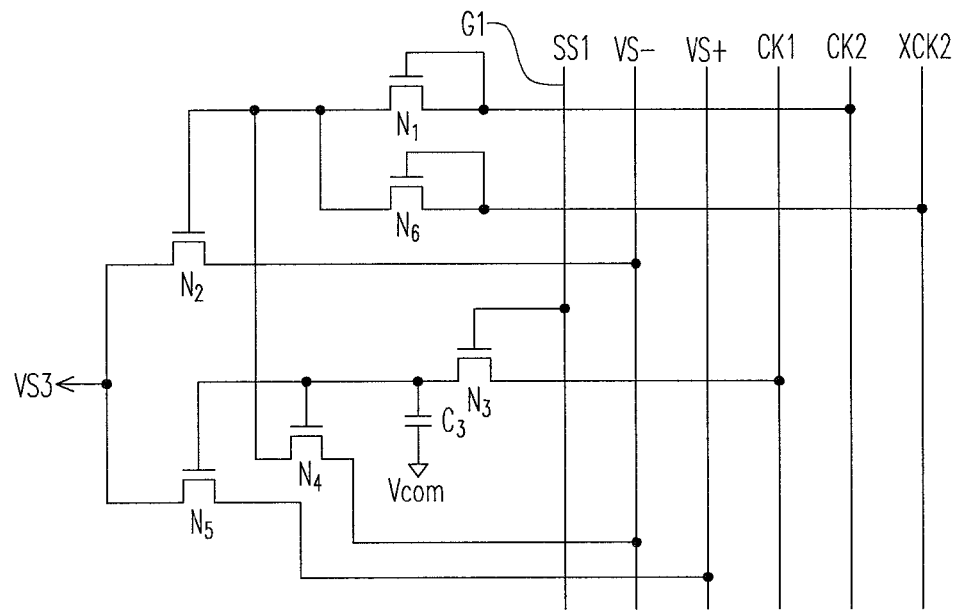
Figure 27D:
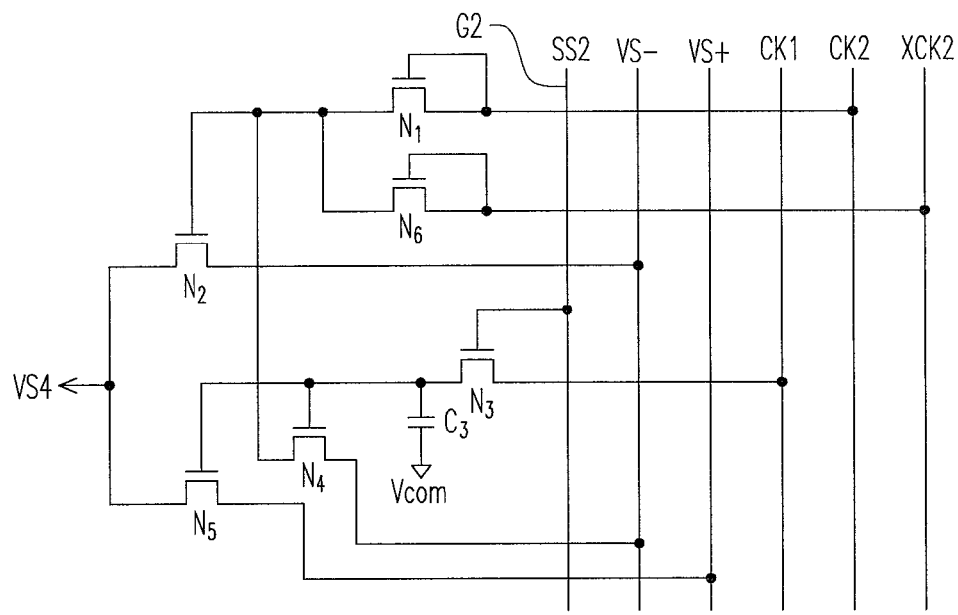

FIGS. 27C and 27D are respectively circuit diagrams of the voltage supply unit 2605_1 and 2605_2 of the eleventh exemplary embodiment. Referring to both FIGS. 27C and 27D, the voltage supply unit 2605_1 and 2605_2 both include a first N-type transistor $N_1$, a second N-type transistor $N_2$, a third capacitor $C_3$, a third N-type transistor $N_3$, a fourth N-type transistor $N_4$, a fifth N-type transistor $N_5$ and a sixth N-type transistor $N_6$. Since the voltage supply unit 2605_1 and 2605_2 are similar in structure and in connection, only single voltage supply unit is used for description in the following.

Taking the voltage supply unit 2605_1 as an example, a gate and a source of the first N-type transistor $N_1$ are coupled with each other to receive the second clock signal CK2. A gate of the second N-type transistor $N_2$ is coupled to the drain of the first N-type transistor $N_1$, a source of the second N-type transistor $N_2$ is used to receive the stable voltage with the negative polarity VS−, and a drain of the second N-type transistor $N_2$ is coupled to the compensation line CL of the even pixel $P_{22}$ of the $2^{nd}$ pixel row.

A gate and a source of the sixth N-type transistor $N_6$ are coupled with each other to receive the third clock signal XCK2, and a drain of the sixth N-type transistor $N_6$ is coupled to the drain of the first N-type transistor $N_1$. A gate of the third N-type transistor $N_3$ is coupled to the $1^{st}$ scan line G1 to receive the scan signal SS1, and a source of the third N-type transistor $N_3$ is used to receive the first clock signal CK1. A first end of the third capacitor $C_3$ is coupled to a drain of the third N-type transistor $N_3$, and a second end of the third capacitor $C_3$ is coupled to the common line $CE_2$.

A gate of the fourth N-type transistor $N_4$ is coupled to the drain of the third N-type transistor $N_3$, a source of the fourth N-type transistor $N_4$ is used to receive the stable voltage with the negative polarity VS−, and a drain of the fourth N-type transistor $N_4$ is coupled to the gate of the second transistor $N_2$. A gate of the fifth N-type transistor $N_5$ is coupled to the drain of the third N-type transistor $N_3$, a source of fifth N-type transistor $N_5$ is used to receive the stable voltage with the positive polarity VS+, and a drain of the fifth N-type transistor $N_5$ is coupled to the compensation line CL of the even pixels $P_{22}$ of the $2^{nd}$ pixel row.

Figure 28A:
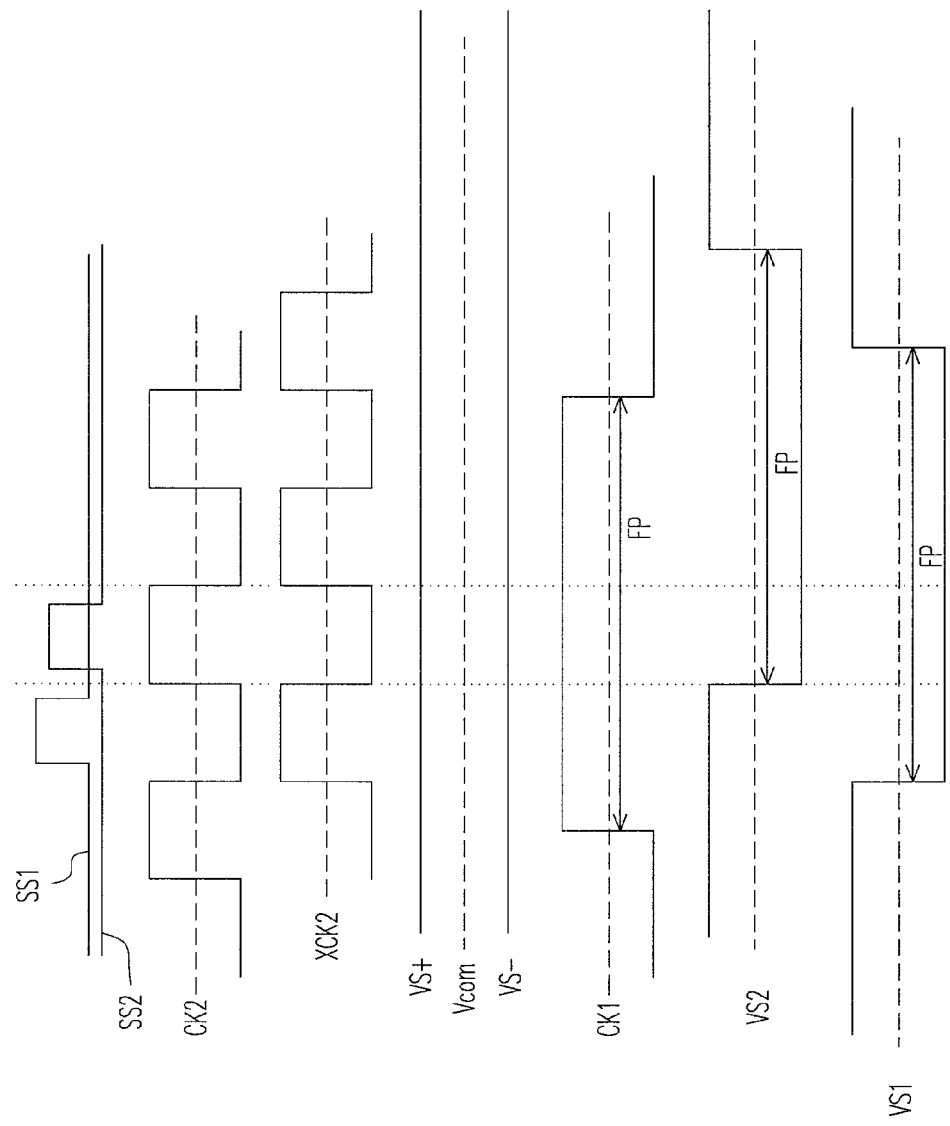

FIG. 28A is a timing diagram of the circuit operation of the voltage supply unit 2603_1 and 2603_2 according to the eleventh exemplary embodiment. Referring to FIG. 26, FIG. 27A, FIG. 27B and FIG. 28A, it can be seen from FIG. 28A that when the scan signal SS1 is enabled, the third N-type transistor $N_3$ of the voltage supply unit 2603_1 is turned on. Since the first and third clock signals CK1 and XCK2 are enabled and the second clock signal CK2 is disabled at this moment, the fourth N-type transistor $N_4$ and the fifth N-type transistor $N_5$ of the voltage supply unit 2603_1 are turned on, and the second N-type transistor $N_2$ is turned off. As a result, the voltage supply unit 2603_1 provides the stable voltage with the negative polarity VS1, i.e. VS−, for the compensation line CL of the odd pixel $P_{21}$ of the $2^{nd}$ pixel row during a frame period FP.

Similarly, when the scan signal SS2 is enabled, the third N-type transistor $N_3$ of the voltage supply unit 2603_2 is turned on. Since the first and second clock signal CK1 and CK2 are enabled and the third clock signal XCK2 is disabled at this moment, the fourth N-type transistor $N_4$ and the fifth N-type transistor $N_5$ of the voltage supply unit 2603_2 are turned on, and the second N-type transistor $N_2$ is turned off. As a result, the voltage supply unit 2603_2 provides the stable voltage with the negative polarity VS2, i.e. VS−, for the compensation line CL of the odd pixels $P_{31}$ of the $3^{rd}$ pixel row during the frame period FP.

FIG. 28B is a timing diagram of the circuit operation of the voltage supply units 2605_1 and 2605_2 according to the eleventh exemplary embodiment. Referring to FIG. 26, FIG. 27C, FIG. 27D and FIG. 28B, it can be seen from FIG. 28B that when the scan signal SS1 is enabled, the third N-type transistor $N_3$ of the voltage supply unit 2605_1 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2605_1 are turned on, and the second N-type transistor $N_2$ is turned off. As a result, the voltage supply unit 2605_1 provides the stable voltage with the positive polarity VS3, i.e. VS+, for the compensation line CL of the even pixel $P_{22}$ of the $2^{nd}$ pixel row during the frame period FP.

Similarly, when the scan signal SS2 is enabled, the third N-type transistor $N_3$ of the voltage supply unit 2605_2 is turned on. Since the first and the second clock signal CK1 and CK2 are enabled, and the third clock signal XCK2 is disabled at this moment, the fourth N-type transistor $N_4$ and the fifth N-type transistor $N_5$ of the voltage supply unit 2605_2 are turned on, and the second N-type transistor $N_2$ is turned off. As a result, the voltage supply unit 2605_2 provides the stable voltage with the positive polarity VS4, i.e. VS+, for the compensation line CL of the even pixels $P_{32}$ of the $3^{rd}$ pixel row during the frame period FP.

Accordingly, the voltage supply device, composed of the first sub-voltage supply unit 2603 and the second sub-voltage supply unit 2605, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 2600 can be optimized simultaneously.

In addition, since the voltage supply device, composed of the first and the second sub-voltage supply devices 2603 and 2605, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 2600 can be reduced below the set specifications of the shipment, for example below 2%, but the present invention is not limited thereto.

The Twelfth Exemplary Embodiment

Figure 29:
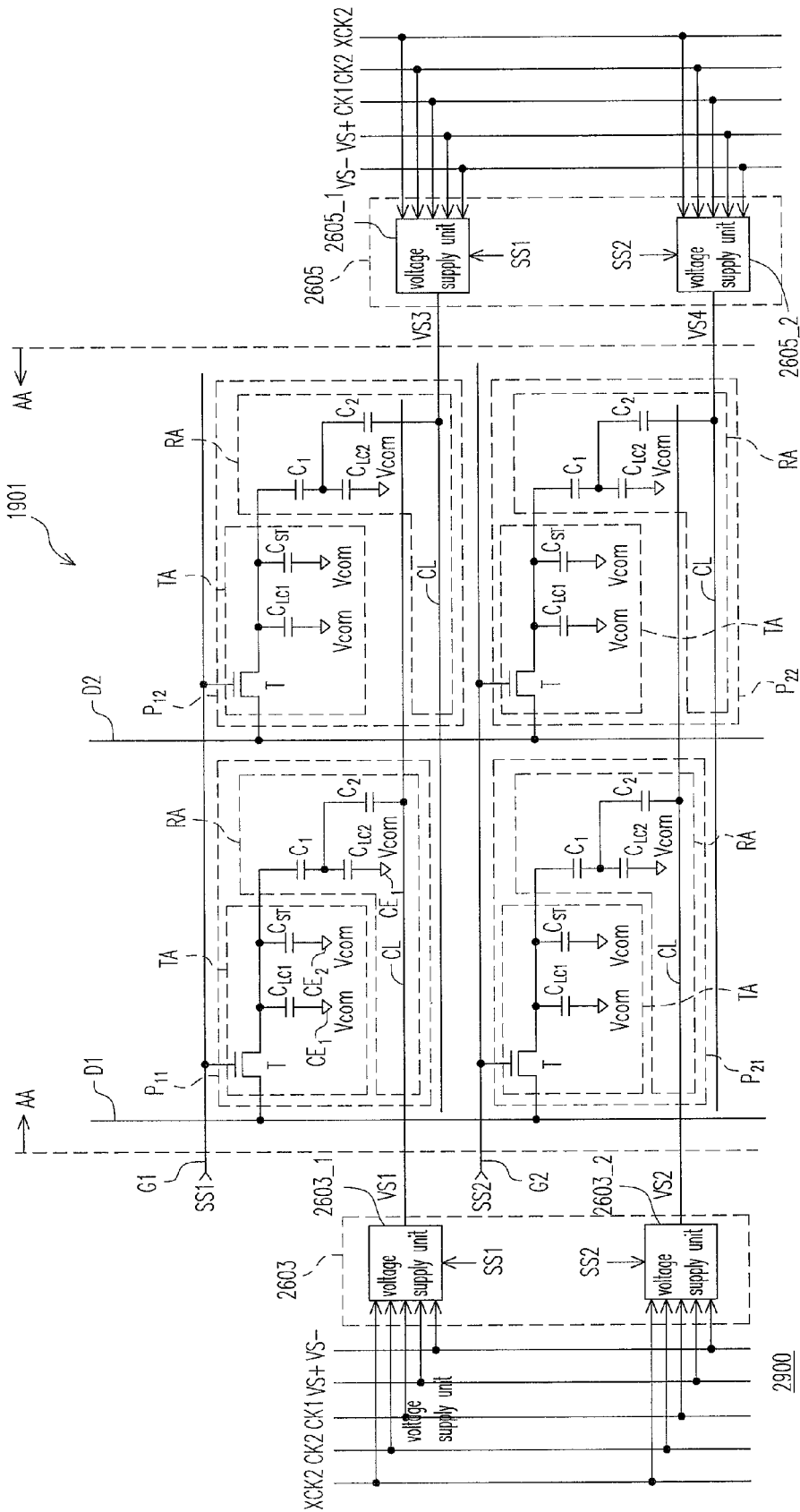
FIG. 29 is a diagram showing a partial single cell gap transflective LCD according to the twelfth exemplary embodiment of the present invention.

FIG. 29 is a diagram showing a partial single cell gap transflective LCD 2900 according to the eleventh exemplary embodiment of the present invention. Referring to FIG. 29, the single cell gap transflective LCD 2900 includes a display panel 1901 and a voltage supply device, wherein the voltage supply device includes a first and a second sub-voltage device 2603 and 2605. Besides, the display panel 1901 is a single cell gap liquid crystal panel. Obviously, the single cell gap transflective LCD 2900 further includes other components, such as a gate driver, a source driver, a timing controller and a back light module. However, only components related to the present invention are sketched in the twelfth exemplary embodiment for illustrating.

Since the structure of the display panel 1901 of the twelfth exemplary embodiment is the same as that of the eighth exemplary embodiment, further descriptions are omitted herein. Besides, the first sub-voltage supply device 2603 is coupled to the compensation line CL of all odd pixels $P_{11}$ and $P_{21}$ of each of the pixel rows, and used to continuously and correspondingly provide the stable voltage(s) VS1 and/or VS2 for the compensation lines CL of the pixels $P_{11}$ and $P_{21}$. Besides, the second sub-voltage supply device 2605 is coupled to the compensation line CL of all even pixels $P_{12}$ and $P_{22}$ of each of the pixel rows, and used to continuously and correspondingly provide the stable voltage(s) VS3 and/or VS4 for the compensation lines CL of the pixels $P_{12}$ and $P_{22}$.

Specifically, the first sub-voltage supply device 2603 has a plurality of voltage supply units 2603_1 and 2603_2. When driving the display panel 1901 in a column inversion driving method, the $1^{st}$ voltage supply unit 2603_1 provides a stable voltage, for example, a stable voltage with a negative polarity VS1, i.e. VS– for the compensation line CL of the odd pixels $P_{11}$ of the $1^{st}$ pixel row according to a $1^{st}$ scan signal SS1, generally generated by the gate driver, a first clock signal CK1, and a second and a third clock signals CK2 and XCK2, wherein there is a 180 degrees phase difference between the second clock signal CK2 and the third clock signal XCK2.

Additionally, the $2^{nd}$ voltage supply device 2603_2 provides a stable voltage, for example, a stable voltage with a negative polarity VS2, i.e. VS–, for the compensation line CL of the odd pixels $P_{21}$ the $2^{nd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2. Besides, a duty cycle of the first clock signal CK1 is substantially a frame period of the single cell gap transflective LCD 2900, and duty cycles of the second and the third clock signals CK2 and XCK2 are substantially an enable period of the scan signal SS1 or SS2. Generally the enable periods of the scan signals SS1 and SS2 are the same.

In addition, the second sub-voltage supply device 2605 has a plurality of voltage supply units 2605_1 and 2605_2. When driving the display panel 1901 in the column inversion driving method, the $1^{st}$ voltage supply unit 2605_1 provides a stable voltage, for example, a stable voltage with a positive polarity VS3, i.e. VS+, for the compensation line CL of the even pixel $P_{12}$ of the $1^{st}$ pixel row according to the $1^{st}$ scan signal SS1, the first clock signal CK1, and the second and the third clock signals CK2 and XCK2, wherein there is a 180 degrees phase difference between the second clock signal CK2 and the third clock signal XCK2. Additionally, the $2^{nd}$ voltage supply device 2605_2 provides a stable voltage, for example, a stable voltage with a positive polarity VS4, i.e. VS+, for the compensation line CL of the even pixel $P_{22}$ the $2^{nd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2.

Since the structure of the voltage supply units 2603_1, 2603_2, 2605_1 and 2605_2 of the twelfth exemplary embodiment are the same as that of the eleventh exemplary embodiment, further descriptions are omitted herein.

Figure 30A:
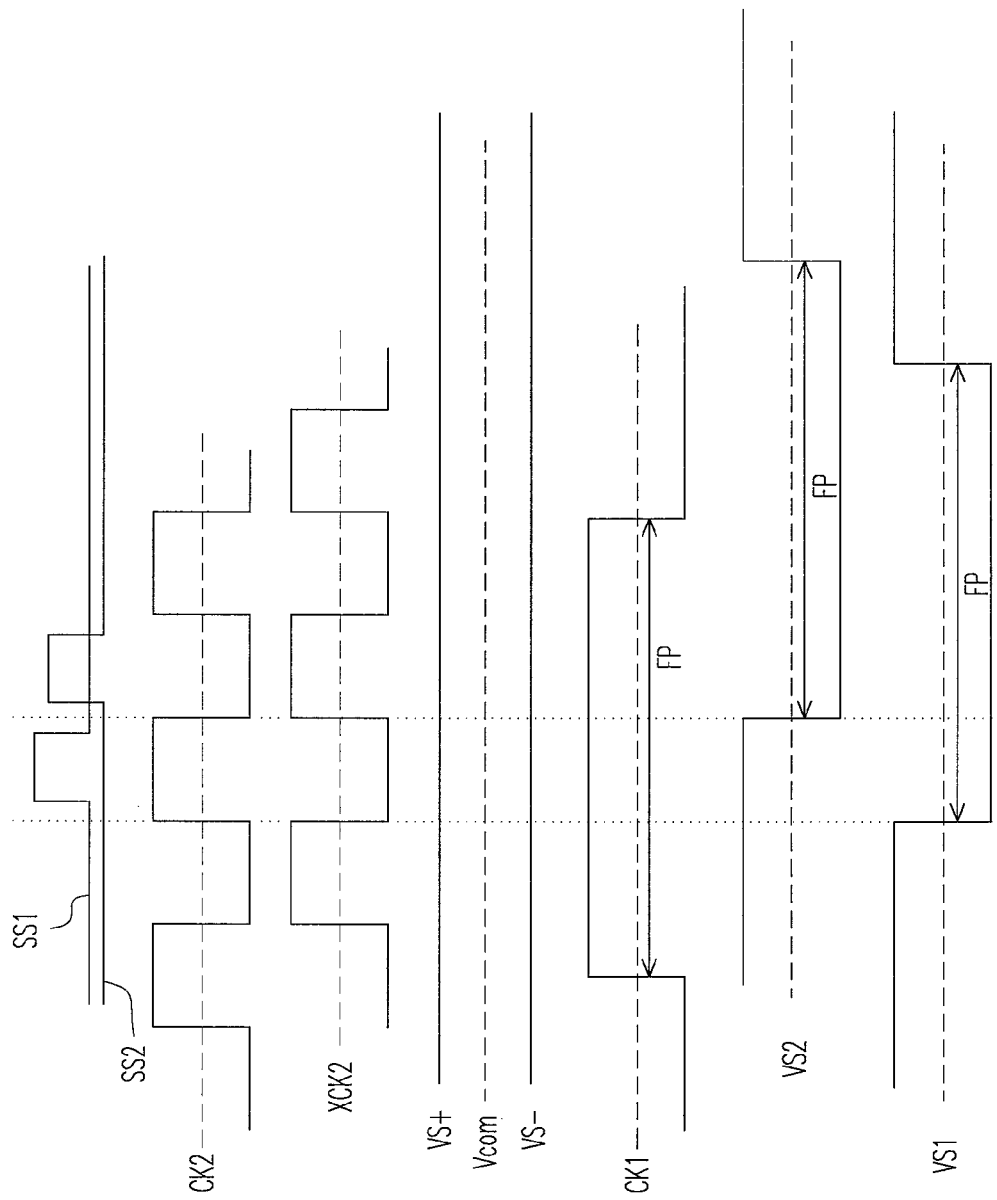
FIGS. 30A and 30B are respectively timing diagrams of the circuit operation of the voltage supply unit according to the twelfth exemplary embodiment.

FIG. 30A is a timing diagram of the circuit operation of the voltage supply unit 2603_1 and 2603_2 according to the twelfth exemplary embodiment. Referring to FIG. 27A, FIG. 27B, FIG. 29 and FIG. 30A, it can be seen from FIG. 30A that when the scan signal SS1 is enabled, the third N-type transistor $N_3$ of the voltage supply unit 2603_1 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2603_1 are turned on, and the second N-type transistor $N_2$ is turned off. As a result, the voltage supply unit 2603_1 provides the stable voltage with the negative polarity VS1, i.e. VS−, for the compensation line CL of the odd pixel $P_{11}$ of the $1^{st}$ pixel row during a frame period FP.

Similarly, when the scan signal SS2 is enabled, the third N-type transistor $N_3$ of the voltage supply unit 2603_2 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2603_2 are turned on, and the second N-type transistor $N_2$ is turned off. As a result, the voltage supply unit 2603_2 provides the stable voltage with the negative polarity VS2, i.e. VS−, for the compensation line CL of the odd pixels $P_{21}$ of the $2^{nd}$ pixel row during the frame period FP.

Figure 30B:
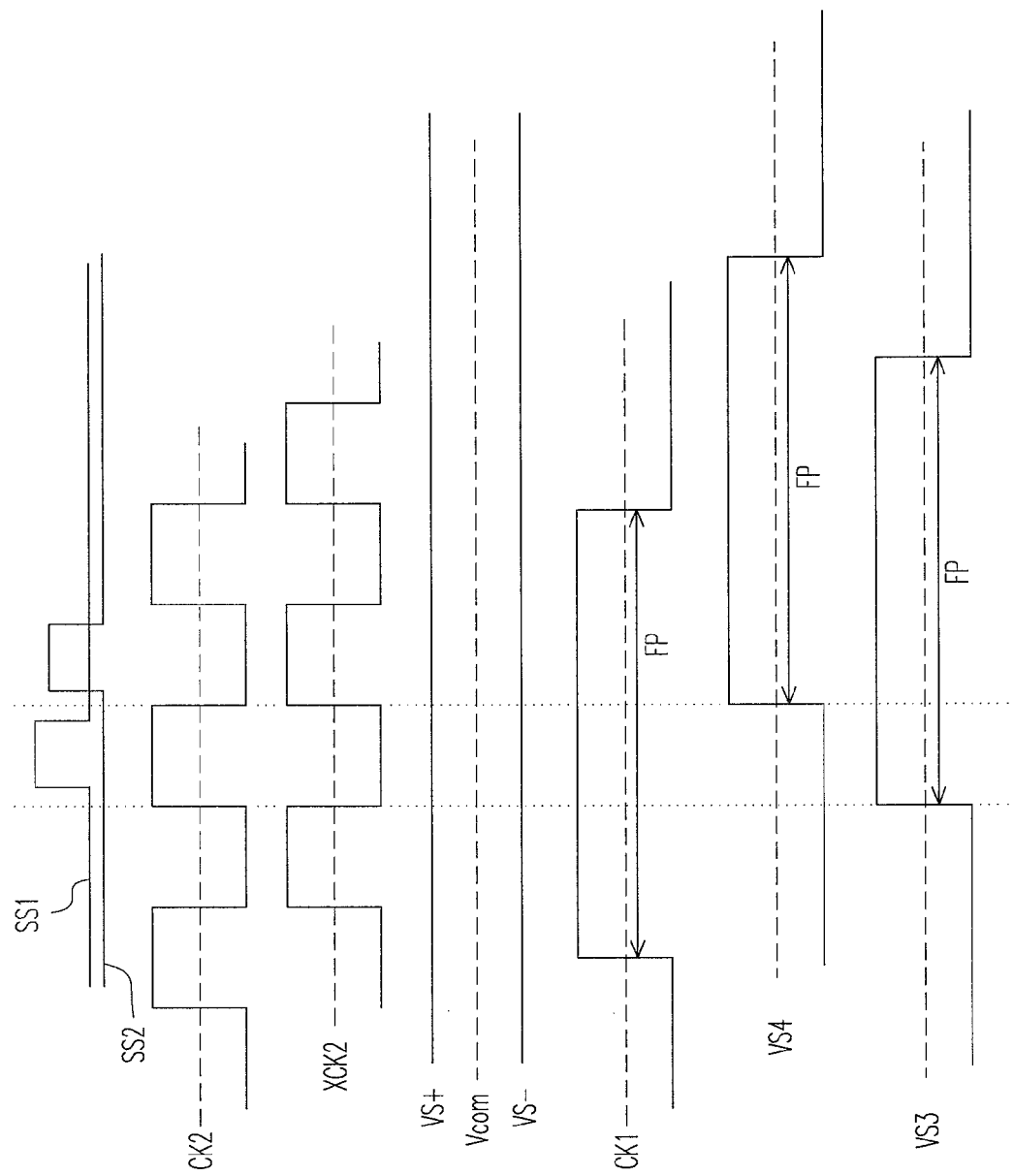

FIG. 30B is a timing diagram of the circuit operation of the voltage supply units 2605_1 and 2605_2 according to the twelfth exemplary embodiment. Referring to FIG. 27C, FIG. 27D, FIG. 29 and FIG. 30B, it can be seen from FIG. 30B that when the scan signal SS1 is enabled, the third N-type transistor $N_3$ of the voltage supply unit 2605_1 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2605_1 are turned on, and the second N-type transistor $N_2$ is turned off. As a result, the voltage supply unit 2605_1 provides the stable voltage with the positive polarity VS3, i.e. VS+, for the compensation line CL of the even pixels $P_{12}$ of the $1^{st}$ pixel row during the frame period FP.

Similarly, when the scan signal SS2 is enabled, the third N-type transistor $N_3$ of the voltage supply unit 2605_2 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2605_2 are turned on, and the second N-type transistor $N_2$ is turned off. As a result, the voltage supply unit 2605_2 provides the stable voltage VS4, i.e. VS+, for the compensation line CL of the even pixel $P_{22}$ of the $2^{nd}$ pixel row in the frame period.

Accordingly, the voltage supply device, composed of the first sub-voltage supply unit 2603 and the second sub-voltage supply unit 2605, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 2900 can be optimized simultaneously.

In addition, since the voltage supply device, composed of the first and the second sub-voltage supply devices 2603 and 2605, continuously and correspondingly provides/applies the stable voltages VS1~VS4 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total crosstalk of the single cell gap transflective LCD 2900 can be reduced below the set specifications of the shipment, for example below 2%, but the present invention is not limited thereto.

The Thirteenth Exemplary Embodiment

Figure 31:
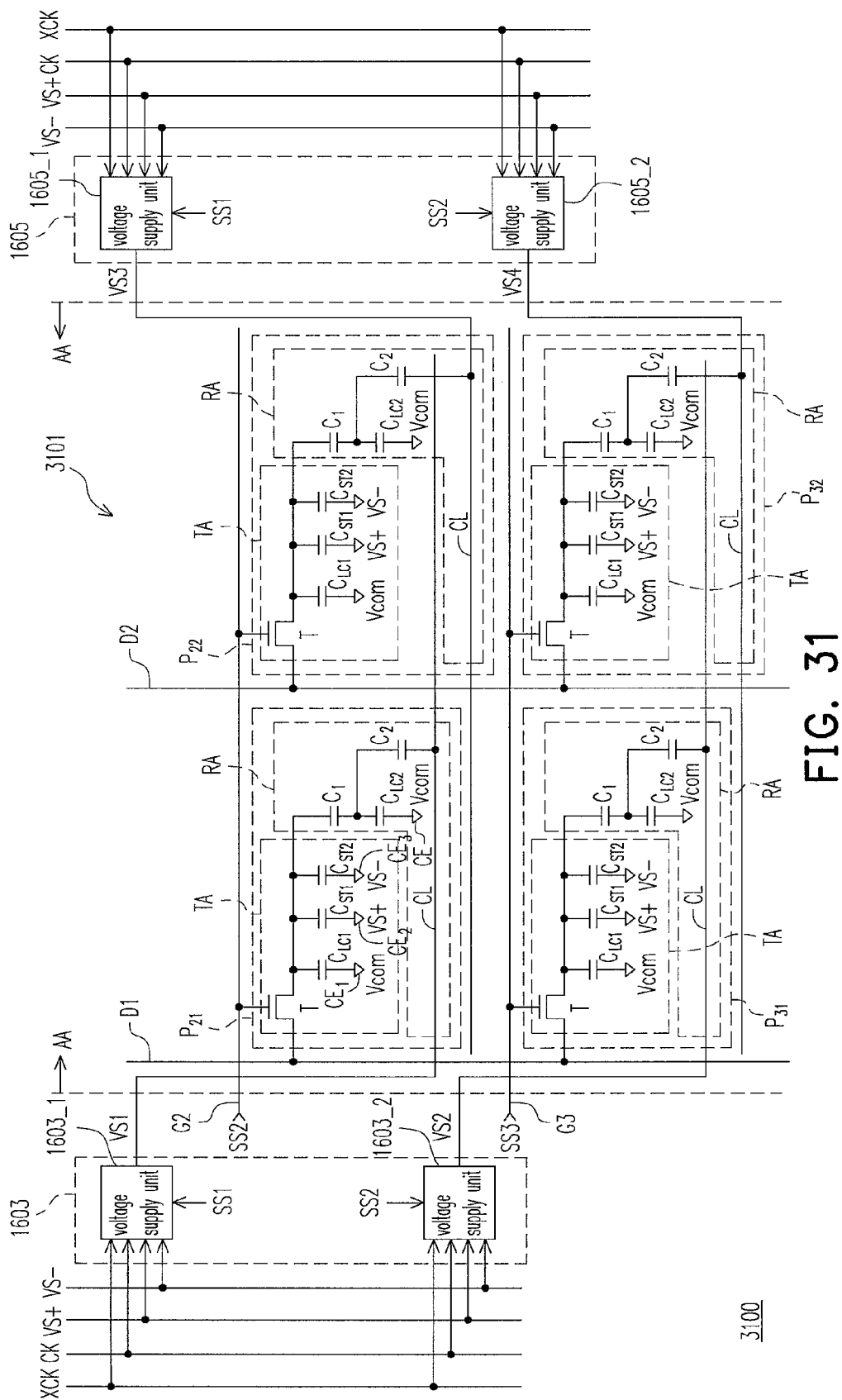
FIG. 31 is a diagram showing a partial single cell gap transflective LCD according to the thirteenth exemplary embodiment of the present invention.

FIG. 31 is a diagram showing a partial single cell gap transflective LCD 3100 according to the thirteenth exemplary embodiment of the present invention. Referring to FIG. 31, the single cell gap transflective LCD 3100 includes a display panel 3101 and a voltage supply device, wherein the voltage supply device includes a first and a second sub-voltage devices 1603 and 1605. Besides, the display panel 3101 is a single cell gap liquid crystal panel. Obviously, the single cell gap transflective LCD 3100 further includes other components, such as a gate driver, a source driver, a timing controller and a back light module. However, only components related to the present invention are sketched in the thirteenth exemplary embodiment for illustrating.

The display panel 3101 includes a plurality of scan lines G2 and G3 (only two scan lines are shown to simplify explanations), a plurality of data lines D1 and D2 substantially perpendicularly disposed to the scan lines G2 and G3 (only two data lines are shown to simplify explanations), and a plurality of pixels $P_{21}$, $P_{22}$, $P_{31}$ and $P_{32}$ located in a display area AA of the display panel 3101 (only four pixels are shown to simplify explanations).

The pixels $P_{21}$, $P_{22}$, $P_{31}$ and $P_{32}$ are respectively electrically connected with the corresponding data line and the corresponding scan line, and are arranged in an array. For example, the pixel $P_{21}$ is respectively electrically connected with the data line D1 and the scan line G2, the pixel $P_{22}$ is respectively electrically connected with the data line D2 and the scan line G2, the pixel $P_{31}$ is respectively electrically connected with the data line D1 and the scan line G3, and the pixel $P_{32}$ is respectively electrically connected with the data line D2 and the scan line G3. In addition, the pixel $P_{21}$ represents the $1^{st}$ pixel of the $2^{nd}$ pixel row of the display panel 3101, the pixel $P_{22}$ represents the $2^{nd}$ pixel of the $2^{nd}$ pixel row of the display panel 3101, the pixel $P_{31}$ represents the $1^{st}$ pixel of the $3^{rd}$ pixel row of the display panel 3101, and the pixel $P_{32}$ represents the $2^{nd}$ pixel of the $3^{rd}$ pixel row of the display panel 3101.

Each of the pixels $P_{21}$, $P_{22}$, $P_{31}$ and $P_{32}$ includes a common line $CE_2$, an auxiliary common line $CE_3$, and a compensation line CL. The common line $CE_2$ and the auxiliary common line $CE_3$, for example, are located in a transparent area TA of each of the pixels $P_{21}$, $P_{22}$, $P_{31}$ and $P_{32}$, so as to receive a stable voltage with a positive polarity VS+ and a stable voltage with a negative polarity VS−. However, it is not to be limited herein. The common line $CE_2$ and the auxiliary common line $CE_3$ can be designed to receive the common voltage Vcom as mentioned in the above embodiment according to a user requirement. The compensation line CL, for example, is located in a reflective area RA of each of the pixels $P_{21}$, $P_{22}$, $P_{31}$ and $P_{32}$, and the compensation line CL is used to correspondingly receive stable voltages VS1~VS4. Moreover, each of the pixels $P_{21}$, $P_{22}$, $P_{31}$ and $P_{32}$ further includes a pixel transistor T, a first liquid crystal capacitor $C_{LC1}$, a first storage capacitor $C_{ST1}$, a second storage capacitor $C_{ST1}$, a first capacitor $C_1$, a second liquid crystal capacitor $C_{LC2}$, and a second capacitor $C_2$. Since the all the pixels $P_{21}$, $P_{22}$, $P_{31}$ and $P_{32}$ are similar in structure and connection, only single pixel is used for description in the following.

Taking the pixel $P_{21}$, as an example, a gate of the pixel transistor T is coupled to the scan line G2, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the first storage capacitor $C_{ST1}$ is formed between the pixel electrode and common line $CE_2$, and the second storage capacitor $C_{ST2}$ is formed between the pixel electrode and auxiliary common line $CE_3$.

A first end of the first LC capacitor $C_{LC1}$ is coupled to the drain of the pixel transistor T and a second end of the first LC capacitor $C_{LC1}$ is coupled to the common electrode $CE_1$. A first end of the first storage capacitor $C_{ST1}$ is coupled to the drain of the pixel transistor T, and a second end of the first storage capacitor $C_{ST1}$ is coupled to the common line $CE_2$. A first end of the second storage capacitor $C_{ST2}$ is coupled to the drain of the pixel transistor T, and a second end of the second storage capacitor $C_{ST2}$ is coupled to the auxiliary common line $CE_3$. Besides, the pixel transistor T, the first liquid crystal capacitor $C_{LC1}$, the first storage capacitor $C_{ST1}$, and the second storage capacitor $C_{ST2}$ are located in the transparent area TA of the pixel $P_{21}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{21}$.

Since the structure of the voltage supply units 1603_1, 1603_2, 1605_1 and 1605_2 of the thirteenth exemplary embodiment are the same as that of the seventh exemplary embodiment, further descriptions are omitted herein.

In view of the above, the major difference between the thirteenth exemplary embodiment and the seventh exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 3101 of the thirteenth exemplary embodiment. Besides, a first end and a second of the storage capacitors $C_{ST1}$ and $C_{ST2}$ respectively receive a stable voltage with a positive polarity VS+ and a stable voltage with the positive polarity VS−. Otherwise, others are the same as that of the seventh exemplary embodiment. Hence, the detail operating principles of the thirteenth exemplary embodiment can be referred to the seventh exemplary embodiment, and further descriptions are omitted herein.

The Fourteenth Exemplary Embodiment

Figure 32:
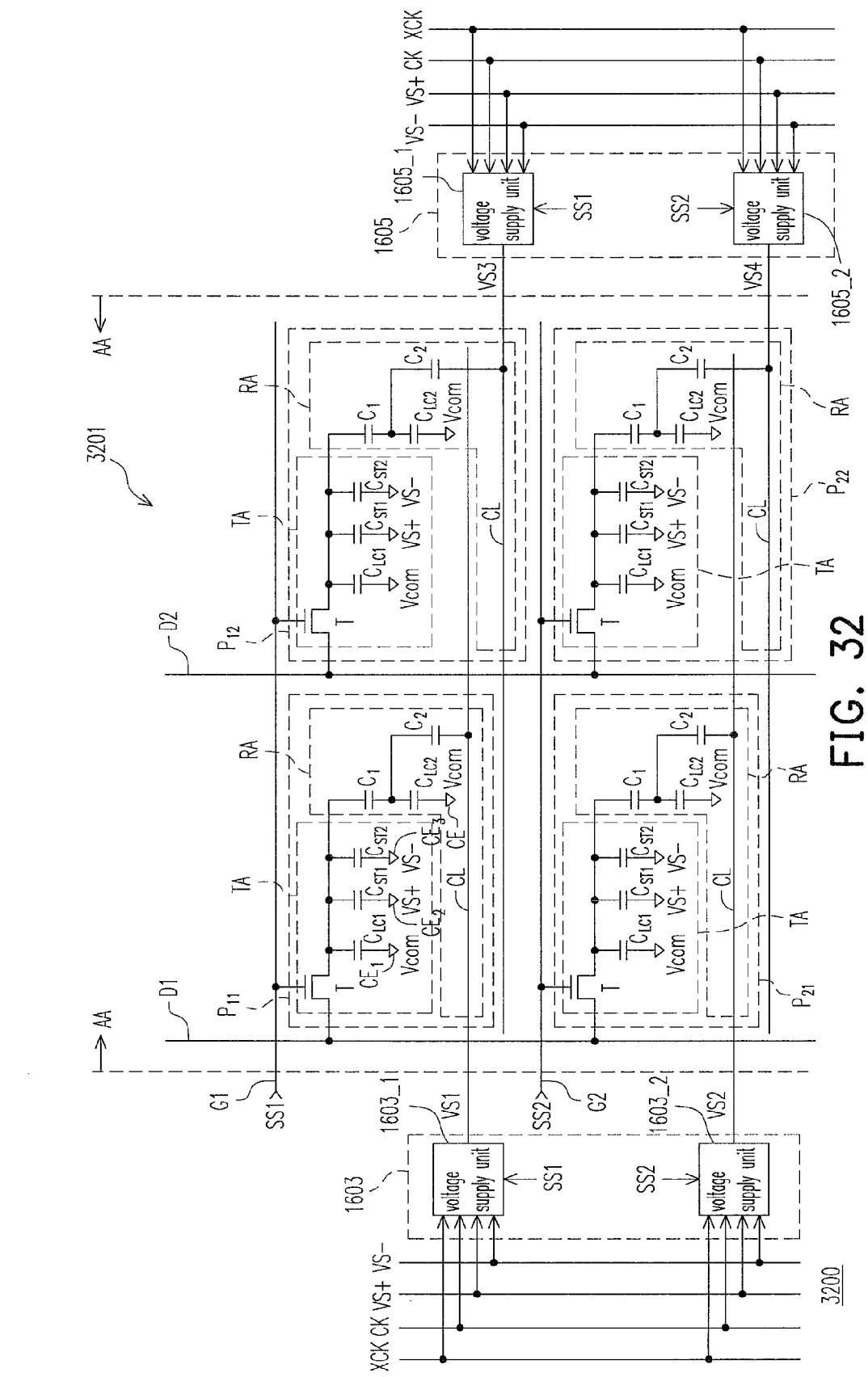
FIG. 32 is a diagram showing a partial single cell gap transflective LCD according to the fourteenth exemplary embodiment of the present invention.

FIG. 32 is a diagram showing a partial single cell gap transflective LCD 3200 according to the fourteenth exemplary embodiment of the present invention. Referring to FIG. 32, the single cell gap transflective LCD 3200 includes a display panel 3201 and a voltage supply device, wherein the voltage supply device includes a first and a second sub-voltage device 1603 and 1605. Besides, the display panel 3201 is a single cell gap liquid crystal panel. Obviously, the single cell gap transflective LCD 3200 further includes other components, such as a gate driver, a source driver, a timing controller and a back light module. However, only components related to the present invention are sketched in the fourteenth exemplary embodiment for illustrating.

The display panel 3201 includes a plurality of scan lines G1 and G2 (only two scan lines are shown to simplify explanations), a plurality of data lines D1 and D2 substantially perpendicularly disposed to the scan lines G1 and G2 (only two data lines are shown to simplify explanations), and a plurality of pixels $P_{11}$, $P_{12}$, $P_{21}$ and $P_{22}$ located in a display area AA of the display panel 3201 (only four pixels are shown to simplify explanations).

The pixels $P_{11}$, $P_{12}$, $P_{21}$ and $P_{22}$ are respectively electrically connected with the corresponding data line and the corresponding scan line, and are arranged in an array. For example, the pixel $P_{11}$ is respectively electrically connected with the data line D1 and the scan line G1, the pixel $P_{12}$ is respectively electrically connected with the data line D2 and the scan line G1, the pixel $P_{21}$ is respectively electrically connected with the data line D1 and the scan line G2, and the pixel $P_{22}$ is respectively electrically connected with the data line D2 and the scan line G2. In addition, the pixel $P_{11}$ represents the $1^{st}$ pixel of the $1^{st}$ pixel row of the display panel 3201, the pixel $P_{12}$ represents the $2^{nd}$ pixel of the $1^{st}$ pixel row of the display panel 3201, the pixel $P_{21}$ represents the $2^{nd}$ pixel of the $1^{st}$ pixel row of the display panel 3201, and the pixel $P_{22}$ represents the $2^{nd}$ pixel of the $2^{nd}$ pixel row of the display panel 3201.

Each of the pixels $P_{11}$, $P_{12}$, $P_{21}$ and $P_{22}$ includes a common line $CE_2$, an auxiliary common line $CE_3$ and a compensation line CL. The common line $CE_2$ and the auxiliary common line $CE_3$, for example, are located in a transparent area TA of each of the pixels $P_{11}$, $P_{12}$, $P_{21}$ and $P_{22}$, so as to receive a stable voltage with a positive polarity VS+ and a stable voltage with a negative polarity VS−. The common line $CE_2$ and the auxiliary common line $CE_3$ of each of the pixels $P_{11}$, $P_{12}$, $P_{21}$ and $P_{22}$ transmit the stable voltage with the positive polarity VS+ and the stable voltage with a negative polarity VS−. The compensation line CL, for example, is located in a reflective area RA of each of the pixels $P_{11}$, $P_{12}$, $P_{21}$ and $P_{22}$, and the compensation line CL is used to correspondingly receive stable voltages VS1~VS4. Moreover, each of the pixels $P_{11}$, $P_{12}$, $P_{21}$ and $P_{22}$ further includes a pixel transistor T, a first liquid crystal capacitor $C_{LC1}$, a first storage capacitor $C_{ST1}$, a second storage capacitor $C_{ST2}$, a first capacitor $C_1$, a second liquid crystal capacitor $C_{LC2}$, and a second capacitor $C_2$. Since the all the pixels $P_{11}$, $P_{12}$, $P_{21}$ and $P_{22}$ are similar in structure and in connection, only single pixel is used for description in the following.

Taking the pixel $P_{11}$ as an example, a gate of the pixel transistor T is coupled to the scan line G1, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the first storage capacitor $C_{ST1}$ is formed between the pixel electrode and common line $CE_2$, and the second storage capacitor $C_{ST2}$ is formed between the pixel electrode and the auxiliary common line $CE_3$.

A first end of the first LC capacitor $C_{LC1}$ is coupled to the drain of the pixel transistor T and a second end of the first LC capacitor $C_{LC1}$ is coupled to the common electrode CE. A first end of the first storage capacitor $C_{ST1}$ is coupled to the drain of the pixel transistor T, and a second end of the first storage capacitor $C_{ST1}$ is coupled to the common line $CE_2$. A first end of the second storage capacitor $C_{ST2}$ is coupled to the drain of the pixel transistor T, and a second end of the second storage capacitor $C_{ST2}$ is coupled to the auxiliary common line $CE_3$. Besides, the pixel transistor T, the first liquid crystal capacitor $C_{LC1}$, the first storage capacitor $C_{ST1}$, and the second storage capacitor $C_{ST2}$ are located in the transparent area TA of the pixel $P_{11}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{11}$.

Since the structure of the voltage supply units 1603_1, 1603_2, 1605_1 and 1605_2 of the fourteenth exemplary embodiment are the same as that of the seventh exemplary embodiment, further descriptions are omitted herein.

In view of the above, the major difference between the fourteenth exemplary embodiment and the eighth exemplary embodiment is that there are two storage capacitors $C_{ST1}$ and $C_{ST2}$ in the transparent area TA of each of the pixels $P_{11}$, $P_{12}$, $P_{21}$ and $P_{22}$ of the display panel 3201 of the fourteenth exemplary embodiment. Besides, a first end and a second of the storage capacitors $C_{ST1}$ and $C_{ST2}$ respectively receive a stable voltage with a positive polarity VS+ and a stable voltage with the positive polarity VS−. Otherwise, others are the same as that of the eighth exemplary embodiment. Hence, the detail operating principles of the fourteenth exemplary embodiment can be referred to both the seventh and the eighth exemplary embodiments, and further descriptions are omitted herein.

The Fifteenth Exemplary Embodiment

Figure 33:
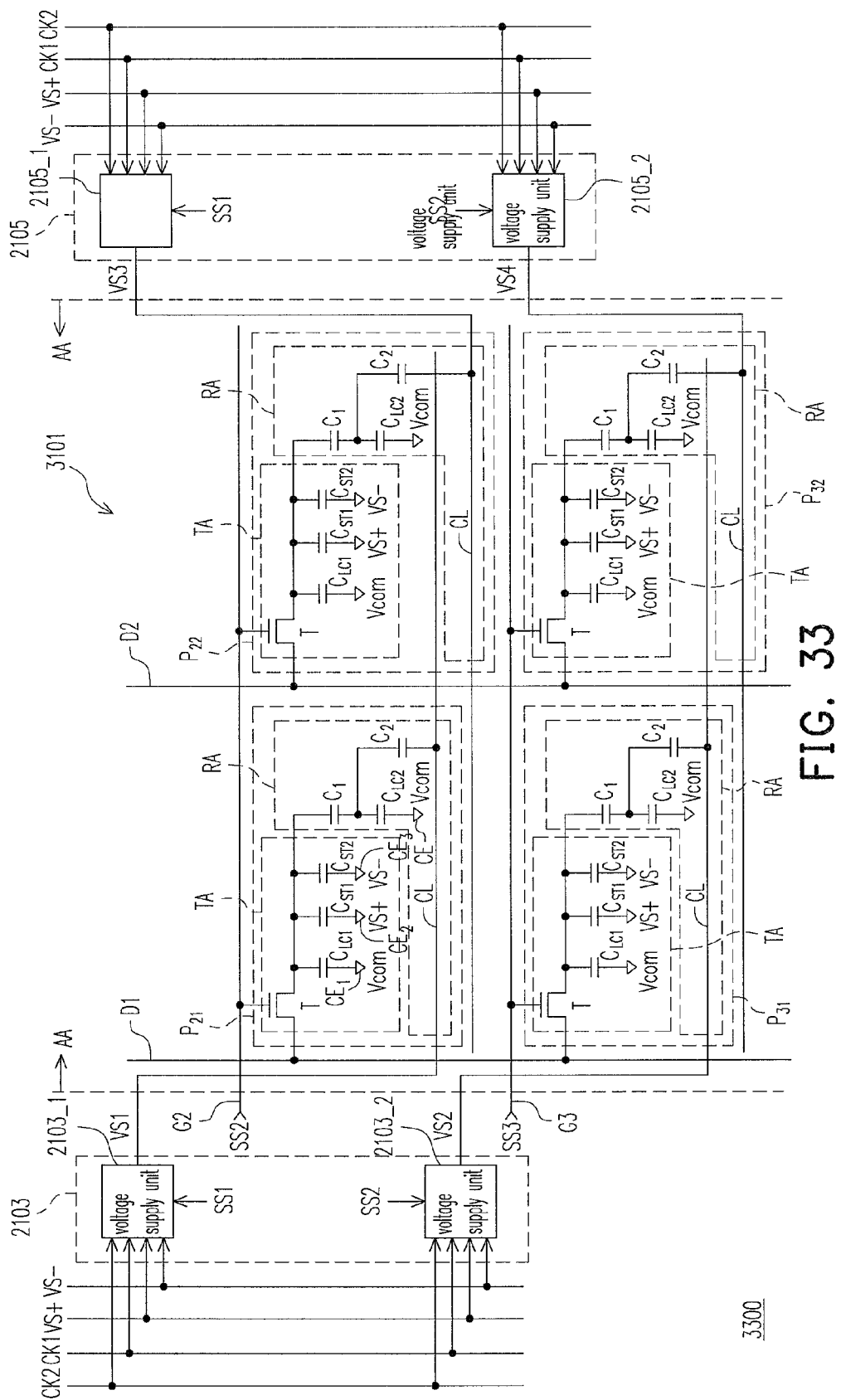
FIG. 33 is a diagram showing a partial single cell gap transflective LCD according to the fifth exemplary embodiment of the present invention.

FIG. 33 is a diagram showing a partial single cell gap transflective LCD 3300 according to the fifteenth exemplary embodiment of the present invention. Referring to FIG. 33, the single cell gap transflective LCD 3300 includes a display panel 3101 and a voltage supply device, wherein the voltage supply device includes a first and a second sub-voltage device 2103 and 2105. Besides, the display panel 3101 is a single cell gap liquid crystal panel. Obviously, the single cell gap transflective LCD 3300 further includes other components, such as a gate driver, a source driver, a timing controller and a back light module. However, only components related to the present invention are sketched in the fifteenth exemplary embodiment for illustrating.

Since the structure of the display panel 3101 of the fifteenth exemplary embodiment is the same as that of the thirteenth exemplary embodiment, further descriptions are omitted herein. Since the structure of the voltage supply units 2103_1, 2103_2, 2105_1 and 2105_2 of the fifteenth exemplary embodiment are the same as that of the ninth exemplary embodiment, further descriptions are omitted herein.

In view of the above, the major difference between the fifteenth exemplary embodiment and the ninth exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 3101 of the fifteenth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the ninth exemplary embodiment. Hence, the detail operating principles of the fifteenth exemplary embodiment can be referred to the ninth exemplary embodiment, and further descriptions are omitted herein.

The Sixteenth Exemplary Embodiment

Figure 34:
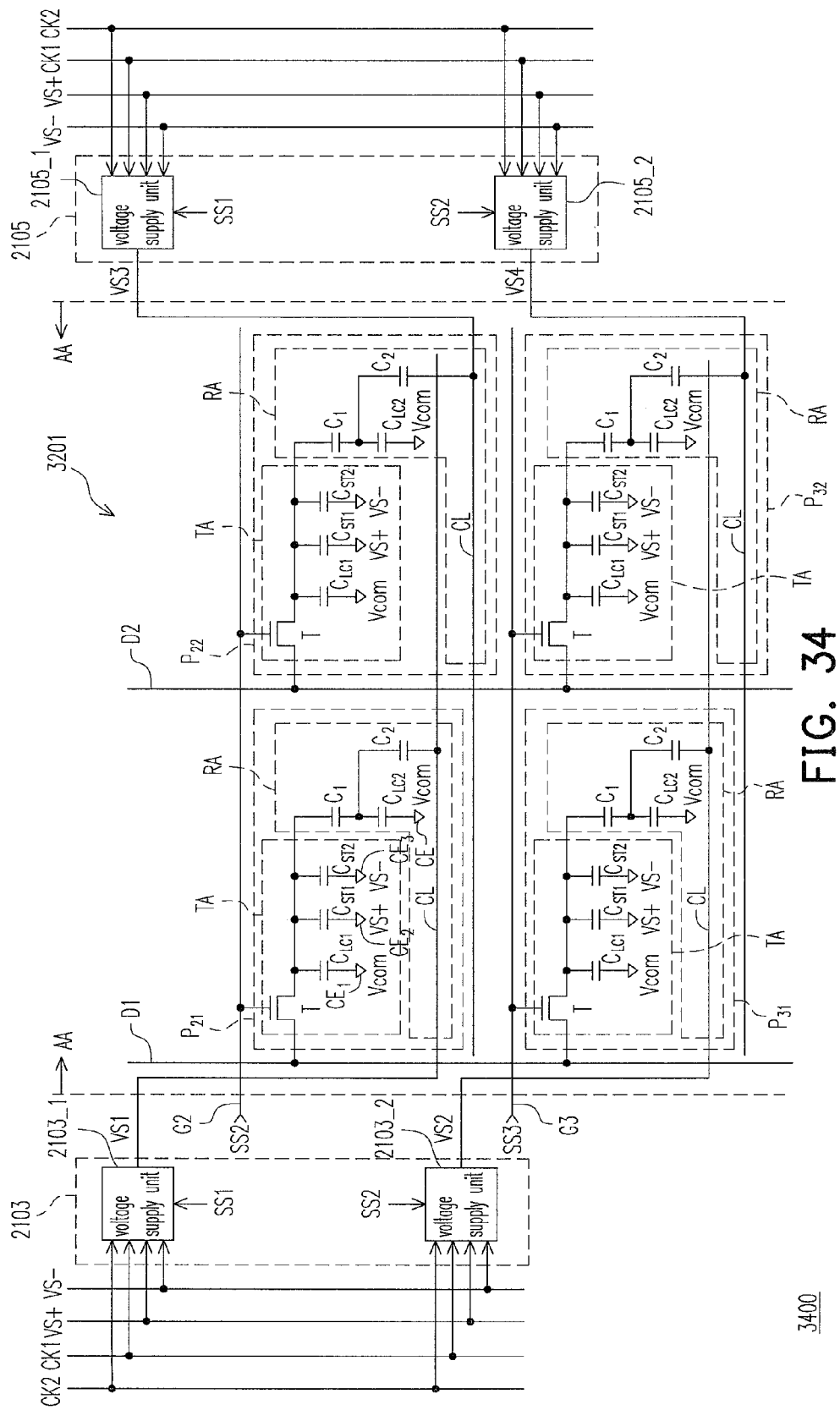
FIG. 34 is a diagram showing a partial single cell gap transflective LCD according to the sixteenth exemplary embodiment of the present invention.

FIG. 34 is a diagram showing a partial single cell gap transflective LCD 3400 according to the sixteenth exemplary embodiment of the present invention. Referring to FIG. 34, the single cell gap transflective LCD 3400 includes a display panel 3201 and a voltage supply device, wherein the voltage supply device includes a first and a second sub-voltage device 2103 and 2105. Besides, the display panel 3201 is a single cell gap liquid crystal panel. Obviously, the single cell gap transflective LCD 3400 further includes other components, such as a gate driver, a source driver, a timing controller and a back light module. However, only components related to the present invention are sketched in the sixteenth exemplary embodiment for illustrating.

Since the structure of the display panel 3201 of the sixteenth exemplary embodiment is the same as that of the fourteenth exemplary embodiment, further descriptions are omitted herein. Since the structure of the voltage supply units 2103_1, 2103_2, 2105_1 and 2105_2 of the sixteenth exemplary embodiment are the same as that of the ninth exemplary embodiment, further descriptions are omitted herein.

In view of the above, the major difference between the sixteenth exemplary embodiment and the tenth exemplary embodiment is that there are two storage capacitors $C_{ST1}$ and $C_{ST2}$ in the transparent area TA of each of the pixels $P_{11}$, $P_{12}$, $P_{21}$ and $P_{22}$ of the display panel 3201 of the sixteenth exemplary embodiment. Besides, a second of the storage capacitors $C_{ST1}$ and $C_{ST2}$ respectively receives a stable voltage with a positive polarity VS+ and a stable voltage with the positive polarity VS−. Otherwise, others are the same as that of the tenth exemplary embodiment. Hence, the detail operating principles of the sixteenth exemplary embodiment can be referred to both the ninth and the tenth exemplary embodiments, and further descriptions are omitted herein.

The Seventeenth Exemplary Embodiment

Figure 35:
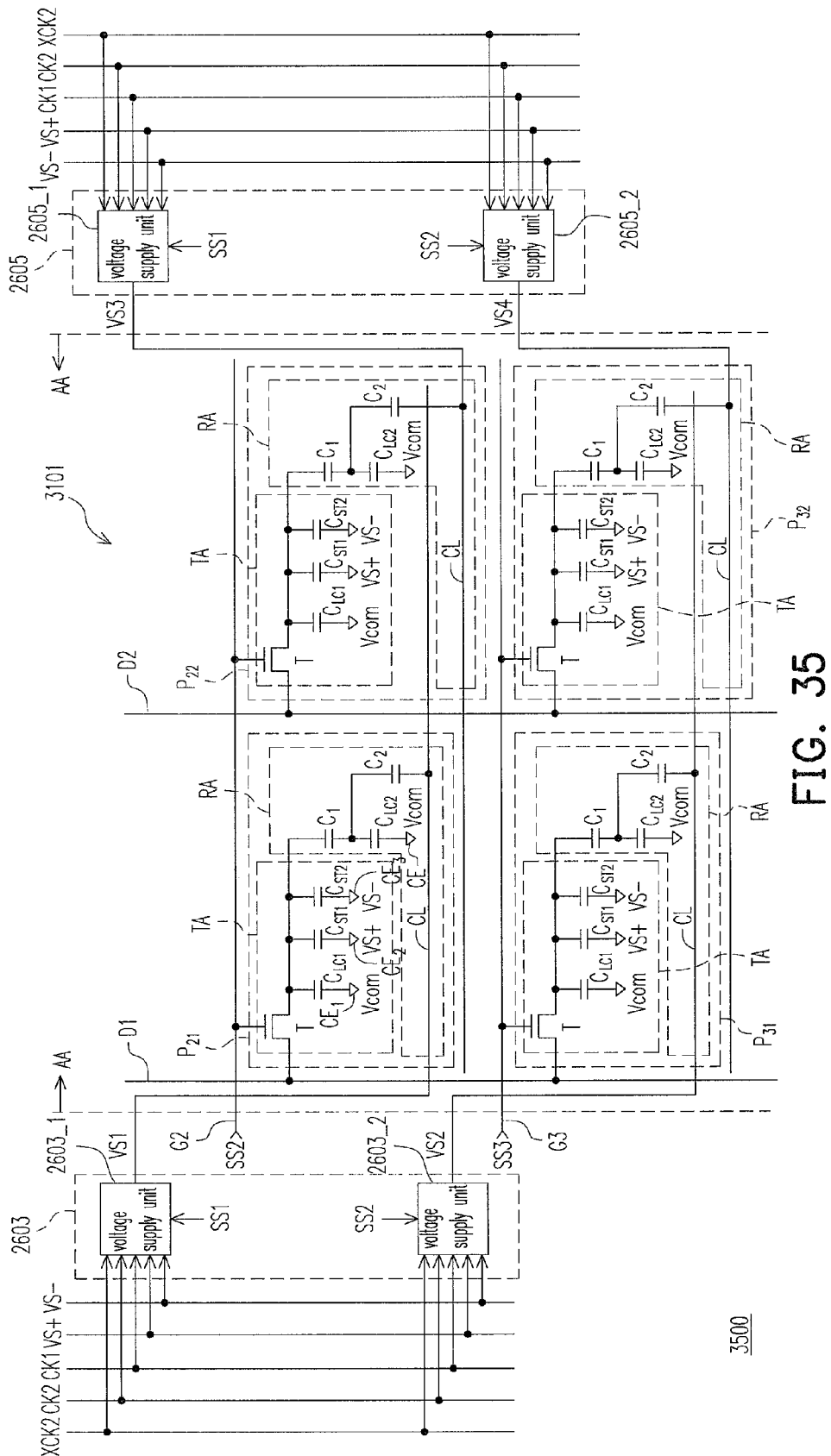
FIG. 35 is a diagram showing a partial single cell gap transflective LCD according to the seventeenth exemplary embodiment of the present invention.

FIG. 35 is a diagram showing a partial single cell gap transflective LCD 3500 according to the seventeenth exemplary embodiment of the present invention. Referring to FIG. 35, the single cell gap transflective LCD 3500 includes a display panel 3101 and a voltage supply device, wherein the voltage supply device includes a first and a second sub-voltage device 2603 and 2605. Besides, the display panel 3101 is a single cell gap liquid crystal panel. Obviously, the single cell gap transflective LCD 3500 further includes other components, such as a gate driver, a source driver, a timing controller and a back light module. However, only components related to the present invention are sketched in the seventeenth exemplary embodiment for illustrating.

Since the structure of the display panel 3101 of the seventeenth exemplary embodiment is the same as that of the thirteenth exemplary embodiment, further descriptions are omitted herein. Since the structure of the voltage supply units 2603_1, 2603_2, 2605_1 and 2605_2 of the seventeenth exemplary embodiment are the same as that of the eleventh exemplary embodiment, further descriptions are omitted herein.

In view of the above, the major difference between the seventeenth exemplary embodiment and the eleventh exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 3101 for the seventeenth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the eleventh exemplary embodiment. Hence, the detail operating principles of the seventeenth exemplary embodiment can be referred to the eleventh exemplary embodiment, and further descriptions are omitted herein.

The Eighteenth Exemplary Embodiment

Figure 36:
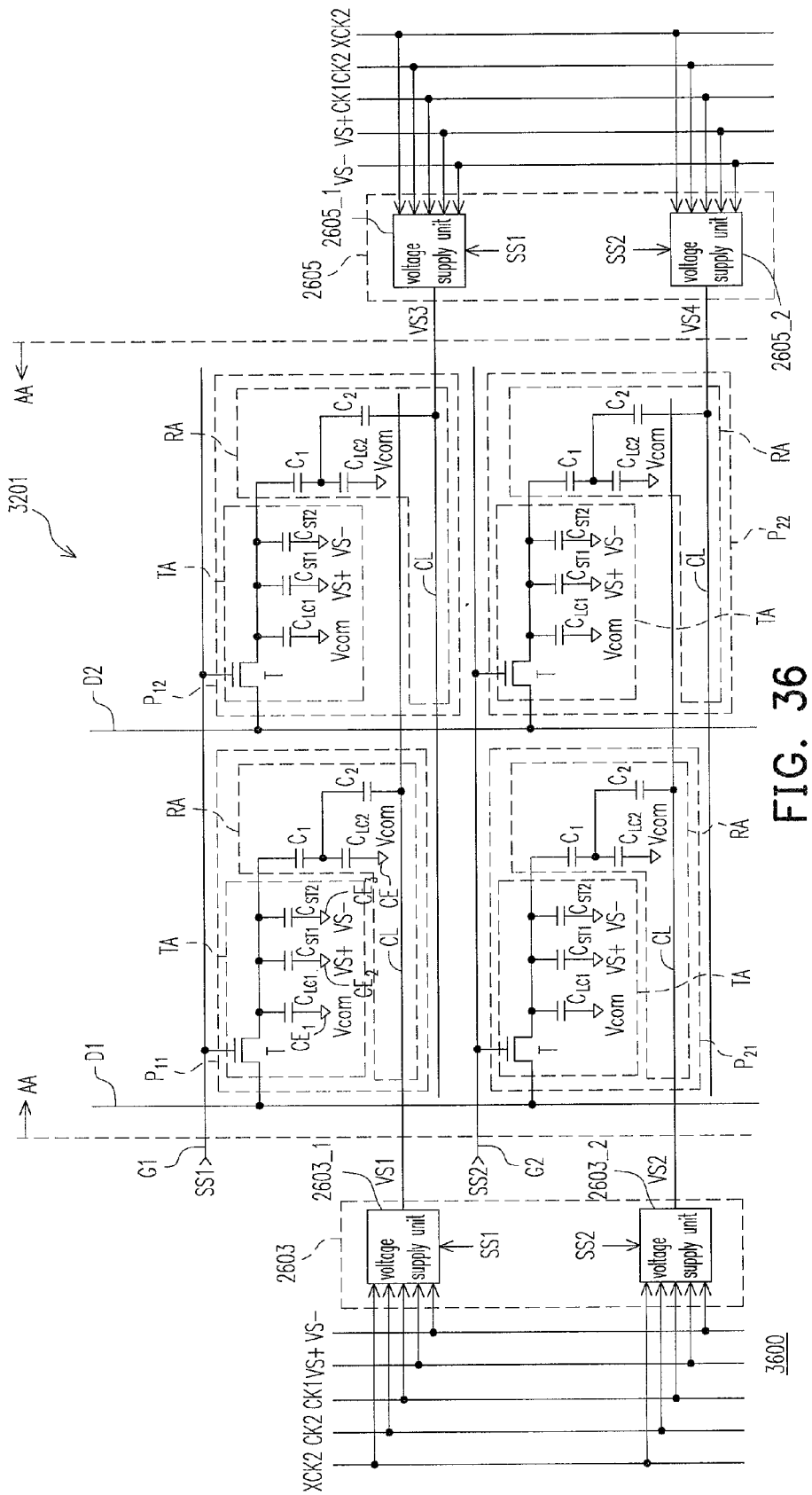
FIG. 36 is a diagram showing a partial single cell gap transflective LCD according to the eighteenth exemplary embodiment of the present invention.

FIG. 36 is a diagram showing a partial single cell gap transflective LCD 3600 according to the eighteenth exemplary embodiment of the present invention. Referring to FIG. 36, the single cell gap transflective LCD 3600 includes a display panel 3201 and a voltage supply device, wherein the voltage supply device includes a first and a second sub-voltage device 2603 and 2605. Besides, the display panel 3201 is a single cell gap liquid crystal panel. Obviously, the single cell gap transflective LCD 3600 further includes other components, such as a gate driver, a source driver, a timing controller and a back light module. However, only components related to the present invention are sketched in the eighteenth exemplary embodiment for illustrating.

Since the structure of the display panel 3201 of the eighteenth exemplary embodiment is the same as that of the fourteenth exemplary embodiment, further descriptions are omitted herein. Since the structure of the voltage supply units 2603_1, 2603_2, 2605_1 and 2605_2 of the eighteenth exemplary embodiment are the same as that of the eleventh exemplary embodiment, further descriptions are omitted herein.

In view of the above, the major difference between the eighteenth exemplary embodiment and the twelfth exemplary embodiment is that there are two storage capacitors $C_{ST1}$ and $C_{ST2}$ in the transparent area TA of each of the pixels $P_{11}$, $P_{12}$, $P_{21}$ and $P_{22}$ of the display panel 3201 of the eighteenth exemplary embodiment. Besides, a second of the storage capacitors $C_{ST1}$ and $C_{ST2}$ respectively receives a stable voltage with a positive polarity VS+ and a stable voltage with the positive polarity VS−. Otherwise, others are the same as that of the twelfth exemplary embodiment. Hence, the detail operating principles of the eighteenth exemplary embodiment can be referred to both the eleventh and the twelfth exemplary embodiments, and further descriptions are omitted herein.

The Nineteenth Exemplary Embodiment

Figure 37:
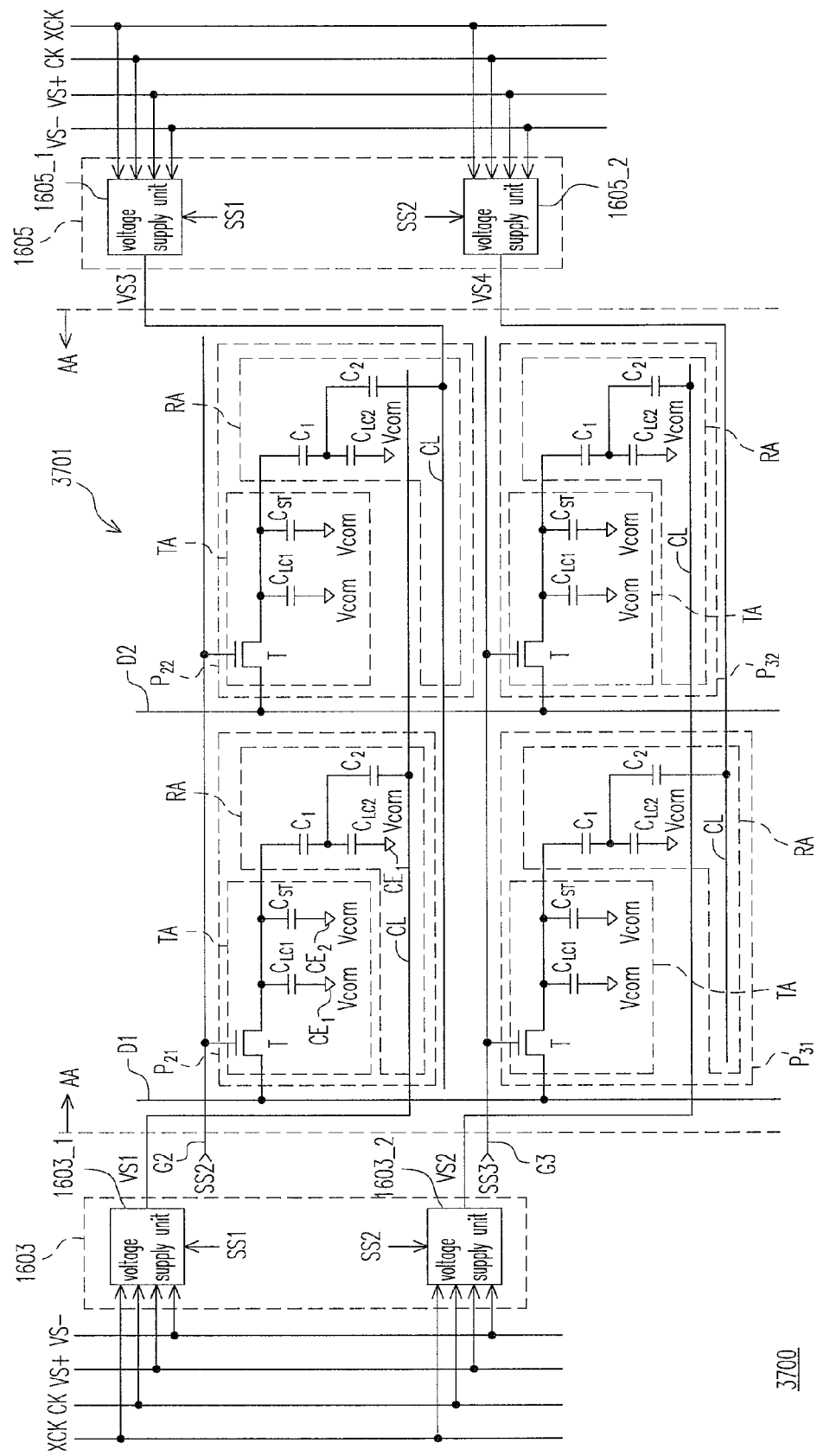
FIG. 37 is a diagram showing a partial single cell gap transflective LCD according to the nineteenth exemplary embodiment of the present invention.

FIG. 37 is a diagram showing a partial single cell gap transflective LCD 3700 according to the nineteenth exemplary embodiment of the present invention. Referring to FIG. 37, the single cell gap transflective LCD 3700 includes a display panel 3701 and a voltage supply device, wherein the voltage supply device includes a first and a second sub-voltage device 1603 and 1605. Besides, the display panel 3701 is a single cell gap liquid crystal panel. Obviously, the single cell gap transflective LCD 3700 further includes other components, such as a gate driver, a source driver, a timing controller and a back light module. However, only components related to the present invention are sketched in the nineteenth exemplary embodiment for illustrating.

The display panel 3701 includes a plurality of scan lines G2 and G3 (only two scan lines are shown to simplify explanations), a plurality of data lines D1 and D2 substantially perpendicularly disposed to the scan lines G2 and G3 (only two data lines are shown to simplify explanations), and a plurality of pixels $P_{21}$, $P_{22}$, $P_{31}$ and $P_{32}$ located in a display area AA of the display panel 3701 (only four pixels are shown to simplify explanations).

The pixels $P_{21}$, $P_{22}$, $P_{31}$ and $P_{32}$ are respectively electrically connected with the corresponding data line and the corresponding scan line, and are arranged in an array. For example, the pixel $P_{21}$ is respectively electrically connected with the data line D1 and the scan line G2, the pixel $P_{22}$ is respectively electrically connected with the data line D2 and the scan line G2, the pixel $P_{31}$ is respectively electrically connected with the data line D1 and the scan line G3, and the pixel $P_{32}$ is respectively electrically connected with the data line D2 and the scan line G3. In addition, the pixel $P_{21}$ represents the $1^{st}$ pixel of the $2^{nd}$ pixel row of the display panel 3701, the pixel $P_{22}$ represents the $2^{nd}$ pixel of the $2^{nd}$ pixel row of the display panel 3701, the pixel $P_{31}$ represents the $1^{st}$ pixel of the $3^{rd}$ pixel row of the display panel 3701, and the pixel $P_{32}$ represents the $2^{nd}$ pixel of the $3^{rd}$ pixel row of the display panel 3701.

Each of the pixels $P_{21}$, $P_{22}$, $P_{31}$ and $P_{32}$ includes a common line $CE_2$ and a compensation line CL. The common line $CE_2$, for example, is located in a transparent area TA of each of the pixels $P_{21}$, $P_{22}$, $P_{31}$ and $P_{32}$, so as to receive a common voltage Vcom. The compensation line CL, for example, is located in a reflective area RA of each of the pixels $P_{21}$, $P_{22}$, $P_{31}$ and $P_{32}$, and the compensation line CL is used to correspondingly receive stable voltages VS1~VS4. Moreover, each of the pixels $P_{21}$, $P_{22}$, $P_{31}$ and $P_{32}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{21}$, $P_{22}$, $P_{31}$ and $P_{32}$ are similar in structure and connection, only single pixel is used for description in the following.

Taking the pixel $P_{21}$ as an example, a gate of the pixel transistor T is coupled to the scan line G2, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and common line $CE_2$.

A first end of the first LC capacitor $C_{LC1}$ is coupled to the drain of the pixel transistor T and a second end of the first LC capacitor $C_{LC1}$ is coupled to the common electrode $CE_1$. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{21}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{21}$.

In the nineteenth exemplary embodiment, the first sub-voltage supply device 1603 is coupled to the compensation line CL of the odd pixel $P_{21}$ of the $2^{nd}$ pixel row and the compensation line CL of the even pixel $P_{32}$ of the $3^{rd}$ pixel row, so as to continuously and correspondingly provide the stable voltages VS1 and VS2 for the compensation lines CL of the pixels $P_{21}$ and $P_{31}$. Besides, the second sub-voltage supply device 1605 is coupled to the compensation line CL of the even pixel $P_{22}$ of the $2^{nd}$ pixel row and the compensation line CL of the odd pixel $P_{31}$ of the $3^{rd}$ pixel row, so as to continuously and correspondingly provide the stable voltages VS3 and VS4 for the compensation lines CL of the pixels $P_{22}$ and $P_{31}$.

Specifically, the first sub-voltage supply device 1603 has a plurality of voltage supply units 1603_1 and 1603_2. When driving the display panel 3701 in a dot inversion driving method, the $1^{st}$ voltage supply unit 1603_1 provides a stable voltage, for example, a stable voltage with a positive polarity VS1, i.e. VS+, for the compensation line CL of the odd pixel $P_{21}$ of the $2^{nd}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply unit 1603_2 provides a stable voltage, for example, a stable voltage with a positive polarity VS2, i.e. VS+, for the compensation line CL of the even pixel $P_{32}$ of the $3^{rd}$ pixel row according to a $2^{nd}$ scan signal SS2, and the first and the second clock signal CK and XCK, wherein there is a 180 degrees phase difference between the first clock signal CK and the second clock signal XCK. Besides, duty cycles of the first and the second clock signals CK and XCK are substantially a frame period of the single cell gap transflective LCD 3700.

In addition, the second sub-voltage supply device 1605 has a plurality of voltage supply units 1605_1 and 1605_2. When driving the display panel 3701 in the column inversion driving method, the $1^{st}$ voltage supply unit 1605_1 provides a stable voltage, for example, a stable voltage with a negative polarity VS3, i.e. VS−, for the compensation line CL of the even pixel $P_{22}$ of the $2^{nd}$ pixel row according to the $1^{st}$ scan signal SS1, generally generated by the gate driver, and the first and the second clock signal CK and XCK, wherein there is a 180 degrees phase difference between the first clock signal CK and the second clock signal XCK. Besides, the $2^{nd}$ voltage supply unit 1605_2 provides a stable voltage, for example, a stable voltage with a negative polarity VS4, i.e. VS−, for the compensation line CL of the odd pixel $P_{31}$ of the $3^{rd}$ pixel row according to a $2^{nd}$ scan signal SS2, and the first and the second clock signal CK and XCK, wherein there is a 180 degrees phase difference between the first clock signal CK and the second clock signal XCK.

Since the structure of the voltage supply units 1603_1, 1603_2, 1605_1 and 1605_2 of the nineteenth exemplary embodiment are the same as that of the seventh exemplary embodiment, further descriptions are omitted herein.

Figure 38A:
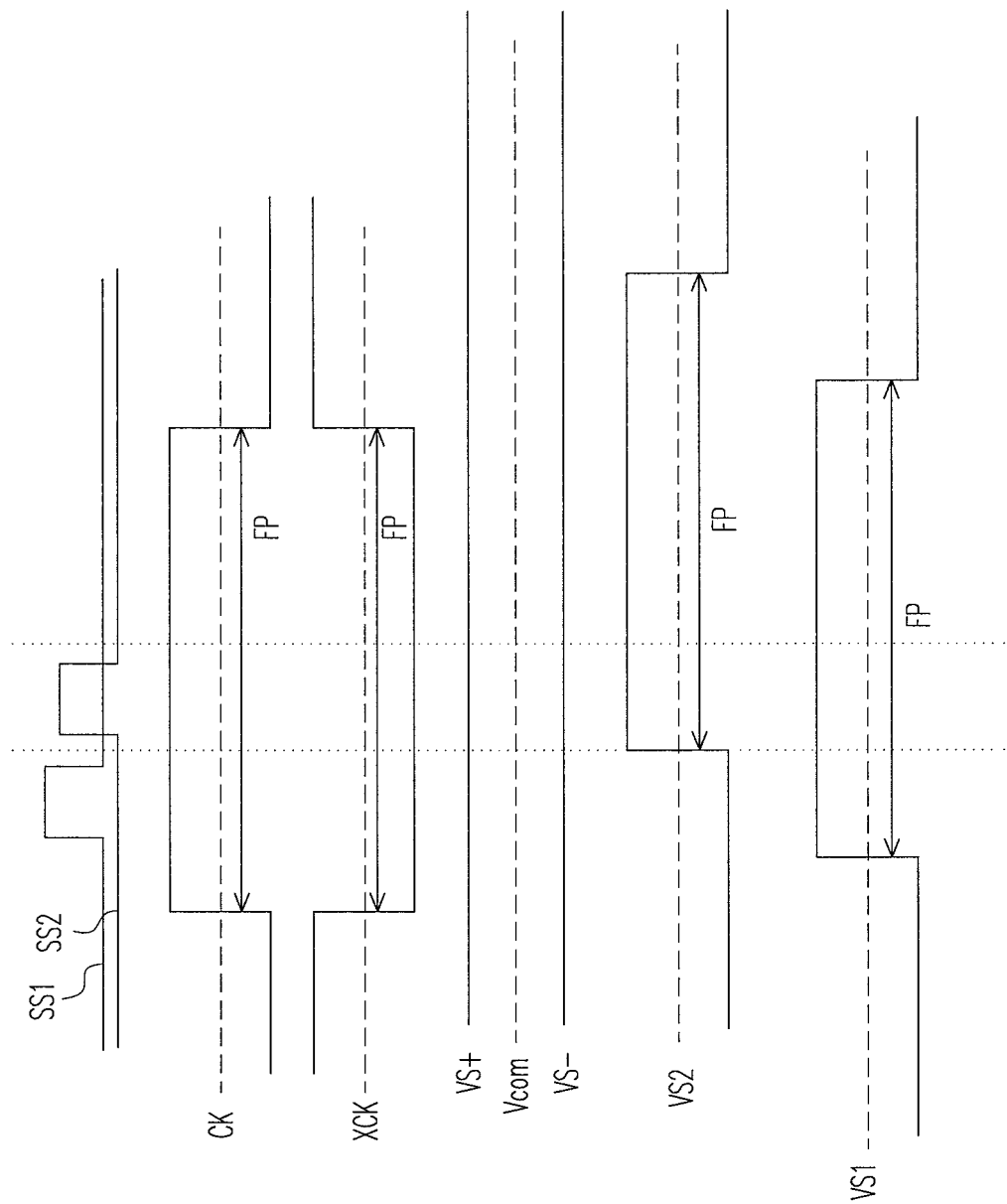
FIGS. 38A and 38B are respectively timing diagrams of the circuit operation of the voltage supply unit according to the nineteenth exemplary embodiment.

FIG. 38A is a timing diagram of the circuit operation of the voltage supply units 1603_1 and 1603_2 according to the nineteenth exemplary embodiment. Referring to FIG. 17A, FIG. 17B, FIG. 37 and FIG. 38A, it can be seen from FIG. 38A that when the scan signal SS1 is enabled, the first N-type transistor $N_1$ and the third N-type transistor $N_3$ of the voltage supply unit 1603_1 are turned on. Since the first clock signal CK is enabled and the second clock signal XCK is disabled, the second N-type transistor $N_2$ of the voltage supply unit 1603_1 is turned on, and the fourth N-type transistor $N_4$ is turned off. As a result, the voltage supply unit 1603_1 provides the stable voltage with the positive polarity VS1, i.e. VS+, for the compensation line CL of the odd pixel $P_{21}$ of the $2^{nd}$ pixel row during a frame period FP.

Similarly, when the scan signal SS2 is enabled, the first N-type transistor $N_1$ and the third N-type transistor $N_3$ of the voltage supply unit 1603_2 are turned on. Since the first clock signal CK is still enabled and the second clock signal XCK is still disabled, the second N-type transistor $N_2$ of the voltage supply unit 1603_2 is turned on, and the fourth N-type transistor $N_4$ is turned off. As a result, the voltage supply unit 1603_2 provides the stable voltage with the positive polarity VS2, i.e. VS+, for the compensation line CL of the even pixel $P_{32}$ of the $3^{rd}$ pixel row during the frame period FP.

Figure 38B:
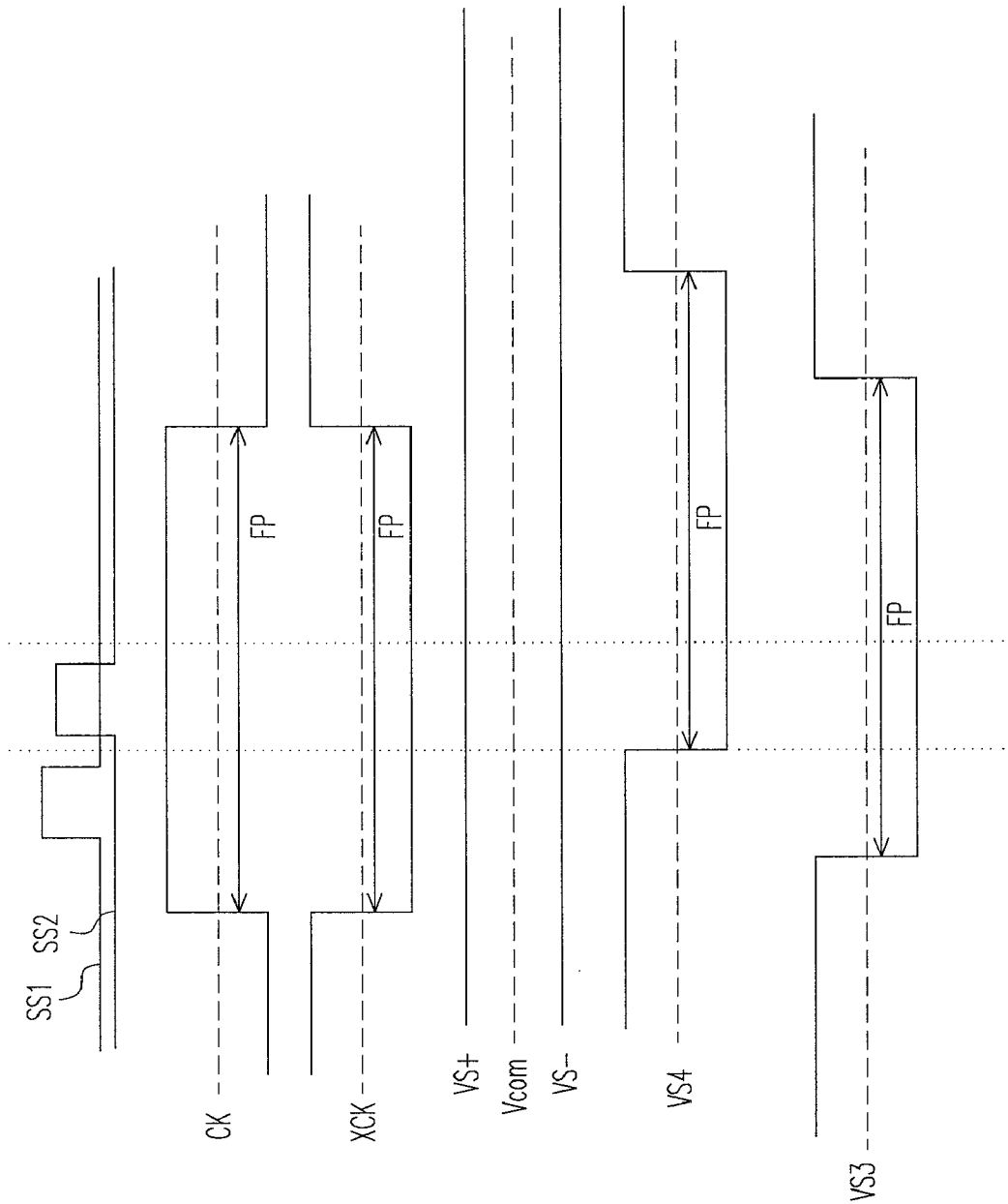

FIG. 38B is a timing diagram of the circuit operation of the voltage supply unit 1605_1 and 1605_2 according to the nineteenth exemplary embodiment. Referring to FIG. 17C, FIG. 17D, FIG. 37 and FIG. 38B, it can be seen from FIG. 38B that when the scan signal SS1 is enabled, the first N-type transistor $N_1$ and the third N-type transistor $N_3$ of the voltage supply unit 1605_1 are turned on. Since the first clock signal CK is enabled and the second clock signal XCK is disabled, the second N-type transistor $N_2$ of the voltage supply unit 1605_1 is turned on, and the fourth N-type transistor $N_4$ is turned off. As a result, the voltage supply unit 1605_1 provides the stable voltage with the negative polarity VS3, i.e. VS−, for the compensation line CL of the even pixels $P_{22}$ of the $2^{nd}$ pixel row during the frame period FP.

Similarly, when the scan signal SS2 is enabled, the first N-type transistor $N_1$ and the third N-type transistor $N_3$ of the voltage supply unit 1605_2 are turned on. Since the first clock signal CK is still enabled and the second clock signal XCK is still disabled, the second N-type transistor $N_2$ of the voltage supply unit 1605_2 is turned on, and the fourth N-type transistor $N_4$ is turned off. As a result, the voltage supply unit 1605_2 provides the stable voltage with the negative polarity VS4, i.e. VS−, for the compensation line CL of the odd pixel $P_{31}$ of the $3^{rd}$ pixel row during the frame period FP.

Accordingly, the voltage supply device, composed of the first sub-voltage supply unit 1603 and the second sub-voltage supply unit 1605, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 3700 can be optimized simultaneously.

In addition, since the voltage supply device, composed of the first and the second sub-voltage supply devices 1603 and 1605, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 3700 can be reduced below the set specifications of the shipment, for example below 2%, but the present invention is not limited thereto.

The Twentieth Exemplary Embodiment

Figure 39:
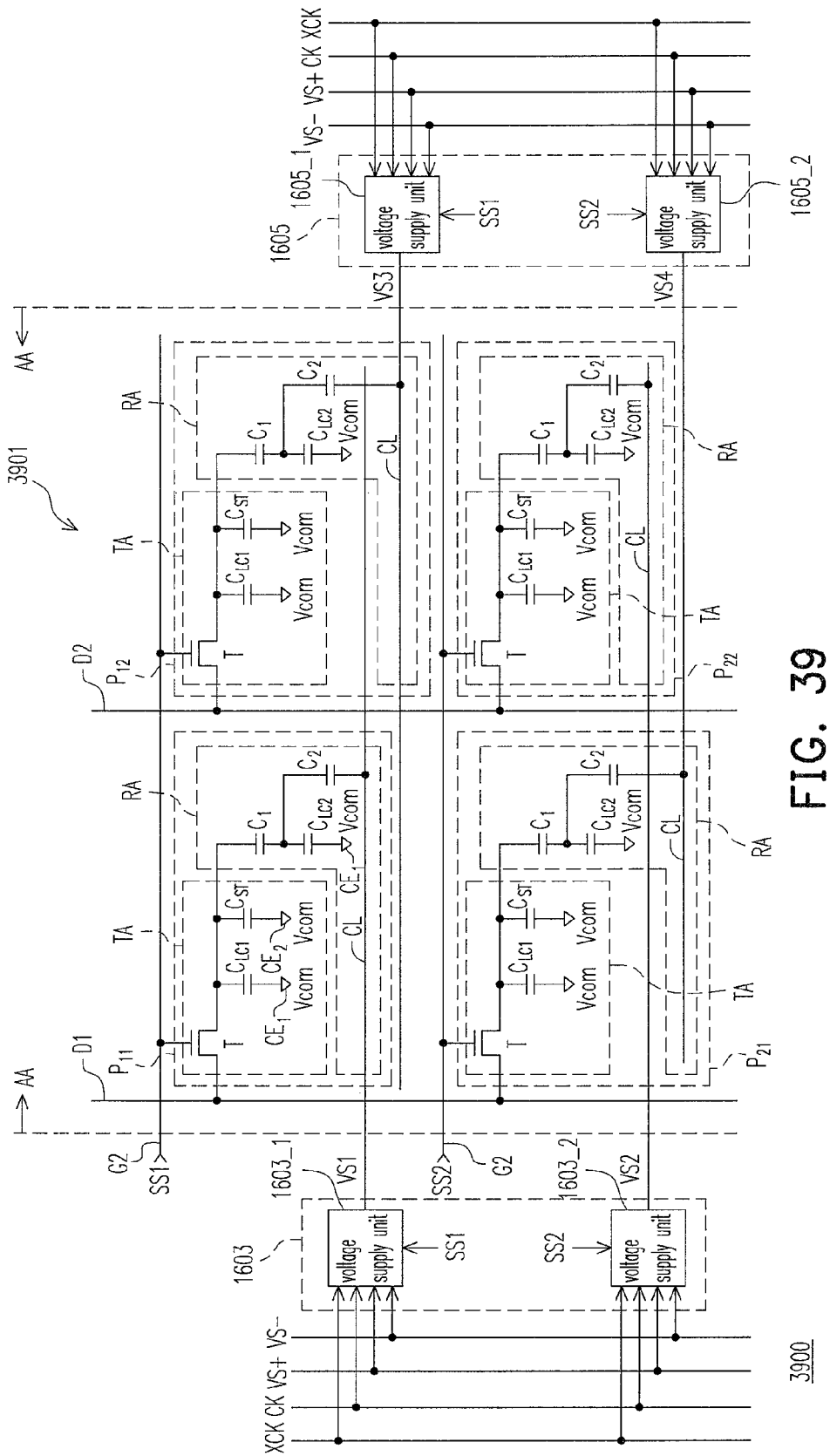
FIG. 39 is a diagram showing a partial single cell gap transflective LCD according to the twentieth exemplary embodiment of the present invention.

FIG. 39 is a diagram showing a partial single cell gap transflective LCD 3900 according to the twentieth exemplary embodiment of the present invention. Referring to FIG. 39, the single cell gap transflective LCD 3900 includes a display panel 3901 and a voltage supply device, wherein the voltage supply device includes a first and a second sub-voltage device 1603 and 1605. Besides, the display panel 3901 is a single cell gap liquid crystal panel. Obviously, the single cell gap transflective LCD 3900 further includes other components, such as a gate driver, a source driver, a timing controller and a back light module. However, only components related to the present invention are sketched in the twentieth exemplary embodiment for illustrating.

The display panel 3901 includes a plurality of scan lines G1 and G2 (only two scan lines are shown to simplify explanations), a plurality of data lines D1 and D2 substantially perpendicularly disposed to the scan lines G1 and G2 (only two data lines are shown to simplify explanations), and a plurality of pixels $P_{11}$, $P_{12}$, $P_{21}$ and $P_{22}$ located in a display area AA of the display panel 3901 (only four pixels are shown to simplify explanations).

The pixels $P_{11}$, $P_{12}$, $P_{21}$ and $P_{22}$ are respectively electrically connected with the corresponding data line and the corresponding scan line, and are arranged in an array. For example, the pixel $P_{11}$ is respectively electrically connected with the data line D1 and the scan line G1, the pixel $P_{12}$ is respectively electrically connected with the data line D2 and the scan line G1, the pixel $P_{21}$ is respectively electrically connected with the data line D1 and the scan line G2, and the pixel $P_{22}$ is respectively electrically connected with the data line D2 and the scan line G2. In addition, the pixel $P_{11}$ represents the $1^{st}$ pixel of the $1^{st}$ pixel row of the display panel 3901, the pixel $P_{12}$ represents the $2^{nd}$ pixel of the $1^{st}$ pixel row of the display panel 3901, the pixel $P_{21}$ represents the $2^{nd}$ pixel of the $1^{st}$ pixel row of the display panel 3901, and the pixel $P_{22}$ represents the $2^{nd}$ pixel of the $2^{nd}$ pixel row of the display panel 3901.

Each of the pixels $P_{11}$, $P_{12}$, $P_{21}$ and $P_{22}$ includes a common line $CE_2$ and a compensation line CL. The common line $CE_2$, for example, is located in a transparent area TA of the pixels $P_{11}$, $P_{12}$, $P_{21}$ and $P_{22}$, and is used to transmit a common voltage Vcom. The compensation line CL, for example, is located in a reflective area RA of each of the pixels $P_{11}$, $P_{12}$, $P_{21}$ and $P_{22}$, and the compensation line CL is used to correspondingly transmit stable voltages VS1~VS4. Moreover, each of the pixels $P_{11}$, $P_{12}$, $P_{21}$ and $P_{22}$ further includes a pixel transistor T, a first liquid crystal capacitor $C_{LC1}$, a storage capacitor $C_{ST}$, a first capacitor $C_1$, a second liquid crystal capacitor $C_{LC2}$, and a second capacitor $C_2$. Since the all the pixels $P_{11}$, $P_{12}$, $P_{21}$ and $P_{22}$ are similar in structure and in connection, only single pixel is used for description in the following.

Taking the pixel $P_{11}$ as an example, a gate of the pixel transistor T is coupled to the scan line G1, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the storage capacitor $C_{ST}$ is formed between the pixel electrode and common line $CE_2$.

A first end of the first LC capacitor $C_{LC1}$ is coupled to the drain of the pixel transistor T and a second end of the first LC capacitor $C_{LC1}$ is coupled to the common electrode $CE_1$. A first end of the storage capacitor $C_{ST}$ is coupled to the drain of the pixel transistor T, and a second end of the storage capacitor $C_{ST}$ is coupled to the common line $CE_2$. Besides, the pixel transistor T, the first liquid crystal capacitor $C_{LC1}$ and the storage capacitor $C_{ST}$ are located in the transparent area TA of the pixel $P_{11}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{11}$.

In the twentieth exemplary embodiment, the first sub-voltage supply device 1603 is coupled to the compensation line CL of the odd pixel $P_{11}$ of the $1^{st}$ pixel row and the compensation line CL of the even pixel $P_{22}$ of the $2^{nd}$ pixel row, so as to continuously and correspondingly provide the stable voltages VS1 and VS2 for the compensation lines CL of the pixels $P_{11}$ and $P_{22}$. Besides, the second sub-voltage supply device 1605 is coupled to the compensation line CL of the even pixel $P_{12}$ of the $1^{st}$ pixel row and the compensation line CL of the odd pixel $P_{21}$ of the $2^{nd}$ pixel row, so as to continuously and correspondingly provide the stable voltage(s) VS3 and/or VS4 for the compensation lines CL of the pixels $P_{12}$ and $P_{21}$.

Specifically, the first sub-voltage supply device 1603 has a plurality of voltage supply units 1603_1 and 1603_2. When driving the display panel 3901 in a dot inversion driving method, the $1^{st}$ voltage supply unit 1603_1 provides a stable voltage, for example, a stable voltage with a positive polarity VS1, i.e. VS+, for the compensation line CL of the odd pixels $P_{11}$ of the $1^{st}$ pixel row according to a $1^{st}$ scan signal SS1, generally generated by the gate driver, and a first and a second clock signals CK and XCK, wherein there is a 180 degrees phase difference between the first clock signal CK and the second clock signal XCK. The first and the second clock signals CK and XCK, for example, are generated by the timing controller, but the present invention is not limited thereto.

Additionally, the $2^{nd}$ voltage supply unit 1603_2 provides a stable voltage, for example, a stable voltage with a positive polarity VS2, i.e. VS+, for the compensation line CL of the even pixel $P_{22}$ of the $2^{nd}$ pixel row according to a $2^{nd}$ scan signal SS2, and the first and the second clock signal CK and XCK, wherein there is a 180 degrees phase difference between the first clock signal CK and the second clock signal XCK. Besides, duty cycles of the first and the second clock signal CK and XCK are substantially a frame period of the single cell gap transflective LCD 3900.

In addition, the second sub-voltage supply device 1605 has a plurality of voltage supply units 1605_1 and 1605_2. When driving the display panel 3701 in the dot inversion driving method, the $1^{st}$ voltage supply unit 1605_1 provides a stable voltage, for example, a stable voltage with a negative polarity VS3, i.e. VS−, for the compensation line CL of the even pixel $P_{12}$ of the $1^{st}$ pixel row according to the $1^{st}$ scan signal SS1, generally generated by the gate driver, and the first and the second clock signal CK and XCK, wherein there is a 180 degrees phase difference between the first clock signal CK and the second clock signal XCK. Besides, the $2^{nd}$ voltage supply unit 1605_2 provides a stable voltage, for example, a stable voltage with a negative polarity VS4, i.e. VS−, for the compensation line CL of the odd pixel $P_{21}$ of the $2^{nd}$ pixel row according to a $2^{nd}$ scan signal SS2, and the first and the second clock signal CK and XCK, wherein there is a 180 degrees phase difference between the first clock signal CK and the second clock signal XCK.

Since the structure of the voltage supply units 1603_1, 1603_2, 1605_1 and 1605_2 of the twentieth exemplary embodiment are the same as that of the seventh exemplary embodiment, further descriptions are omitted herein.

Figure 40A:
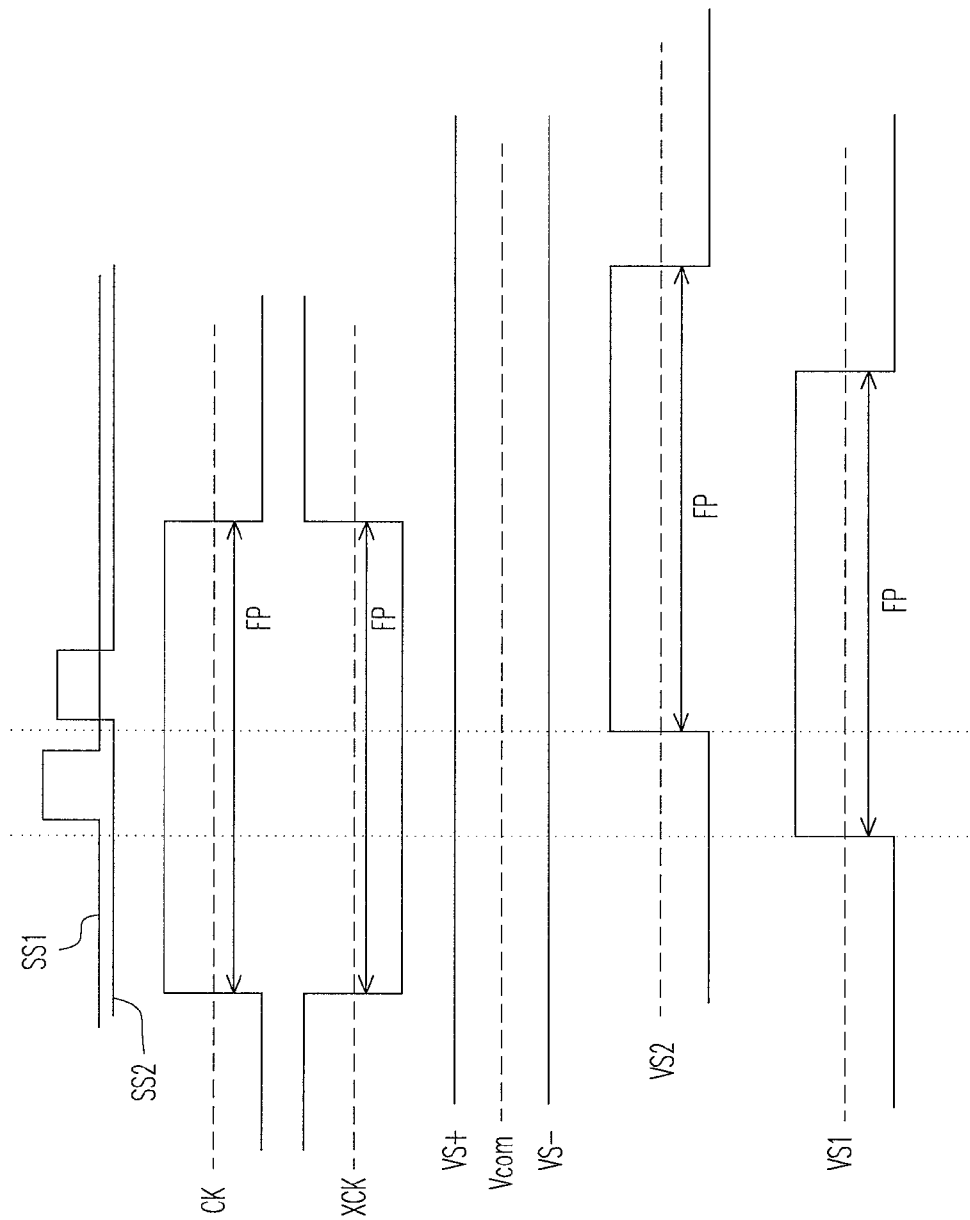
FIGS. 40A and 40B are respectively timing diagrams of the circuit operation of the voltage supply unit according to the twentieth exemplary embodiment.

FIG. 40A is a timing diagram of the circuit operation of the voltage supply units 1603_1 and 1603_2 according to the twentieth exemplary embodiment. Referring to FIG. 17A, FIG. 17B, FIG. 39 and FIG. 40A, it can be seen from FIG. 40A that when the scan signal SS1 is enabled, the first N-type transistor $N_1$ and the third N-type transistor $N_3$ of the voltage supply unit 1603_1 are turned on. Since the first clock signal CK is enabled and the second clock signal XCK is disabled, the second N-type transistor $N_2$ of the voltage supply unit 1605_1 is turned on, and the fourth N-type transistor $N_4$ is turned off. As a result, the voltage supply unit 1603_1 provides the stable voltage with the positive polarity VS1, i.e.

VS+, for the compensation line CL of the odd pixel $P_{11}$ of the $1^{st}$ pixel row during a frame period FP.

Similarly, when the scan signal SS2 is enabled, the first N-type transistor $N_1$ and the third N-type transistor $N_3$ of the voltage supply unit 1603_2 are turned on. Since the first clock signal CK is still enabled and the second clock signal XCK is still disabled, the second N-type transistor $N_2$ of the voltage supply unit 1603_2 is turned on, and the fourth N-type transistor $N_4$ is turned off. As a result, the voltage supply unit 1603_2 provides the stable voltage with the positive polarity VS2, i.e. VS+, for the compensation line CL of the even pixel $P_{22}$ of the $2^{nd}$ pixel row during the frame period FP.

Figure 40B:
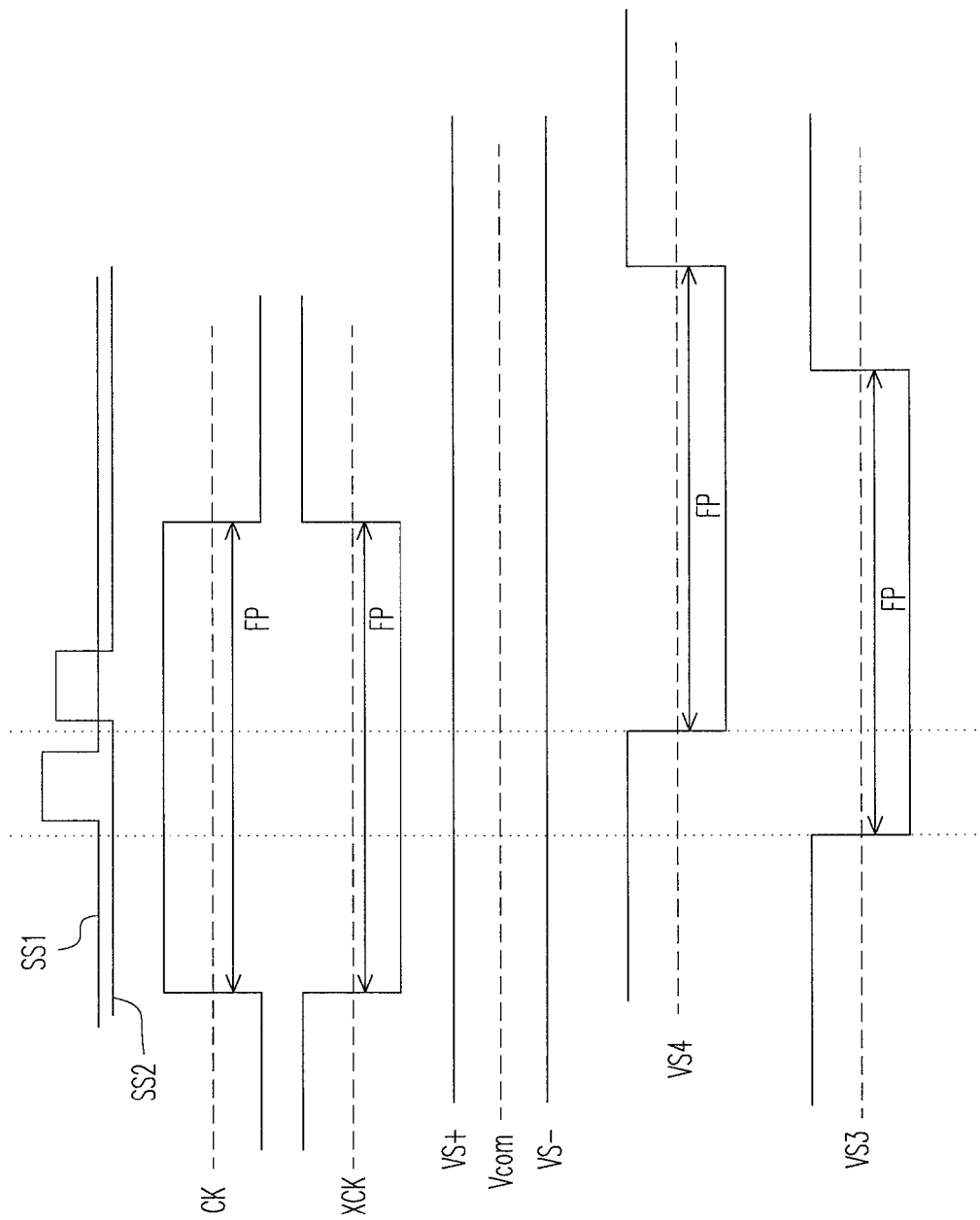

FIG. 40B is a timing diagram of the circuit operation of the voltage supply unit 1605_1 and 1605_2 according to the twentieth exemplary embodiment. Referring to FIG. 17C, FIG. 17D, FIG. 39 and FIG. 40B, it can be seen from FIG. 40B that when the scan signal SS1 is enabled, the first N-type transistor $N_1$ and the third N-type transistor $N_3$ of the voltage supply unit 1605_1 are turned on. Since the first clock signal CK is enabled and the second clock signal XCK is disabled, the second N-type transistor $N_2$ of the voltage supply unit 1605_1 is turned on, and the fourth N-type transistor $N_4$ is turned off. As a result, the voltage supply unit 1605_1 provides the stable voltage with the negative polarity VS3, i.e. VS−, for the compensation line CL of the even pixels $P_{12}$ of the $1^{st}$ pixel row during the frame period FP.

Similarly, when the scan signal SS2 is enabled, the first N-type transistor $N_1$ and the third N-type transistor $N_3$ of the voltage supply unit 1605_2 are turned on. Since the first clock signal CK is still enabled and the second clock signal XCK is still disabled, the second N-type transistor $N_2$ of the voltage supply unit 1605_2 is turned on, and the fourth N-type transistor $N_4$ is turned off. As a result, the voltage supply unit 1605_2 provides the stable voltage with the negative polarity VS4, i.e. VS−, for the compensation line CL of the odd pixel $P_{21}$ of the $2^{nd}$ pixel row during the frame period FP.

Accordingly, the voltage supply device, composed of the first sub-voltage supply unit 1603 and the second sub-voltage supply unit 1605, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 3900 can be optimized simultaneously.

In addition, since the voltage supply device, composed of the first and the second sub-voltage supply devices 1603 and 1605, continuously and correspondingly provides/applies the stable voltages VS1~VS4 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total crosstalk of the single cell gap transflective LCD 3900 can be reduced below the set specifications of the shipment, for example below 2%, but the present invention is not limited thereto.

The Twenty-First Exemplary Embodiment

Figure 41:
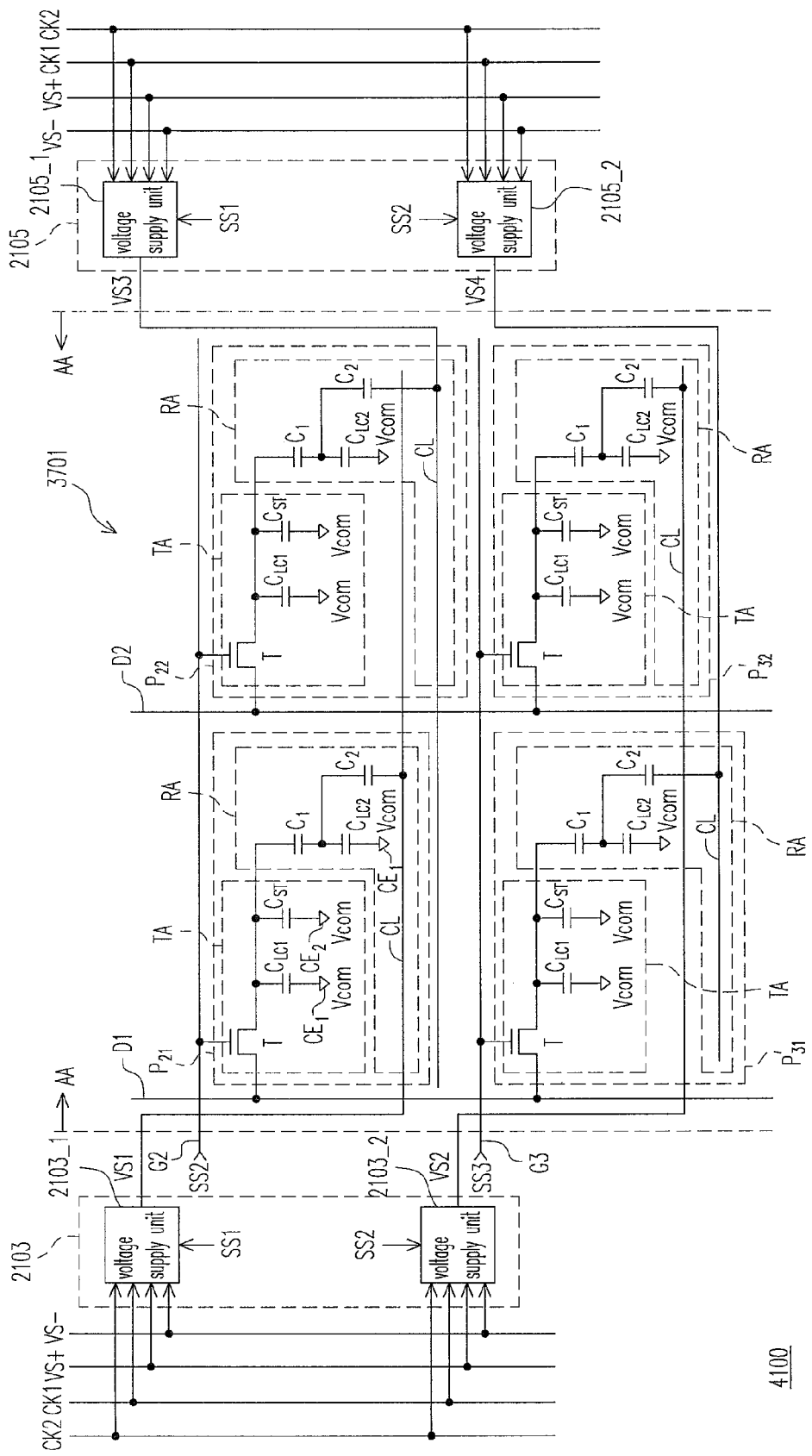
FIG. 41 is a diagram showing a partial single cell gap transflective LCD according to the twenty-first exemplary embodiment of the present invention.

FIG. 41 is a diagram showing a partial single cell gap transflective LCD 4100 according to the twenty-first exemplary embodiment of the present invention. Referring to FIG. 41, the single cell gap transflective LCD 4100 includes a display panel 3701 and a voltage supply device, wherein the voltage supply device includes a first and a second sub-voltage device 2103 and 2105. Besides, the display panel 3701 is a single cell gap liquid crystal panel. Obviously, the single cell gap transflective LCD 4100 further includes other components, such as a gate driver, a source driver, a timing controller and a back light module. However, only components related to the present invention are sketched in the twenty-first exemplary embodiment for illustrating.

Since the structure of the display panel 3701 of the twenty-first exemplary embodiment is the same as that of the nineteenth exemplary embodiment, further descriptions are omitted herein. Besides, the second sub-voltage supply device 2103 is coupled to the compensation line CL of the odd pixel $P_{21}$ of the $2^{nd}$ pixel row and the compensation line CL of the odd pixel $P_{32}$ of the $3^{rd}$ pixel row, so as to continuously and correspondingly provide the stable voltage(s) VS1 and/or VS2 for the compensation lines CL of the pixels $P_{21}$ and $P_{32}$. Besides, the second sub-voltage supply device 2105 is coupled to the compensation line CL of the even pixel $P_{22}$ of the $2^{nd}$ pixel row and the compensation line CL of the odd pixel $P_{31}$ of the $3^{rd}$ pixel row, so as to continuously and correspondingly provide the stable voltage(s) VS3 and/or VS4 for the compensation lines CL of the pixels $P_{22}$ and $P_{31}$.

Specifically, the first sub-voltage supply device 2103 has a plurality of voltage supply units 2103_1 and 2103_2. When driving the display panel 3701 in a dot inversion driving method, the $1^{st}$ voltage supply unit 2103_1 provides a stable voltage, for example, a stable voltage with a negative polarity VS1, i.e. VS−, for the compensation line CL of the odd pixels $P_{21}$ of the $2^{nd}$ pixel row according to a $1^{st}$ scan signal SS1, generally generated by the gate driver, and a first and a second clock signals CK1 and CK2. The first and the second clock signal CK1 and CK2, for example, are generated by the timing controller, but the present invention is not limited thereto.

Additionally, the $2^{nd}$ voltage supply device 2103_2 provides a stable voltage, for example, a stable voltage with a negative polarity VS2, i.e. VS−, for the compensation line CL of the even pixel $P_{32}$ of the $3^{rd}$ pixel row according to a $2^{nd}$ scan signal SS2, and the first and the second clock signal CK1 and CK2. Besides, a duty cycle of the first clock signal CK1 is substantially a frame period of the single cell gap transflective LCD 4100, and the second clock signal CK2 is maintained enabled.

In addition, the second sub-voltage supply device 2105 has a plurality of voltage supply units 2105_1 and 2105_2 When driving the display panel 3701 in the dot inversion driving method, the $1^{st}$ voltage supply unit 2105_1 provides a stable voltage, for example, a stable voltage with a positive polarity VS3, i.e. VS+, for the compensation line CL of the even pixels $P_{22}$ of the $2^{nd}$ pixel row according to the $1^{st}$ scan signal SS1, and the first and the second clock signal CK1 and CK2. Additionally, the $2^{nd}$ voltage supply device 2105_2 provides a stable voltage, for example, a stable voltage with a positive polarity VS4, i.e. VS+, for the compensation line CL of the odd pixel $P_{31}$ of the $3^{rd}$ pixel row according to a $2^{nd}$ scan signal SS2, and the first and the second clock signal CK1 and CK2.

Since the structure of the voltage supply units 2103_1, 2103_2, 2105_1 and 2105_2 of the twenty-first exemplary embodiment are the same as that of the ninth exemplary embodiment, further descriptions are omitted herein.

Figure 42A:
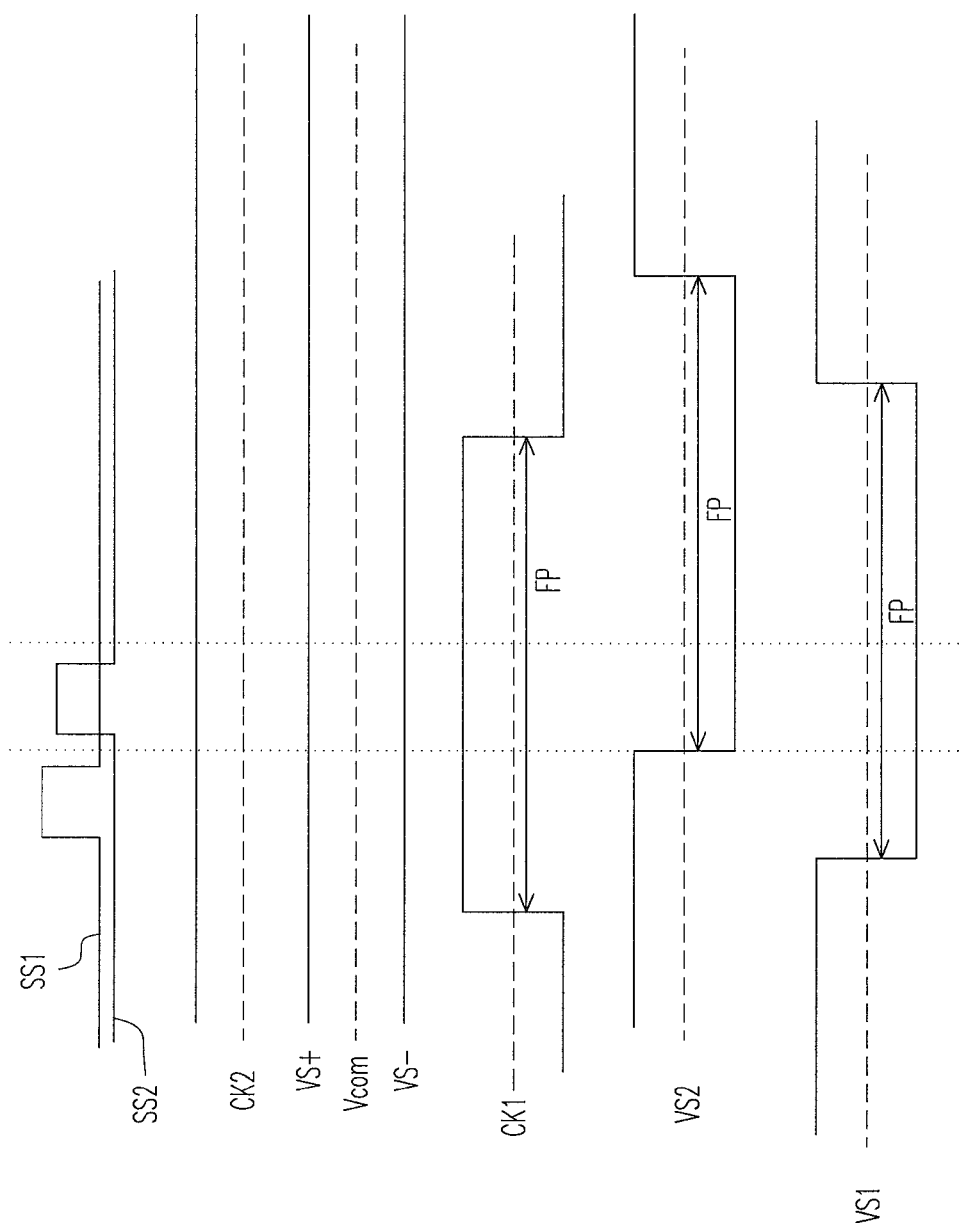
FIGS. 42A and 42B are respectively timing diagrams of the circuit operation of the voltage supply unit according to the twenty-first exemplary embodiment.

FIG. 42A is a timing diagram of the circuit operation of the voltage supply units 2103_1 and 2103_2 according to the twenty-first exemplary embodiment. Referring to FIG. 22A, FIG. 22B, FIG. 41 and FIG. 42A, it can be seen from FIG. 42A that when the scan signal SS1 is enabled, the third N-type transistor $N_3$ of the voltage supply unit 2103_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2103_1 are turned on, and the second N-type transistor $N_2$ is turned off. As a result, the voltage supply unit 2103_1 provides the stable voltage with the negative polarity VS1, i.e. VS−, for the compensation line CL of the odd pixel $P_{21}$ of the $2^{nd}$ pixel row during a frame period FP.

Similarly, when the scan signal SS2 is enabled, the third N-type transistor $N_3$ of the voltage supply unit 2103_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2103_2 are turned on, and the second N-type transistor $N_2$ is turned off. As a result, the voltage supply unit 2103_2 provides the stable voltage with the negative polarity VS2, i.e. VS−, for the compensation line CL of the even pixel $P_{32}$ of the $3^{rd}$ pixel row during the frame period FP.

Figure 42B:
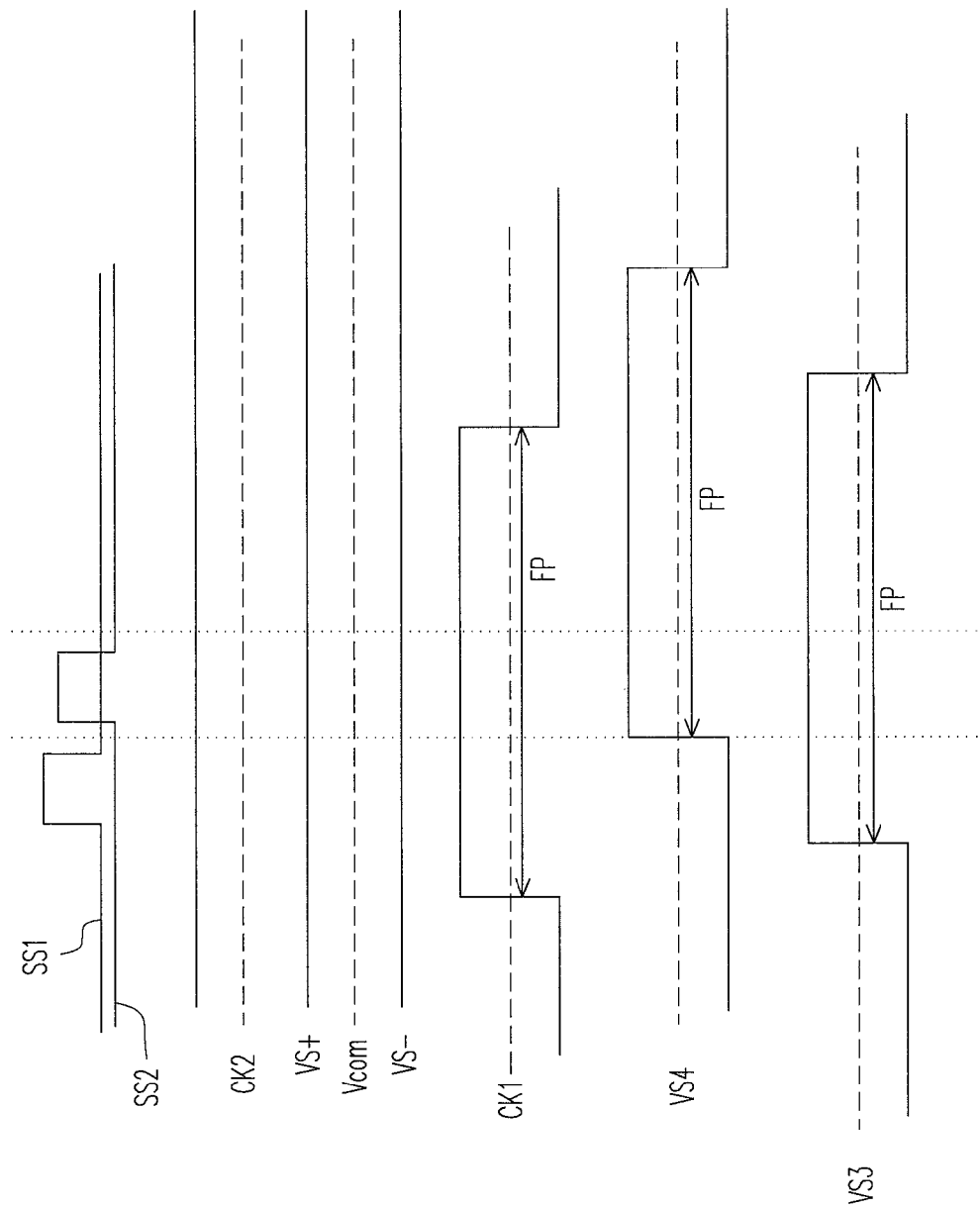

FIG. 42B is a timing diagram of the circuit operation of the voltage supply units 2105_1 and 2105_2 according to the twenty-first exemplary embodiment. Referring to FIG. 22C, FIG. 22D, FIG. 41 and FIG. 42B, it can be seen from FIG. 42B that when the scan signal SS1 is enabled, the third N-type transistor $N_3$ of the voltage supply unit 2105_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2105_1 are turned on, and the second N-type transistor $N_2$ is turned off. As a result, the voltage supply unit 2105_1 provides the stable voltage with the positive polarity VS3, i.e. VS+, for the compensation line CL of the even pixel $P_{22}$ of the $2^{nd}$ pixel row during the frame period FP.

Similarly, when the scan signal SS2 is enabled, the third N-type transistor $N_3$ of the voltage supply unit 2105_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2105_2 are turned on, and the second N-type transistor $N_2$ is turned off. As a result, the voltage supply unit 2105_2 provides the stable voltage with the positive polarity VS4, i.e. VS+, for the compensation line CL of the odd pixels $P_{31}$ of the $3^{rd}$ pixel row during the frame period FP.

Accordingly, the voltage supply device, composed of the first sub-voltage supply unit 2103 and the second sub-voltage supply unit 2105, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 4100 can be optimized simultaneously.

In addition, since the voltage supply device, composed of the first and the second sub-voltage supply devices 2103 and 2105, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 4100 can be reduced below the set specifications of the shipment, for example below 2%, but the present invention is not limited thereto.

The Twenty-Second Exemplary Embodiment

Figure 43:
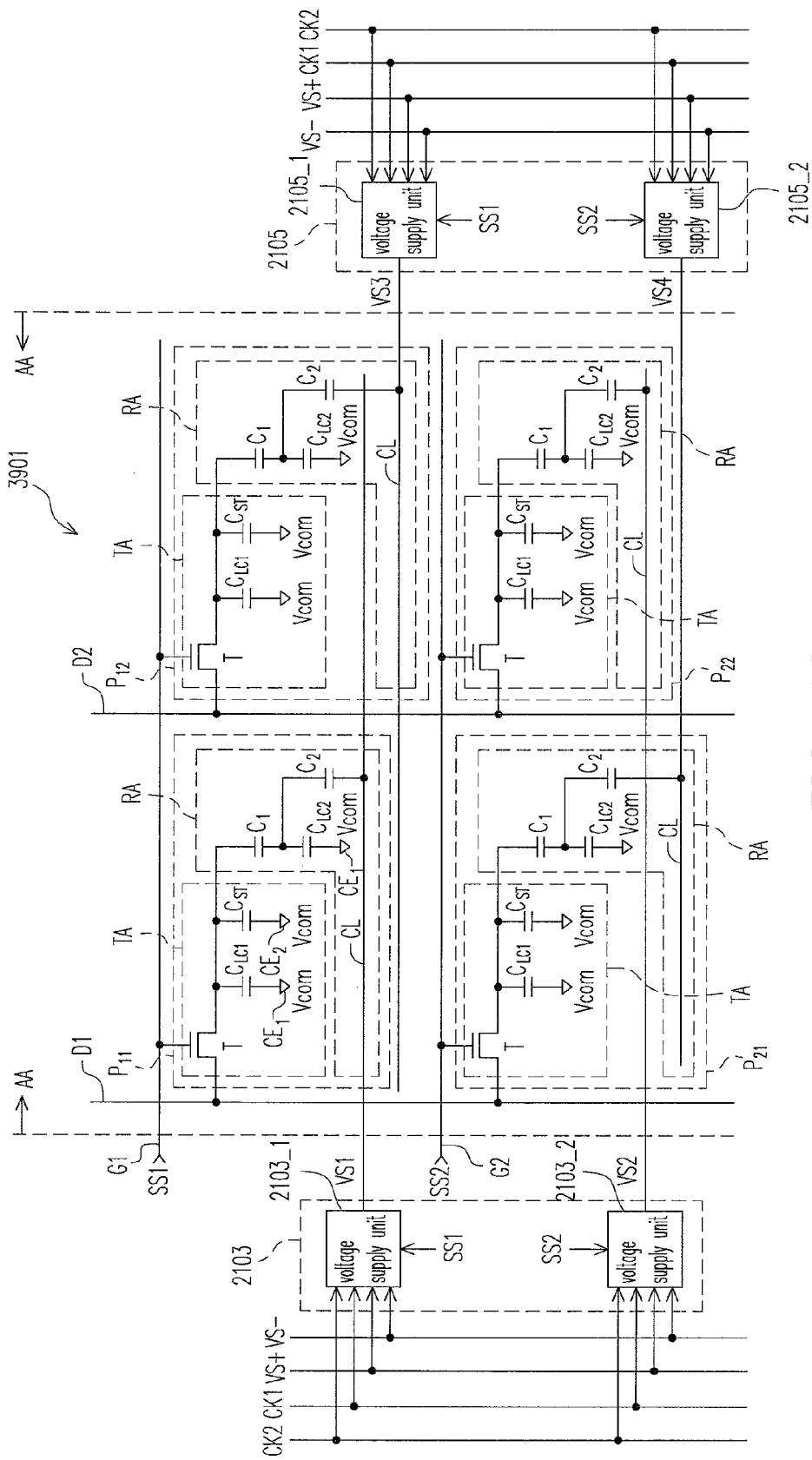
FIG. 43 is a diagram showing a partial single cell gap transflective LCD according to the twenty-second exemplary embodiment of the present invention.

FIG. 43 is a diagram showing a partial single cell gap transflective LCD 4300 according to the twenty-second exemplary embodiment of the present invention. Referring to FIG. 43, the single cell gap transflective LCD 4300 includes a display panel 3901 and a voltage supply device, wherein the voltage supply device includes a first and a second sub-voltage device 2103 and 2105. Besides, the display panel 3901 is a single cell gap liquid crystal panel. Obviously, the single cell gap transflective LCD 4300 further includes other components, such as a gate driver, a source driver, a timing controller and a back light module. However, only components related to the present invention are sketched in the twenty-second exemplary embodiment for illustrating.

Since the structure of the display panel 3901 of the twenty-second exemplary embodiment is the same as that of the twentieth exemplary embodiment, further descriptions are omitted herein. Besides, the first sub-voltage supply device 2103 is coupled to the compensation line CL of the odd pixel $P_{11}$ of the $1^{st}$ pixel row and the compensation line CL of the even pixel $P_{22}$ of the $2^{nd}$ pixel row, so as to continuously and correspondingly provide the stable voltage(s) VS1 and/or VS2 for the compensation lines CL of the pixels $P_{11}$ and $P_{22}$. Besides, the second sub-voltage supply device 2105 is coupled to the compensation line CL of the even pixel $P_{12}$ of the $1^{st}$ pixel row and the compensation line CL of the odd pixel $P_{21}$ of the $2^{nd}$ pixel row, so as to continuously and correspondingly provide the stable voltage(s) VS3 and/or VS4 for the compensation lines CL of the pixels $P_{12}$ and $P_{21}$.

Specifically, the first sub-voltage supply device 2103 has a plurality of voltage supply units 2103_1 and 2103_2. When driving the display panel 3901 in a dot inversion driving method, the $1^{st}$ voltage supply unit 2103_1 provides a stable voltage, for example, a stable voltage with a positive polarity VS1, i.e. VS+, for the compensation line CL of the odd pixels $P_{11}$ of the $1^{st}$ pixel row according to a $1^{st}$ scan signal SS1, generally generated by the gate driver, and a first and a second clock signals CK1 and CK2. The first and the second clock signals CK1 and CK2, for example, are generated by the timing controller, but the present invention is not limited thereto.

Additionally, the $2^{nd}$ voltage supply device 2103_2 provides a stable voltage, for example, a stable voltage with a positive polarity VS2, i.e. VS+, for the compensation line CL of the even pixel $P_{22}$ of the $2^{nd}$ pixel row according to a $2^{nd}$ scan signal SS2, and the first and the second clock signal CK1 and CK2. Besides, a duty cycle of the first clock signal CK1 is substantially a frame period of the single cell gap transflective LCD 4300, and the second clock signal CK2 is maintained enabled.

In addition, the second sub-voltage supply device 2105 has a plurality of voltage supply units 2105_1 and 2105_2. When driving the display panel 3901 in the dot inversion driving method, the $1^{st}$ voltage supply unit 2105_1 provides a stable voltage, for example, a stable voltage with a negative polarity VS3, i.e. VS−, for the compensation line CL of the even pixels $P_{12}$ of the $1^{st}$ pixel row according to the $1^{st}$ scan signal SS1, and the first and the second clock signal CK1 and CK2.

Additionally, the $2^{nd}$ voltage supply device 2105_2 provides a stable voltage, for example, a stable voltage with a negative polarity VS4, i.e. VS−, for the compensation line CL of the odd pixel $P_{21}$ of the $2^{nd}$ pixel row according to a $2^{nd}$ scan signal SS2, and the first and the second clock signal CK1 and CK2.

Since the structure of the voltage supply units 2103_1, 2103_2, 2105_1 and 2105_2 of the twenty-second exemplary embodiment are the same as that of the ninth exemplary embodiment, further descriptions are omitted herein.

Figure 44A:
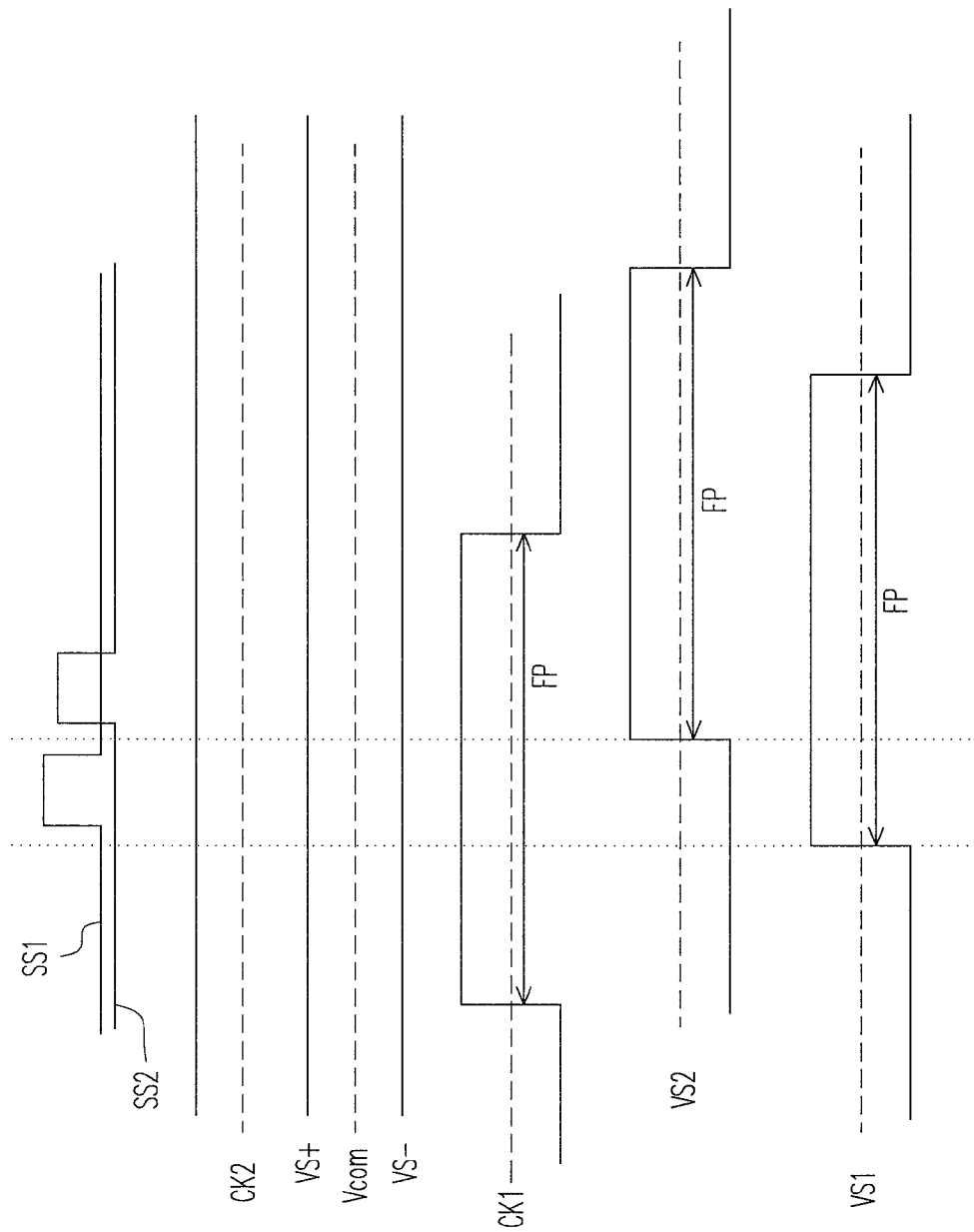
FIGS. 44A and 44B are respectively timing diagrams of the circuit operation of the voltage supply unit according to the twenty-second exemplary embodiment.

FIG. 44A is a timing diagram of the circuit operation of the voltage supply units 2103_1 and 2103_2 according to the twenty-second exemplary embodiment. Referring to FIG. 22A, FIG. 22B, FIG. 43 and FIG. 44A, it can be seen from FIG. 44A that when the scan signal SS1 is enabled, the third N-type transistor $N_3$ of the voltage supply unit 2103_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2103_1 are turned on, and the second N-type transistor $N_2$ is turned off. As a result, the voltage supply unit 2103_1 provides the stable voltage with the positive polarity VS1, i.e. VS+, for the compensation line CL of the odd pixel $P_{11}$ of the $1^{st}$ pixel row during a frame period FP.

Similarly, when the scan signal SS2 is enabled, the third N-type transistor $N_3$ of the voltage supply unit 2103_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2103_2 are turned on, and the second N-type transistor $N_2$ is turned off. As a result, the voltage supply unit 2103_2 provides the stable voltage with the positive polarity VS2, i.e. VS+, for the compensation line CL of the even pixel $P_{22}$ of the $2^{nd}$ pixel row during the frame period FP.

Figure 44B:
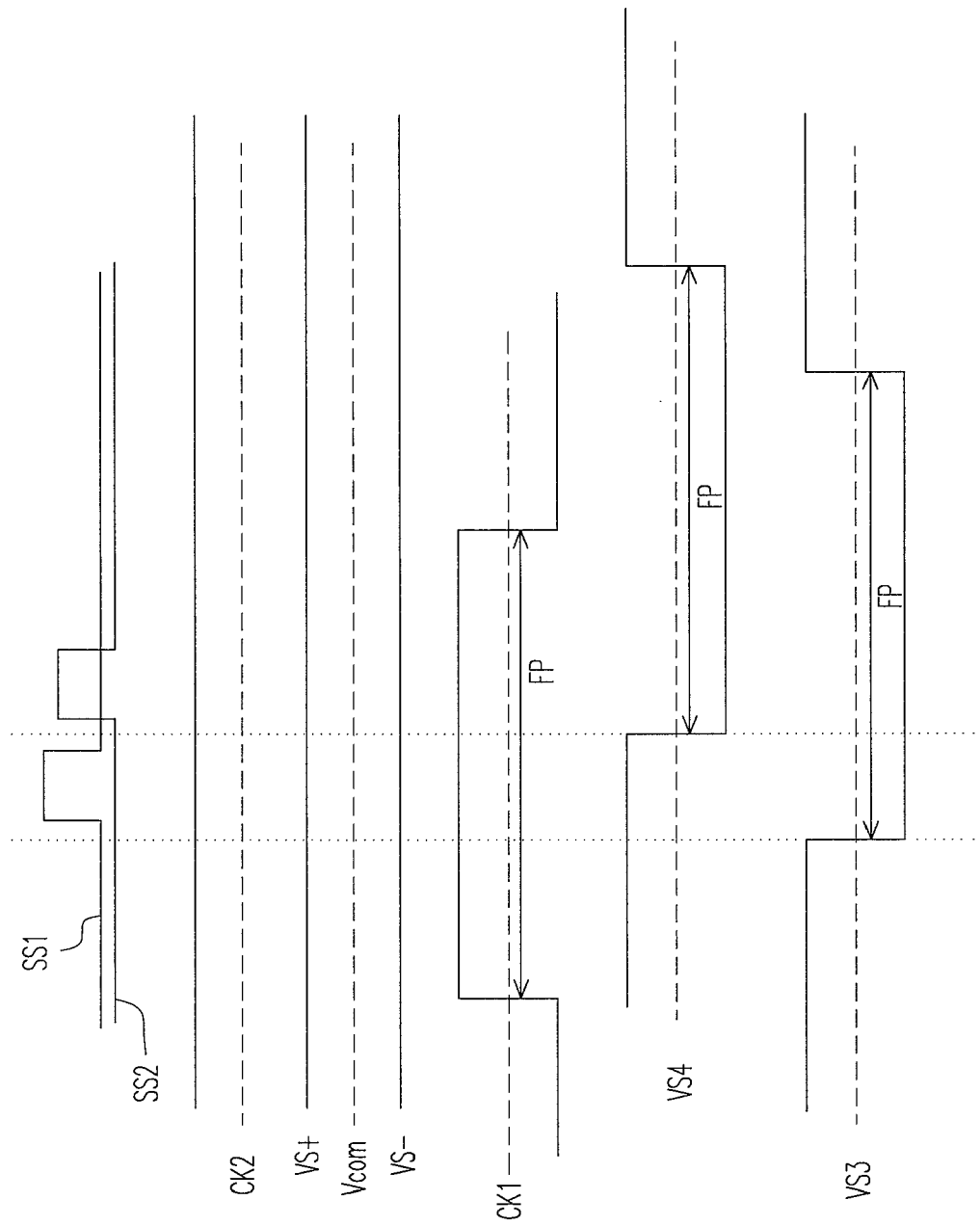

FIG. 44B is a timing diagram of the circuit operation of the voltage supply units 2503_1 and 2503_2 according to the twenty-second exemplary embodiment. Referring to FIG. 22C, FIG. 22D, FIG. 43 and FIG. 44B, it can be seen from FIG. 44B that when the scan signal SS1 is enabled, the third N-type transistor $N_3$ of the voltage supply unit 2105_1 is turned on. Since the first clock signal CK1 is enabled and the second clock signal CK2 is maintained enabled at this moment, the fourth N-type transistor $N_4$ and the fifth N-type transistor $N_5$ of the voltage supply unit 2105_1 are turned on, and the second N-type transistor $N_2$ is turned off. As a result, the voltage supply unit 2105_1 provides the stable voltage with the negative polarity VS3, i.e. VS−, for the compensation line CL of the even pixel $P_{12}$ of the $1^{st}$ pixel row during the frame period FP.

Similarly, when the scan signal SS2 is enabled, the third N-type transistor $N_3$ of the voltage supply unit 2105_2 is turned on. Since the first clock signal CK1 is still enabled and the second clock signal CK2 is still maintained enabled at this moment, the fourth N-type transistor $N_4$ and the fifth N-type transistor $N_5$ of the voltage supply unit 2105_2 are turned on, and the second N-type transistor $N_2$ is turned off. As a result, the voltage supply unit 2105_2 provides the stable voltage with the negative polarity VS4, i.e. VS−, for the compensation line CL of the odd pixel $P_{21}$ of the $2^{nd}$ pixel row during the frame period FP.

Accordingly, the voltage supply device, composed of the first sub-voltage supply unit 2103 and the second sub-voltage supply unit 2105, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 4300 can be optimized simultaneously.

In addition, since the voltage supply device, composed of the first and the second sub-voltage supply devices 2103 and 2105, continuously and correspondingly provides/applies the stable voltages VS1~VS4 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total crosstalk of the single cell gap transflective LCD 4300 can be reduced below the set specifications of the shipment, for example below 2%, but the present invention is not limited thereto.

The Twenty-Third Exemplary Embodiment

Figure 45:
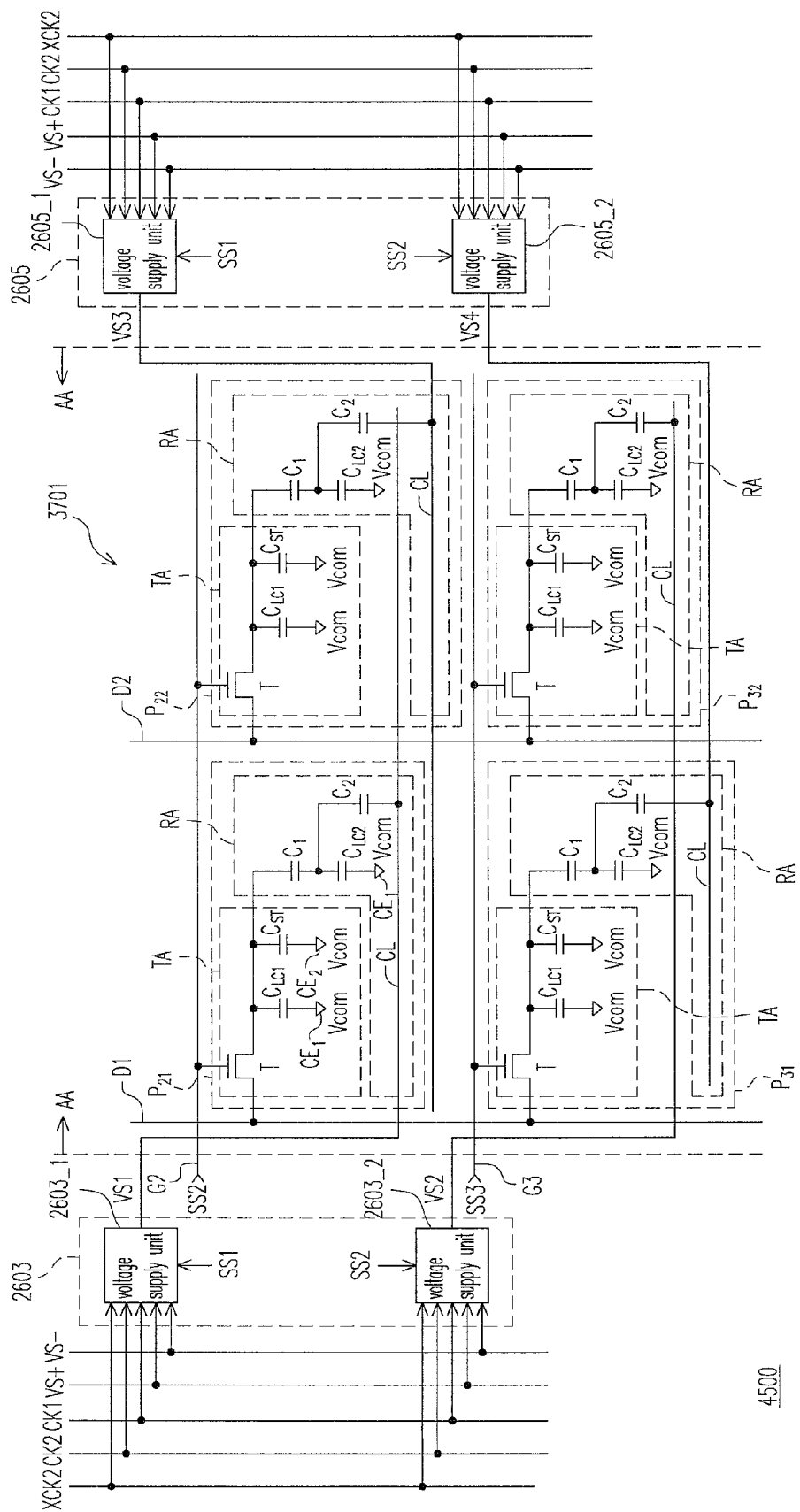
FIG. 45 is a diagram showing a partial single cell gap transflective LCD according to the twenty-third exemplary embodiment of the present invention.

FIG. 45 is a diagram showing a partial single cell gap transflective LCD 4500 according to the twenty-third exemplary embodiment of the present invention. Referring to FIG. 45, the single cell gap transflective LCD 4500 includes a display panel 3701 and a voltage supply device, wherein the voltage supply device includes a first and a second sub-voltage device 2603 and 2605. Besides, the display panel 3701 is a single cell gap liquid crystal panel. Obviously, the single cell gap transflective LCD 4500 further includes other components, such as a gate driver, a source driver, a timing controller and a back light module. However, only components related to the present invention are sketched in the twenty-third exemplary embodiment for illustrating.

Since the structure of the display panel 3701 of the twenty-third exemplary embodiment is the same as that of the nineteenth exemplary embodiment, further descriptions are omitted herein. Besides, the first sub-voltage supply device 2603 is coupled to the compensation line CL of the odd pixel $P_{21}$ of the $2^{nd}$ pixel row and the compensation line CL of the even pixel $P_{32}$ of the $3^{rd}$ pixel row, so as to continuously and correspondingly provide the stable voltage(s) VS1 and/or VS2 for the compensation lines CL of the pixels $P_{21}$ and $P_{32}$. Besides, the second sub-voltage supply device 2605 is coupled to the compensation line CL of the even pixel $P_{22}$ of the $2^{nd}$ pixel row and the compensation line CL of the odd pixel $P_{31}$ of the $3^{rd}$ pixel row, so as to continuously and correspondingly provide the stable voltage(s) VS3 and/or VS4 for the compensation lines CL of the pixels $P_{22}$ and $P_{31}$.

Specifically, the first sub-voltage supply device 2603 has a plurality of voltage supply units 2603_1 and 2603_2. When driving the display panel 3701 in a dot inversion driving method, the $1^{st}$ voltage supply unit 2603_1 provides a stable voltage, for example, a stable voltage with a negative polarity VS1, i.e. VS− for the compensation line CL of the odd pixel $P_{21}$ of the $2^{nd}$ pixel row according to a $1^{st}$ scan signal SS1, generally generated by the gate driver, a first clock signal CK1, and a second and a third clock signals CK2 and XCK2, wherein there is a 180 degrees phase difference between the second clock signal CK2 and the third clock signal XCK2.

Additionally, the $2^{nd}$ voltage supply device 2603_2 provides a stable voltage, for example, a stable voltage with a positive polarity VS2, i.e. VS+, for the compensation line CL of the even pixels $P_{32}$ of the $3^{rd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2. Besides, a duty cycle of the first clock signal CK1 is substantially a frame period of the single cell gap transflective LCD 4500, and duty cycles of the second and the third clock signals CK2 and XCK2 are substantially an enable period of the scan signal SS1 or SS2. Generally the enable periods of the scan signal SS1 and SS2 are the same.

In addition, the second sub-voltage supply device 2605 has a plurality of voltage supply units 2605_1 and 2605_2. When driving the display panel 1601 in the dot inversion driving method, the $1^{st}$ voltage supply unit 2605_1 provides a stable voltage, for example, a stable voltage with a positive polarity VS3, i.e. VS+, for the compensation line CL of the even pixel $P_{22}$ of the $2^{nd}$ pixel row according to the $1^{st}$ scan signal SS1, the first clock signal CK1, and the second and the third clock signals CK2 and XCK2, wherein there is a 180 degrees phase difference between the second clock signal CK2 and the third clock signal XCK2. Additionally, the $2^{nd}$ voltage supply device 2605_2 provides a stable voltage, for example, a stable voltage with a positive polarity VS4, i.e. VS+, for the compensation line CL of the odd pixel $P_{31}$ the $3^{rd}$ pixel row according to a $2^{nd}$ scan signal SS2, the first clock signal CK1, and the second and the third clock signals CK2 and XCK2, wherein there is a 180 degrees phase difference between the second clock signal CK2 and the third clock signal XCK2.

Since the structure of the voltage supply units 2603_1, 2603_2, 2605_1 and 2605_2 of the twenty-third exemplary embodiment are the same as that of the eleventh exemplary embodiment, further descriptions are omitted herein.

Figure 46A:
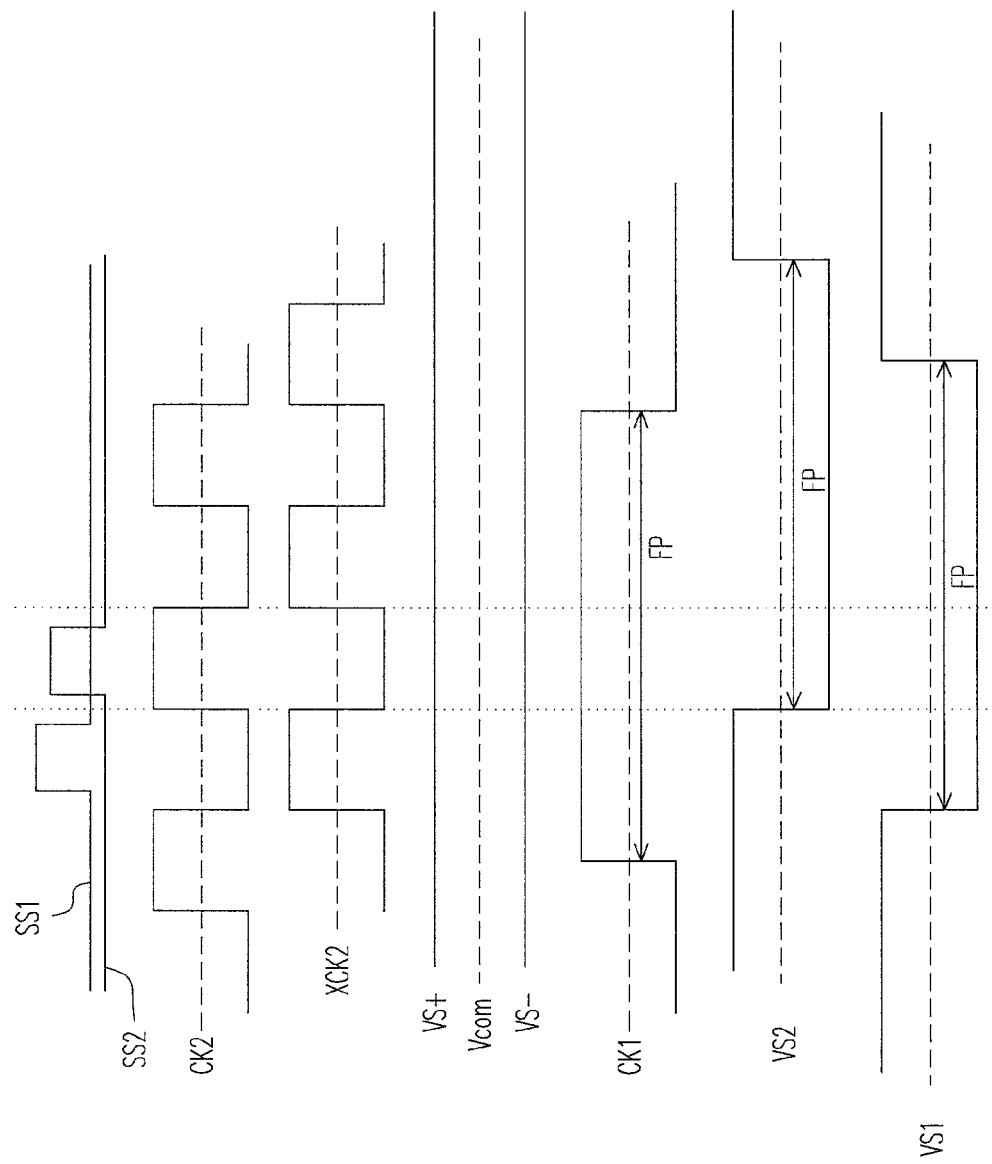
FIGS. 46A and 46B are respectively timing diagrams of the circuit operation of the voltage supply unit according to the twenty-third exemplary embodiment.

FIG. 46A is a timing diagram of the circuit operation of the voltage supply unit 2603_1 and 2603_2 according to the twenty-third exemplary embodiment. Referring to FIG. 27A, FIG. 27B, FIG. 45 and FIG. 46A, it can be seen from FIG. 28A that when the scan signal SS1 is enabled, the third N-type transistor $N_3$ of the voltage supply unit 2603_1 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2603_1 are turned on, and the second N-type transistor $N_2$ is turned off. As a result, the voltage supply unit 2603_1 provides the stable voltage with the negative polarity VS1, i.e. VS−, for the compensation line CL of the odd pixel $P_{21}$ of the $2^{nd}$ pixel row during a frame period FP.

Similarly, when the scan signal SS2 is enabled, the third N-type transistor $N_3$ of the voltage supply unit 2603_2 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2603_2 are turned on, and the second N-type transistor $N_2$ is turned off. As a result, the voltage supply unit 2603_2 provides the stable voltage with the negative polarity VS2, i.e. VS−, for the compensation line CL of the even pixel $P_{32}$ of the $3^{rd}$ pixel row during the frame period FP.

Figure 46B:
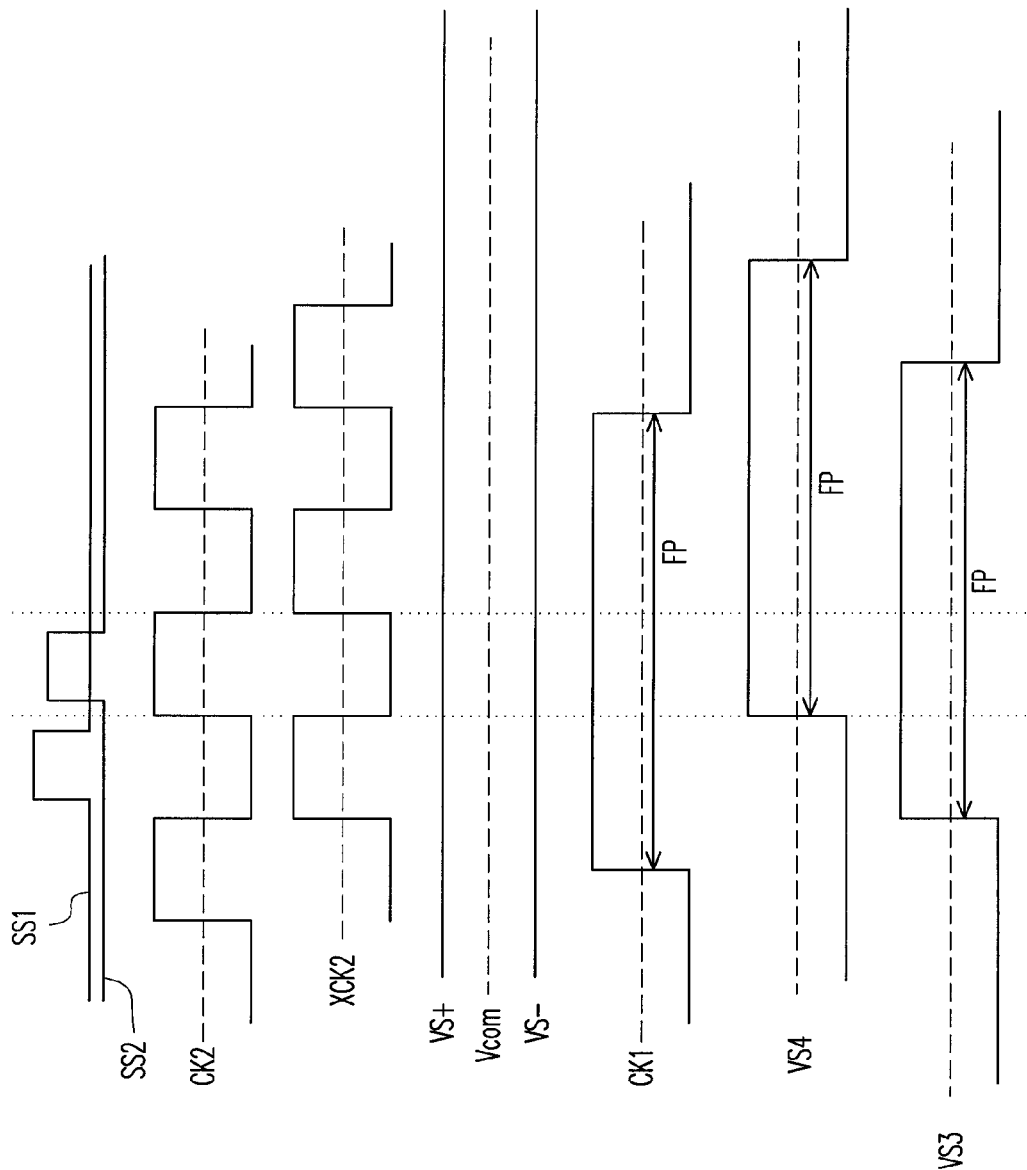

FIG. 46B is a timing diagram of the circuit operation of the voltage supply units 2605_1 and 2605_2 according to the twenty-third exemplary embodiment. Referring to FIG. 27C, FIG. 27D, FIG. 45 and FIG. 46B, it can be seen from FIG. 46B that when the scan signal SS1 is enabled, the third N-type transistor $N_3$ of the voltage supply unit 2605_1 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2605_1 are turned on, and the second N-type transistor $N_2$ is turned off. As a result, the voltage supply unit 2605_1 provides the stable voltage with the positive polarity VS3, i.e. VS+, for the compensation line CL of the even pixel $P_{22}$ of the $2^{nd}$ pixel row during the frame period FP.

Similarly, when the scan signal SS2 is enabled, the third N-type transistor $N_3$ of the voltage supply unit 2605_2 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2605_2 are turned on, and the second N-type transistor $N_2$ is turned off. As a result, the voltage supply unit 2605_2 provides the stable voltage with the positive polarity VS4, i.e. VS+, for the compensation line CL of the odd pixel $P_{31}$ of the $3^{rd}$ pixel row during the frame period FP.

Accordingly, the voltage supply device, composed of the first sub-voltage supply unit 2603 and the second sub-voltage supply unit 2605, continuously and correspondingly provides/applies the stable voltages VS1~VS4 for/in the compensation line CL of each of the pixels $P_{21}$, $P_{22}$, $P_{31}$ and $P_{32}$ to change a voltage difference of the reflective area RA of each of the pixels $P_{21}$, $P_{22}$, $P_{31}$ and $P_{32}$, so that reflective Gamma curves of the reflective area RA of each of the pixels $P_{21}$, $P_{22}$, $P_{31}$ and $P_{32}$ can be adjusted, and the reflective Gamma curves can be matched with transparent Gamma curves of the transparent area TA. Hence, the transparent display quality and the reflective display quality of the single cell gap transflective LCD 4500 can be optimized simultaneously.

In addition, since the voltage supply device, composed of the first and the second sub-voltage supply devices 2603 and 2605, continuously and correspondingly provides/applies the stable voltages VS1~VS4 for/in the compensation line CL of each of the pixels $P_{21}$, $P_{22}$, $P_{31}$ and $P_{32}$, the voltage of the compensation line CL of each of the pixels $P_{21}$, $P_{22}$, $P_{31}$ and $P_{32}$ is not affected by the signal received by the data lines D1 and D2 through the coupling effect. Hence, the total crosstalk of the single cell gap transflective LCD 4500 can be reduced below the set specifications of the shipment, for example below 2%, but the present invention is not limited thereto.

The Twenty-Fourth Exemplary Embodiment

Figure 47:
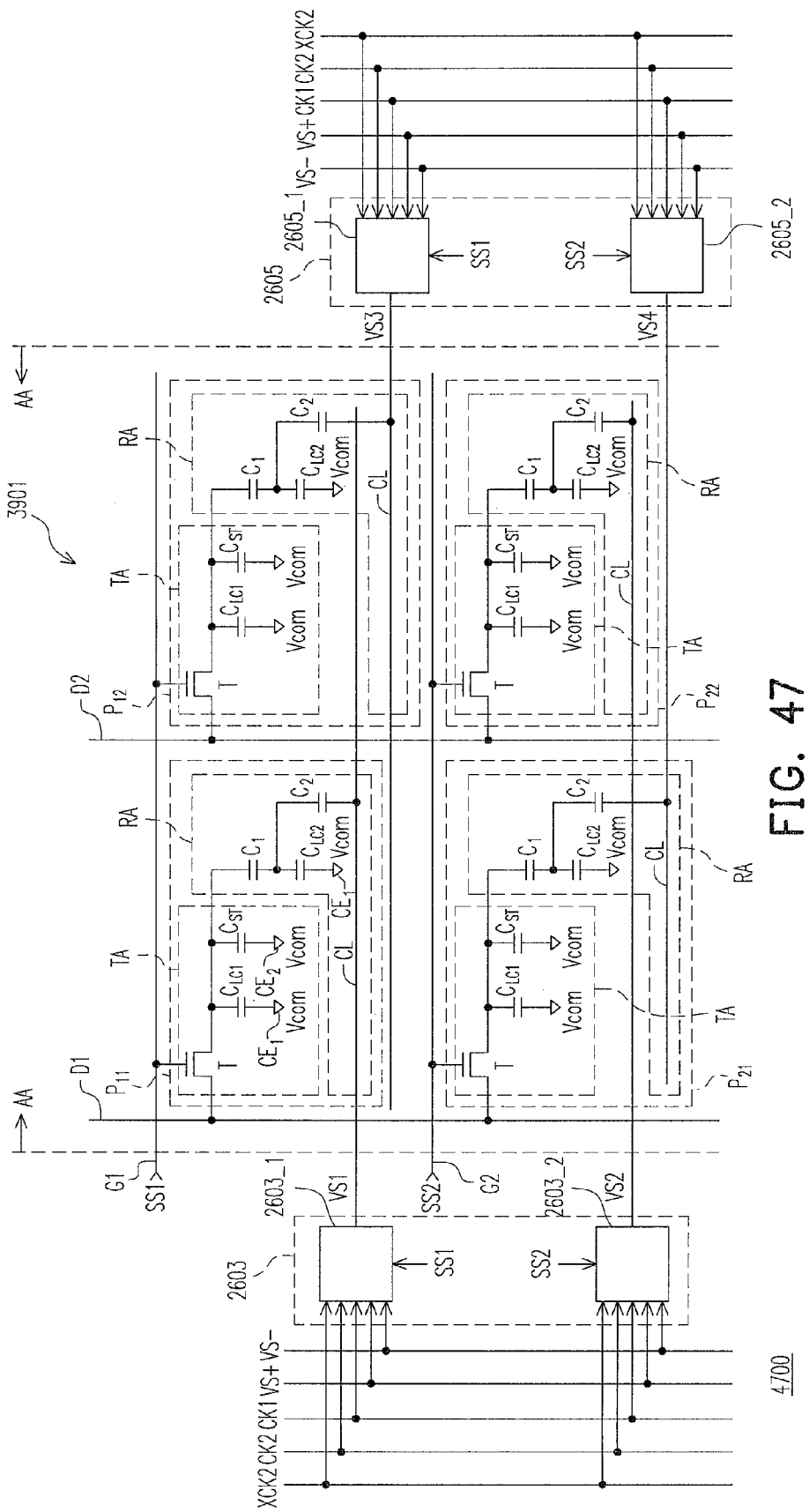
FIG. 47 is a diagram showing a partial single cell gap transflective LCD according to the twenty-fourth exemplary embodiment of the present invention.

FIG. 47 is a diagram showing a partial single cell gap transflective LCD 4700 according to the twenty-fourth exemplary embodiment of the present invention. Referring to FIG. 47, the single cell gap transflective LCD 4700 includes a display panel 3901 and a voltage supply device, wherein the voltage supply device includes a first and a second sub-voltage device 2603 and 2605. Besides, the display panel 3901 is a single cell gap liquid crystal panel. Obviously, the single cell gap transflective LCD 4700 further includes other components, such as a gate driver, a source driver, a timing controller and a back light module. However, only components related to the present invention are sketched in the twenty-fourth exemplary embodiment for illustrating.

Since the structure of the display panel 3901 of the twenty-fourth exemplary embodiment is the same as that of the twentieth exemplary embodiment, further descriptions are omitted herein. Besides, the first sub-voltage supply device 2603 is coupled to the compensation line CL of the odd pixel $P_{11}$ of the $1^{st}$ pixel row and the compensation line CL of the even pixel $P_{22}$ of the $2^{nd}$ pixel row, so as to continuously and correspondingly provide the stable voltage(s) VS1 and/or VS2 for the compensation lines CL of the pixels $P_{11}$ and $P_{22}$. In addition, the second sub-voltage supply device 2605 is coupled to the compensation line CL of the even pixel $P_{12}$ of the 1$^{st}$ pixel row and the compensation line CL of the odd pixel $P_{21}$ of the 2$^{nd}$ pixel row, so as to continuously and correspondingly provide the stable voltage(s) VS3 and/or VS4 for the compensation lines CL of the pixels $P_{12}$ and $P_{21}$.

Specifically, the first sub-voltage supply device 2603 has a plurality of voltage supply units 2603_1 and 2603_2. When driving the display panel 3901 in a dot inversion driving method, the 1$^{st}$ voltage supply unit 2603_1 provides a stable voltage, for example, a stable voltage with a negative polarity VS1, i.e. VS− for the compensation line CL of the odd pixel $P_{11}$ of the 1$^{st}$ pixel row according to a 1$^{st}$ scan signal SS1, generally generated by the gate driver, a first clock signal CK1, and a second and a third clock signals CK2 and XCK2, wherein there is a 180 degrees phase difference between the second clock signal CK2 and the third clock signal XCK2.

Additionally, the 2$^{nd}$ voltage supply device 2603_2 provides a stable voltage, for example, a stable voltage with a negative polarity VS2, i.e. VS−, for the compensation line CL of the odd pixel $P_{21}$ the 2$^{nd}$ pixel row according to a 2$^{nd}$ scan signal SS2, the first clock signal CK1, and the second and the third clock signals CK2 and XCK2, wherein there is a 180 degrees phase difference between the second clock signal CK2 and the third clock signal XCK2. Besides, a duty cycle of the first clock signal CK1 is substantially a frame period of the single cell gap transflective LCD 4700, and duty cycles of the second and the third clock signals CK2 and XCK2 are substantially an enable period of the scan signal SS1 or SS2. Generally the enable periods of the scan signals SS1 and SS2 are the same.

In addition, the second sub-voltage supply device 2605 has a plurality of voltage supply units 2605_1 and 2605_2. When driving the display panel 3901 in the dot inversion driving method, the 1$^{st}$ voltage supply unit 2605_1 provides a stable voltage, for example, a stable voltage with a positive polarity VS3, i.e. VS+, for the compensation line CL of the even pixel $P_{12}$ of the 1$^{st}$ pixel row according to the 1$^{st}$ scan signal SS1, the first clock signal CK1, and the second and the third clock signals CK2 and XCK2, wherein there is a 180 degrees phase difference between the second clock signal CK2 and the third clock signal XCK2. Additionally, the 2$^{nd}$ voltage supply device 2605_2 provides a stable voltage, for example, a stable voltage with a positive polarity VS4, i.e. VS+, for the compensation line CL of the odd pixel $P_{21}$ the 2$^{nd}$ pixel row according to the 2$^{nd}$ scan signal SS2, the first clock signal CK1, and the second and the third clock signals CK2 and XCK2, wherein there is a 180 degrees phase difference between the second clock signal CK2 and the third clock signal XCK2.

Since the structure of the voltage supply units 2603_1, 2603_2, 2605_1 and 2605_2 of the twenty-fourth exemplary embodiment are the same as that of the eleventh exemplary embodiment, further descriptions are omitted herein.

Figure 48A:
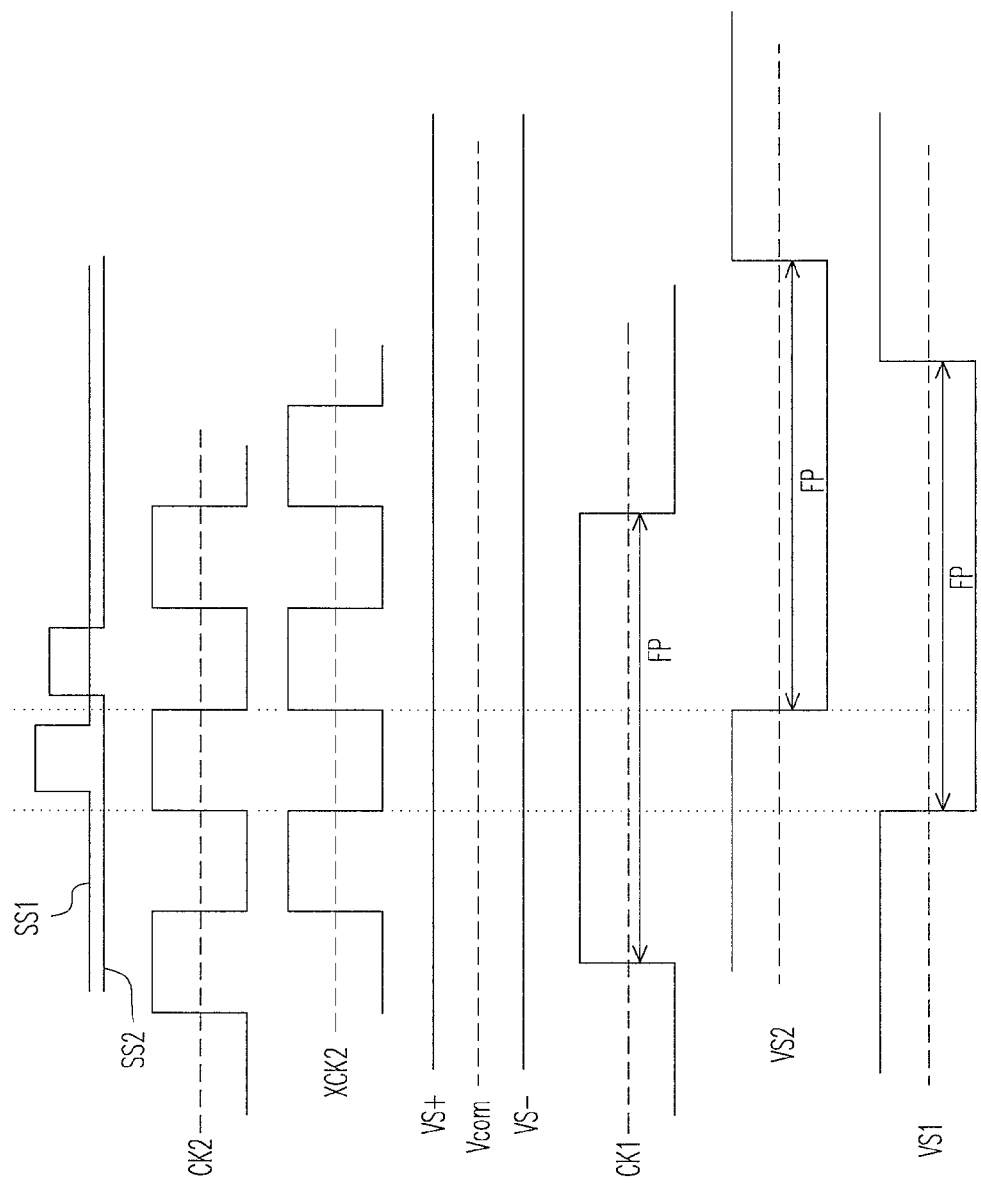

FIG. 48A is a timing diagram of the circuit operation of the voltage supply unit 2603_1 and 2603_2 according to the twenty-fourth exemplary embodiment. Referring to FIG. 27A, FIG. 27B, FIG. 47 and FIG. 48A, it can be seen from FIG. 48A that when the scan signal SS1 is enabled, the third N-type transistor $N_3$ of the voltage supply unit 2603_1 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2603_1 are turned on, and the second N-type transistor $N_2$ is turned off. As a result, the voltage supply unit 2603_1 provides the stable voltage with the negative polarity VS1, i.e. VS−, for the compensation line CL of the odd pixel $P_{11}$ of the 1$^{st}$ pixel row during a frame period FP.

Similarly, when the scan signal SS2 is enabled, the third N-type transistor $N_3$ of the voltage supply unit 2603_2 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2603_2 are turned on, and the second N-type transistor $N_2$ is turned off. As a result, the voltage supply unit 2603_2 provides the stable voltage with the negative polarity VS2, i.e. VS−, for the compensation line CL of the even pixel $P_{22}$ of the 2$^{nd}$ pixel row during the frame period FP.

FIG. 48B is a timing diagram of the circuit operation of the voltage supply units 2605_1 and 2605_2 according to the twenty-fourth exemplary embodiment. Referring to FIG. 27C, FIG. 27D, FIG. 47 and FIG. 48B, it can be seen from FIG. 48B that when the scan signal SS1 is enabled, the third N-type transistor $N_3$ of the voltage supply unit 2605_1 is turned on. Since the first and the second clock signal CK1 and CK2 are enabled and the third clock signal XCK2 is disabled at this moment, the fourth N-type transistor $N_4$ and the fifth N-type transistor $N_5$ of the voltage supply unit 2605_1 are turned on, and the second N-type transistor $N_2$ is turned off. As a result, the voltage supply unit 2605_1 provides the stable voltage with the positive polarity VS3, i.e. VS+, for the compensation line CL of the even pixel $P_{12}$ of the 1$^{st}$ pixel row during the frame period FP.

Similarly, when the scan signal SS2 is enabled, the third N-type transistor $N_3$ of the voltage supply unit 2605_2 is turned on. Since the first and the third clock signals CK1 and XCK2 are enabled, and the second clock signal XCK2 is disabled at this moment, the fourth N-type transistor $N_4$ and the fifth N-type transistor $N_5$ of the voltage supply unit 2605_2 are turned on, and the second N-type transistor $N_2$ is turned off. As a result, the voltage supply unit 2605_2 provides the stable voltage with the positive polarity VS4, i.e. VS+, for the compensation line CL of the odd pixel $P_{21}$ of the 2$^{nd}$ pixel row during the frame period FP.

Accordingly, the voltage supply device, composed of the first sub-voltage supply unit 2603 and the second sub-voltage supply unit 2605, continuously and correspondingly provides/applies the stable voltages VS1~VS4 for/in the compensation line CL of each of the pixels $P_{11}$, $P_{12}$, $P_{21}$ and $P_{22}$ to change a voltage difference of the reflective area RA of each of the pixels $P_{11}$, $P_{12}$, $P_{21}$ and $P_{22}$, so that a reflective Gamma curves of the reflective area RA of each of the pixels $P_{11}$, $P_{12}$, $P_{21}$ and $P_{22}$ can be adjusted, and the reflective Gamma curves can be matched with transparent Gamma curves of the transparent area TA. Hence, the transparent display quality and the reflective display quality of the single cell gap transflective LCD 4700 can be optimized simultaneously.

In addition, since the voltage supply device, composed of the first and the second sub-voltage supply devices 2603 and 2605, continuously and correspondingly provides/applies the stable voltages VS1~VS4 for/in the compensation line CL of each of the pixels $P_{11}$, $P_{12}$, $P_{21}$ and $P_{22}$, the voltage of the compensation line CL of each of the pixels $P_{11}$, $P_{12}$, $P_{21}$ and $P_{22}$ is not affected by the signal received by the data lines D1 and D2 through the coupling effect. Hence, the total crosstalk of the single cell gap transflective LCD 4700 can be reduced below the set specifications of the shipment, for example below 2%, but the present invention is not limited thereto.

The Twenty-Fifth Exemplary Embodiment

Figure 49:
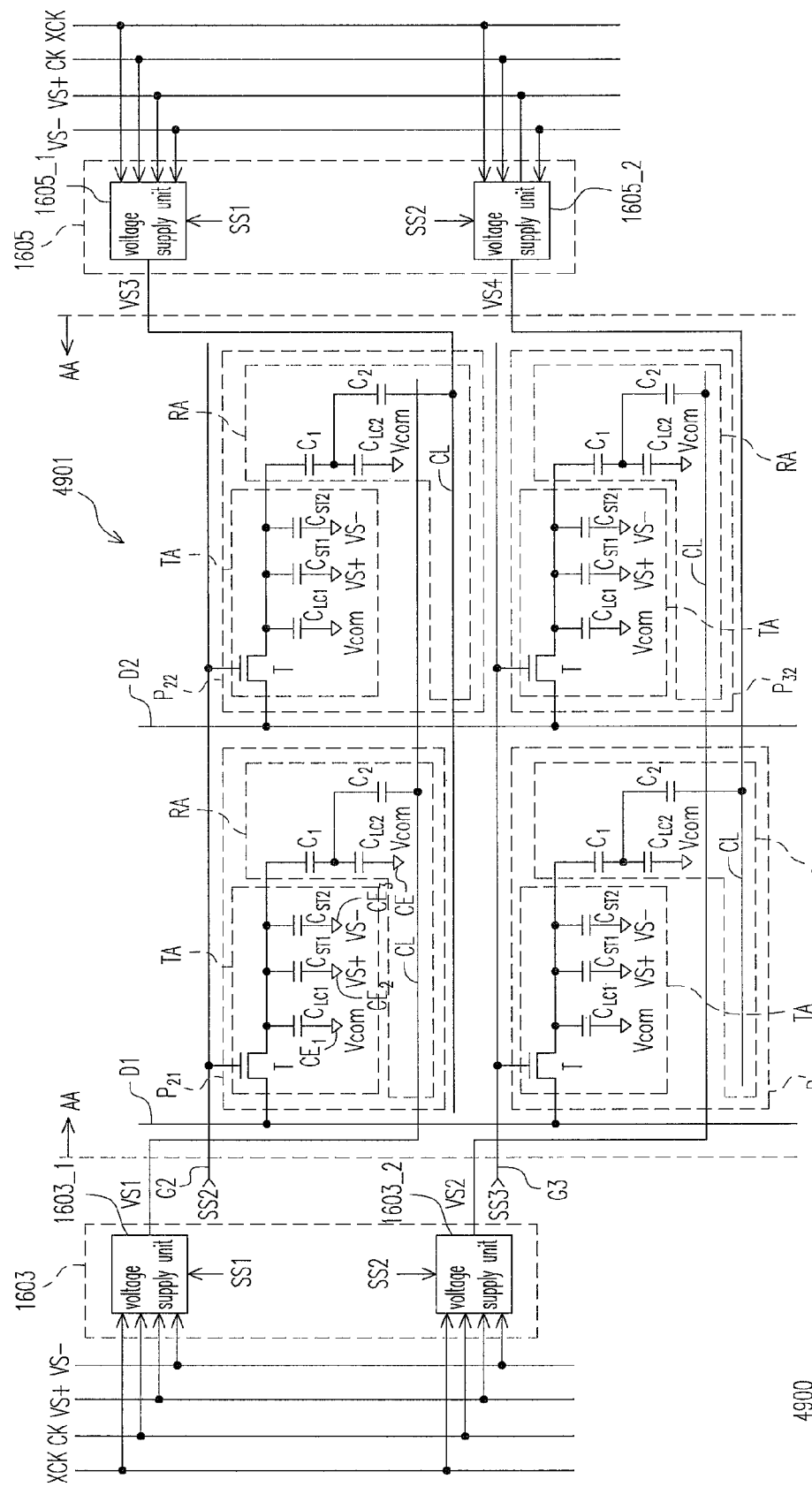
FIG. 49 is a diagram showing a partial single cell gap transflective LCD according to the twenty-fifth exemplary embodiment of the present invention.

FIG. 49 is a diagram showing a partial single cell gap transflective LCD 4900 according to the twenty-fifth exemplary embodiment of the present invention. Referring to FIG. 49, the single cell gap transflective LCD 4900 includes a display panel 4901 and a voltage supply device, wherein the voltage supply device includes a first and a second sub-voltage device 1603 and 1605. Besides, the display panel 4901 is a single cell gap liquid crystal panel. Obviously, the single cell gap transflective LCD 4900 further includes other components, such as a gate driver, a source driver, a timing controller and a back light module. However, only components related to the present invention are sketched in the twenty-fifth exemplary embodiment for illustrating.

The display panel 4901 includes a plurality of scan lines G2 and G3 (only two scan lines are shown to simplify explanations), a plurality of data lines D1 and D2 substantially perpendicularly disposed to the scan lines G2 and G3 (only two data lines are shown to simplify explanations), and a plurality of pixels $P_{21}$, $P_{22}$, $P_{31}$ and $P_{32}$ located in a display area AA of the display panel 4901 (only four pixels are shown to simplify explanations).

The pixels $P_{21}$, $P_{22}$, $P_{31}$ and $P_{32}$ are respectively electrically connected with the corresponding data line and the corresponding scan line, and are arranged in an array. For example, the pixel $P_{21}$ is respectively electrically connected with the data line D1 and the scan line G2, the pixel $P_{22}$ is respectively electrically connected with the data line D2 and the scan line G2, the pixel $P_{31}$ is respectively electrically connected with the data line D1 and the scan line G3, and the pixel $P_{32}$ is respectively electrically connected with the data line D2 and the scan line G3. In addition, the pixel $P_{21}$ represents the $1^{st}$ pixel of the $2^{nd}$ pixel row of the display panel 4901, the pixel $P_{22}$ represents the $2^{nd}$ pixel of the $2^{nd}$ pixel row of the display panel 4901, the pixel $P_{31}$ represents the $1^{st}$ pixel of the $3^{rd}$ pixel row of the display panel 4901, and the pixel $P_{32}$ represents the $2^{nd}$ pixel of the $3^{rd}$ pixel row of the display panel 4901.

Each of the pixels $P_{21}$, $P_{22}$, $P_{31}$ and $P_{32}$ includes a common line $CE_2$, an auxiliary common line $CE_3$ and a compensation line CL. The common line $CE_2$ and the auxiliary common line $CE_3$, for example, are located in a transparent area TA of each of the pixels $P_{21}$, $P_{22}$, $P_{31}$ and $P_{32}$, so as to respectively receive a stable voltage with a positive polarity VS+ and a stable voltage with a negative polarity VS−. The compensation line CL, for example, is located in a reflective area RA of each of the pixels $P_{21}$, $P_{22}$, $P_{31}$ and $P_{32}$, and the compensation line CL is used to correspondingly receive stable voltages VS1~VS4. Moreover, each of the pixels $P_{21}$, $P_{22}$, $P_{31}$ and $P_{32}$ further includes a pixel transistor T, a first liquid crystal capacitor $C_{LC1}$, a first storage capacitor $C_{ST1}$, a second storage capacitor $C_{ST2}$, a first capacitor $C_1$, a second liquid crystal capacitor $C_{LC2}$, and a second capacitor $C_2$. Since the all the pixels $P_{21}$, $P_{22}$, $P_{31}$ and $P_{32}$ are similar in structure and connection, only single pixel is used for description in the following.

Taking the pixel $P_{21}$ as an example, a gate of the pixel transistor T is coupled to the scan line G2, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the first storage capacitor $C_{ST1}$ is formed between the pixel electrode and common line $CE_2$, and the second storage capacitor $C_{ST2}$ is formed between the pixel electrode and auxiliary common line $CE_3$.

A first end of the first LC capacitor $C_{LC1}$ is coupled to the drain of the pixel transistor T and a second end of the first LC capacitor $C_{LC1}$ is coupled to the common electrode $CE_1$. A first end of the first storage capacitor $C_{ST1}$ is coupled to the drain of the pixel transistor T, and a second end of the first storage capacitor $C_{ST1}$ is coupled to the common line $CE_2$. A first end of the second storage capacitor $C_{ST2}$ is coupled to the drain of the pixel transistor T, and a second end of the second storage capacitor $C_{ST2}$ is coupled to the auxiliary common line $CE_3$. Besides, the pixel transistor T, the first liquid crystal capacitor $C_{LC1}$, the first storage capacitor $C_{ST1}$, and the second storage capacitor $C_{ST2}$ are located in the transparent area TA of the pixel $P_{21}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{21}$.

Since the structure of the voltage supply units 1603_1, 1603_2, 1605_1 and 1605_2 of the twenty-fifth exemplary embodiment are the same as that of the seventh exemplary embodiment, further descriptions are omitted herein.

In view of the above, the major difference between the twenty-fifth exemplary embodiment and the nineteenth exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 4901 of the twenty-fifth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the nineteenth exemplary embodiment. Hence, the detail operating principles of the twenty-fifth exemplary embodiment can be referred to the seventh and the nineteenth exemplary embodiments, and further descriptions are omitted herein.

The Twenty-Sixth Exemplary Embodiment

Figure 50:
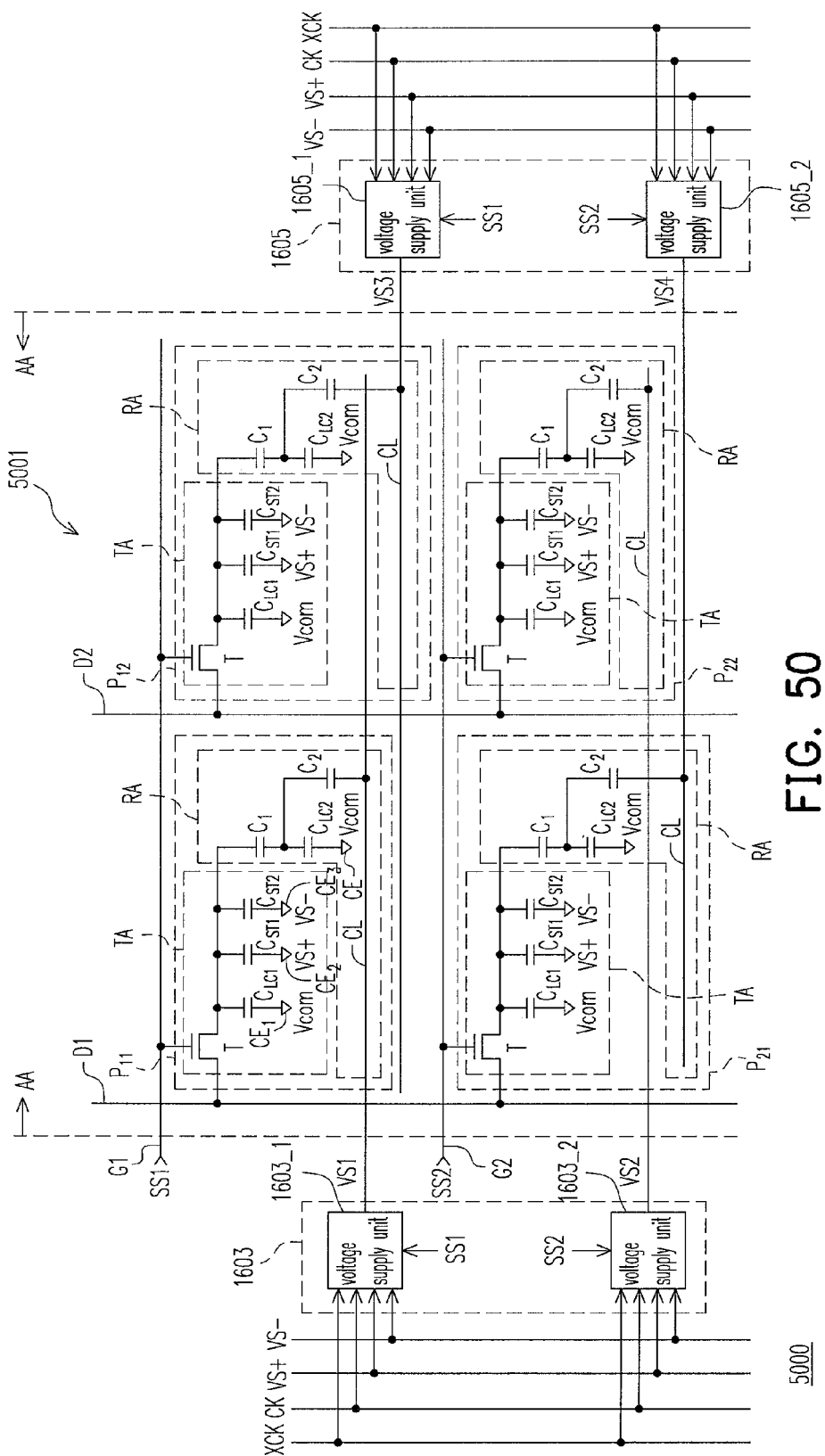
FIG. 50 is a diagram showing a partial single cell gap transflective LCD according to the twenty-sixth exemplary embodiment of the present invention.

FIG. 50 is a diagram showing a partial single cell gap transflective LCD 5000 according to the twenty-sixth exemplary embodiment of the present invention. Referring to FIG. 50, the single cell gap transflective LCD 5001 includes a display panel 5001 and a voltage supply device, wherein the voltage supply device includes a first and a second sub-voltage device 1603 and 1605. Obviously, the single cell gap transflective LCD 5000 further includes other components, such as a gate driver, a source driver, a timing controller and a back light module. However, only components related to the present invention are sketched in the twenty-sixth exemplary embodiment for illustrating.

The display panel 5001 includes a plurality of scan lines G1 and G2 (only two scan lines are shown to simplify explanations), a plurality of data lines D1 and D2 substantially perpendicularly disposed to the scan lines G1 and G2 (only two data lines are shown to simplify explanations), and a plurality of pixels $P_{11}$, $P_{12}$, $P_{21}$ and $P_{22}$ located in a display area AA of the display panel 5001 (only four pixels are shown to simplify explanations).

The pixels $P_{11}$, $P_{12}$, $P_{21}$ and $P_{22}$ are respectively electrically connected with the corresponding data line and the corresponding scan line, and are arranged in an array. For example, the pixel $P_{11}$ is respectively electrically connected with the data line D1 and the scan line G1, the pixel $P_{12}$ is respectively electrically connected with the data line D2 and the scan line G1, the pixel $P_{21}$ is respectively electrically connected with the data line D1 and the scan line G2, and the pixel $P_{22}$ is respectively electrically connected with the data line D2 and the scan line G2. In addition, the pixel $P_{11}$ represents the $1^{st}$ pixel of the $1^{st}$ pixel row of the display panel 5001, the pixel $P_{12}$ represents the $2^{nd}$ pixel of the $1^{st}$ pixel row of the display panel 5001, the pixel $P_{21}$ represents the $2^{nd}$ pixel of the $1^{st}$ pixel row of the display panel 5001, and the pixel $P_{22}$ represents the $2^{nd}$ pixel of the $2^{nd}$ pixel row of the display panel 5001.

Each of the pixels $P_{21}$, $P_{22}$, $P_{31}$ and $P_{32}$ includes a common line $CE_2$, an auxiliary common line $CE_3$ and a compensation line CL. The common line $CE_2$ and the auxiliary common line $CE_3$, for example, are located in a transparent area TA of each of the pixels $P_{21}$, $P_{22}$, $P_{31}$ and $P_{32}$, so as to respectively receive a stable voltage with a positive polarity VS+ and a stable voltage with a negative polarity VS−. The compensation line CL, for example, is located in a reflective area RA of each of the pixels $P_{11}$, $P_{12}$, $P_{21}$ and $P_{22}$, and the compensation line CL is used to correspondingly receive stable voltages VS1~VS4. Moreover, each of the pixels $P_{11}$, $P_{12}$, $P_{21}$ and $P_{22}$ further includes a pixel transistor T, a first liquid crystal capacitor $C_{LC1}$, a first storage capacitor $C_{ST1}$, a second storage capacitor $C_{ST2}$, a first capacitor $C_1$, a second liquid crystal capacitor $C_{LC2}$, and a second capacitor $C_2$. Since the all the pixels $P_{11}$, $P_{12}$, $P_{21}$ and $P_{22}$ are similar in structure and in connection, only single pixel is used for description in the following.

Taking the pixel $P_{11}$ as an example, a gate of the pixel transistor T is coupled to the scan line G1, and a source of the pixel transistor T is coupled to the data line D1. In general, the first liquid crystal capacitor $C_{LC1}$ is formed between a pixel electrode and a common electrode $CE_1$, wherein a drain of the pixel transistor T is electrically connected with the pixel electrode and the common electrode $CE_1$ is used to receive the common voltage Vcom. In addition, the first storage capacitor $C_{ST1}$ is formed between the pixel electrode and common line $CE_2$, and the second storage capacitor $C_{ST2}$ is formed between the pixel electrode and the auxiliary common line $CE_3$.

A first end of the first LC capacitor $C_{LC1}$ is coupled to the drain of the pixel transistor T and a second end of the first LC capacitor $C_{LC1}$ is coupled to the common electrode $CE_1$. A first end of the first storage capacitor $C_{ST1}$ is coupled to the drain of the pixel transistor T, and a second end of the first storage capacitor $C_{ST1}$ is coupled to the common line $CE_2$. A first end of the second storage capacitor $C_{ST2}$ is coupled to the drain of the pixel transistor T, and a second end of the second storage capacitor $C_{ST2}$ is coupled to the auxiliary common line $CE_3$. Besides, the pixel transistor T, the first liquid crystal capacitor $C_{LC1}$, the first storage capacitor $C_{ST1}$, and the second storage capacitor $C_{ST2}$ are located in the transparent area TA of the pixel $P_{11}$.

In addition, a first end of the first capacitor $C_1$ is coupled to the drain of the pixel transistor T. A first end of the second LC capacitor $C_{LC2}$ is coupled to a second end of the first capacitor $C_1$, and the second end of the second LC capacitor $C_{LC2}$ is coupled to the common electrode $CE_1$. A first end of the second capacitor $C_2$ is coupled to the second end of the first capacitor $C_1$, and a second end of the second capacitor $C_2$ is coupled to the compensation line CL. In addition, the first transistor $C_1$, the second LC capacitor $C_{LC2}$ and the second capacitor $C_2$ are located in the reflective area RA of the pixel $P_{11}$.

Since the structure of the voltage supply units 1603_1, 1603_2, 1605_1 and 1605_2 of the twenty-sixth exemplary embodiment are the same as that of the seventh exemplary embodiment, further descriptions are omitted herein.

In view of the above, the major difference between the twenty-sixth exemplary embodiment and the twentieth exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 5001 of the twenty-sixth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the twentieth exemplary embodiment. Hence, the detail operating principles of the twenty-sixth exemplary embodiment can refer to both the seventh and the twentieth exemplary embodiments, and further descriptions are omitted herein.

The Twenty-Seventh Exemplary Embodiment

Figure 51:
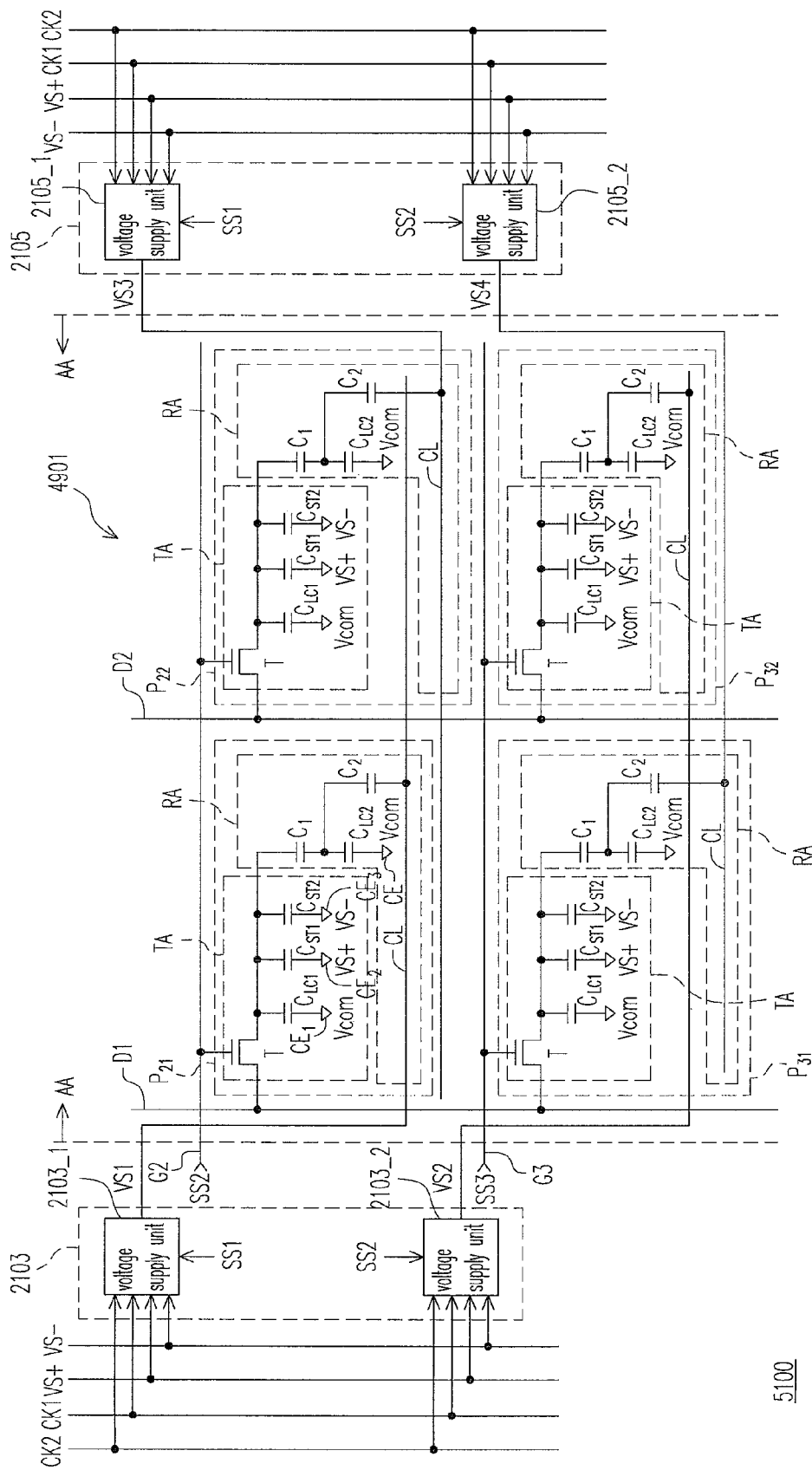
FIG. 51 is a diagram showing a partial single cell gap transflective LCD according to the twenty-seventh exemplary embodiment of the present invention.

FIG. 51 is a diagram showing a partial single cell gap transflective LCD 5100 according to the twenty-seventh exemplary embodiment of the present invention. Referring to FIG. 51, the single cell gap transflective LCD 5100 includes a display panel 4901 and a voltage supply device, wherein the voltage supply device includes a first and a second sub-voltage device 2103 and 2105. Besides, the display panel 4901 is a single cell gap liquid crystal panel. Obviously, the single cell gap transflective LCD 5100 further includes other components, such as a gate driver, a source driver, a timing controller and a back light module. However, only components related to the present invention are sketched in the twenty-seventh exemplary embodiment for illustrating.

Since the structure of the display panel 4901 of the twenty-seventh exemplary embodiment is the same as that of the twenty-fifth exemplary embodiment, further descriptions are omitted herein. Since the structure of the voltage supply units 2103_1, 2103_2, 2105_1 and 2105_2 of the twenty-sixth exemplary embodiment are the same as that of the ninth exemplary embodiment, further descriptions are omitted herein.

In view of the above, the major difference between the twenty-sixth exemplary embodiment and the twenty-first exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 4901 of the twenty-sixth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the twenty-first exemplary embodiment. Hence, the detail operating principles of the twenty-seventh exemplary embodiment can refer to both the ninth and the twenty-first exemplary embodiments, and further descriptions are omitted herein.

The Twenty-Eighth Exemplary Embodiment

Figure 52:
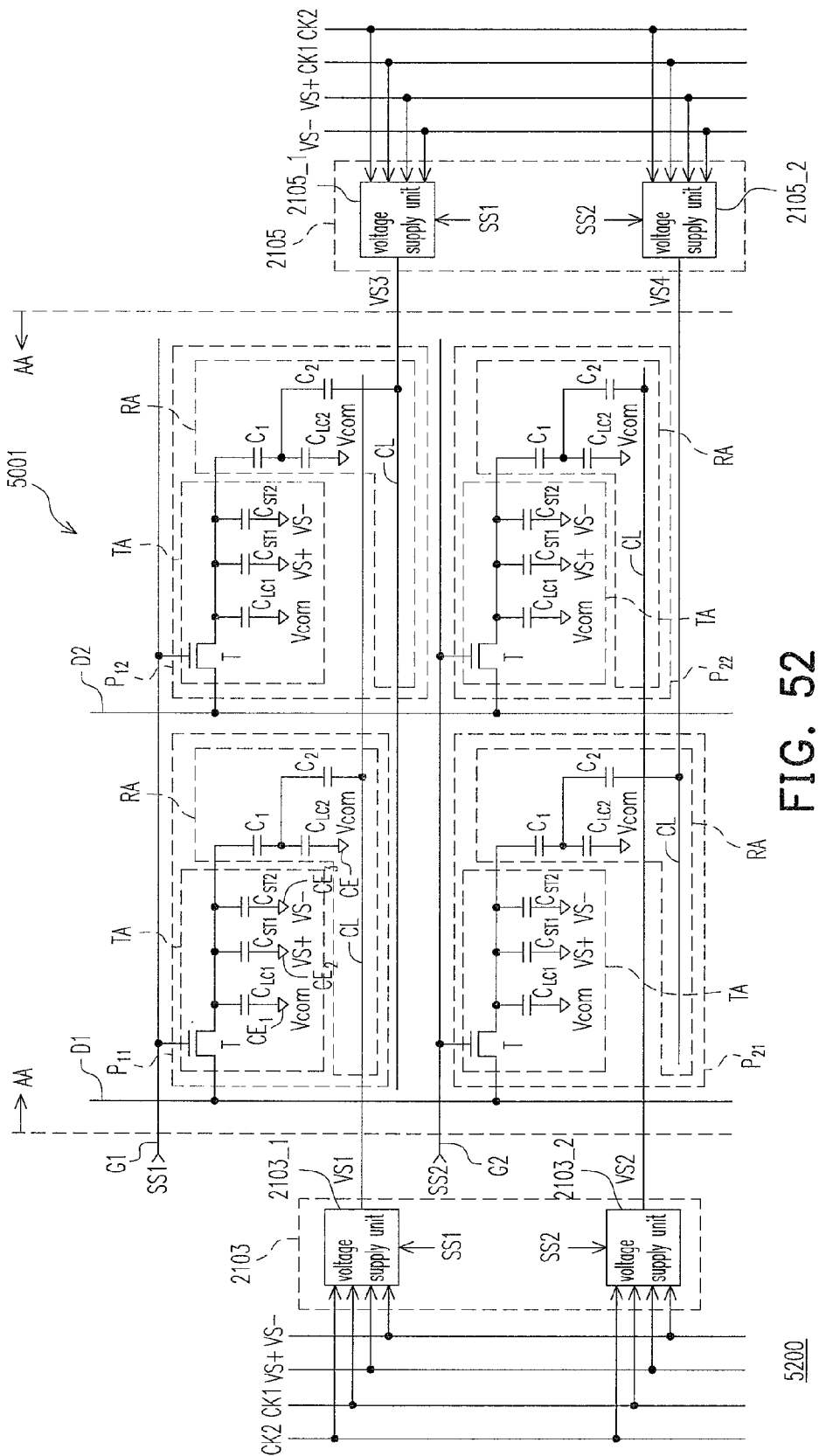
FIG. 52 is a diagram showing a partial single cell gap transflective LCD according to the twenty-eighth exemplary embodiment of the present invention.

FIG. 52 is a diagram showing a partial single cell gap transflective LCD 5200 according to the twenty-eighth exemplary embodiment of the present invention. Referring to FIG. 52, the single cell gap transflective LCD 5200 includes a display panel 5001 and a voltage supply device, wherein the voltage supply device includes a first and a second sub-voltage device 2103 and 2105. Besides, the display panel 5001 is a single cell gap liquid crystal panel. Obviously, the single cell gap transflective LCD 5200 further includes other components, such as a gate driver, a source driver, a timing controller and a back light module. However, only components related to the present invention are sketched in the twenty-eighth exemplary embodiment for illustrating.

Since the structure of the display panel 5001 of the twenty-eighth exemplary embodiment is the same as that of the twenty-sixth exemplary embodiment, further descriptions are omitted herein. Since the structure of the voltage supply units 2103_1, 2103_2, 2105_1 and 2105_2 of the twenty-eighth exemplary embodiment are the same as that of the ninth exemplary embodiment, further descriptions are omitted herein.

In view of the above, the major difference between the twenty-eighth exemplary embodiment and the twenty-second exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 5001 of the twenty-eighth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the twenty-second exemplary embodiment. Hence, the detail operating principles of the twenty-eighth exemplary embodiment can be referred to both the ninth, the tenth and the twenty-second exemplary embodiments, and further descriptions are omitted herein.

The Twenty-Ninth Exemplary Embodiment

Figure 53:
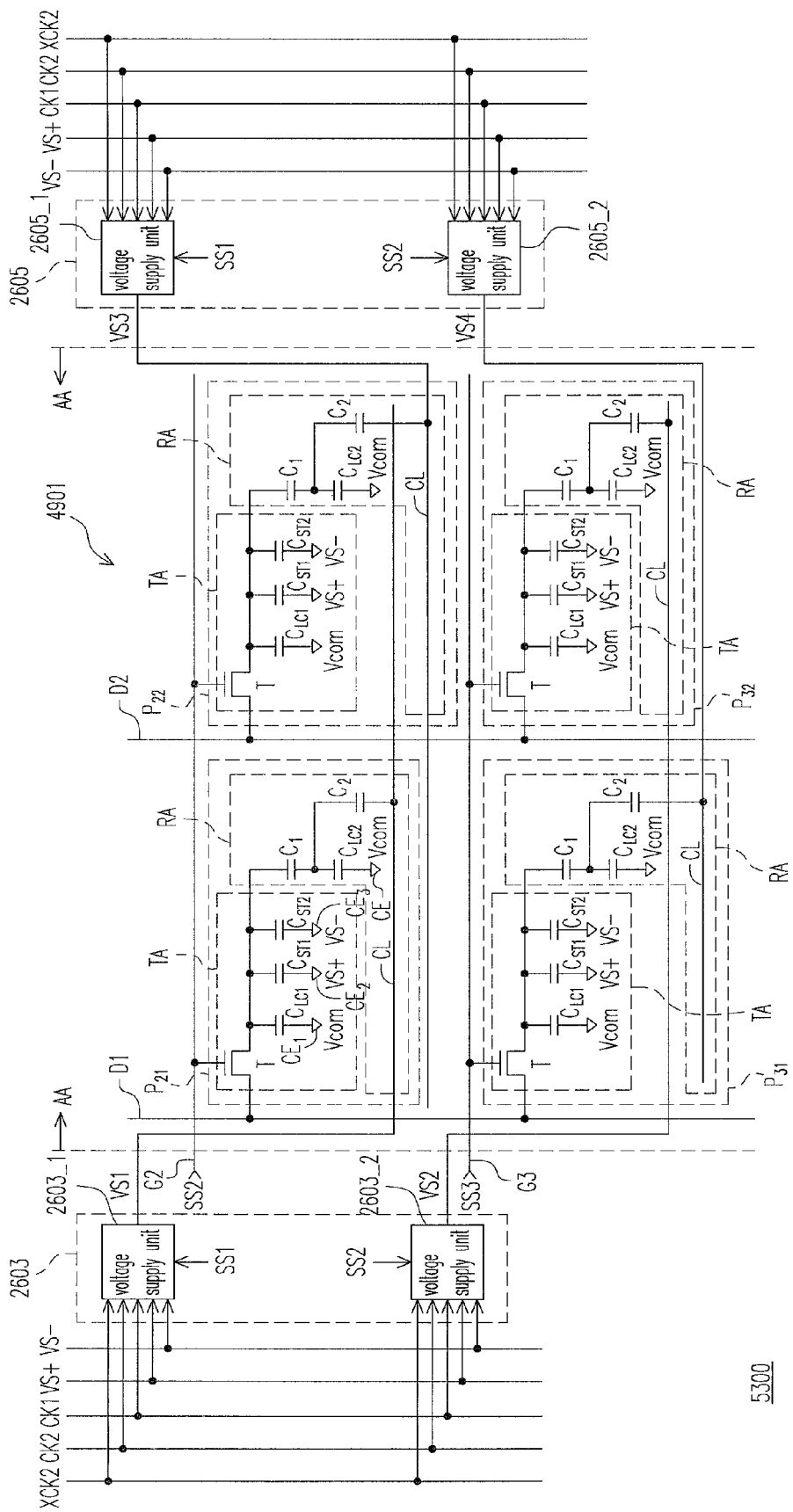
FIG. 53 is a diagram showing a partial single cell gap transflective LCD according to the twenty-ninth exemplary embodiment of the present invention.

FIG. 53 is a diagram showing a partial single cell gap transflective LCD 5300 according to the twenty-ninth exemplary embodiment of the present invention. Referring to FIG. 53, the single cell gap transflective LCD 5300 includes a display panel 4901 and a voltage supply device, wherein the voltage supply device includes a first and a second sub-voltage device 2603 and 2605. Besides, the display panel 4901 is a single cell gap liquid crystal panel. Obviously, the single cell gap transflective LCD 5300 further includes other components, such as a gate driver, a source driver, a timing controller and a back light module. However, only components related to the present invention are sketched in the twenty-ninth exemplary embodiment for illustrating.

Since the structure of the display panel 4901 of the twenty-ninth exemplary embodiment is the same as that of the twenty-fifth exemplary embodiment, further descriptions are omitted herein. Since the structure of the voltage supply units 2603_1, 2603_2, 2605_1 and 2605_2 of the twenty-ninth exemplary embodiment are the same as that of the eleventh exemplary embodiment, further descriptions are omitted herein.

In view of the above, the major difference between the twenty-ninth exemplary embodiment and the twenty-third exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 4901 of the twenty-ninth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the twenty-third exemplary embodiment. Hence, the detail operating principles of the twenty-ninth exemplary embodiment can be referred to both the eleventh and the twenty-third exemplary embodiments, and further descriptions are omitted herein.

The Thirtieth Exemplary Embodiment

Figure 54:
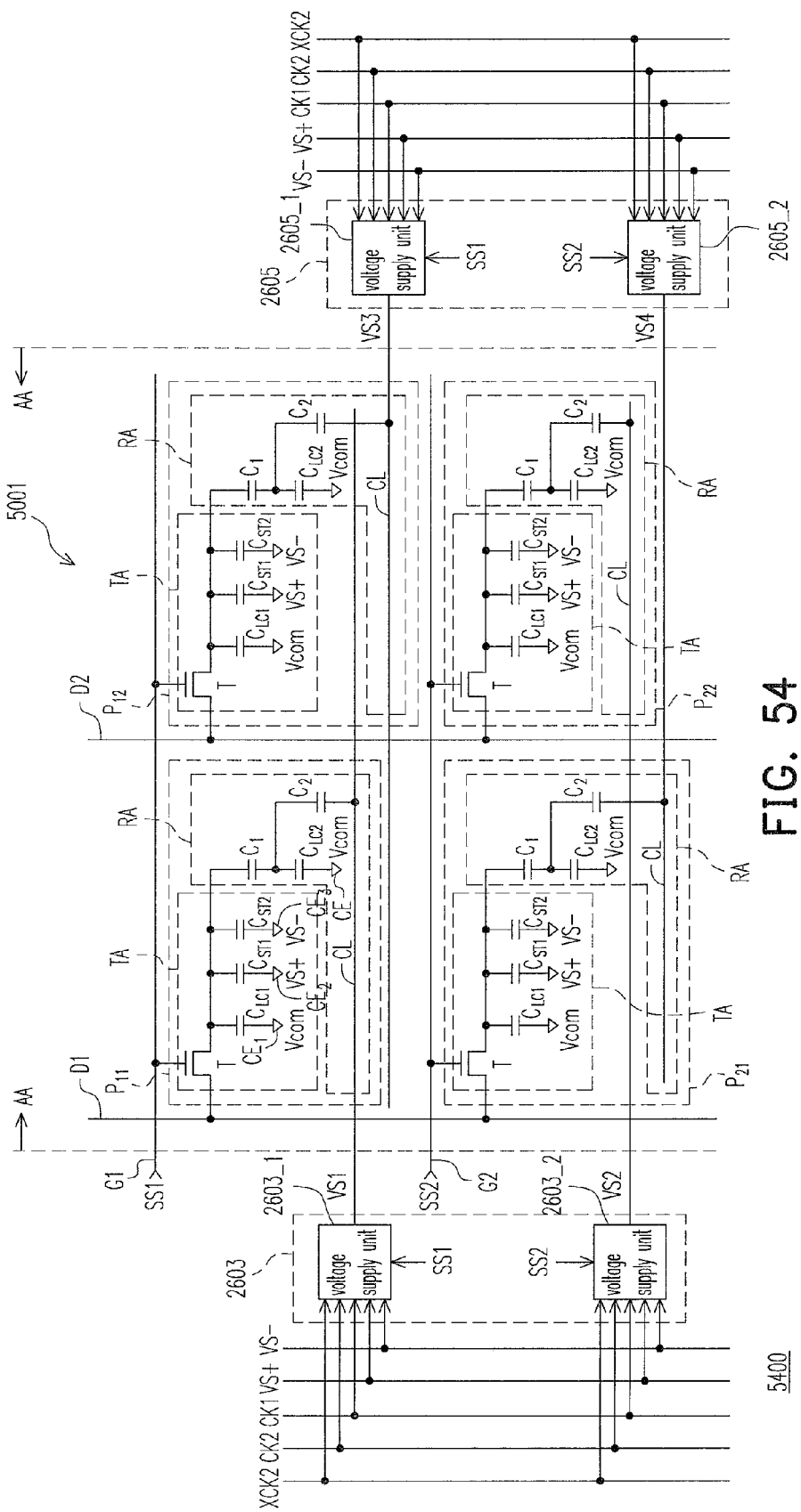
FIG. 54 is a diagram showing a partial single cell gap transflective LCD according to the thirtieth exemplary embodiment of the present invention.

FIG. 54 is a diagram showing a partial single cell gap transflective LCD 5400 according to the thirtieth exemplary embodiment of the present invention. Referring to FIG. 54, the single cell gap transflective LCD 5400 includes a display panel 5001 and a voltage supply device, wherein the voltage supply device includes a first and a second sub-voltage device 2603 and 2605. Besides, the display panel 5001 is a single cell gap liquid crystal panel. Obviously, the single cell gap transflective LCD 5400 further includes other components, such as a gate driver, a source driver, a timing controller and a back light module. However, only components related to the present invention are sketched in the thirtieth exemplary embodiment for illustrating.

Since the structure of the display panel 5001 of the thirtieth exemplary embodiment is the same as that of the twenty-sixth exemplary embodiment, further descriptions are omitted herein. Since the structure of the voltage supply units 2603_1, 2603_2, 2605_1 and 2605_2 of the thirtieth exemplary embodiment are the same as that of the eleventh exemplary embodiment, further descriptions are omitted herein.

In view of the above, the major difference between the thirtieth exemplary embodiment and the twenty-fourth exemplary embodiment is that there are two storage capacitors $C_{ST1}$ and $C_{ST2}$ in the transparent area TA of each of the pixels $P_{21}$, $P_{22}$, $P_{31}$ and $P_{32}$ of the display panel 5001 of the thirtieth exemplary embodiment. Besides, a second end of the storage capacitors $C_{ST1}$ and $C_{ST2}$ respectively receives a stable voltage with a positive polarity VS+ and a stable voltage with the positive polarity VS−. Otherwise, others are the same as that of the twenty-fourth exemplary embodiment. Hence, the detail operating principles of the thirtieth exemplary embodiment can be referred to both the eleventh, the twelfth and the twenty-fourth exemplary embodiments, and further descriptions are omitted herein.

Each of the above-mentioned exemplary embodiments is illustrated with a 2*2 pixel matrix. However, people of ordinary skill in the art can easily derive more than 2*2 pixel matrix of the implementation from the disclosure of the present invention, and the description of such details will not be illustrated herein again.

Besides, although the voltage supply units of each of the aforementioned embodiments are illustrated with the N-type transistor, the invention is not limited to these examples. Namely, the voltage supply units can be implemented with P-type transistors allowed by the fabricating process, and accompanied with adjustments of a corresponding gate control signal and a source receiving signal according to necessity of design, so that the voltage supply units can provide the above-mentioned function. Such a modified device also belongs to the protection range of the present invention.

Moreover, although the voltage supply units of each of the aforementioned embodiments are applied to the single cell gap transflective LCD, the voltage supply units can be applied to other types of LCD. Such a modified device also belongs to the protection range of the present invention.

According to the above descriptions, the exemplary embodiments of the present invention use the voltage supply device to continuously and correspondingly provide the stable voltage (so called the fixed voltage) to the compensation line of each of the pixels in a reflective area, so as to change a voltage difference among each of the pixels in the reflective area. Hence, reflective Gamma curves of the reflective area of each of pixels can be adjusted, so that the reflective Gamma curves can be matched with transparent Gamma curves of the transparent area of each of pixels. As a result, the transparent display quality and the reflective display quality of the single cell gap transflective LCD can be optimized simultaneously.

In addition, since the voltage supply device continuously and correspondingly provides/applies the stable voltage for/in the compensation line of each of the pixels, the voltage of the compensation line of each of the pixels is not affected by the signal received by the data lines D1 and D2 through the coupling effect. Hence, the total cross-talk of the single cell gap transflective LCD can be reduced below the set specifications of the shipment. Although each of the exemplary embodiments is exemplified by the transflective LCD, the application of the present invention is not limited thereto. The main components of the exemplary embodiment of the present invention can be also applied to a transparent LCD or a reflective LCD, so as to improve the color washout phenomenon. In addition, the voltage supply device can be fabricated by the method of gate on array, so that the voltage supply device can be integrated with the components in the display area AA of the display panel 101, so it can have an advantage of good space utilization.

Although the present invention has been described with reference to the above exemplary embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display (LCD) comprising:
a display panel comprising:
a plurality of scan lines;
a plurality of data lines, substantially perpendicularly disposed with the scan lines;
a plurality of pixels arranged in an array, respectively electrically connected with corresponding data line and the corresponding scan line, each of the pixels comprising:
a common line for receiving a common voltage; and
a compensation line for receiving a stable voltage; and
a voltage supply device, coupled to the compensation line of each of the pixels, for continuously and correspondingly providing the stable voltage to the compensation line of each of the pixels,
wherein each of the pixels of the $i^{th}$ pixel row further comprises:
a pixel transistor, having a gate coupled to the $i^{th}$ scan line and a source coupled to the $i^{th}$ data line, where i is a positive integer;
a first liquid crystal capacitor, having a first end coupled to a drain of the pixel transistor and a second end coupled to a common electrode;
a first storage capacitor, having a first end coupled to the drain of the pixel transistor and a second end coupled to the common line;
a first capacitor having a first end coupled to the drain of the pixel transistor;
a second liquid crystal capacitor, having a first end coupled to a second end of the first capacitor and a second end coupled to the common electrode; and
a second capacitor, having a first end coupled to the second end of the first capacitor and a second end coupled to the compensation line,
wherein the pixel transistor, the first liquid crystal capacitor and the first storage capacitor are located in a transparent area,
wherein the first capacitor, the second liquid crystal capacitor and the second capacitor are located in a reflective area.

2. The LCD according to claim 1, wherein the $i^{th}$ voltage supply unit provides the stable voltage with a positive polarity or a negative polarity to the compensation line of each of the pixels of the $i^{th}$ or the $(i+1)^{th}$ pixel row according to a corresponding scan signal and a first and a second clock signals, wherein there is a 180 degrees phase difference between the first clock signal and the second clock signal,
wherein duty cycles of the first and the second clock signals are substantially an enable period of the corresponding scan signal.

3. The LCD according to claim 2, wherein the $i^{th}$ voltage supply unit comprises:
a first N-type transistor, having a gate coupled to the $i^{th}$ scan line to receive the corresponding scan signal and a source receiving the first clock signal;
a third capacitor, having a first end coupled to a drain of the first N-type transistor and a second end coupled the common line;
a second N-type transistor, having a gate coupled to the drain of the first N-type transistor, a source receiving the stable voltage with the positive polarity and a drain coupled to the compensation line of each of the pixels of the $i^{th}$ or the $(i+1)^{th}$ pixel row;
a third N-type transistor, having a gate coupled to the $i^{th}$ scan line to receive the corresponding scan signal and a source receiving the second clock signal;
a fourth capacitor, having a first end coupled to a drain of the third N-type transistor and a second end coupled to the common line; and
a fourth N-type transistor having a gate coupled to the drain of the third N-type transistor, a source receiving the stable voltage with the negative polarity and a drain coupled to the compensation line of each of the pixels of the $i^{th}$ or the $(i+1)^{th}$ pixel row.

4. The LCD according to claim 1, wherein the $i^{th}$ voltage supply unit provides the stable voltage with a positive polarity or a negative polarity to the compensation line of each of the pixels of the $i^{th}$ or the $(i+1)^{th}$ pixel row according to a corresponding scan signal, a first clock signal and a second clock signal.

5. The LCD according to claim 4, wherein a duty cycle of the first clock signal is substantially an enable period of the corresponding scan line, while the second clock signal is maintained enabled.

6. The LCD according to claim 4, wherein the $i^{th}$ voltage supply unit comprises:
a first N-type transistor, having a gate and a source both coupled with each other to receive the second clock signal;
a second N-type transistor, having a gate coupled to a drain of the first N-type transistor, a source receiving the stable voltage with the positive polarity, and a drain coupled to the compensation line of each of the pixels of the $i^{th}$ or the $(i+1)^{th}$ pixel row;
a third N-type transistor, having a gate coupled to the $i^{th}$ scan line to receive the corresponding scan signal and a source receiving the first clock signal;
a third capacitor, having a first end coupled to a drain of the third N-type transistor and a second end coupled the common line;
a fourth N-type transistor, having a gate coupled to the drain of the third N-type transistor, a source receiving the stable voltage with the negative polarity and a drain coupled to the gate of the second N-type transistor; and
a fifth N-type transistor, having a gate coupled to the drain of the third N-type transistor, a source receiving the stable voltage with the negative polarity, and a drain coupled to the compensation line of each of the pixels of the $i^{th}$ or the $(i+1)^{th}$ pixel row, wherein the $i^{th}$ voltage supply unit further provides the stable voltage with the positive polarity or the negative polarity to the compensation line of each of the pixels of the $i^{th}$ or the $(i+1)^{th}$ pixel row according to the corresponding scan signal, the first clock signal, and the second and a third clock signals, wherein there is a 180 degrees phase difference between the second clock signal and the third clock signal.

7. The LCD according to claim 1, wherein the $i^{th}$ first voltage supply unit provides the stable voltage with a positive polarity to the compensation line of all odd pixels of the $i^{th}$ or the $(i+1)^{th}$ pixel row according to a corresponding scan signal and a first and a second clock signals, wherein there is a 180 degrees phase difference between the first clock signal and the second clock signal; and a second sub-voltage supply device, including a plurality of second voltage supply units, wherein the $i^{th}$ second voltage supply unit provides the stable voltage with a negative polarity to the compensation line of all even pixels of the $i^{th}$ or the $(i+1)^{th}$ pixel row according to the corresponding scan signal, and the first and the second clock signals, wherein there is a 180 degrees phase difference between the first clock signal and the second clock signal, wherein duty cycles of the first and the second clock signals are substantially a frame period of the LCD.

8. The LCD according to claim 7, wherein the $i^{th}$ first voltage supply unit comprises:

a first N-type transistor, having a gate coupled to the $i^{th}$ scan line to receive the corresponding scan signal and a source receiving the first clock signal;

a third capacitor, having a first end coupled to a drain of the first N-type transistor and a second end coupled to the common electrode;

a second N-type transistor, having a gate coupled to the drain of the first N-type transistor, a source receiving the stable voltage with the positive polarity and a drain coupled to the compensation line of all odd pixels of the $i^{th}$ or the $(i+1)^{th}$ pixel row;

a third N-type transistor, having a gate coupled to the $i^{th}$ scan line to receive the corresponding scan signal and a source receiving the second clock signal;

a fourth capacitor, having a first end coupled to a drain of the third N-type transistor and a second end coupled to the common line; and a fourth N-type transistor, having a gate coupled to the drain of the third N-type transistor, a source receiving the stable voltage with the negative polarity and a drain coupled to the compensation line of all odd pixels of the $i^{th}$ or the $(i+1)^{th}$ pixel row.

9. The LCD according to claim 7, wherein the $i^{th}$ second voltage supply unit comprises:

a first N-type transistor, having a gate coupled to the $i^{th}$ scan line to receive the corresponding scan signal and a source receiving the first clock signal;

a third capacitor, having a first end coupled to a drain of the first N-type transistor and a second end coupled to the common line;

a second N-type transistor, having a gate coupled to the drain of the first N-type transistor, a source receiving the stable voltage with the negative polarity and a drain coupled to the compensation line of all even pixels of the $i^{th}$ or the $(i+1)^{th}$ pixel row;

a third N-type transistor, having a gate coupled to the $i^{th}$ scan line to receive the corresponding scan signal and a source receiving the second clock signal;

a fourth capacitor, having a first end coupled to a drain of the third N-type transistor and a second end coupled to the common line; and a fourth N-type transistor, having a gate coupled to the drain of the third N-type transistor, a source receiving the stable voltage with the positive polarity and a drain coupled to the compensation line of all even pixels of the $i^{th}$ or the $(i+1)^{th}$ pixel row.

10. The LCD according to claim 1, wherein the $i^{th}$ first voltage supply unit provides the stable voltage with a positive polarity to the compensation line of all odd pixels of the $i^{th}$ or the $(i+1)^{th}$ pixel row according to a corresponding scan signal, a first clock signal and a second clock signal; and wherein the $i^{th}$ second voltage supply unit provides the stable voltage with a negative polarity to the compensation line of all even pixels of the $i^{th}$ or the $(i+1)^{th}$ pixel row according to the corresponding scan signal, the first clock signal and the second clock signal.

11. The LCD according to claim 10, wherein a duty cycle of the first clock signal is substantially a frame period of the LCD, while the second clock signal is maintained enabled.

12. The LCD according to claim 10, wherein the $i^{th}$ first voltage supply unit comprises:

a first N-type transistor, having a gate and a source both coupled with each other to receive the second clock signal;

a second N-type transistor, having a gate coupled to a drain of the first N-type transistor, a source receiving the stable voltage with the positive polarity and a drain coupled to the compensation line of all odd pixels of the $i^{th}$ or the $(i+1)^{th}$ pixel row;

a third N-type transistor, having a gate coupled to the $i^{th}$ scan line to receive the corresponding scan signal, and a source receiving the first clock signal;

a third capacitor, having a first end coupled to a drain of the third N-type transistor and a second end coupled to the common line;

a fourth N-type transistor, having a gate coupled to the drain of the third N-type transistor, a source receiving the stable voltage with the negative polarity and a drain coupled to the gate of the second N-type transistor; and a fifth N-type transistor, having a gate coupled to the drain of the third N-type transistor, a source receiving the stable voltage with the negative polarity and a drain coupled to the compensation line of all odd pixels of the $i^{th}$ or the $(i+1)^{th}$ pixel row, wherein the $i^{th}$ first voltage supply unit further provides the stable voltage with the positive polarity to the compensation line of all odd pixels of the $i^{th}$ or the $(i+1)^{th}$ pixel row according to the corresponding scan signal, the first clock signal, and the second and a third clock signals, wherein there is a 180 degrees phase difference between the second clock signal and the third clock signal.

13. The LCD according to claim 10, wherein the $i^{th}$ second voltage supply unit comprises:

a first N-type transistor, having a gate and a source both coupled with each other to receive the second clock signal;

a second N-type transistor, having a gate coupled to a drain of the first N-type transistor, a source receiving the stable voltage with the negative polarity, and a drain coupled to the compensation line of all even pixels of the $i^{th}$ or the $(i+1)^{th}$ pixel row;

a third N-type transistor, having a gate coupled to the $i^{th}$ scan line to receive the corresponding scan signal and a source receiving the first clock signal;

a third capacitor, having a first end coupled to a drain of the third N-type transistor and a second end coupled to the common line;

a fourth N-type transistor, having a gate coupled to the drain of the third N-type transistor, a source receiving the stable voltage with the negative polarity and a drain coupled to the gate of the second N-type transistor;

a fifth N-type transistor, having a gate coupled to the drain of the third N-type transistor, a source receiving the stable voltage with the positive polarity and a drain coupled to the compensation line of all even pixels of the $i^{th}$ or the $(i+1)^{th}$ pixel row, wherein the $i^{th}$ second voltage supply unit further provides the stable voltage with the negative polarity to the compensation line of all even pixels of the $i^{th}$ or the $(i+1)^{th}$ pixel row according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and a sixth N-type transistor, having a gate and a source both coupled with each other to receive the third clock signal and a drain coupled to the drain of the first N-type transistor.

14. The LCD according to claim 1,
wherein
the $i^{th}$ first voltage supply unit provides the stable voltage with a positive polarity to the compensation line of all odd pixels of the $i^{th}$ or the $(i+1)^{th}$ pixel row according to a corresponding scan signal, and a first and a second clock signals, wherein there is a 180 degrees phase difference between the first clock signal and the second clock signal; and the $(i+1)^{th}$ first voltage supply unit provides the stable voltage with the positive polarity to the compensation line of all even pixels of the $(i+1)^{th}$ or the $(i+2)^{th}$ pixel row according to another corresponding scan signal, and the first and the second clock signals, wherein there is a 180 degrees phase difference between the first clock signal and the second clock signal; and wherein
the $i^{th}$ second voltage supply unit provides the stable voltage with a negative polarity to the compensation line of all even pixels of the $i^{th}$ or the $(i+1)^{th}$ pixel row according to the corresponding scan signal, and the first and the second clock signals, wherein there is a 180 degrees phase difference between the first clock signal and the second clock signal; and the $(i+1)^{th}$ second voltage supply unit provides the stable voltage with the negative polarity to the compensation line of all odd pixels of the $(i+1)^{th}$ or the $(i+2)^{th}$ pixel row according to the another corresponding scan signal, and the first and the second clock signals, wherein there is a 180 degrees phase difference between the first clock signal and the second clock signal, wherein duty cycles of the first and the second clock signals are substantially a frame period of the LCD.

15. The LCD according to claim 14, wherein the $i^{th}$ first voltage supply unit comprises:

a first N-type transistor, having a gate coupled to the $i^{th}$ scan line to receive the corresponding scan signal and a source receiving the first clock signal;

a third capacitor, having a first end coupled to a drain of the first N-type transistor and a second end coupled to the common line;

a second N-type transistor, having a gate coupled to the drain of the first N-type transistor, a source receiving the stable voltage with the positive polarity, and a drain coupled to the compensation line of all odd pixels of the $i^{th}$ or the $(i+1)^{th}$ pixel row;

a third N-type transistor, having a gate coupled to the $i^{th}$ scan line to receive the corresponding scan signal and a source receiving the second clock signal;

a fourth capacitor, having a first end coupled to a drain of the third N-type transistor and a second end coupled to the common line; and a fourth N-type transistor, having a gate coupled to a drain of the third N-type transistor, a source receiving the stable voltage with the negative polarity and a drain coupled to the compensation line of all odd pixels of the $i^{th}$ or the $(i+1)^{th}$ pixel row.

16. The LCD according to claim 14, wherein the $(i+1)^{th}$ first voltage supply unit comprises:

a first N-type transistor, having a gate coupled to the $(i+1)^{th}$ scan line to receive the another corresponding scan signal and a source receiving the first clock signal;

a third capacitor, having a first end coupled to a drain of the first N-type transistor and a second end coupled to the common line;

a second N-type transistor, having a gate coupled to the drain of the first N-type transistor, a source receiving the stable voltage with the positive polarity and a drain coupled to the compensation line of all even pixels of the $(i+1)^{th}$ or the $(i+2)^{th}$ pixel row;

a third N-type transistor, having a gate coupled to the $(i+1)^{th}$ scan line to receive the another corresponding scan signal and a source receiving the second clock signal;

a fourth capacitor, having a first end coupled to a drain of the third N-type transistor and a second end coupled to the common line; and a fourth N-type transistor, having a gate coupled to the drain of the third N-type transistor, a source receiving the stable voltage with the negative polarity and a drain coupled to the compensation line of all even pixels of the $(i+1)^{th}$ or the $(i+2)^{th}$ pixel row.

17. The LCD according to claim 14, wherein the $i^{th}$ second voltage supply unit comprises:

a first N-type transistor, having a gate coupled to the $i^{th}$ scan line to receive the corresponding scan signal and a source receiving the first clock signal;

a third capacitor, having a first end coupled to a drain of the first N-type transistor and a second end coupled to the common line;

a second N-type transistor, having a gate coupled to the drain of the first N-type transistor, a source receiving the stable voltage with the negative polarity and a drain coupled to the compensation line of all even pixels of the $i^{th}$ or the $(i+1)^{th}$ pixel row;

a third N-type transistor having a gate coupled to the $i^{th}$ scan line to receive the corresponding scan signal and a source receiving the second clock signal;

a fourth capacitor, having a first end coupled to a drain of the third N-type transistor and a second end coupled to the common line; and a fourth N-type transistor, having a gate coupled to the drain of the third N-type transistor, a source receiving the stable voltage with the positive polarity and a drain coupled to the compensation line of all even pixels of the $i^{th}$ or the $(i+1)^{th}$ pixel row.

18. The LCD according to claim 14, wherein the $(i+1)^{th}$ second voltage supply unit comprises:
   a first N-type transistor, having a gate coupled to the $(i+1)^{th}$ scan line to receive the another corresponding scan signal and a source receiving the first clock signal;
   a third capacitor, having a first end coupled to a drain of the first N-type transistor and a second end coupled to the common line;
   a second N-type transistor, having a gate coupled to a drain of the first N-type transistor, a source receiving the stable voltage with the negative polarity and a drain coupled to the compensation line of all odd pixels of the $(i+1)^{th}$ or the $(i+2)^{th}$ pixel row;
   a third N-type transistor, having a gate coupled to the $(i+1)^{th}$ scan line to receive the another corresponding scan signal and a source receiving the second clock signal;
   a fourth capacitor, having a first end coupled to a drain of the third N-type transistor and a second end coupled to the common line; and
   a fourth N-type transistor, having a gate coupled to the drain of the third N-type transistor, a source receiving the stable voltage with the positive polarity and a drain coupled to the compensation line of all odd pixels of the $(i+1)^{th}$ or the $(i+2)^{th}$ pixel row.

19. The LCD according to claim 1,
wherein
   the $i^{th}$ first voltage supply unit provides the stable voltage with a positive polarity to the compensation line of all odd pixels of the $i^{th}$ or the $(i+1)^{th}$ pixel row according to a corresponding scan signal, a first clock signal and a second clock signal; and
   the $(i+1)^{th}$ first voltage supply unit provides the stable voltage with the positive polarity to the compensation line of all even pixels of the $(i+1)^{th}$ or the $(i+2)^{th}$ pixel row according to another corresponding scan signal, the first clock signal and the second clock signal; and
wherein
   the $i^{th}$ second voltage supply unit provides the stable voltage with a negative polarity to the compensation line of all even pixels of the $i^{th}$ or the $(i+1)^{th}$ pixel row according to the corresponding scan signal, the first clock signal and the second clock signal; and
   the $(i+1)^{th}$ second voltage supply unit provides the stable voltage with the negative polarity to the compensation line of all odd pixels of the $(i+1)^{th}$ or the $(i+2)^{th}$ pixel row according to the another corresponding scan signal, the first clock signal and the second clock signal.

20. The LCD according to claim 19, wherein a duty cycle of the first clock signal is substantially a frame period of the LCD, while the second clock signal is maintained enabled.

21. The LCD according to claim 19, wherein the $i^{th}$ first voltage supply unit comprises:
   a first N-type transistor, having a gate and a source both coupled with each other to receive the second clock signal;
   a second N-type transistor, having a gate coupled to a drain of the first N-type transistor, a source receiving the stable voltage with the positive polarity and a drain coupled to the compensation line of all odd pixels of the $i^{th}$ or the $(i+1)^{th}$ pixel row;
   a third N-type transistor, having a gate coupled to the $i^{th}$ scan line to receive the corresponding scan signal and a source receiving the first clock signal;
   a third capacitor, having a first end coupled to a drain of the third N-type transistor and a second end coupled to the common line;
   a fourth N-type transistor, having a gate coupled to the drain of the third N-type transistor, a source receiving the stable voltage with the negative polarity and a drain coupled to the gate of the second N-type transistor;
   a fifth N-type transistor, having a gate coupled to the drain of the third N-type transistor, a source receiving the stable voltage with the negative polarity, and a drain coupled to the compensation line of all odd pixels of the $i^{th}$ or the $(i+1)^{th}$ pixel row, wherein the $i^{th}$ first voltage supply unit further provides the stable voltage with the positive polarity to the compensation line of all odd pixels of the $i^{th}$ or the $(i+1)^{th}$ pixel row according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
   a sixth N-type transistor, having a gate and a source both coupled with each other to receive the third clock signal, and a drain coupled to the drain of the first N-type transistor.

22. The LCD according to claim 19, wherein the $(i+1)^{th}$ first voltage supply unit comprises:
   a first N-type transistor, having a gate and a source both coupled with each other to receive the second clock signal;
   a second N-type transistor, having a gate coupled to the drain of the first N-type transistor, a source receiving the stable voltage with the positive polarity, and a drain coupled to the compensation line of all even pixels of the $(i+1)^{th}$ or the $(i+2)^{th}$ pixel row;
   a third N-type transistor, having a gate coupled to the $(i+1)^{th}$ scan line to receive the another corresponding scan signal, and a source receiving the first clock signal;
   a third capacitor, having a first end coupled to a drain of the third N-type transistor, and a second end coupled to the common line;
   a fourth N-type transistor, having a gate coupled to the drain of the third N-type transistor, a source receiving the stable voltage with the negative polarity, and a drain coupled to the gate of the second N-type transistor;
   a fifth N-type transistor, having a gate coupled to the drain of the third N-type transistor, a source receiving the stable voltage with the negative polarity, and a drain coupled to the compensation line of all even pixels of the $(i+1)^{th}$ or the $(i+2)^{th}$ pixel row, wherein the $(i+1)^{th}$ first voltage supply unit further provides the stable voltage with the positive polarity to the compensation line of all even pixels of the $(i+1)^{th}$ or the $(i+2)^{th}$ pixel row according to the another corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
   a sixth N-type transistor, having a gate and a source both coupled with each other to receive the third clock signal, and a drain coupled to the drain of the first N-type transistor.

23. The LCD according to claim 19, wherein the $i^{th}$ second voltage supply unit comprises:
- a first N-type transistor, having a gate and a source both coupled with each other to receive the second clock signal;
- a second N-type transistor, having a gate coupled to a drain of the first N-type transistor, a source receiving the stable voltage with the negative polarity, and a drain coupled to the compensation line of all even pixels of the $i^{th}$ or the $(i+1)^{th}$ pixel row;
- a third N-type transistor, having a gate coupled to the $i^{th}$ scan line to receive the corresponding scan signal, and a source receiving the first clock signal;
- a third capacitor, having a first end coupled to a drain of the third N-type transistor, and a second end coupled to the common line;
- a fourth N-type transistor, having a gate coupled to the drain of the third N-type transistor, a source receiving the stable voltage with the negative polarity, and a drain coupled to the gate of the second N-type transistor;
- a fifth N-type transistor, having a gate coupled to the drain of the third N-type transistor, a source receiving the stable voltage with the positive polarity, and a drain coupled to the compensation line of all even pixels of the $i^{th}$ or the $(i+1)^{th}$ pixel row, wherein the $i^{th}$ second voltage supply unit further provides the stable voltage with the negative polarity to the compensation line of all even pixels of the $i^{th}$ or the $(i+1)^{th}$ pixel row according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
- a sixth N-type transistor, having a gate and a source both coupled with each other to receive the third clock signal, and a drain coupled to the drain of the first N-type transistor.

24. The LCD according to claim 19, wherein the $(i+1)^{th}$ second voltage supply unit comprises:
- a first N-type transistor, having a gate and a source both coupled with each other to receive the second clock signal;
- a second N-type transistor, having a gate coupled to a drain of the first N-type transistor, a source receiving the stable voltage with the negative polarity, and a drain coupled to the compensation line of all odd pixels of the $(i+1)^{th}$ or the $(i+2)^{th}$ pixel row;
- a third N-type transistor, having a gate coupled to the $(i+1)^{th}$ scan line to receive the another corresponding scan signal, and a source receiving the first clock signal;
- a third capacitor, having a first end coupled to a drain of the third N-type transistor, and a second end coupled to the common line;
- a fourth N-type transistor, having a gate coupled to the drain of the third N-type transistor, a source receiving the stable voltage with the negative polarity, and a drain coupled to the gate of the second N-type transistor;
- a fifth N-type transistor, having a gate coupled to the drain of the third N-type transistor, a source receiving the stable voltage with the positive polarity, and a drain coupled to the compensation line of all odd pixels of the $(i+1)^{th}$ or the $(i+2)^{th}$ pixel row, wherein the $(i+1)^{th}$ second voltage supply unit further provides the stable voltage with the negative polarity to the compensation line of all odd pixels of the $(i+1)^{th}$ or the $(i+2)^{th}$ pixel row according to the another corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
- a sixth N-type transistor, having a gate and a source both coupled with each other to receive the third clock signal, and a drain coupled to the drain of the first N-type transistor.

25. The LCD according to claim 1, wherein the second end of the first storage capacitor is coupled to the common line to receive the stable voltage with a positive polarity, and each of the pixels of the $i^{th}$ pixel row further comprises:
- an auxiliary common line; and
- a second storage capacitor, having a first end coupled to the drain of the pixel transistor and a second end coupled to the auxiliary common line to receive the stable voltage with a negative polarity,
wherein the pixel transistor, the first liquid crystal capacitor and the first and the second storage capacitors are located in the transparent area.

26. The LCD according to claim 25,
wherein the $i^{th}$ first voltage supply unit provides the stable voltage with the positive polarity to the compensation line of all odd pixels of the $i^{th}$ or the $(i+1)^{th}$ pixel row and to the second end of the first storage capacitor according to a corresponding scan signal, and a first and a second clock signals, wherein there is a 180 degrees phase difference between the first clock signal and the second clock signal; and
wherein the $i^{th}$ second voltage supply unit provides the stable voltage with the negative polarity to the compensation line of all even pixels of the $i^{th}$ or the $(i+1)^{th}$ pixel row and to the second end of the second storage capacitor according to the corresponding scan signal, and the first and the second clock signals, wherein there is a 180 degrees phase difference between the first clock signal and the second clock signal,
wherein duty cycles of the first and the second clock signals are substantially a frame period of the LCD.

27. The LCD according to claim 26, wherein the $i^{th}$ first voltage supply unit comprises:
- a first N-type transistor, having a gate coupled to the $i^{th}$ scan line to receive the corresponding scan signal, and a source receiving the first clock signal;
- a third capacitor, having a first end coupled to a drain of the first N-type transistor, and a second end coupled to the common line;
- a second N-type transistor, having a gate coupled to the drain of the first N-type transistor, a source receiving the stable voltage with the positive polarity, and a drain coupled to the compensation line of all odd pixels of the $i^{th}$ or the $(i+1)^{th}$ pixel row and to the second end of the first storage capacitor;
- a third N-type transistor, having a gate coupled to the $i^{th}$ scan line to receive the corresponding scan signal, and a source receiving the second clock signal;
- a fourth capacitor, having a first end coupled to a drain of the third N-type transistor, and a second end coupled to the common line; and
- a fourth N-type transistor, having a gate coupled to the drain of the third N-type transistor, a source receiving the stable voltage with the negative polarity, and a drain coupled to the compensation line of all odd pixels of the $i^{th}$ or the $(i+1)^{th}$ pixel row and to the second end of the first storage capacitor.

28. The LCD according to claim 26, wherein the $i^{th}$ second voltage supply unit comprises:
- a first N-type transistor, having a gate coupled to the $i^{th}$ scan line to receive the corresponding scan signal, and a source receiving the first clock signal;
- a third capacitor, having a first end coupled to a drain of the first N-type transistor, and a second end coupled to the common line;
- a second N-type transistor, having a gate coupled to the drain of the first N-type transistor, a source receiving the stable voltage with the negative polarity, and a drain coupled to the compensation line of all even pixels of the $i^{th}$ or the $(i+1)^{th}$ pixel row and to the second end of the second storage capacitor;
- a third N-type transistor, having a gate coupled to the $i^{th}$ scan line to receive the corresponding scan signal, and a source receiving the second clock signal;
- a fourth capacitor, having a first end coupled to a drain of the third N-type transistor, and a second end coupled to the common line; and
- a fourth N-type transistor, having a gate coupled to the drain of the third N-type transistor, a source receiving the stable voltage with the positive polarity, and a drain coupled to the compensation line of all even pixels of the $i^{th}$ or the $(i+1)^{th}$ pixel row and to the second end of the second storage capacitor.

29. The LCD according to claim 25,
- wherein the $i^{th}$ first voltage supply unit provides the stable voltage with the positive polarity to the compensation line of all odd pixels of the $i^{th}$ or the $(i+1)^{th}$ pixel row and to the second end of the first storage capacitor according to a corresponding scan signal, and a first and a second clock signals; and
- wherein the $i^{th}$ second voltage supply unit provides the stable voltage with the negative polarity to the compensation line of all even pixels of the $i^{th}$ or the $(i+1)^{th}$ pixel row and to the second end of the second storage capacitor according to the corresponding scan signal, and the first and the second clock signals.

30. The LCD according to claim 29, wherein a duty cycle of the first clock signal is substantially a frame period of the LCD, while the second clock signal is maintained enabled.

31. The LCD according to claim 29, wherein the $i^{th}$ first voltage supply unit comprises:
- a first N-type transistor, having a gate and a source both coupled with each other to receive the second clock signal;
- a second N-type transistor, having a gate coupled to a drain of the first N-type transistor, a source receiving the stable voltage with the positive polarity, and a drain coupled to the compensation line of all odd pixels of the $i^{th}$ or the $(i+1)^{th}$ pixel row and to the second end of the first storage capacitor;
- a third N-type transistor, having a gate coupled to the $i^{th}$ scan line to receive the corresponding scan signal, and a source receiving the first clock signal;
- a third capacitor, having a first end coupled to a drain of the third N-type transistor, and a second end coupled to the common line;
- a fourth N-type transistor, having a gate coupled to the drain of the third N-type transistor, a source receiving the stable voltage with the negative polarity, and a drain coupled to the gate of the second N-type transistor;
- a fifth N-type transistor, having a gate coupled to the drain of the third N-type transistor, a source receiving the stable voltage with the negative polarity, and a drain coupled to the compensation line of all odd pixels of the $i^{th}$ or the $(i+1)^{th}$ pixel row and the to second end of the first storage capacitor, wherein the $i^{th}$ first voltage supply unit further provides the stable voltage with the positive polarity to the compensation line of all odd pixels of the $i^{th}$ or the $(i+1)^{th}$ pixel row and to the second end of the first storage capacitor according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
- a sixth N-type transistor having a gate and a source both coupled with each other to receive the third clock signal, and a drain coupled to the drain of the first N-type transistor.

32. The LCD according to claim 29, wherein the $i^{th}$ second voltage supply unit comprises:
- a first N-type transistor, having a gate and a source both coupled with each other to receive the second clock signal;
- a second N-type transistor, having a gate coupled to the drain of the first N-type transistor, a source receiving the stable voltage with the negative polarity, and a drain coupled to the compensation line of all even pixels of the $i^{th}$ or the $(i+1)^{th}$ pixel row and to the second end of the second storage capacitor;
- a third N-type transistor, having a gate coupled to the $i^{th}$ scan line to receive the corresponding scan signal, and a source receiving the first clock signal;
- a third capacitor, having a first end coupled to a drain of the third N-type transistor, and a second end coupled to the common line;
- a fourth N-type transistor, having a gate coupled to the drain of the third N-type transistor, a source receiving the stable voltage with the negative polarity, and a drain coupled to the gate of the second N-type transistor;
- a fifth N-type transistor, having a gate coupled to the drain of the third N-type transistor, a source receiving the stable voltage with the positive polarity, and a drain coupled to the compensation line of all even pixels of the $i^{th}$ or the $(i+1)^{th}$ pixel row and to the second end of the second storage capacitor, wherein the $i^{th}$ second voltage supply unit further provides the stable voltage with the positive polarity to the compensation line of all even pixels of the $i^{th}$ or the $(i+1)^{th}$ pixel row and to the second end of the second storage capacitor according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
- a sixth N-type transistor, having a gate and a source both coupled with each other to receive the third clock signal, and a drain coupled to the drain of the first N-type transistor.

33. The LCD according to claim 25,
wherein
the $i^{th}$ first voltage supply unit provides the stable voltage with the positive polarity to the compensation line of all odd pixels of the $i^{th}$ or the $(i+1)^{th}$ pixel row and to the second end of the first storage capacitor according to a corresponding scan signal, and a first and a second clock signals, wherein there is a 180 degrees phase difference between the first clock signal and the second clock signal; and the (i+1)$^{th}$ first voltage supply unit provides the stable voltage with the positive polarity to the compensation line of all even pixels of the (i+1)$^{th}$ or the (i+2)$^{th}$ pixel row and to the second end of the first storage capacitor according to another corresponding scan signal, and the first and the second clock signal, wherein there is a 180 degrees phase difference between the first clock signal and the second clock signal; and wherein the i$^{th}$ second voltage supply unit provides the stable voltage with the negative polarity to the compensation line of all odd pixels of the i$^{th}$ or the (i+1)$^{th}$ pixel row and to the second end of the second storage capacitor according to the corresponding scan signal, and the first and the second clock signals, wherein there is a 180 degrees phase difference between the first clock signal and the second clock signal; and the (i+1)$^{th}$ second voltage supply unit provides the stable voltage with the negative polarity to the compensation line of all odd pixels of the (i+1)$^{th}$ or the (i+2)$^{th}$ pixel row and to the second end of the second storage capacitor according to the another corresponding scan signal, and the first and the second clock signals, wherein there is a 180 degrees phase difference between the first clock signal and the second clock signal, wherein duty cycles of the first and the second clock signals are substantially a frame period of the LCD.

34. The LCD according to claim 33, wherein the i$^{th}$ first voltage supply unit comprises:
a first N-type transistor, having a gate coupled to the i$^{th}$ scan line to receive the corresponding scan signal, and a source receiving the first clock signal;
a third capacitor, having a first end coupled to a drain of the first N-type transistor, and a second end coupled to the common line;
a second N-type transistor, having a gate coupled to a drain of the first N-type transistor, a source receiving the stable voltage with the positive polarity, and a drain coupled to the compensation line of all odd pixels of the i$^{th}$ or the (i+1)$^{th}$ pixel row and to the second end of the first storage capacitor;
a third N-type transistor, having a gate coupled to the i$^{th}$ scan line to receive the corresponding scan signal, and a source receiving the second clock signal;
a fourth capacitor, having a first end coupled to a drain of the third N-type transistor, and a second end coupled to the common line; and
a fourth N-type transistor, having a gate coupled to the drain of the third N-type transistor, a source receiving the stable voltage with the negative polarity, and a drain coupled to the compensation line of all odd pixels of the i$^{th}$ or the (i+1)$^{th}$ pixel row and to the second end of the first storage capacitor.

35. The LCD according to claim 33, wherein the (i+1)$^{th}$ first voltage supply unit comprises:
a first N-type transistor, having a gate coupled to the (i+1)$^{th}$ scan line to receive the another corresponding scan signal, and a source receiving the first clock signal;
a third capacitor, having a first end coupled to a drain of the first N-type transistor, and a second end coupled to the common line;
a second N-type transistor, having a gate coupled to the drain of the first N-type transistor, a source receiving the stable voltage with the positive polarity, and a drain coupled to the compensation line of all even pixels of the (i+1)$^{th}$ or the (i+2)$^{th}$ pixel row and to the second end of the first storage capacitor;
a third N-type transistor, having a gate coupled to the (i+1)$^{th}$ scan line to receive the another corresponding scan signal, and a source receiving the second clock signal;
a fourth capacitor, having a first end coupled to a drain of the third N-type transistor, and a second end coupled to the common line; and
a fourth N-type transistor, having a gate coupled to the drain of the third N-type transistor, a source receiving the stable voltage with the negative polarity, and a drain coupled to the compensation line of all even pixels of the (i+1)$^{th}$ or the (i+2)$^{th}$ pixel row and to the second end of the first storage capacitor.

36. The LCD according to claim 33, wherein the i$^{th}$ second voltage supply unit comprises:
a first N-type transistor, having a gate coupled to the i$^{th}$ scan line to receive the corresponding scan signal, and a source receiving the first clock signal;
a third capacitor, having a first end coupled to a drain of the first N-type transistor, and a second end coupled to the common line;
a second N-type transistor, having a gate coupled to the drain of the first N-type transistor, a source receiving the stable voltage with the negative polarity, and a drain coupled to the compensation line of all even pixels of the i$^{th}$ or the (i+1)$^{th}$ pixel row and to the second end of the second storage capacitor;
a third N-type transistor, having a gate coupled to the i$^{th}$ scan line to receive the corresponding scan signal, and a source receiving the second clock signal;
a fourth capacitor, having a first end coupled to a drain of the third N-type transistor, and a second end coupled to the common line; and
a fourth N-type transistor, having a gate coupled to the drain of the third N-type transistor, a source receiving the stable voltage with the positive polarity, and a drain coupled to the compensation line of all even pixels of the i$^{th}$ or the (i+1)$^{th}$ pixel row and to the second end of the second storage capacitor.

37. The LCD according to claim 33, wherein the (i+1)$^{th}$ second voltage supply unit comprises:
a first N-type transistor, having a gate coupled to the (i+1)$^{th}$ scan line to receive the another corresponding scan signal, and a source receiving the first clock signal;
a third capacitor, having a first end coupled to a drain of the first N-type transistor, and a second end coupled to the common line;
a second N-type transistor, having a gate coupled to the drain of the first N-type transistor, a source receiving the stable voltage with the negative polarity, and a drain coupled to the compensation line of all odd pixels of the (i+1)$^{th}$ or the (i+2)$^{th}$ pixel row and to the second end of the second storage capacitor;
a third N-type transistor, having a gate coupled to the (i+1)$^{th}$ scan line to receive the another corresponding scan signal, and a source receiving the second clock signal;
a fourth capacitor, having a first end coupled to a drain of the third N-type transistor, and a second end coupled to the common line; and
a fourth N-type transistor, having a gate coupled to the drain of the third N-type transistor, a source receiving the stable voltage with the positive polarity, and a drain coupled to the compensation line of all odd pixels of the (i+1)$^{th}$ or the (i+2)$^{th}$ pixel row and to the second end of the second storage capacitor.

38. The LCD according to claim 25,
wherein
the i$^{th}$ first voltage supply unit provides the stable voltage with the positive polarity to the compensation line of all odd pixels of the i$^{th}$ or the (i+1)$^{th}$ pixel row and to the second end of the first storage capacitor according to a corresponding scan signal, and a first and a second clock signals; and
the (i+1)$^{th}$ first voltage supply unit provides the stable voltage with the positive polarity to the compensation line of all even pixels of the (i+1)$^{th}$ or the (i+2)$^{th}$ pixel row and to the second end of the first storage capacitor according to another corresponding scan signal, and the first and the second clock signals; and
wherein
the i$^{th}$ second voltage supply unit provides the stable voltage with the negative polarity to the compensation line of all even pixels of the i$^{th}$ or the (i+1)$^{th}$ pixel row and to the second end of the second storage capacitor according to the corresponding scan signal, and the first and the second clock signals; and
the (i+1)$^{th}$ second voltage supply unit provides the stable voltage with the negative polarity to the compensation line of all odd pixels of the (i+1)$^{th}$ or the (i+2)$^{th}$ pixel row and to the second end of the second storage capacitor according to the another corresponding scan signal, and the first and the second clock signals.

39. The LCD according to claim 38, wherein a duty cycle of the first clock signal is substantially a frame period of the LCD, while the second clock signal is maintained enabled.

40. The LCD according to claim 38, wherein the i$^{th}$ first voltage supply unit comprises:
a first N-type transistor, having a gate and a source both coupled with each other to receive the second clock signal;
a second N-type transistor, having a gate coupled to a drain of the first N-type transistor, a source receiving the stable voltage with the positive polarity, and a drain coupled to the compensation line of all odd pixels of the i$^{th}$ or the (i+1)$^{th}$ pixel row and to the second end of the first storage capacitor;
a third N-type transistor, having a gate coupled to the i$^{th}$ scan line to receive the corresponding scan signal, and a source receiving the first clock signal;
a third capacitor, having a first end coupled to a drain of the third N-type transistor, and a second end coupled to the common line;
a fourth N-type transistor, having a gate coupled to the drain of the third N-type transistor, a source receiving the stable voltage with the negative polarity, and a drain coupled to the gate of the second N-type transistor;
a fifth N-type transistor, having a gate coupled to the drain of the third N-type transistor, a source receiving the stable voltage with the negative polarity, and a drain coupled to the compensation line of all odd pixels of the i$^{th}$ or the (i+1)$^{th}$ pixel row and to the second end of the first storage capacitor, wherein the i$^{th}$ first voltage supply unit further provides the stable voltage with the positive polarity to the compensation line of all odd pixels of the i$^{th}$ or the (i+1)$^{th}$ pixel row and to the second end of the first storage capacitor according to the corresponding scan signal, the first clock signal, and the second and a third clock signals, wherein there is a 180 degrees phase difference between the first clock signal and the second clock signal, and duty cycles of the second and the third clock signals are substantially an enable period of the corresponding scan signal; and
a sixth N-type transistor, having a gate and a source both coupled with each other to receive the third clock signal, and a drain coupled to the drain of the first N-type transistor.

41. The LCD according to claim 38, wherein the (i+1)$^{th}$ first voltage supply unit comprises:
a first N-type transistor, having a gate and a source both coupled with each other to receive the second clock signal;
a second N-type transistor, having a gate coupled to a drain of the first N-type transistor, a source receiving the stable voltage with the positive polarity, and a drain coupled to the compensation line of all even pixels of the (i+1)$^{th}$ or the (i+2)$^{th}$ pixel row and to the second end of the first storage capacitor;
a third N-type transistor, having a gate coupled to the (i+1)$^{th}$ scan line to receive the another corresponding scan signal, and a source receiving the first clock signal;
a third capacitor, having a first end coupled to a drain of the third N-type transistor, and a second end coupled to the common line;
a fourth N-type transistor, having a gate coupled to the drain of the third N-type transistor, a source receiving the stable voltage with the negative polarity, and a drain coupled to the gate of the second N-type transistor;
a fifth N-type transistor, having a gate coupled to the drain of the third N-type transistor, a source receiving the stable voltage with the negative polarity, and a drain coupled to the compensation line of all even pixels of the (i+1)$^{th}$ or the (i+2)$^{th}$ pixel row and the second end of the first storage capacitor, wherein the (i+1)$^{th}$ first voltage supply unit further provides the stable voltage with the positive polarity to the compensation line of all even pixels of the (i+1)$^{th}$ or the (i+2)$^{th}$ pixel row and to the second end of the first storage capacitor according to the other corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and
a sixth N-type transistor, having a gate and a source both coupled with each other to receive the third clock signal, and a drain coupled to the drain of the first N-type transistor.

42. The LCD according to claim 38, wherein the i$^{th}$ second voltage supply unit comprises:
a first N-type transistor, having a gate and a source both coupled with each other to receive the second clock signal;
a second N-type transistor, having a gate coupled to the drain of the first N-type transistor, a source receiving the stable voltage with the negative polarity, and a drain coupled to the compensation line of all even pixels of the i$^{th}$ or the (i+1)$^{th}$ pixel row and to the second end of the second storage capacitor;
a third N-type transistor, having a gate coupled to the i$^{th}$ scan line to receive the corresponding scan signal, and a source receiving the first clock signal;
a third capacitor, having a first end coupled to a drain of the third N-type transistor, and a second end coupled to the common line;
a fourth N-type transistor, having a gate coupled to the drain of the third N-type transistor, a source receiving the stable voltage with the negative polarity, and a drain coupled to the gate of the second N-type transistor;

a fifth N-type transistor, having a gate coupled to the drain of the third N-type transistor, a source receiving the stable voltage with the positive polarity, and a drain coupled to the compensation line of all even pixels of the $i^{th}$ or the $(i+1)^{th}$ pixel row and to the second end of the second storage capacitor, wherein the $i^{th}$ second voltage supply unit further provides the stable voltage with the negative polarity to the compensation line of all even pixels of the $i^{th}$ or the $(i+1)^{th}$ pixel row and to the second end of the second storage capacitor according to the corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and a sixth N-type transistor, having a gate and a source both coupled with each other to receive the third clock signal, and a drain is coupled to the drain of the first N-type transistor.

43. The LCD according to claim 38, wherein the $(i+1)^{th}$ second voltage supply unit comprises:

a first N-type transistor, having a gate and a source both coupled with each other to receive the second clock signal;

a second N-type transistor, having a gate coupled to a drain of the first N-type transistor, a source receiving the stable voltage with the negative polarity, and a drain coupled to the compensation line of all odd pixels of the $(i+1)^{th}$ or the $(i+2)^{th}$ pixel row and to the second end of the second storage capacitor;

a third N-type transistor, having a gate coupled to the $(i+1)^{th}$ scan line to receive the another corresponding scan signal, and a source receiving the first clock signal;

a third capacitor, having a first end coupled to a drain of the third N-type transistor, and a second end coupled to the common line;

a fourth N-type transistor, having a gate coupled to the drain of the third N-type transistor, a source receiving the stable voltage with the negative polarity, and a drain coupled to the gate of the second N-type transistor;

a fifth N-type transistor, having a gate coupled to the drain of the third N-type transistor, a source receiving the stable voltage with the positive polarity, and a drain coupled to the compensation line of all odd pixels of the $(i+1)^{th}$ or the $(i+2)^{th}$ pixel row and to the second end of the second storage capacitor, wherein the $(i+1)^{th}$ second voltage supply unit further provides the stable voltage with the negative polarity to the compensation line of all odd pixels of the $(i+1)^{th}$ or the $(i+2)^{th}$ pixel row and to the second end of the second storage capacitor according to the other corresponding scan signal, the first clock signal, and the second and a third clock signals, wherein there is a 180 degrees phase difference between the second clock signal and the third clock signal, and duty cycles of the second and the third clock signals are substantially an enable period of the corresponding scan signal; and a sixth N-type transistor, having a gate and a source both coupled with each other to receive the third clock signal, and a drain coupled to the drain of the first N-type transistor.

44. The LCD according to claim 1, wherein the display panel is a single cell gap liquid crystal display panel.

45. A liquid crystal display, comprising:
a display panel, comprising:
  a plurality of scan lines;
  a plurality of data lines substantially perpendicularly disposed with the scan lines;
  a plurality of pixels respectively electrically connected with corresponding data line and corresponding scan line and arranged in an array, each of the pixels comprising:
    a common line receiving a common voltage; and
    a compensation line;
    a pixel transistor, having a gate coupled to the $i^{th}$ scan line and a source coupled to the $i^{th}$ data line, where i is a positive integer;
    a first liquid crystal capacitor, having a first end coupled to a drain of the pixel transistor and a second end coupled to a common electrode; and
    a first storage capacitor, having a first end coupled to the drain of the pixel transistor and a second end coupled to the common line;
    an auxiliary common line;
    a second storage capacitor, having a first end coupled to the drain of the pixel transistor and a second end coupled to the auxiliary common line;
    a first capacitor, having a first end coupled to the drain of the pixel transistor;
    a second liquid crystal capacitor, having a first end coupled to a second end of the first capacitor and a second end coupled to the common electrode; and
    a second capacitor, having a first end coupled to the second end of the first capacitor and a second end coupled to the compensation line; and
  a voltage supply device, coupled to the compensation line of each of the pixels, comprising:
    a first sub-voltage supply device including a plurality of a first voltage supply units, wherein the $i^{th}$ first voltage supply unit is coupled to the compensation line of all odd pixels of the $i^{th}$ or the $(i+1)^{th}$ pixel row and to the second end of the first storage capacitor; and
    a second sub-voltage supply device including a plurality of a second voltage supply units, wherein the $i^{th}$ second voltage supply unit is coupled to the compensation line of all even pixels of the $i^{th}$ or the $(i+1)^{th}$ pixel row and to the second end of the second storage capacitor.

* * * * *